US010359333B2

(12) United States Patent
Lawson et al.

(10) Patent No.: US 10,359,333 B2
(45) Date of Patent: Jul. 23, 2019

(54) BALANCING DEVICE, UNIFORMITY DEVICE AND METHODS FOR UTILIZING THE SAME

(71) Applicant: Android Industries LLC, Auburn Hills, MI (US)

(72) Inventors: Lawrence J. Lawson, Troy, MI (US); Robert Reece, Clarkston, MI (US); Barry Allan Clark, Ortonville, MI (US); Donald Graham Straitiff, Howell, MI (US)

(73) Assignee: Android Industries LLC, Auburn Hills, MI (US)

( * ) Notice: Subject to any disclaimer, the term of this patent is extended or adjusted under 35 U.S.C. 154(b) by 294 days.

(21) Appl. No.: 15/238,268

(22) Filed: Aug. 16, 2016

(65) Prior Publication Data

US 2016/0370247 A1 Dec. 22, 2016

Related U.S. Application Data

(63) Continuation-in-part of application No. 14/328,157, filed on Jul. 10, 2014, now Pat. No. 10,048,157.

(60) Provisional application No. 61/845,053, filed on Jul. 11, 2013.

(51) Int. Cl.

| | |
|---|---|
| ***G01M 1/04*** | (2006.01) |
| ***G01M 1/16*** | (2006.01) |
| ***G01M 17/02*** | (2006.01) |
| ***G01L 5/16*** | (2006.01) |
| ***G01M 1/06*** | (2006.01) |

(52) U.S. Cl.

CPC ............... *G01M 1/045* (2013.01); *G01L 5/16* (2013.01); *G01M 1/04* (2013.01); *G01M 1/06* (2013.01); *G01M 1/16* (2013.01); *G01M 17/022* (2013.01)

(58) Field of Classification Search

CPC ............ G01M 1/045; G01M 1/16; G01L 5/16

USPC ............................................................ 73/462

See application file for complete search history.

(56) References Cited

U.S. PATENT DOCUMENTS

| | | | | |
|---|---|---|---|---|
| 5,027,649 | A | 7/1991 | Himmler | |
| 6,324,753 | B1 | 12/2001 | Naruse | |
| 6,584,877 | B1 * | 7/2003 | Poling, Sr. | G01M 17/022 82/101 |
| 2002/0011103 | A1 * | 1/2002 | Kimbara | B60C 25/05 73/146 |
| 2005/0006031 | A1 | 1/2005 | Pellerin et al. | |
| 2010/0013913 | A1 | 1/2010 | Vignoli | |

(Continued)

FOREIGN PATENT DOCUMENTS

| | | | |
|---|---|---|---|
| EP | 0924502 | A2 | 6/1999 |
| EP | 1239275 | A2 | 9/2002 |
| WO | 9834801 | A2 | 8/1998 |

OTHER PUBLICATIONS

International Search Report, International Application PCT/US2017/046840 dated Jan. 18, 2018.

(Continued)

*Primary Examiner* — Tarun Sinha

(74) *Attorney, Agent, or Firm* — Honigman LLP

(57) ABSTRACT

A balancing device, a uniformity device and an apparatus including the balancing device and the uniformity device are disclosed. Each of the balancing device and the uniformity device includes at least one multi-axis transducer. Methods are also disclosed.

35 Claims, 83 Drawing Sheets

(56) References Cited

U.S. PATENT DOCUMENTS

| | | | | |
|---|---|---|---|---|
| 2010/0263801 | A1* | 10/2010 | Lawson | B25J 15/10 157/1.1 |
| 2012/0205054 | A1 | 8/2012 | Kirstatter | |
| 2013/0042980 | A1* | 2/2013 | Sotgiu | B60C 25/132 157/1.24 |
| 2014/0326061 | A1 | 11/2014 | Wakazono et al. | |
| 2015/0013453 | A1 | 1/2015 | Lawson et al. | |

OTHER PUBLICATIONS

International Search Report, International Application No. PCT/US2014/034143 dated Aug. 19, 2014.

International Search Report, International Application No. PCT/US2014/046192 dated Jan. 12, 2016.

* cited by examiner

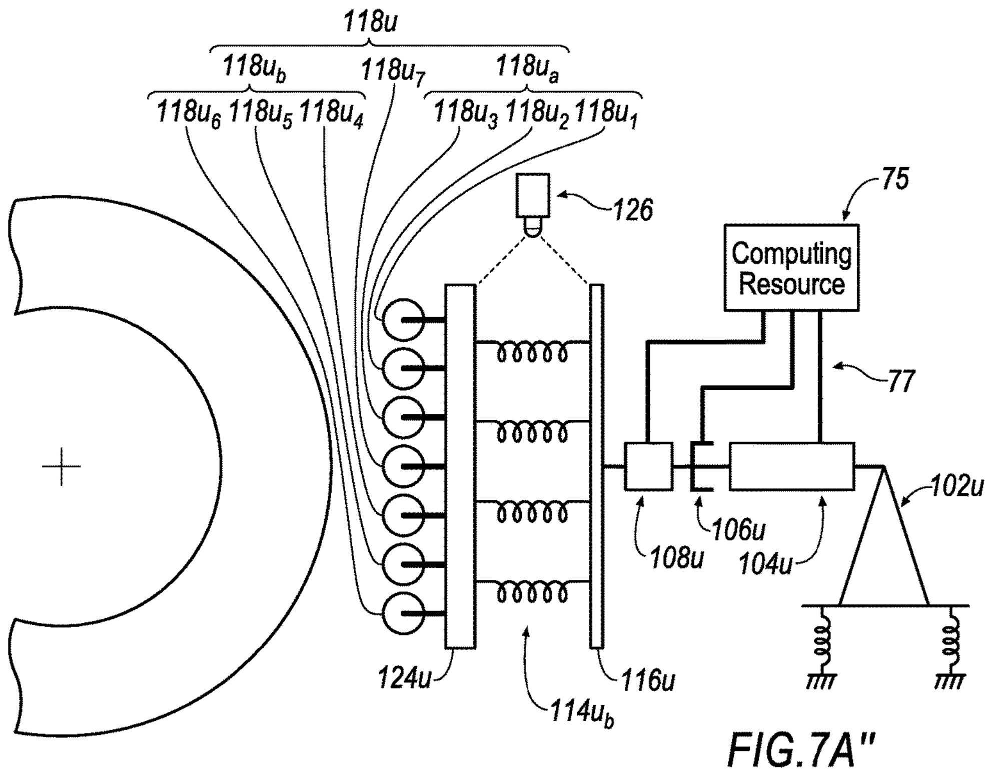
FIG.7A"
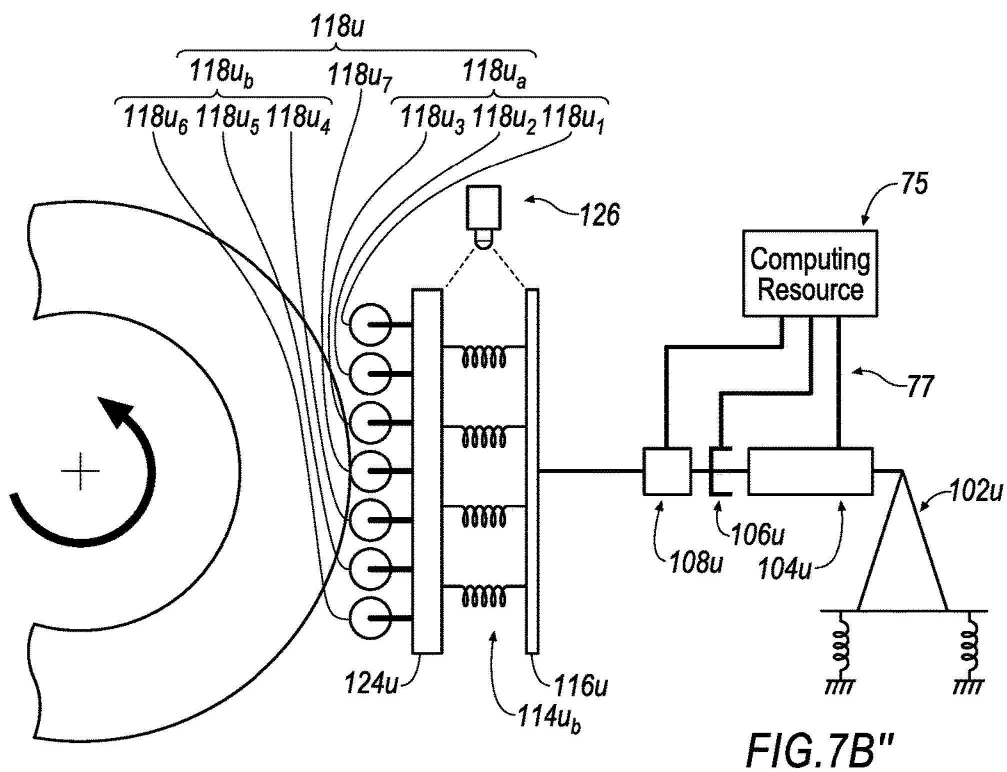
FIG.7B"

FIG.9''''
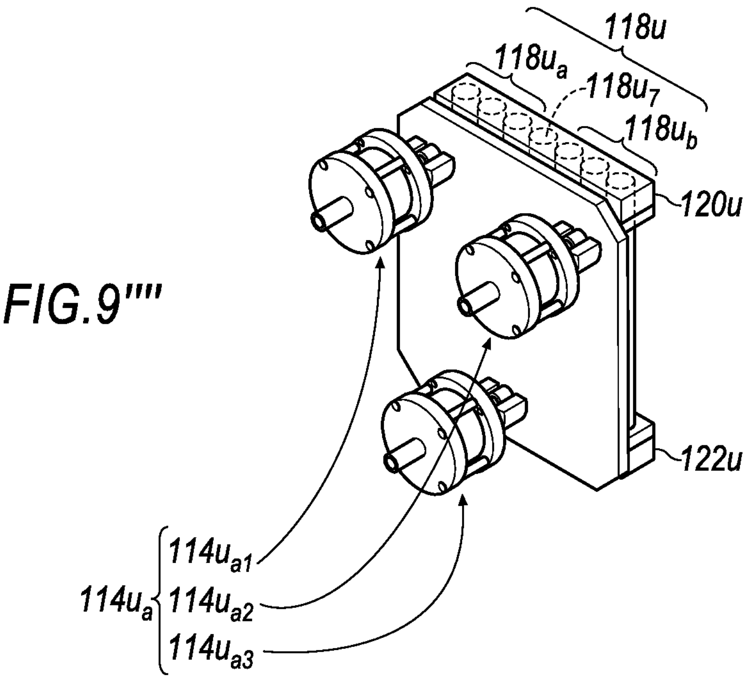
FIG.9'''''
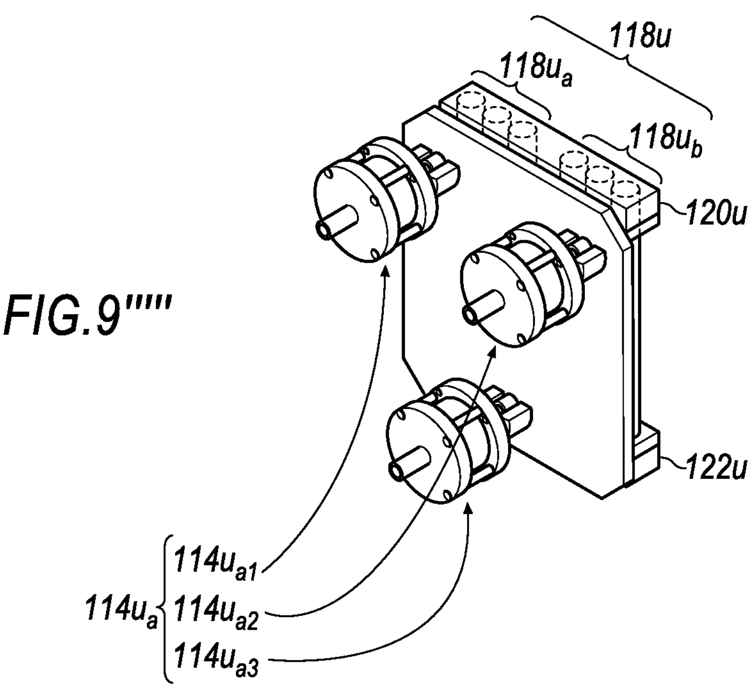

FIG.16''''
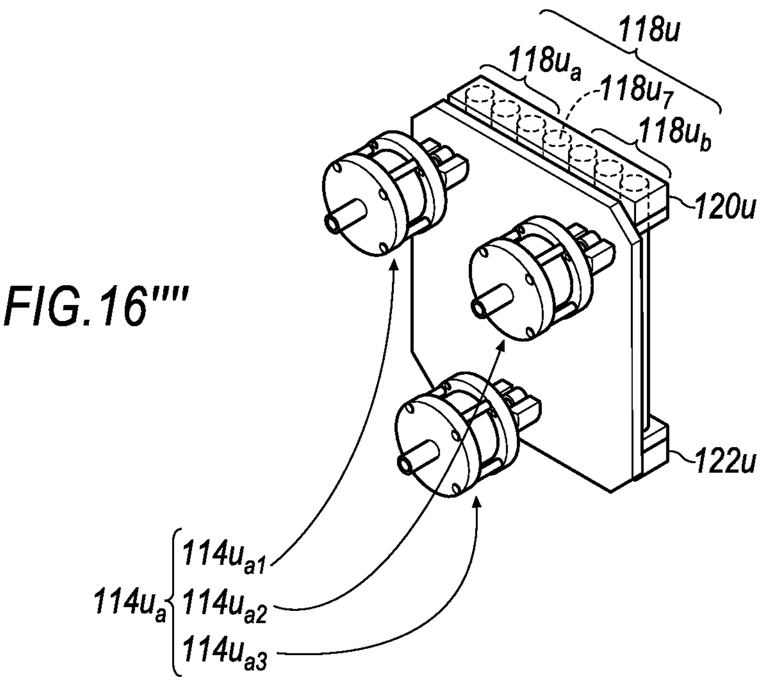
FIG.16'''''
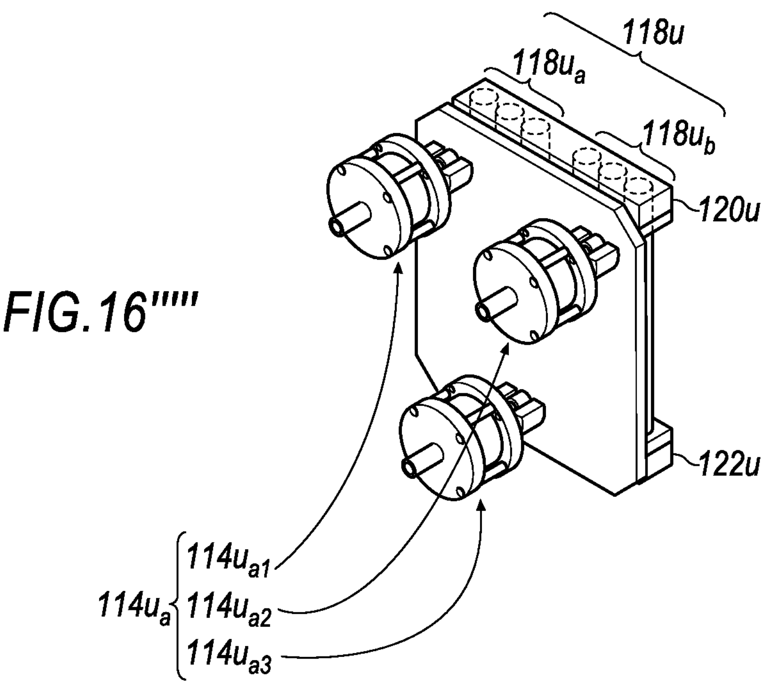

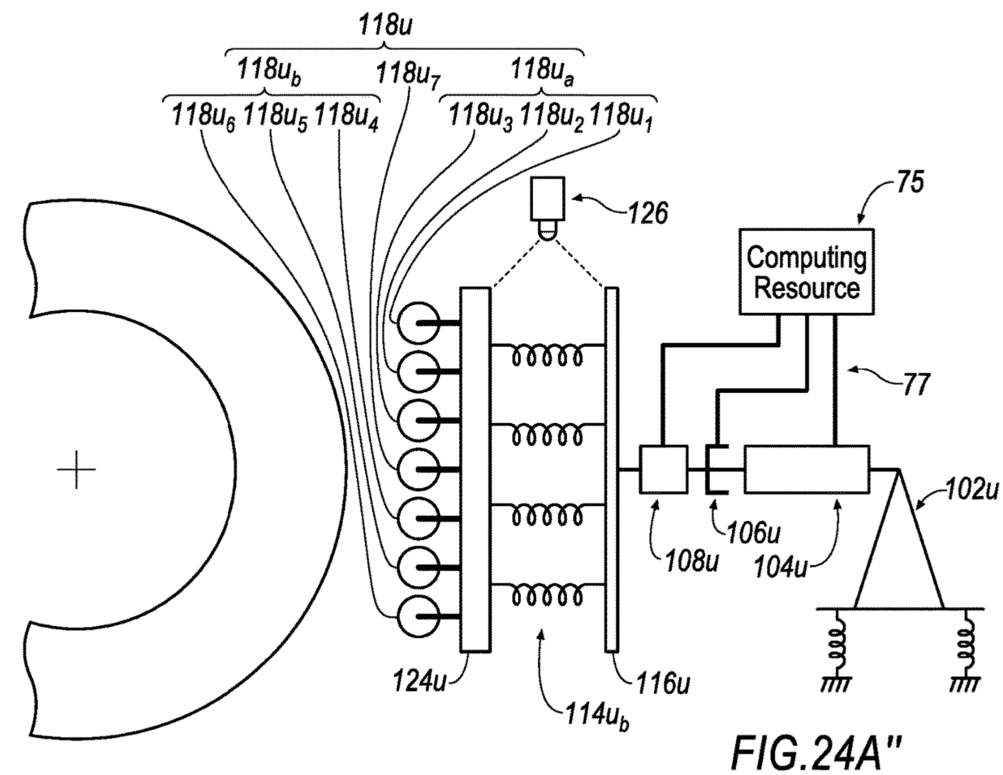
FIG.24A"
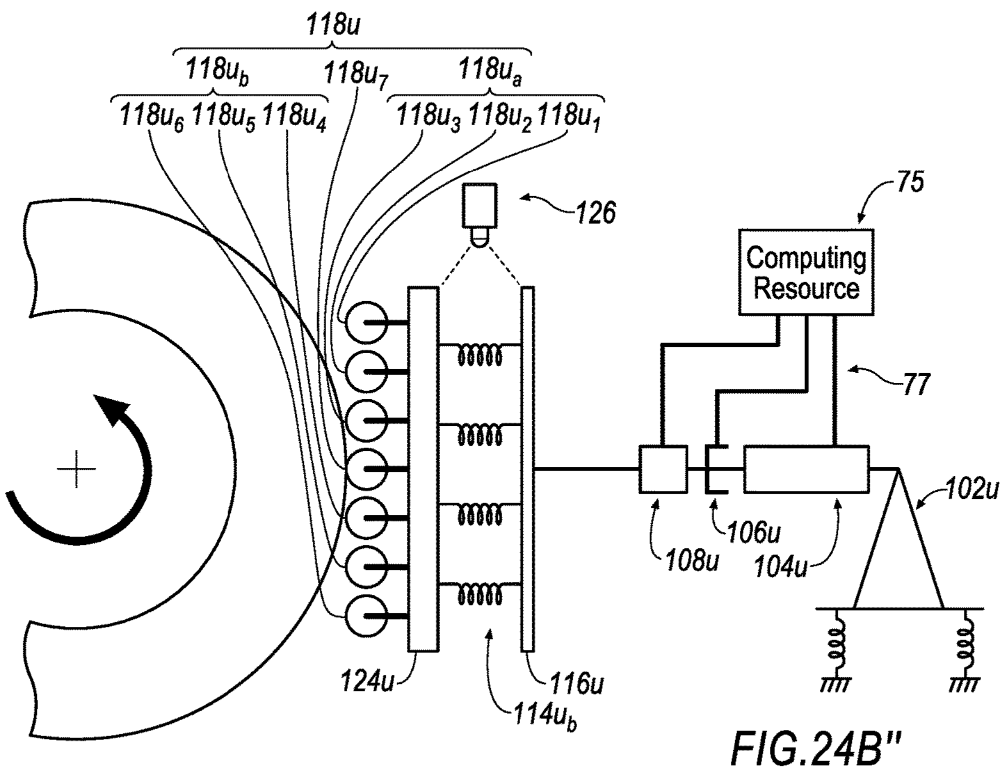
FIG.24B"

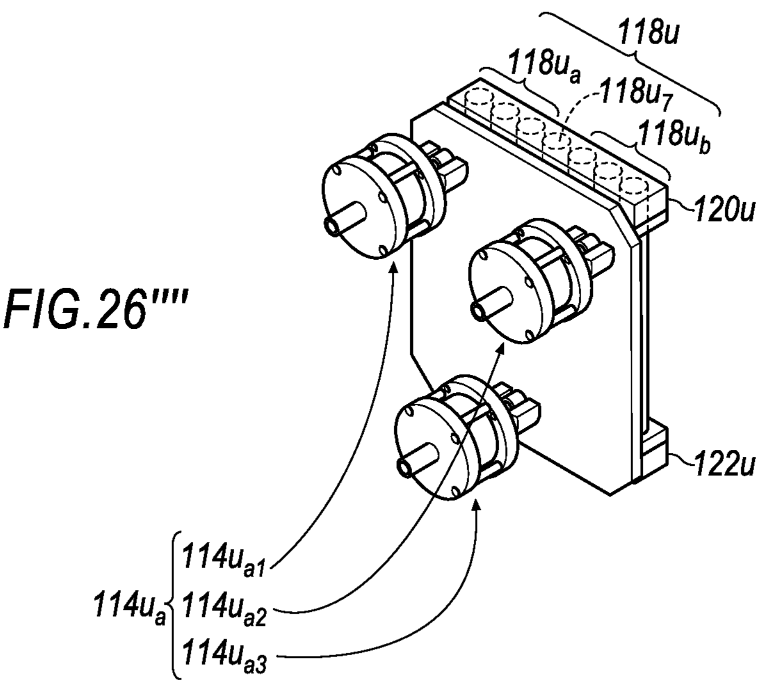
FIG.26''''
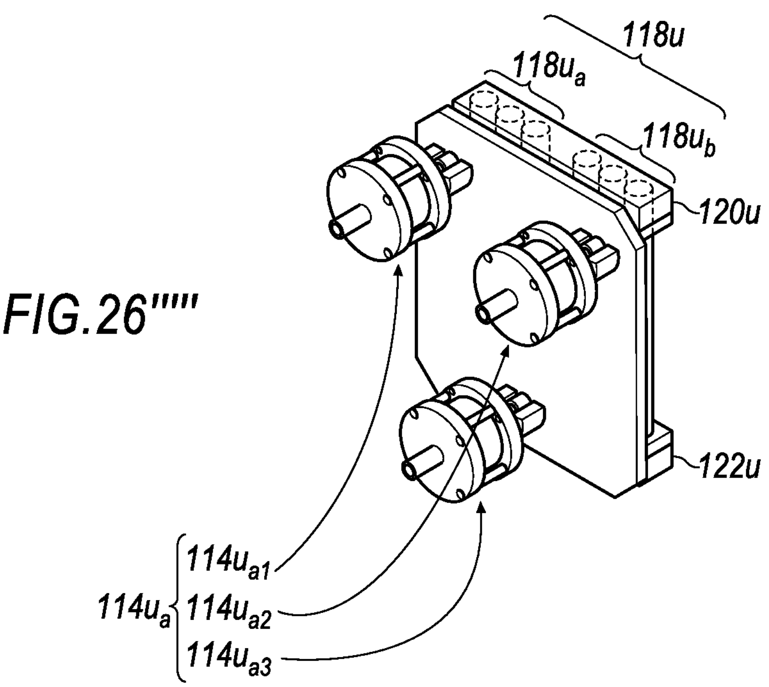
FIG.26'''''

FIG.29"
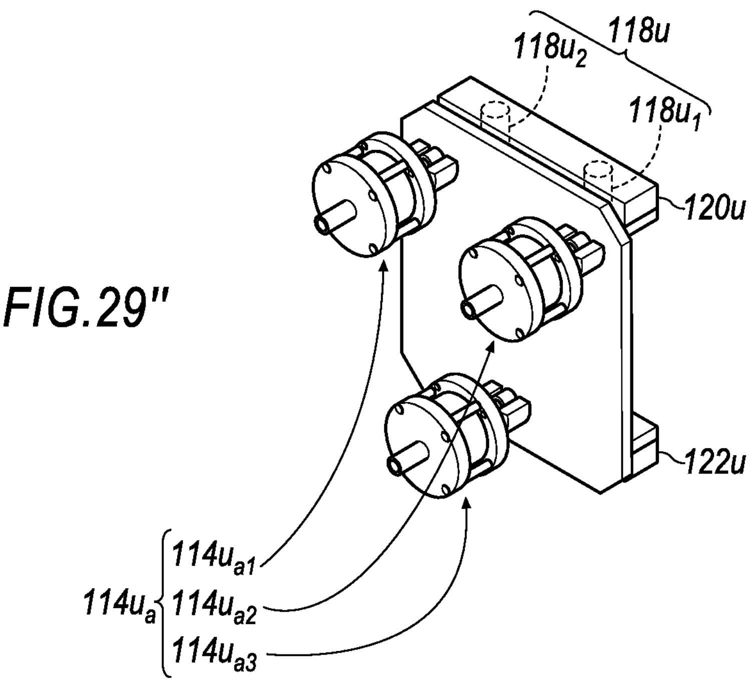

BALANCING DEVICE, UNIFORMITY DEVICE AND METHODS FOR UTILIZING THE SAME

CROSS-REFERENCE TO RELATED APPLICATIONS

This U.S. patent application is a continuation-in-part of U.S. Non-Provisional application Ser. No. 14/328,157 filed on Jul. 10, 2014, which claims priority to U.S. Provisional Application 61/845,053 filed on Jul. 11, 2013 the disclosures of which are considered part of the disclosure of this application and are hereby incorporated by reference in their entirety.

FIELD OF THE INVENTION

The disclosure relates to balancing devices, uniformity devices and methods for utilizing the same.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method that contributes to assembling a tire-wheel assembly.

BRIEF DESCRIPTION OF THE DRAWINGS

The disclosure will now be described, by way of example, with reference to the accompanying drawings, in which:

FIGS. 3B'-3D' are section side views of the apparatus of FIG. 3A being interfaced with a tire-wheel assembly.

FIGS. 12C'-12E' are section side views of the apparatus of FIG. 12B being interfaced with a tire-wheel assembly.

FIGS. 19B'-19D' are section side views of the apparatus of FIG. 19A being interfaced with a tire-wheel assembly.

FIGS. 22C'-22E' are section side views of the apparatus of FIG. 22B being interfaced with a tire-wheel assembly.

SUMMARY

Figure 1:
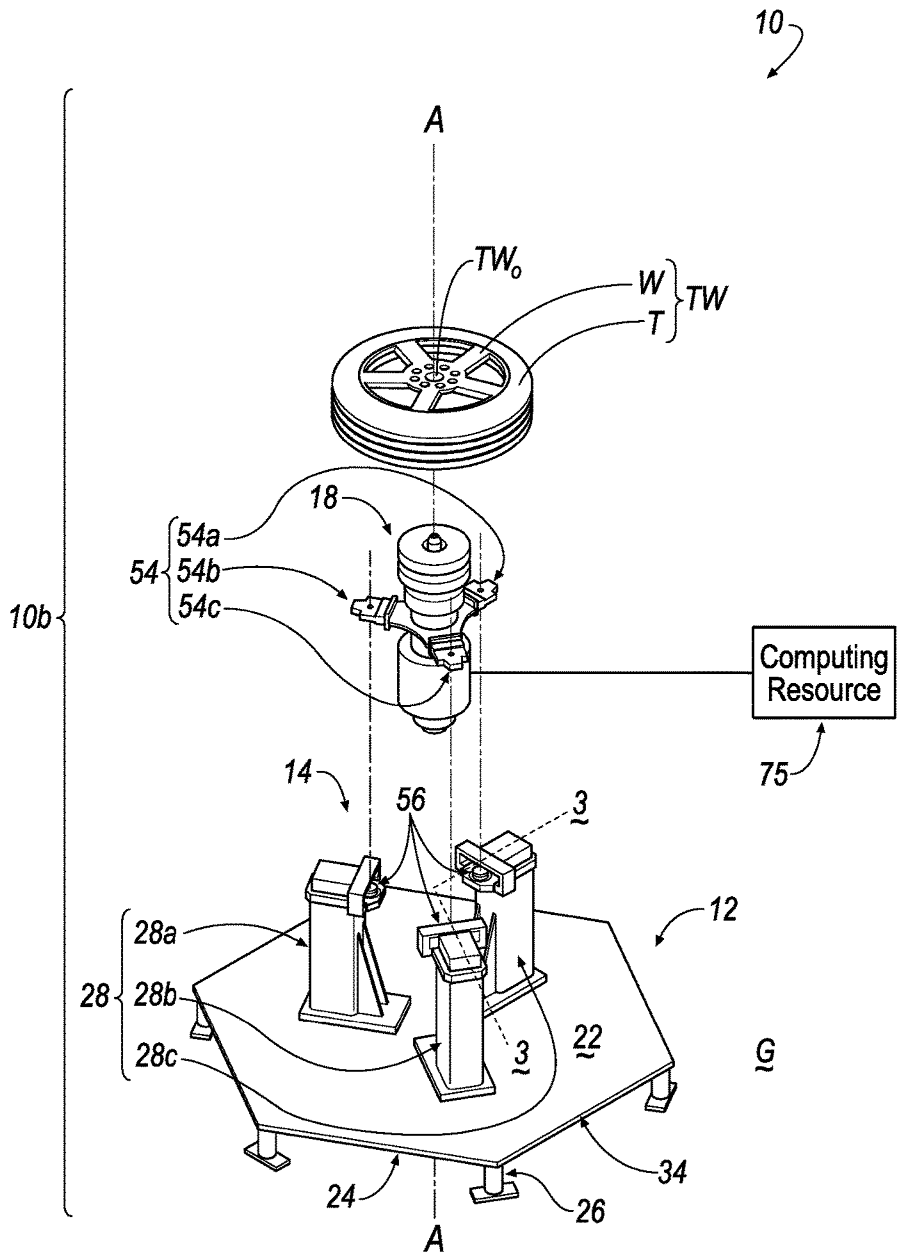
FIG. 1 is an exploded view of an apparatus for processing a tire and a wheel in accordance with an exemplary embodiment of the invention.

One aspect of the disclosure provides an apparatus. The apparatus includes a uniformity device, a computing resource and a first tire tread-engaging portion. The uniformity device determines uniformity of a workpiece. The uniformity device includes: a lower workpiece-engaging portion that interfaces with an upper workpiece-engaging portion. The computing resource is communicatively-coupled to one or more components of one or both of the lower workpiece-engaging portion and the upper workpiece-engaging portion by one or more communication conduits. The lower workpiece-engaging portion includes a central shaft having a proximal end and a distal end and an elongated body that extends between the proximal end and the distal end. The lower workpiece-engaging portion includes a motor. The proximal end of the central shaft is connected to the motor. The lower workpiece-engaging portion includes a radially manipulatable workpiece-engaging chuck that is connected to the distal end of the central shaft. The upper workpiece-engaging portion includes an axially-movable cylinder having a proximal end and a distal end forming a recess that is sized for receiving the radially inwardly/outwardly manipulatable workpiece-engaging chuck. The first tire tread-engaging portion is opposingly-arranged with respect to a second tire tread-engaging portion. Each of the first tire tread-engaging portion and the second tire tread-engaging portion includes a tire tread-engaging member. The first tire tread-engaging portion includes a uniformity-detecting portion connected to the tire tread-engaging member. The first tire tread-engaging portion includes a tire tread-engaging member including a plurality of roller members rotatably connected to an upper bracket and a lower bracket. The plurality of roller members consists of: only two roller members.

Implementations of the disclosure may include one or more of the following optional features. For example, a first roller member of the two roller members is arranged for movement along a first path. A second roller member of the two roller members is arranged for movement along a second path. The first path and the second path are arranged in parallel.

In some implementations, the apparatus further includes a balancing device. The balancing device determines imbalance of the workpiece. The balancing device includes: the lower workpiece-engaging portion. The computing resource is communicatively-coupled to the lower workpiece-engaging portion by one or more communication conduits. The lower workpiece-engaging portion includes at least one multi-axis transducer.

In some examples, the uniformity-detecting portion includes three or more multi-axis load cells.

In some implementations, information relating to uniformity of the workpiece is provided by the three or more multi-axis load cells and is over-deterministically calculated in terms of at least one group of signals associated with respective axes of at least two axes that are produced by the three or more multi-axis load cells. The at least one group of signals includes: a group of two or more torque-moment signals with each torque-moment signal associated with a respective axis of the at least two axes, or a group of two or more force signals with each force signal associated with a respective axis of the at least two axes. All axes of the at least two axes share the same origin and are orthogonal to one another.

In some examples, each signal of the at least one group of signals is communicated from the three or more multi-axis load cells to the computing resource by the one or more communication conduits. The one or more communication conduits includes a plurality of signal communication channels equal a quantity of axes of the at least two axes of the three or more multi-axis load cells.

In some implementations, the three or more multi-axis load cells includes three multi-axis load cells. The at least two axes includes two axes thereby constituting the plurality of signal communication channels of the one or more communication conduits communicatively-connecting the three or more multi-axis load cells to the computing resource to include a total of six signal communication channels.

In some examples, the three or more multi-axis load cells includes three multi-axis load cells. The at least two axes includes three axes thereby constituting the plurality of signal communication channels of the one or more communication conduits communicatively-connecting the three or more multi-axis load cells to the computing resource to include a total of nine signal communication channels.

In some implementations, the three or more multi-axis load cells includes four multi-axis load cells. The at least two axes includes two axes thereby constituting the plurality of signal communication channels of the one or more communication conduits communicatively-connecting the three or more multi-axis load cells to the computing resource to include a total of eight signal communication channels.

In some examples, the three or more multi-axis load cells includes four multi-axis load cells. The at least two axes includes three axes thereby constituting the plurality of signal communication channels of the one or more communication conduits communicatively-connecting the three or more multi-axis load cells to the computing resource to include a total of twelve signal communication channels.

In some implementations, each signal of the at least one group of signals is a time domain force or moment ripple output that is communicated to the computing resource over the one or more communication conduits. Software associated with the computing resource sums the time domain force or moment ripple output of each channel and are then subsequently provided to a fast Fourier transform (FFT) analyzer.

In some examples, information relating to uniformity of the workpiece is provided by the three or more multi-axis load cells and is over-deterministically calculated in terms of at least one group of signals associated with respective axes of at least two axes that are produced by the three or more multi-axis load cells. The at least one group of signals includes: a group of two or more torque-moment signals with each torque-moment signal associated with a respective axis of the at least two axes and a group of two or more force signals with each force signal associated with a respective axis of the at least two axes. All axes of the at least two axes share the same origin and are orthogonal to one another.

In some implementations, each signal of the at least one group of signals is communicated from the three or more multi-axis load cells to the computing resource by the one or more communication conduits. The one or more communication conduits includes a plurality of signal communication channels equal a quantity of axes of the at least two axes of the three or more multi-axis load cells.

In some examples, the three or more multi-axis load cells includes three multi-axis load cells. The at least two axes includes two axes thereby constituting the plurality of signal communication channels of the one or more communication conduits communicatively-connecting the three or more multi-axis load cells to the computing resource to include a total of six signal communication channels.

In some implementations, the three or more multi-axis load cells includes three multi-axis load cells. The at least two axes includes three axes thereby constituting the plurality of signal communication channels of the one or more communication conduits communicatively-connecting the three or more multi-axis load cells to the computing resource to include a total of nine signal communication channels.

In some examples, the three or more multi-axis load cells includes four multi-axis load cells. The at least two axes includes two axes thereby constituting the plurality of signal communication channels of the one or more communication conduits communicatively-connecting the three or more multi-axis load cells to the computing resource to include a total of eight signal communication channels.

In some implementations, the three or more multi-axis load cells includes four multi-axis load cells. The at least two axes includes three axes thereby constituting the plurality of signal communication channels of the one or more communication conduits communicatively-connecting the three or more multi-axis load cells to the computing resource to include a total of twelve signal communication channels.

In some examples, each signal of the at least one group of signals is a time domain force or moment ripple output that is communicated to the computing resource over the one or more communication conduits. Software associated with the computing resource sums the time domain force or moment ripple output of each channel and are then subsequently provided to a fast Fourier transform (FFT) analyzer.

In some implementations, the uniformity-detecting portion includes: three or more air spring members and at least one laser indicator. The three or more air spring members are disposed between and connects a first support plate to a second support plate. The at least one laser indicator is positioned proximate the plurality of air spring members as well as the first support plate and the second support plate. The at least one laser indicator detects a difference in an amount distance between the first support plate and the second support plate as a result of a compression or expansion of the three or more air spring members that connects a first support plate to the second support plate.

In some examples, the at least one laser indicator produces at least one signal that is communicated to the computing resource over the one or more communication conduits. The at least one signal is a time domain displacement ripple output.

In some implementations, if more than one laser indicator is used, software associated with the computing resource sums the time domain displacement ripple output of each signal output by each laser indicator which is then subsequently provided to a fast Fourier transform (FFT) analyzer.

In some examples, the plurality of roller members includes two roller members that are separated by a gap. The gap spans a leading edge and a trailing edge of a tire contact patch area.

In some implementations, the first tire tread-engaging portion includes a pedestal member connected to a radially-movable cylinder or servo mechanism that selectively radially moves the uniformity-detecting portion connected to the tire tread-engaging member. The first tire tread-engaging portion includes an applied load-detecting portion.

In some examples, selective radial movement of the uniformity-detecting portion imparted by the radially-movable cylinder or servo mechanism ceases once the applied load-detecting portion detects that the tire tread-engaging member applies a specified load to the workpiece.

In some implementations, the lower workpiece-engaging portion includes a workpiece inboard surface-engaging member connected to the elongated body of the central shaft proximate the distal end of the central shaft.

In some examples, the lower workpiece-engaging portion includes an angular encoder connected to the elongated body of the central shaft between the distal end of the central shaft and the proximal end of the central shaft.

In some implementations, the uniformity device includes a base member, a lower support member and an upper support member. The lower support member and the upper support member are arranged upon the base member. The lower support member is connected to the lower workpiece-engaging portion. The upper support member is connected to the upper workpiece-engaging portion.

In some examples, the upper workpiece-engaging portion includes an axially-movable cylinder having a proximal end connected to a canopy member of an upper support member.

In some implementations, the three or more multi-axis load cells are strain gauge transducers.

In some examples, the three or more multi-axis load cells are piezoelectric transducers.

Another aspect of the disclosure provides a method. The method includes the steps of providing the uniformity device; arranging the workpiece upon the lower workpiece-engaging portion. The workpiece is a tire-wheel assembly. The method further includes removably-securing the tire-wheel assembly to the lower workpiece-engaging portion; interfacing the upper workpiece-engaging portion with the lower workpiece-engaging portion for rotatably-sandwiching the tire-wheel assembly between the lower workpiece-engaging portion and the upper workpiece-engaging portion; interfacing the tire tread-engaging member of each of the first tire tread-engaging portion and the second tire tread-engaging portion adjacent a tread surface of a tire of the tire-wheel assembly until the tire tread-engaging member applies a specified load to the workpiece; rotating the lower workpiece-engaging portion in order to impart the rotation to the tire-wheel assembly; and communicating a signal from the uniformity-detecting portion to the computing resource by way of the one or more communication conduits. The signal is indicative of uniformity or a lack of uniformity of the tire of the tire-wheel assembly.

In yet another aspect of the disclosure provides a method. The method includes the steps of providing the balancing device; arranging the workpiece upon the lower workpiece-engaging portion. The workpiece is a calibration disk. The method further includes attaching one or more imbalance weights to one or more of the inboard surface and the outboard surface of the calibration disk; removably-securing the calibration disk to the lower workpiece-engaging portion; rotating the lower workpiece-engaging portion in order to impart the rotation to the calibration disk at sufficient rotational speed for any components of mass imbalance associated therewith to produce measurable inertial forces; and communicating a signal from the multi-axis transducer to the computing resource by way of the one or more communication conduits. The signal is indicative of a predetermined imbalance configuration of the calibration disk that is defined by the one or more imbalance weights attached to one or more of the inboard surface and the outboard surface of the calibration disk.

Another aspect of the disclosure provides a method. The method includes the steps of providing the balancing device; arranging the workpiece upon the lower workpiece-engaging portion. The workpiece is a tire-wheel assembly. The method further includes removably-securing the tire-wheel assembly to the lower workpiece-engaging portion; rotating the lower workpiece-engaging portion in order to impart the rotation to the tire-wheel assembly at sufficient rotational speed for any components of mass imbalance associated therewith to produce measurable inertial forces; and communicating a signal from the multi-axis transducer to the computing resource by way of the one or more communication conduits. The signal is indicative of an unknown imbalance of the tire-wheel assembly.

In yet another aspect of the disclosure provides a method. The method includes the steps of providing the apparatus; arranging at least one lock-up mechanism in a first state of engagement for arranging the apparatus in the balancing mode. The first state of engagement is different than a second state of engagement of the at least one lock-up mechanism. The method further includes arranging the workpiece upon the lower workpiece-engaging portion. The workpiece is a calibration disk. The method further includes attaching one or more imbalance weights to one or more of the inboard surface and the outboard surface of the calibration disk; removably-securing the calibration disk to the lower workpiece-engaging portion; rotating the lower workpiece-engaging portion in order to impart the rotation to the calibration disk at sufficient rotational speed for any components of mass imbalance associated therewith to produce measurable inertial forces; and communicating a signal from the multi-axis transducer to the computing resource by way of the one or more communication conduits. The signal is indicative of a predetermined imbalance configuration of the calibration disk that is defined by the one or more imbalance weights attached to one or more of the inboard surface and the outboard surface of the calibration disk.

Another aspect of the disclosure provides a method. The method includes the steps of providing the apparatus; arranging at least one lock-up mechanism in a first state of engagement for arranging the apparatus in the balancing mode. The first state of engagement is different than a second state of engagement of the at least one lock-up mechanism. The method further includes arranging the workpiece upon the lower workpiece-engaging portion. The workpiece is a tire-wheel assembly. The method further includes removably-securing the tire-wheel assembly to the lower workpiece-engaging portion; rotating the lower workpiece-engaging portion in order to impart the rotation to the tire-wheel assembly at sufficient rotational speed for any components of mass imbalance associated therewith to produce measurable inertial forces; and communicating a signal from the multi-axis transducer to the computing resource by way of the one or more communication conduits. The signal is indicative of an unknown imbalance of the tire-wheel assembly.

In yet another aspect of the disclosure provides a method. The method includes the steps of providing the apparatus; arranging at least one lock-up mechanism in a second state of engagement for arranging the apparatus in the uniformity mode. The second state of engagement is different than a first state of engagement of the at least one lock-up mechanism. The method further includes arranging the workpiece upon the lower workpiece-engaging portion. The workpiece is a tire-wheel assembly. The method further includes removably-securing the tire-wheel assembly to the lower workpiece-engaging portion; interfacing the upper workpiece-engaging portion with the lower workpiece-engaging portion for rotatably-sandwiching the tire-wheel assembly between the lower workpiece-engaging portion and the upper workpiece-engaging portion; interfacing the tire tread-engaging member of each of the first tire tread-engaging portion and the second tire tread-engaging portion adjacent a tread surface of a tire of the tire-wheel assembly until the tire tread-engaging member applies a specified load to the workpiece; rotating the lower workpiece-engaging portion in order to impart the rotation to the tire-wheel assembly; and communicating a signal from the uniformity-detecting portion to the computing resource by way of the one or more communication conduits. The signal is indicative of uniformity or a lack of uniformity of the tire of the tire-wheel assembly.

DETAILED DESCRIPTION OF THE INVENTION

The Figures illustrate exemplary embodiments of balancing devices, uniformity devices and methods for utilizing the same. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 30A-30D, which illustrates an exemplary tire, T. In the present disclosure, reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure that supports the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 30A), a lower sidewall surface, $T_{SL}$ (see, e.g., FIG. 30D), and a tread surface, $T_T$ (see, e.g., FIGS. 30B-30C), that joins the upper sidewall surface, $T_{SU}$, to the lower sidewall surface, $T_{SL}$. Referring to FIG. 30B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$.

As seen in FIG. 30B, when the tire, T, is in a relaxed, unbiased state, the upper bead, $T_{BU}$, forms a circular, upper tire opening, $T_{OU}$; similarly, when the tire, T, is in a relaxed, unbiased state, the lower bead, $T_{BL}$, forms a circular, lower tire opening, $T_{OL}$. It will be appreciated that when an external force is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include an oval shape.

Referring to FIG. 16B, when in the relaxed, unbiased state, each of the upper tire opening, $T_{OU}$, and the lower tire opening, $T_{OL}$, form, respectively, an upper tire opening diameter, $T_{OU\text{-}D}$, and a lower tire opening diameter, $T_{OL\text{-}D}$. Further, as seen in FIGS. 30A-30B, when in the relaxed, unbiased state, the upper sidewall surface, $T_{SU}$, and the lower sidewall surface, $T_{SL}$, define the tire, T, to include a tire diameter, $T_D$.

Figure 30A:
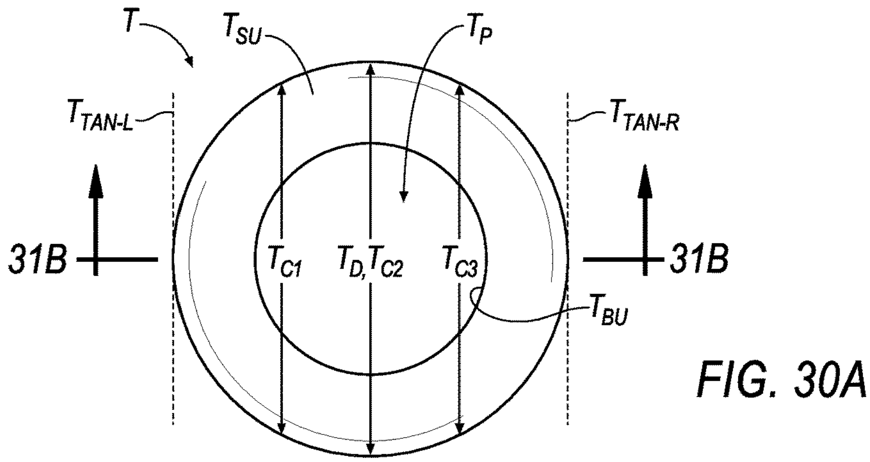
FIG. 30A is a top view of an exemplary tire.
Figure 30B:
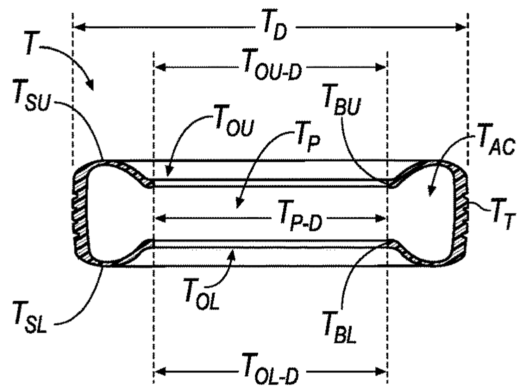
FIG. 30B is a cross-sectional view of the tire according to line 30B-30B of FIG. 30A.
Figure 30C:
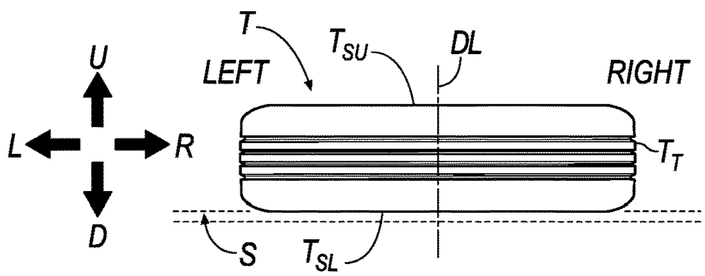
FIG. 30C is a side view of the tire of FIG. 30A.
Figure 30D:
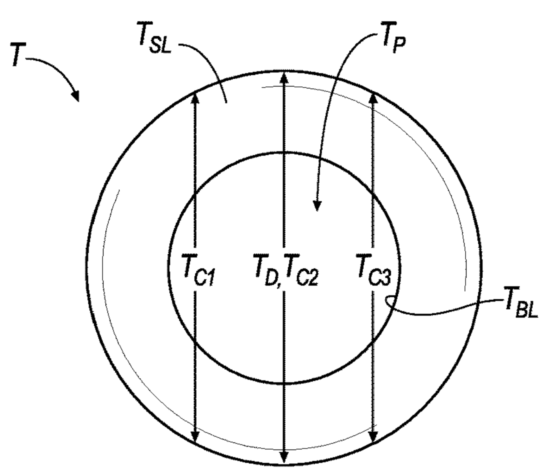
FIG. 30D is a bottom view of the tire of FIG. 30A.

Referring to FIGS. 30A-30B and 30D, the tire, T, also includes a passage, $T_P$. Access to the passage, $T_P$, is permitted by either of the upper tire opening, $T_{OU}$, and the lower tire opening, $T_{OL}$. Referring to FIG. 30B, when the tire, T, is in a relaxed, unbiased state, the upper tire opening, $T_{OU}$, and the lower tire opening, $T_{OL}$, define the passage, $T_P$, to include a diameter, $T_{P-D}$. Referring also to FIG. 30B, the tire, T, includes a circumferential air cavity, $T_{AC}$, that is in communication with the passage, $T_P$. After joining the tire, T, to a wheel, W, pressurized air is deposited into the circumferential air cavity, $T_{AC}$, for inflating the tire, T.

When the tire, T, is arranged adjacent structure or a wheel, W (see, e.g., FIGS. 31A-31B), as described in the following disclosure, the written description may reference a "left" portion or a "right" portion of the tire, T. Referring to FIG. 30C, the tire, T, is shown relative to a support member, S; the support member, S, is provided (and shown in phantom) in order to establish a frame of reference for the "left" portion and the "right" portion of the tire, T. In FIG. 30C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center dividing line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 30A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C2}$, /tire diameter, $T_D$.

In order to reference the location of the left chord, $T_{C1}$, and the right chord, $T_{C3}$, reference is made to a left tire tangent line, $T_{TAN-L}$, and a right tire tangent line, $T_{TAN-R}$. The left chord, $T_{C1}$, is spaced apart approximately one-fourth (¼) of the tire diameter, $T_D$, from the left tire tangent line, $T_{TAN-L}$. The right chord, $T_{C3}$, is spaced apart approximately one-fourth (¼) of the tire diameter, $T_D$, from the right tire tangent line, $T_{TAN-R}$. Each of the left and right tire chords, $T_{C1}$, $T_{C3}$, may be spaced apart about one-fourth (¼) of the tire diameter, $T_D$, from the central chord, $T_{C2}$. The above spacings referenced from the tire diameter, $T_D$, are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 30C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Figure 31A:
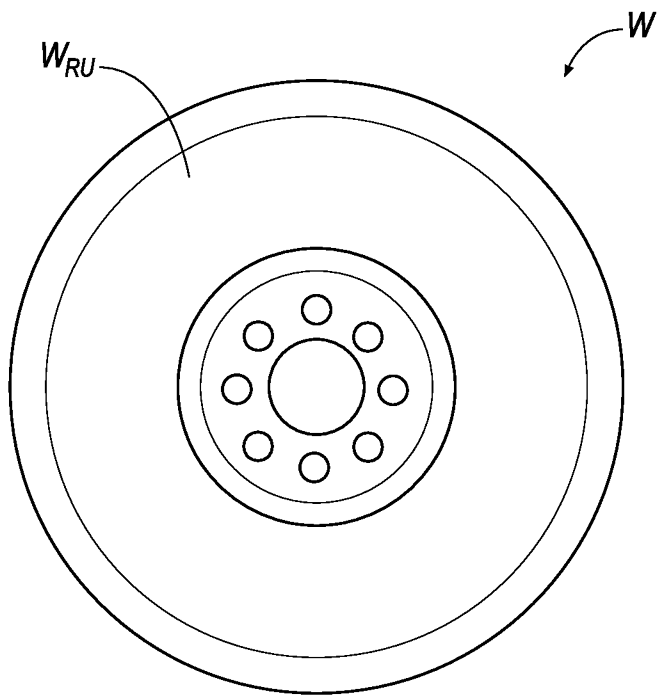
FIG. 31A is a top view of an exemplary wheel.
Figure 31B:
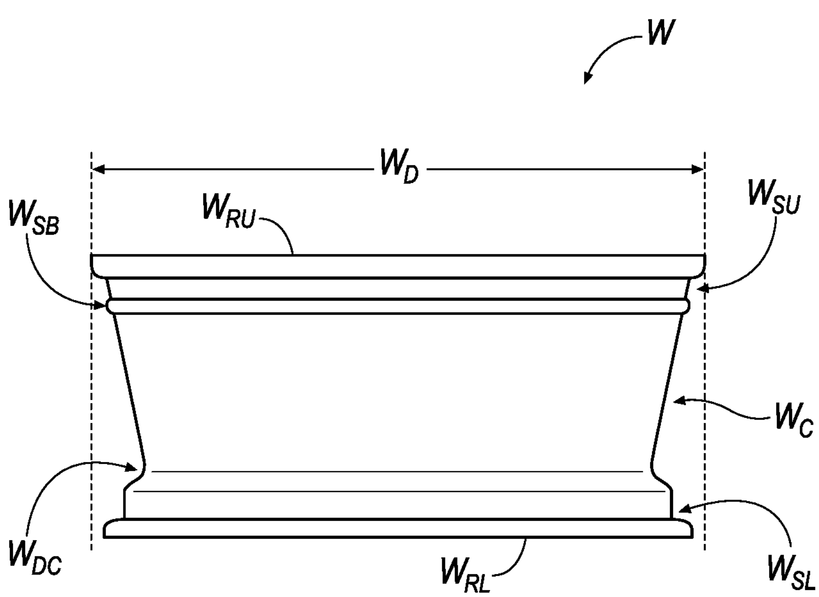
FIG. 31B is a side view of the wheel of FIG. 31A.

Prior to describing embodiments of the invention, reference is made to FIGS. 31A-31B, which illustrate an exemplary wheel, W. In the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure that supports the wheel, W. Accordingly, the above nomenclature should not be utilized to limit the scope of the claimed invention and is utilized herein for exemplary purposes in describing an embodiment of the invention.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 31B, the upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be friction-ally-secured to the wheel, W, as a result of the wheel diameter, $W_D$, being approximately the same as, but slightly greater than the diameter, $T_{P-D}$, of the passage, $T_P$, of the tire, T.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, $W_{RL}$. Upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$.

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead; however, upper and/or lower safety beads may be included with the wheel, W, as desired, and are not required in order to practice the invention described in the following disclosure.

The Apparatus 10

Referring to FIG. 1, an exemplary apparatus is shown generally at 10. In some instances, the apparatus 10 may be structurally configured in a manner to provide only one function being an act of balancing. The act of balancing may include, for example: (1) teaching a computing resource 75 a variety of imbalance configurations that may be exhibited by an inflated tire-wheel assembly, TW, by arranging a calibration disk, CD (as seen in, e.g., 3B-3D), upon the apparatus 10, and (2) arranging an inflated tire-wheel assembly, TW (as seen, e.g., FIGS. 3B'-3D'), upon the apparatus 10 for determining imbalance (which may be quantified in gram-centimeters), if any, of the inflated tire-wheel assembly, TW (which may be determined in view of, for example, a learned state of imbalance provided to the computing resource 75 from a previous application of the calibration disk, CD, to the apparatus 10 as described above).

Because the apparatus 10 is directed to providing a balancing function, one or more reference numerals identifying a 'balancing device' of the apparatus 10 includes a "b" appended to the one or more reference numerals; accordingly, a 'balancing device' is generally represented at, for example reference numeral "10*b*".

The Balancing Device 10*b* of the Apparatus 10

Figure 2:
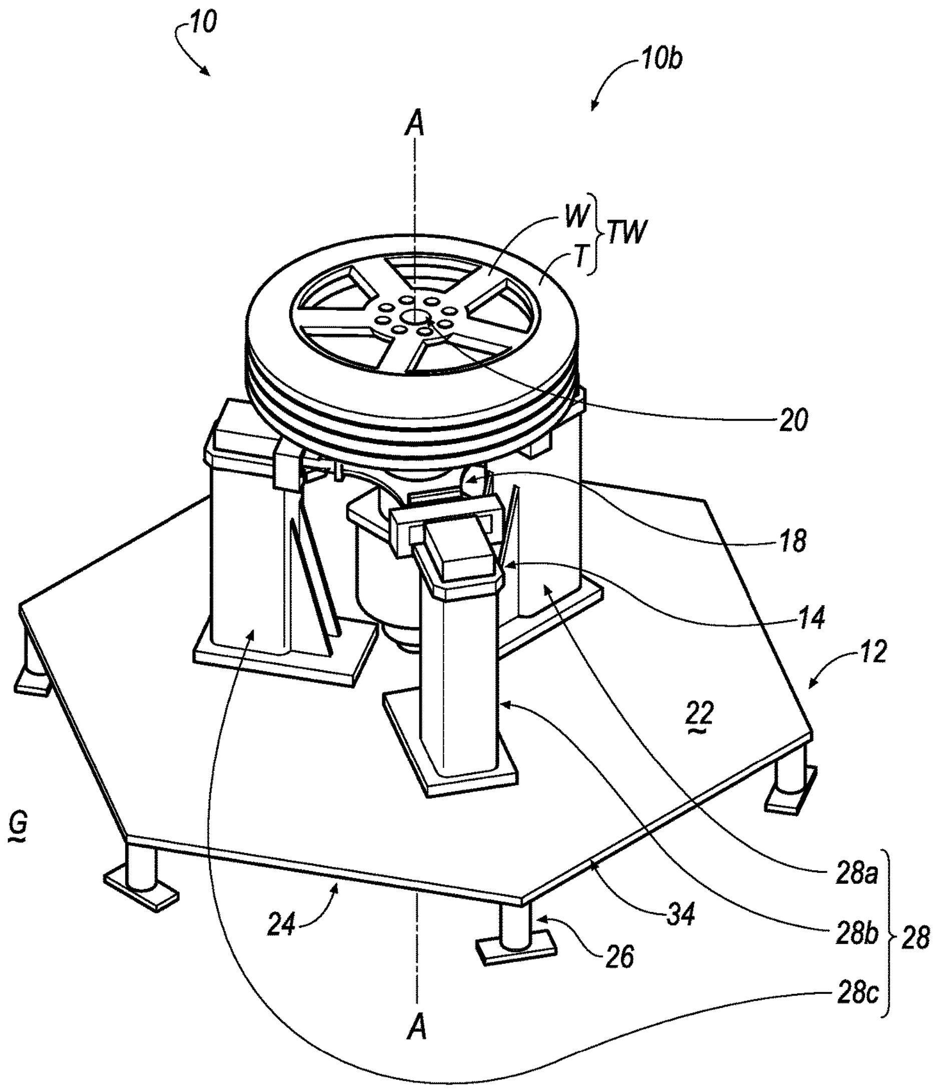
FIG. 2 is an assembled view of the apparatus of FIG. 1.

Referring initially to FIGS. 1-2, the balancing device 10*b* generally includes a base member 12, a lower support member 14 and a lower workpiece-engaging portion 18. The base member 12 is arranged upon an underlying ground surface, G. The lower support member 14 is arranged upon the base member 12. The lower support member 14 is connected to the lower workpiece-engaging portion 18.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28*a*, 28*b*, 28*c*.

Each pedestal member 28*a*-28*c* of the plurality of pedestal members 28 of the lower support member 14 is disposed upon the upper surface 22 of the base member 12 such that each pedestal member 28*a*-28*c* of the plurality of pedestal members 28 are arranged radially inwardly closer to a central axis, A-A, extending through an axial center of the base member 12 and away from an outer perimeter 34 of the base member 12.

Referring to FIGS. 3A-3D', the lower workpiece-engaging portion 18 includes a central shaft 36 having a proximal end $\mathbf{36}_P$ and a distal end $\mathbf{36}_D$. The central shaft 36 is defined by an elongated body 38 that extends between the proximal end $\mathbf{36}_P$ and the distal end $\mathbf{36}_D$. The central axis, A-A, is axially-aligned with an axial center of the elongated body 38 of the central shaft 36.

The lower workpiece-engaging portion 18 may also include a motor 40 disposed within a motor housing 42. The proximal end $\mathbf{36}_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $\mathbf{36}_D$ of the central shaft 36.

The motor 40 may be actuated in order to, for example, cause rotation, R, of the central shaft 36. In some instances the central shaft 36 may be rotated approximately 300 rpm; in such an example, 300 rmp may be considered to be 'high speed' in order to impart inertia forces for conducting the balancing function. The motor 40 may also be actuated to impart movement of/spatially manipulate the workpiece-engaging chuck 44. Movement of the workpiece-engaging chuck 44 may include: (1) radial outward movement (for coupling the distal end $\mathbf{36}_D$ of the central shaft 36 to a workpiece, CD/TW) or (2) radial inward movement (for de-coupling the distal end $\mathbf{36}_D$ of the central shaft 36 from the workpiece, CD/W).

Actuation of the motor 40 (for the purpose of rotating, R, the central shaft 36 or causing movement of the workpiece-engaging chuck 44) may occur as a result of a signal sent from the computing resource 75 to the motor 40. The computing resource 75 may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

In an example, the lower workpiece-engaging portion 18 may also include a plurality of components 46, 48, 50*b* that are disposed upon the elongated body 38 of the central shaft 36; the plurality of components 46, 48, 50*b* may include, for example: a workpiece inboard surface-engaging member 46, an angular encoder 48 and a multi-axis transducer 50*b*. The workpiece inboard surface-engaging member 46 may be connected to the elongated body 38 of the central shaft 36 proximate the workpiece-engaging chuck 44 and the distal end $\mathbf{36}_D$ of the central shaft 36. The multi-axis transducer 50*b* may be connected to the elongated body 38 of the central shaft 36 proximate, for example, the proximal end $\mathbf{36}_P$ of the central shaft 36; the transducer 50*b* may be, for example, a strain gauge transducer or a piezoelectric transducer. The angular encoder 48 may be connected to the elongated body 38 of the central shaft 36 at, for example, a location between the workpiece inboard surface-engaging member 46 and the multi-axis transducer 50*b*.

In an example, the lower support member 14 may be connected to the lower workpiece-engaging portion 18 as follows. As seen in, for example, FIGS. 3A-3D', a plurality of radially-projecting support arms 54 may extend radially outwardly from a non-rotating structural member of the lower workpiece-engaging portion 18, such as, for example, the motor housing 42.

With reference to FIG. 1, the plurality of radially-projecting support arms 54 may include, for example, a first radially-projecting support arm 54*a*, a second radially-projecting support arm 54*b* and a third radially-projecting support arm 54*c*. Each pedestal member 28*a*-28*c* of the plurality of pedestal members 28 may include a shoulder portion 56. Referring to FIGS. 3A-3D', a distal end $\mathbf{54}_D$ of each of the first, second and third radially-projecting support arms 54*a*, 54*b*, 54*c* may be disposed upon and connected to the shoulder portion 56 of each pedestal member 28*a*-28*c* of the plurality of pedestal members 28.

Method for Utilizing the Apparatus 10—Calibration Disk, CD

As described above, one of the acts of balancing provided by the apparatus 10 may include, for example, teaching the computing resource 75 a variety of imbalance configurations that may be exhibited by an inflated tire-wheel assembly, TW, by arranging a calibration disk, CD, upon the apparatus 10. An exemplary method for utilizing the apparatus 10 as described immediately above may be seen at FIGS. 3A-3D. The balancing device 10*b* may be referred to as a "two plane" balancer for the upper plane (e.g., outboard side) and the lower plane (e.g., inboard side) of the tire-wheel assembly, TW, in order to correct the static component and the couple component of the tire-wheel assembly, TW (i.e., the balancing device 10*b* may contribute to dynamically balancing the tire-wheel assembly, TW).

Figure 3A:
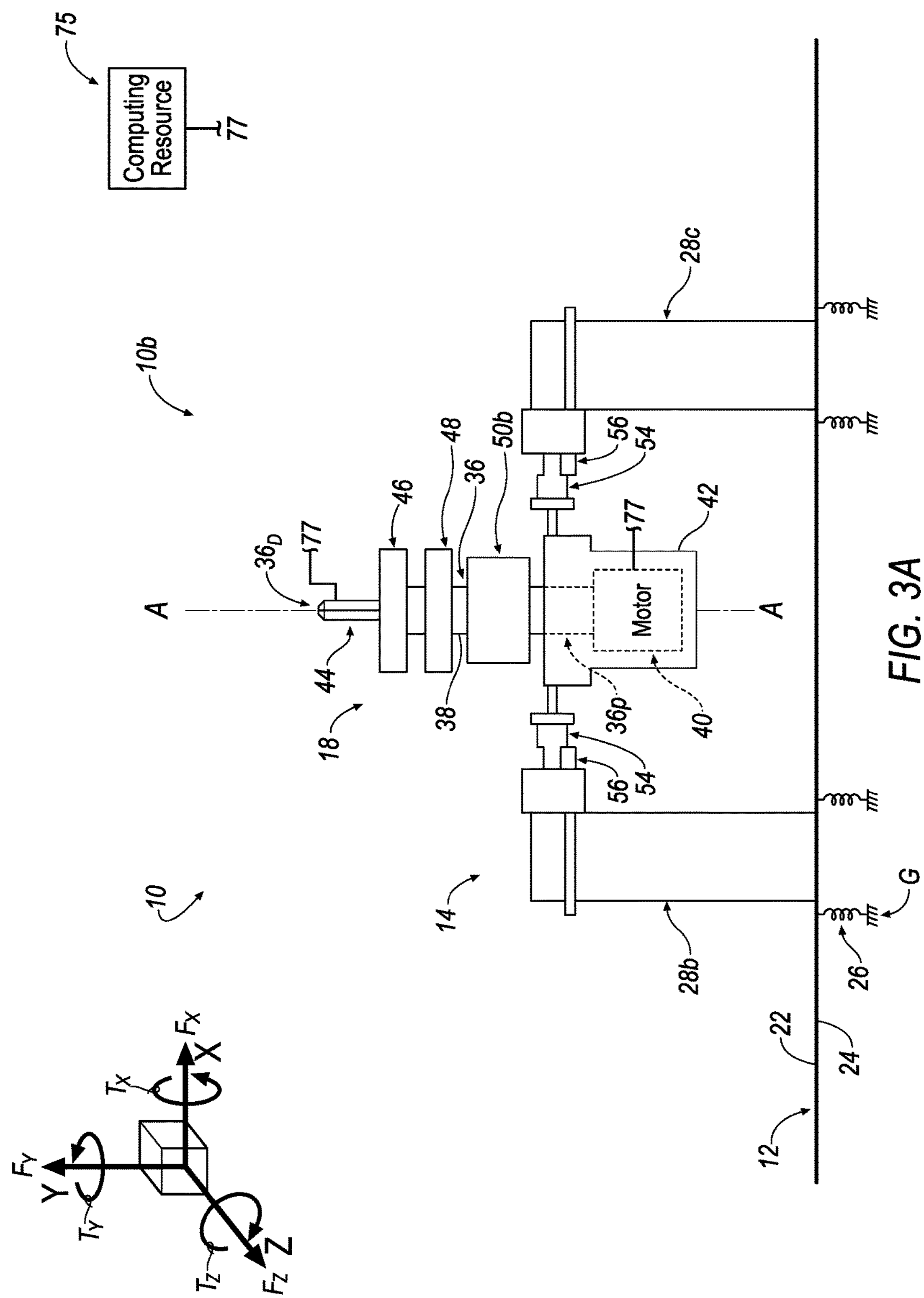
FIG. 3A is a section side view of the apparatus of FIG. 1 according to line 3-3.
Figure 3B:
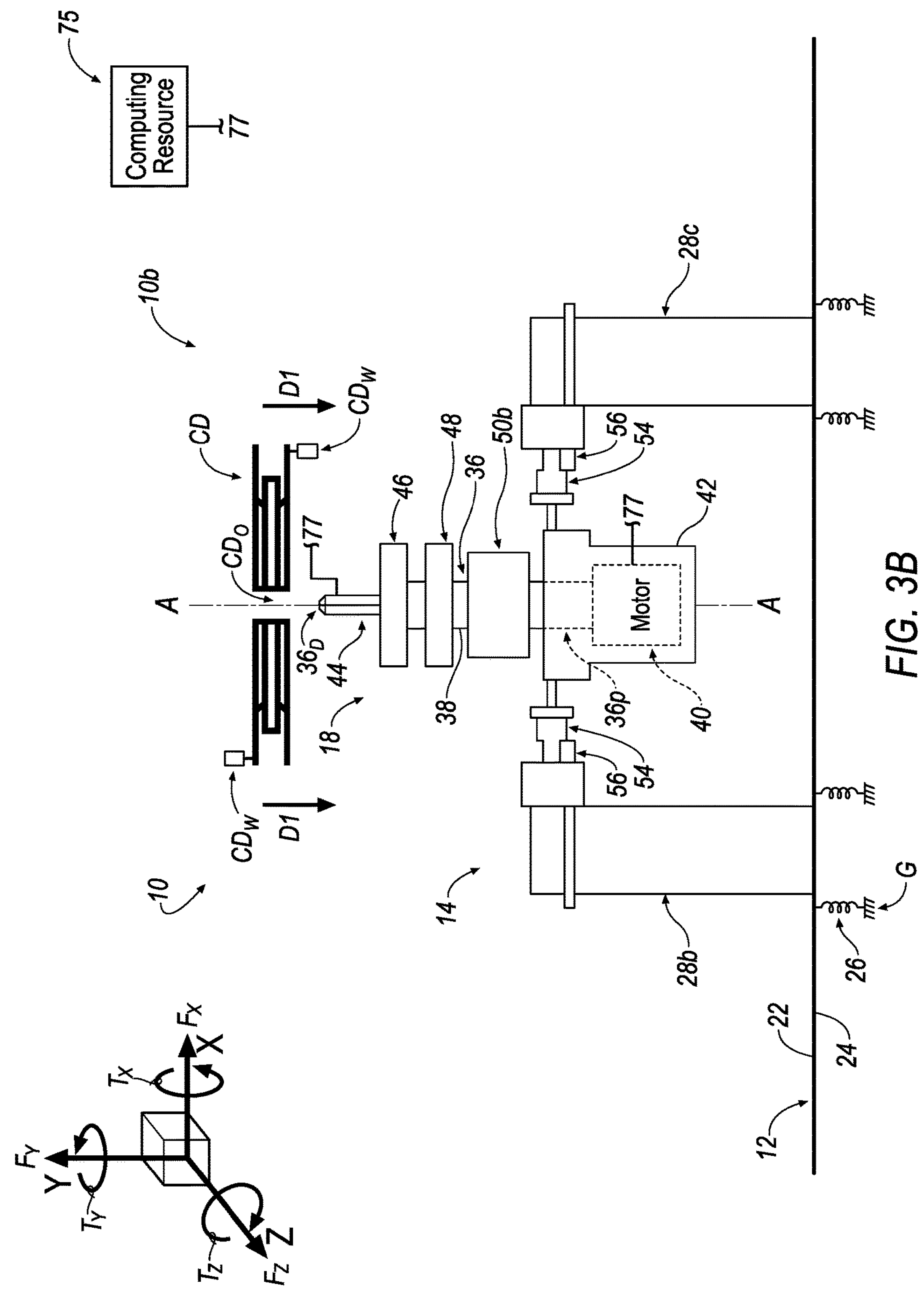
FIGS. 3B-3D are section side views of the apparatus of FIG. 3A being interfaced with a calibration disk.
Figure 3B:
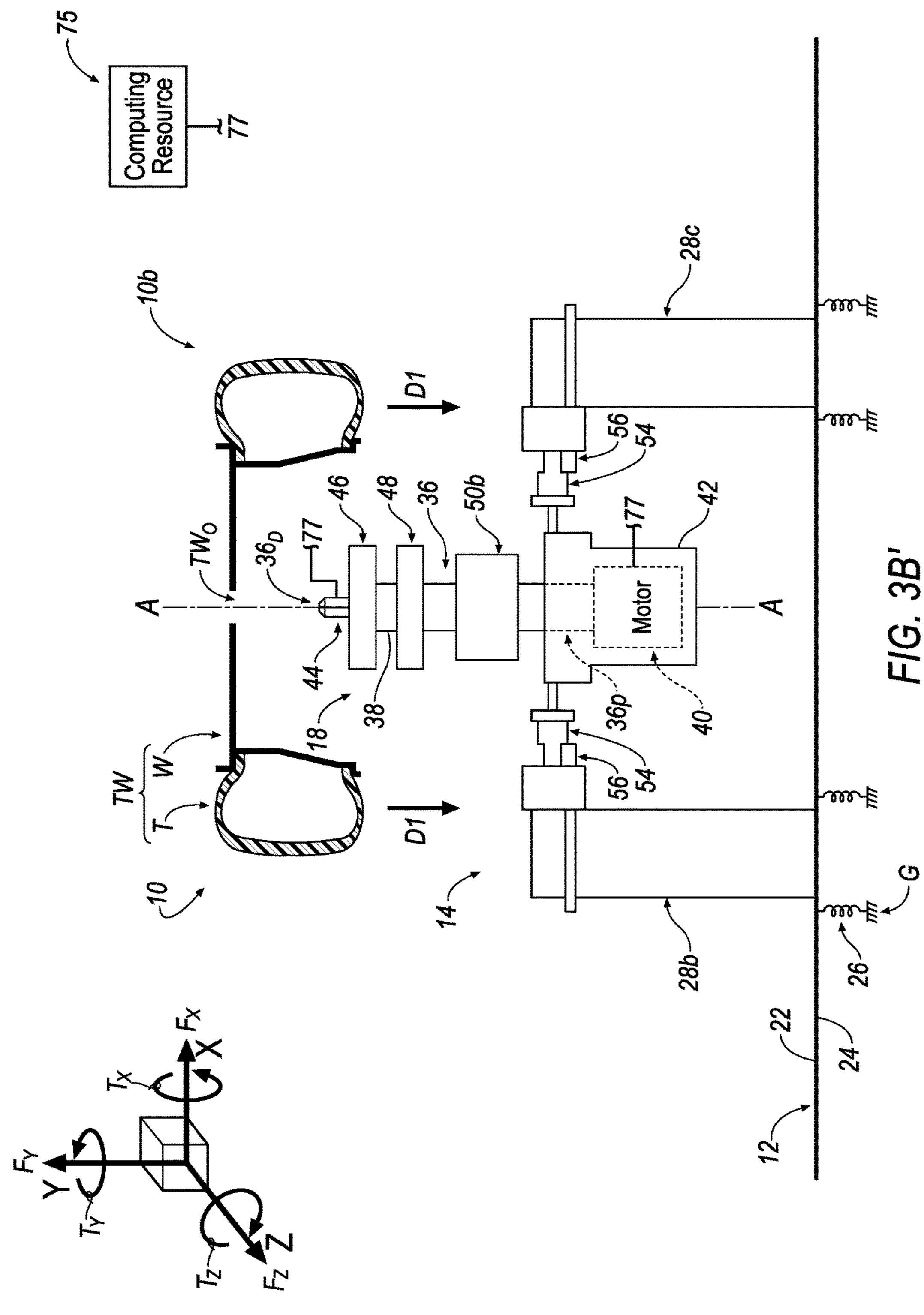

Referring to FIG. 3B, the calibration disk, CD, may be arranged upon the workpiece inboard surface-engaging member 46 of the lower workpiece-engaging portion 18. The calibration disk, CD, may be disposed upon the workpiece inboard surface-engaging member 46 as follows.

In an example, a central opening, $CD_O$, of the calibration disk, CD, may be axially-aligned with the central axis, A-A, such that the central opening, $CD_O$, may be arranged over the radially inwardly/outwardly manipulatable workpiece-engaging chuck 44, which is also axially-aligned with the central axis, A-A. Then, the calibration disk, CD, may be moved according to the direction of the arrow, D1, such that the distal end $\mathbf{36}_D$ of the central shaft 36 is inserted through the central opening, $CD_O$, of the calibration disk, CD, whereby an inboard surface, $CD_{IS}$, of the calibration disk, CD, may be disposed adjacent the workpiece inboard surface-engaging member 46 of the lower workpiece-engaging portion 18.

Figure 3C:
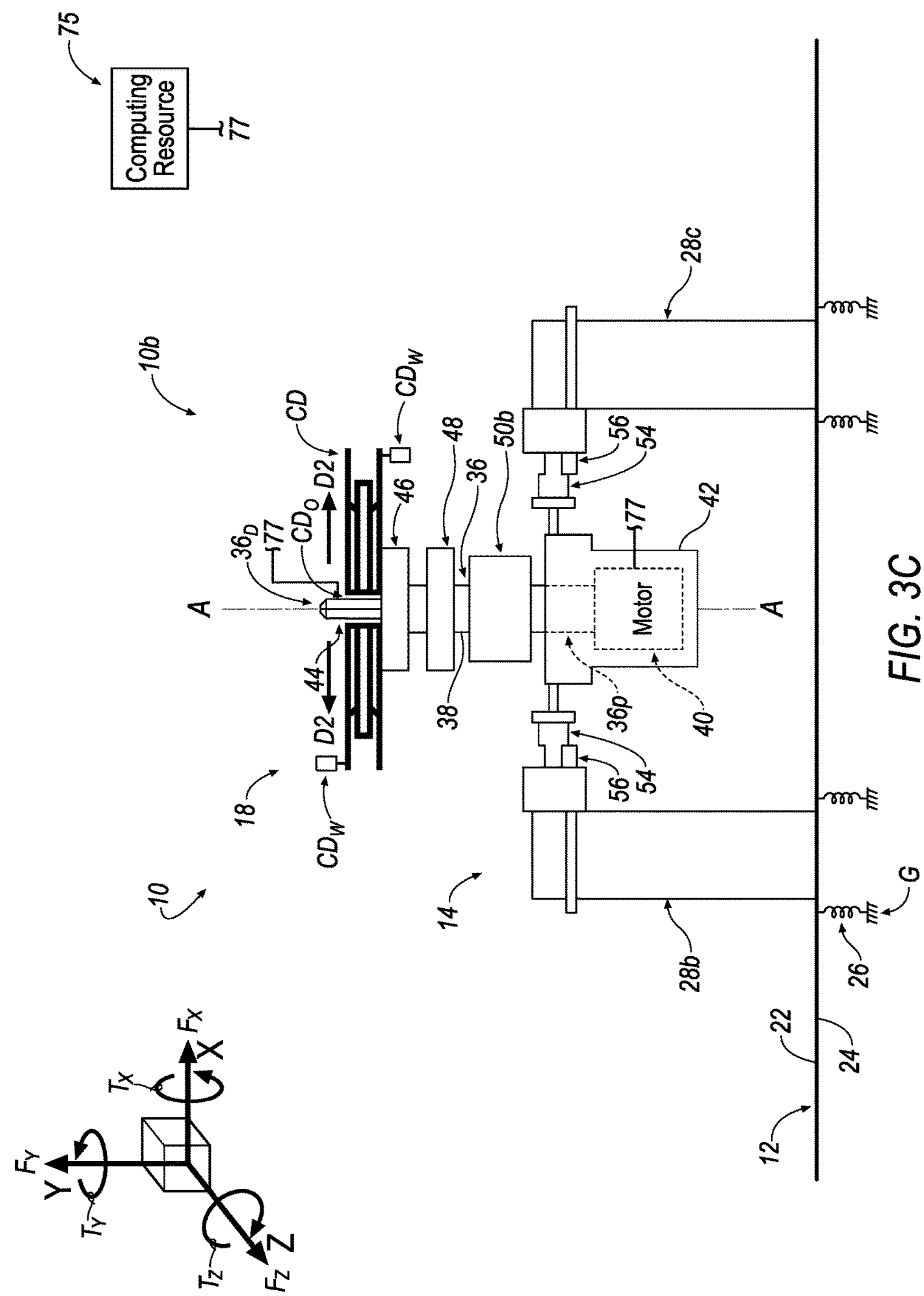
Figure 3C:
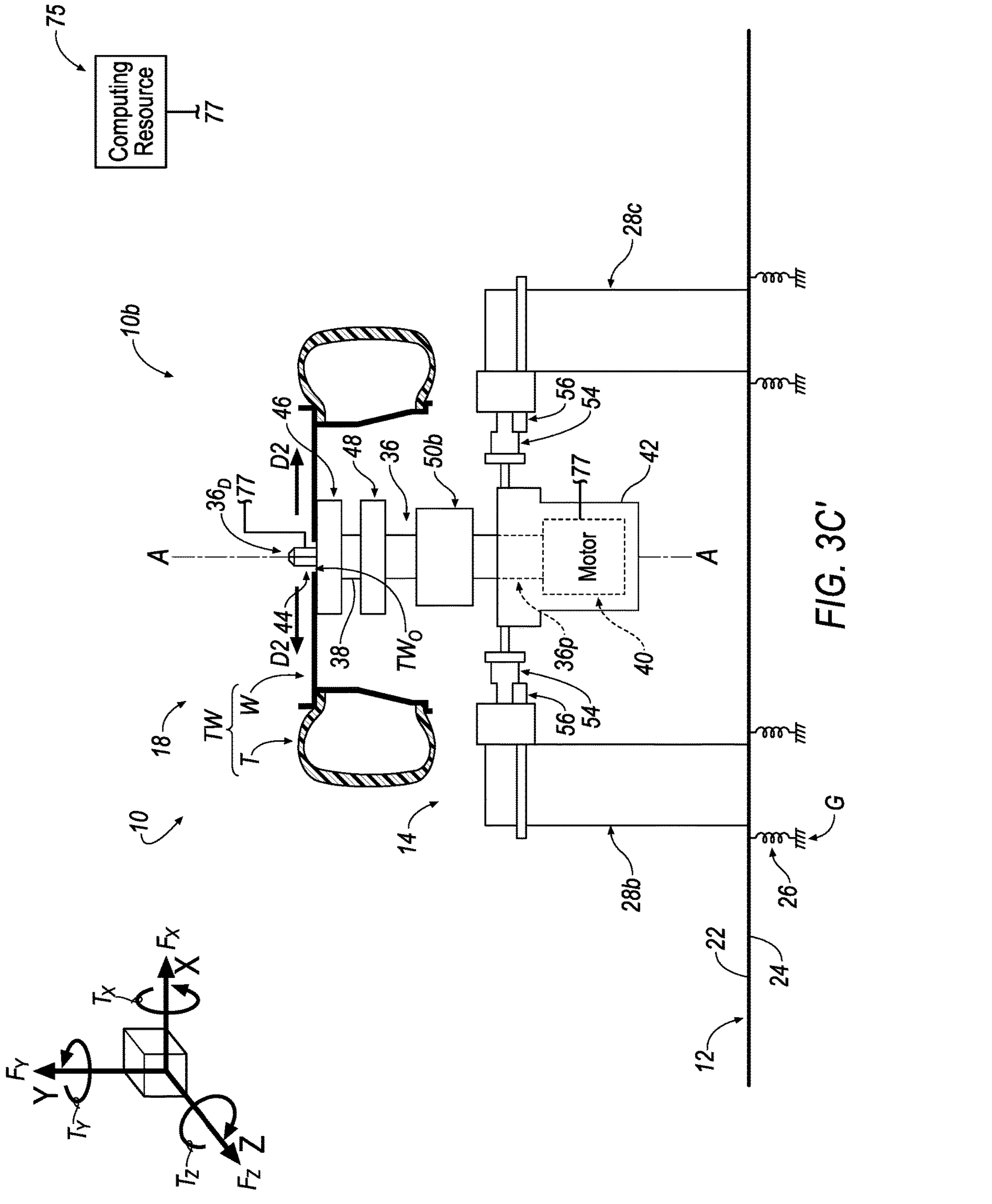
Figure 3D:
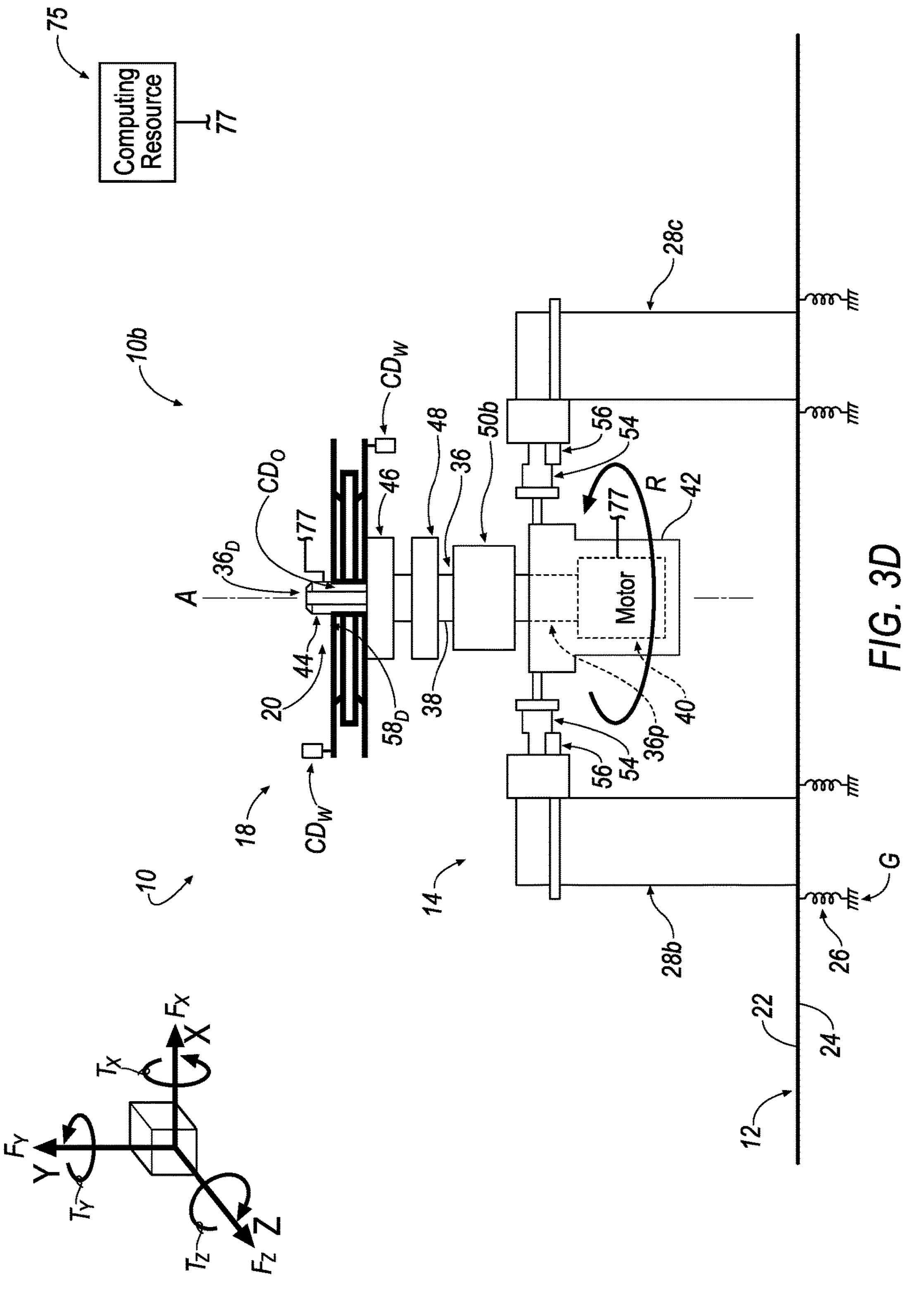
Figure 3D:
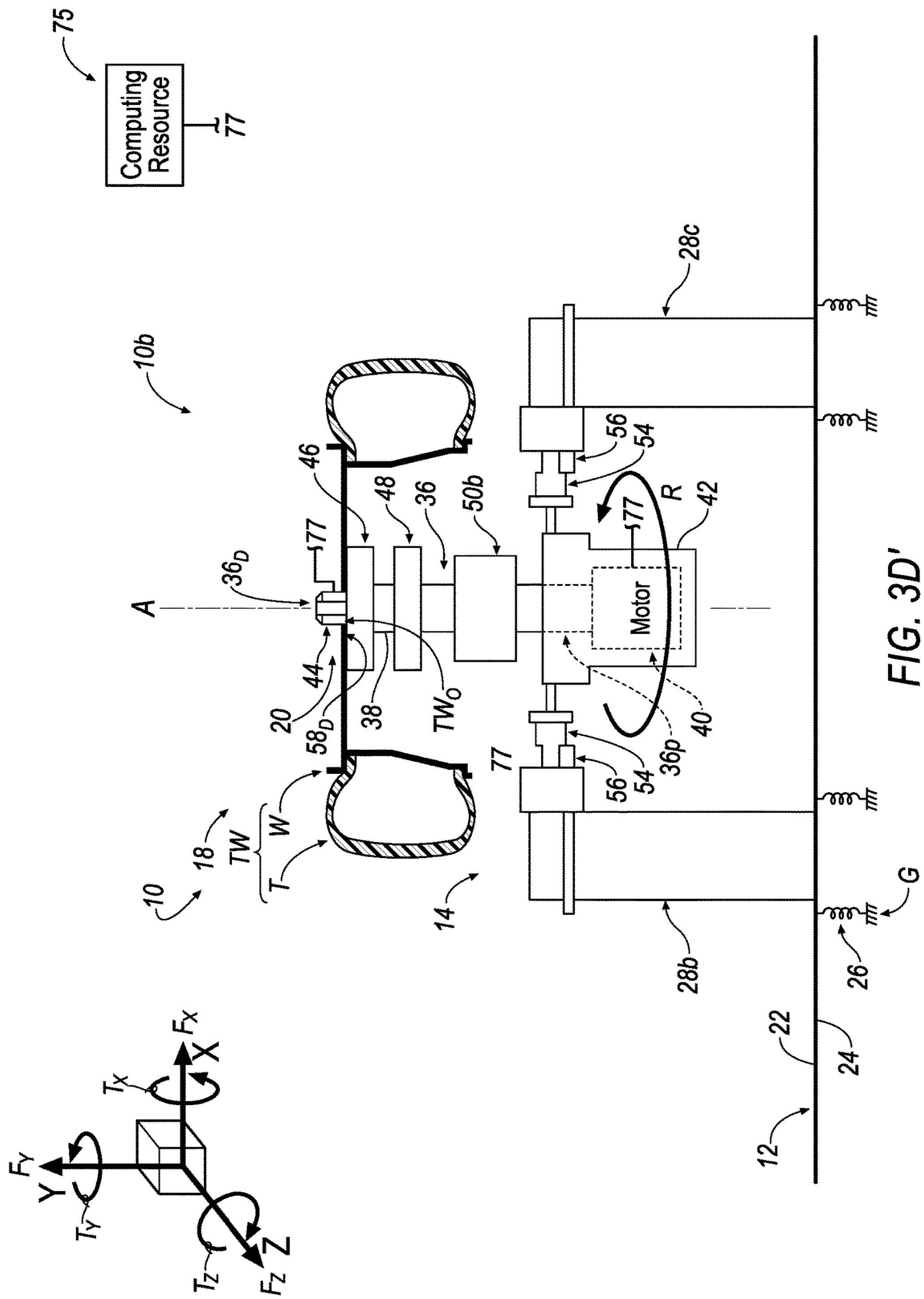

Referring to FIG. 3C, once the calibration disk, CD, is disposed adjacent the workpiece inboard surface-engaging member 46 of the lower workpiece-engaging portion 18, the calibration disk, CD, is selectively-retained to the lower workpiece-engaging portion 18 as a result of the radially inwardly/outwardly manipulatable workpiece-engaging chuck 44 being expanded in a radially outward direction according to the direction of the arrow, D2.

Once the calibration disk, CD, is rotatably-connected to the lower workpiece-engaging portion 18, the motor 40 may be actuated in order to impart rotation, R, to the central shaft 36, which is connected to all of: the workpiece inboard surface-engaging member 46, the angular encoder 48 and the multi-axis transducer 50*b*; because the calibration disk, CD, is disposed adjacent the workpiece inboard surface-engaging member 46 of the lower workpiece-engaging portion 18, the calibration disk, CD, rotates, R, with the workpiece inboard surface-engaging member 46 of the lower workpiece-engaging portion 18 such that the calibration disk, CD, is rotated at sufficient rotational speed for any components of mass imbalance associated therewith to produce measurable inertial forces.

Upon rotating, R, the central shaft 36, the multi-axis transducer 50*b* may produce signals that are indicative of an imbalance of the calibration disk, CD (if an imbalance exists). Any determined imbalance of the calibration disk, CD, is communicated to the computing resource 75 by way of the one or more communication conduits 77 that are communicatively-couple the multi-axis transducer 50*b* to the computing resource 75.

The detected imbalance may be over-deterministically calculated in terms of at least one group of signals produced by the multi-axis transducer 50*b*, including: (1) a group of two or more torque-moment signals (see, e.g., $T_X$, $T_Y$, $T_Z$ in FIGS. 3A-3D) with each torque-moment signal about a respective axis of at least two axes (see, e.g., axes X, Y, Z in FIGS. 3A-3D) and (2) a group of two or more force signals (see, e.g., $F_X$, $F_Y$, $F_Z$ in FIGS. 3A-3D) with each force signal along a respective axis of the at least two axes (see, e.g., axes X, Y, Z in FIGS. 3A-3D). Mathematically, two-plane balancing may be achieved with two independent force or acceleration signals. Because the transducer 50*b* is coined as a "multi-axis" transducer, the term "multi" defines the number of axes monitored by the transducer 50*b*; further, the number of axes include two or more of the axes that share the same origin and are orthogonal to one another. In an exemplary implementation, the number of axes may include three axes (see, e.g., axes X, Y, Z in FIGS. 3A-3D); although three orthogonal axes, X, Y, Z, are shown in FIGS. 3A-3D, some implementations may include two axes that are orthogonal relative one another such as, for example: (1) axis X orthogonal to axis Y, (2) axis X orthogonal to axis Z, or (3) axis Y orthogonal to axis Z.

In some instances, each axis (i.e., the X axis, the Y axis and the Z axis) of the multi-axis transducer 50*b* may have its own channel (generally represented by the one or more communication conduits 77); therefore, in some examples, the balancing device 10*b* may include three channels each providing a voltage gain output (e.g., voltage per unit of imbalance of the workpiece, for each plane) that is communicated to the computing resource 75 over the one or more communication conduits 77. The software associated with the computing resource 75 will average the voltage gain output of each channel, and, if there is noise on any one of the channels, noise will be reduced (in the form of noise cancellation) as a result of the total number (e.g., in the present example, three) of channels being averaged together (i.e., the voltage gain output per unit of imbalance is stochastically measured and calculated by the computing resource 75). This may be referred to as an "over-determined" system where more channels than typically deemed to be absolutely deterministically needed, are used to perform the balancing operation. With the use of a minimum number of channels (i.e., two in the present example), any measurement error in either of the signals may add to significant error in the overall calculation. The device described here uses inverse force estimation, averaging the outputs of as many signals as practical, so as to have the error of any individual signal cause minimal distortion of a final resultant.

The calibration disc, CD, is manufactured to have very little imbalance (i.e., the calibration disc, CD, is purposely manufactured to be balanced with an acceptable imbalance). When attached to the apparatus 10 and rotated, R, as described above, the calibration disk, CD, will functionally teach a computing resource 75 a variety of imbalance configurations that may be exhibited by an inflated tire-wheel assembly, TW; the variety of imbalance configurations may be determined by the computing resource 75 during a 'learning mode' whereby the magnitude and phase of the voltage gain output (e.g., voltage per unit of imbalance of the workpiece, for each plane) of each channel of the transducer 50*b* is communicated to the computing resource 75 over the one or more communication conduits 77. The imbalance configurations are selectively-determined by an operator that attaches one or more imbalance weights, $CD_W$ (see, e.g., FIG. 3D) to one or more of the inboard surface, $CD_{IS}$, and the outboard surface, $CD_{OS}$, of the calibration disk, CD. The selective attachment of the one or more imbalance weights, $CD_W$, may include not only selecting a specific amount of weight but also a specific angular location upon the calibration disk, CD. A process known as inverse force estimation is used whereas the signal gain (e.g., signal output per unit of imbalance) is calculated from the calibration measurements, for each channel of the transducer 50*b* or for each channel of the multi-axis transducer 50*b*.

In an example, one calibration weight, $CD_W$, having an amount of 'X units' may be attached to the outboard surface, $CD_{OS}$, of the calibration disk, CD, at an angular orientation of 279° of the calibration disk, CD. Therefore, upon rotation, R, of the calibration disk from 0° to 279°, the computing resource 75 will receive an imbalance signal produced by the multi-axis transducer 50*b* indicative of 'X units' attached to the outboard surface, $CD_{OS}$, of the calibration disk, CD, at an angular orientation of 279°; accordingly, when an inflated tire-wheel assembly, TW, having an imbalance of 'X units' of the outboard surface at an angular orientation of 279°, is attached to the apparatus 10 and rotated, R, in a substantially similar manner as described above, the computing resource 75 will recognize not only the imbalance amount but also the location of the imbalance. Upon determining the amount and location of the imbalance, the computing resource will record the imbalance and provide an operator or corresponding system with instructions for attaching an amount of weight and location to attach the weight to the wheel, W, of the inflated tire-wheel assembly, TW.

Method for Utilizing the Apparatus 10—Inflated Tire-Wheel Assembly, TW

As described above, one of the acts of balancing provided by the apparatus 10 may include, for example, determining imbalance (which may be quantified in gram-centimeters), if any, of an inflated tire-wheel assembly, TW. An exemplary method for utilizing the apparatus 10 as described immediately above may be seen at FIGS. 3A and 3B'-3D'.

Referring to FIG. 3B', the inflated tire-wheel assembly, TW, may be arranged over the workpiece inboard surface-engaging member 46 of the lower workpiece-engaging portion 18. The inflated tire-wheel assembly, TW, may be then be disposed upon the workpiece inboard surface-engaging member 46 as follows.

In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D1, such that the distal end $36_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Referring to FIG. 3C', once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D2.

Once the tire-wheel assembly, TW, is rotatably-connected to the lower workpiece-engaging portion 18, the motor 40 may be actuated in order to impart rotation, R, to the central shaft 36, which is connected to all of: the workpiece inboard surface-engaging member 46, the angular encoder 48 and the multi-axis transducer 50*b*; because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18 such that the tire-wheel assembly, TW, is rotated at sufficient rotational speed for any components of mass imbalance associated therewith to produce measurable inertial forces.

Upon rotating, R, the central shaft 36, the multi-axis transducer 50*b* may produce signals that are indicative of an imbalance of the tire-wheel assembly, TW (if an imbalance exists). The communicated signal may be then used to determine the static and couple components of the imbalance (by firstly averaging the signals and then calculating imbalance from the average by using a geometric transform to convert the measured imbalance to effective imbalance mass magnitudes and phase angles at one or more locations (e.g., one or more correction planes) on the workpiece by comparing the calculation to a library or data look-up table of imbalance signatures that have been previously prepared as described above at FIGS. 3A-3D). Recommended correction masses are then determined using a geometric transform for the given wheel geometry. An ideal recommended correction may be computed directly, such as with the use of "cut-to-length" correction mass material, or an acceptable compromise may be selected from a library or data look-up table of imbalance signals that have been previously prepared as described above at FIGS. 3A-3D in order to provide an operator or corresponding system with instructions for attaching an amount of weight and location to attach the weight to the wheel, W, of the inflated tire-wheel assembly, TW, in order to correct the determined imbalance of the inflated tire-wheel assembly, TW.

As described above, the detected imbalance may be over-deterministically calculated in terms of at least one group of signals produced by the multi-axis transducer 50*b*, including: (1) a group of two or more torque-moment signals (see, e.g., $T_X$, $T_Y$, $T_Z$ in FIGS. 3A and 3B'-3D') with each torque-moment signal about a respective axis of at least two axes (see, e.g., axes X, Y, Z in FIGS. 3A and 3B'-3D') and (2) a group of two or more force signals (see, e.g., $F_X$, $F_Y$, $F_Z$ in FIGS. 3A and 3B'-3D') with each force signal along a respective axis of the at least two axes (see, e.g., axes X, Y, Z in FIGS. 3A and 3B'-3D'). Mathematically, two-plane balancing may be achieved with two independent force or acceleration signals. Because the transducer 50*b* is coined as a "multi-axis" transducer, the term "multi" defines the number of axes monitored by the transducer 50*b*; further, the number of axes include two or more of the axes that share the same origin and are orthogonal to one another. In an exemplary implementation, the number of axes may include three axes (see, e.g., axes X, Y, Z in FIGS. 3A and 3B'-3D'); although three orthogonal axes, X, Y, Z, are shown in FIGS. 3A and 3B'-3D', some implementations may include two axes that are orthogonal relative one another such as, for example: (1) axis X orthogonal to axis Y, (2) axis X orthogonal to axis Z, or (3) axis Y orthogonal to axis Z.

The Apparatus 10'

Figure 4:
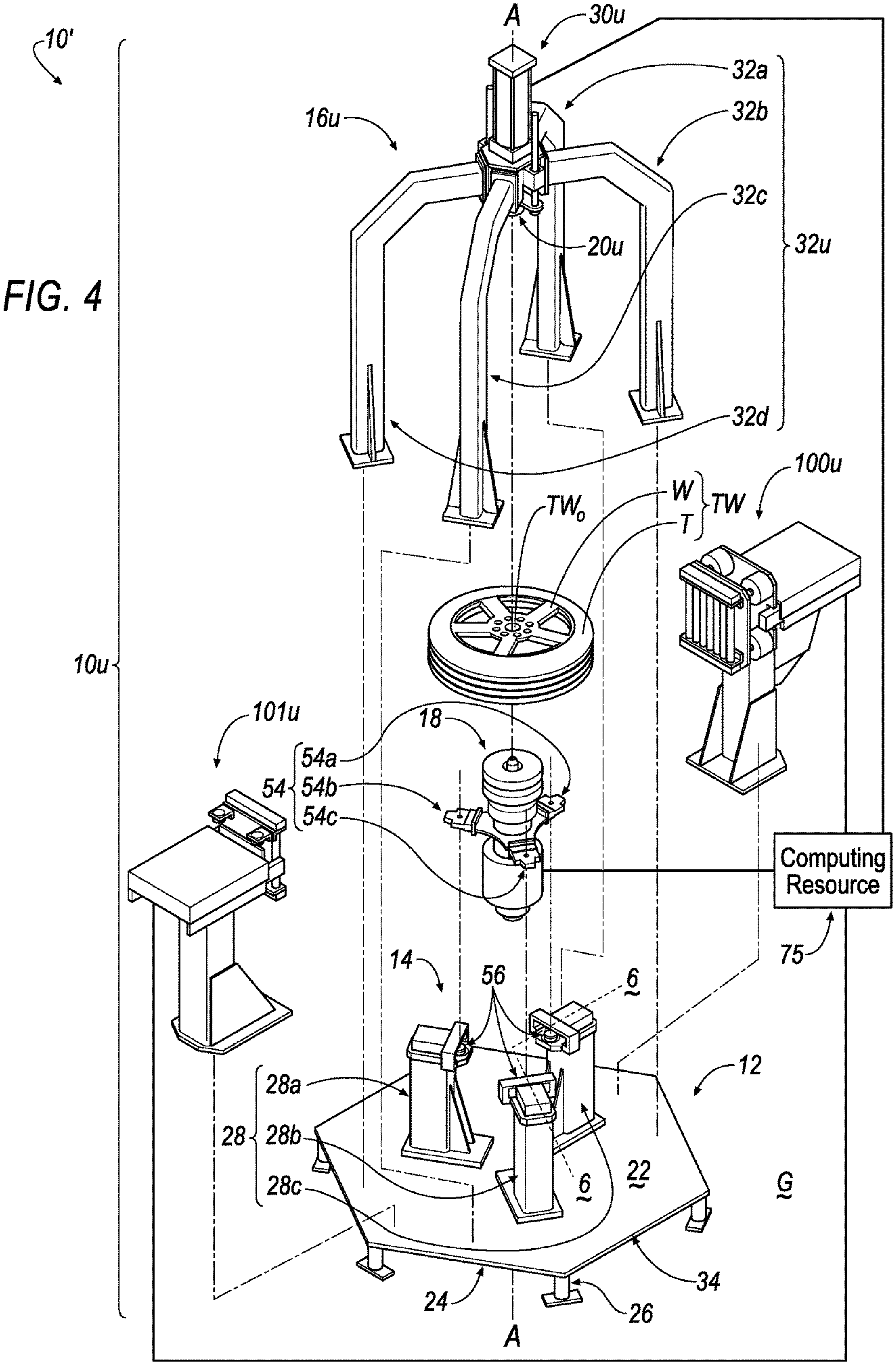
FIG. 4 is an exploded view of an apparatus for processing a tire and a wheel in accordance with an exemplary embodiment of the invention.

Referring to FIG. 4, an exemplary apparatus is shown generally at 10'. In some instances, the apparatus 10' may be structurally configured in a manner to provide only one function being an act of determining uniformity of a tire, T, of an inflated tire-wheel assembly, TW.

Because the apparatus 10' is directed to providing a determining uniformity function, one or more reference numerals identifying a 'uniformity device' of the apparatus 10' includes a "u" appended to the one or more reference numerals; accordingly, a 'uniformity device' is generally represented at, for example, reference numeral "10*u*".

The Uniformity Device 10*u* of the Apparatus 10'

Figure 5:
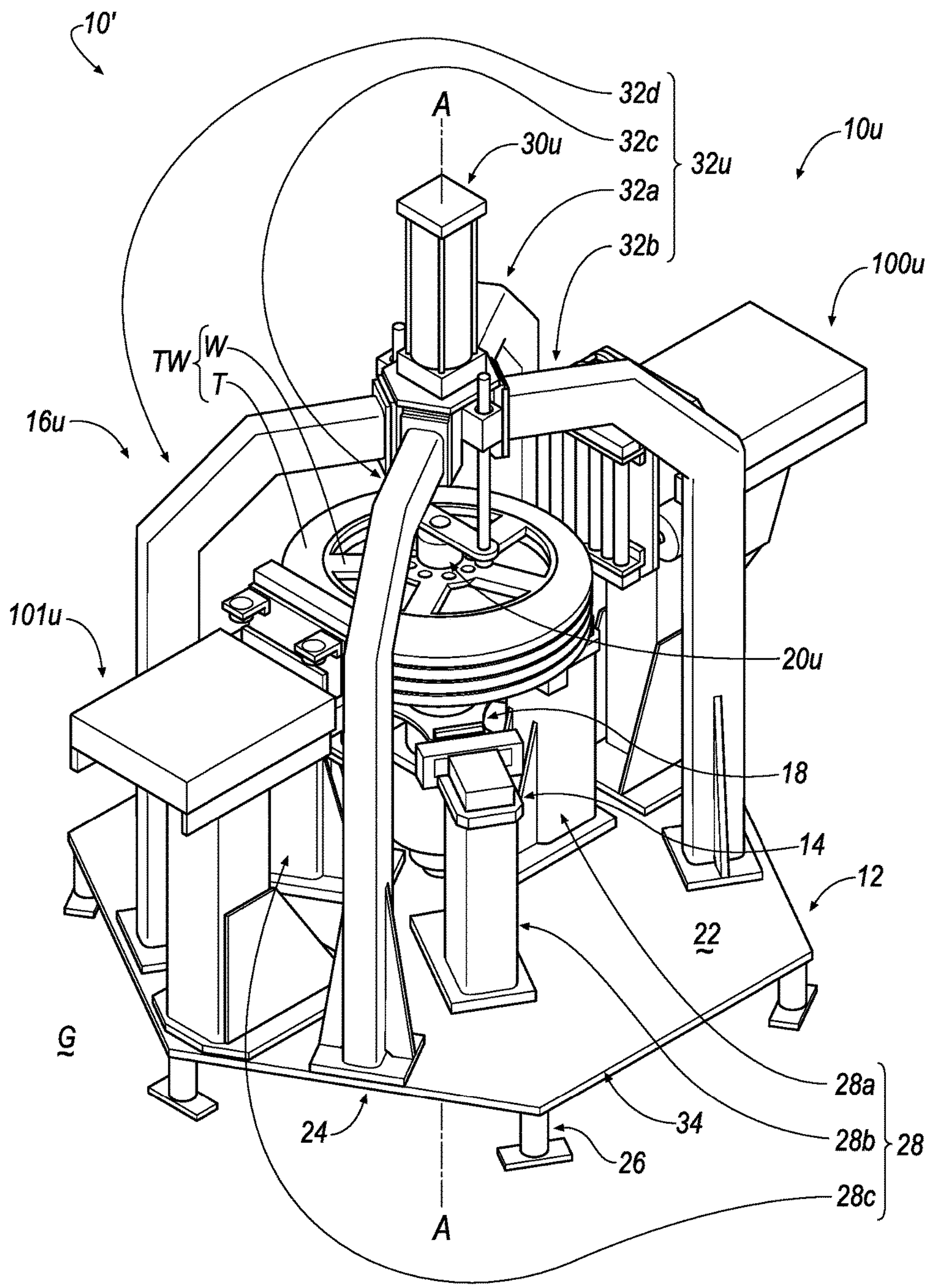
FIG. 5 is an assembled view of the apparatus of FIG. 4.

Referring initially to FIGS. 4-5, the uniformity device 10*u* generally includes a base member 12, a lower support member 14, an upper support member 16*u*, a lower workpiece-engaging portion 18 and an upper workpiece-engaging portion 20*u*. The base member 12 is arranged upon an underlying ground surface, G. The lower support member 14 and the upper support member 16*u* are arranged upon the base member 12. The lower support member 14 is connected to the lower workpiece-engaging portion 18. The upper support member 16*u* is connected to the upper workpiece-engaging portion 20*u*.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28*a*, 28*b*, 28*c*.

The upper support member 16*u* may include a canopy member 30*u* including a plurality of leg members 32*u*. In an example, the plurality of leg members 32*u* may include four leg members 32*a*, 32*b*, 32*c*, 32*d*.

Each pedestal member 28*a*-28*c* of the plurality of pedestal members 28 of the lower support member 14 is disposed upon the upper surface 22 of the base member 12 such that each pedestal member 28*a*-28*c* of the plurality of pedestal members 28 are arranged radially inwardly closer to a central axis, A-A, extending through an axial center of the base member 12 and away from an outer perimeter 34 of the base member 12. Each leg 32*a*-32*d* of the plurality of leg members 32*u* of the upper support member 16*u* is disposed upon the upper surface 22 of the base member 12 such that each leg 32*a*-32*d* of the plurality of leg members 32*u* are arranged proximate the outer perimeter 34 of the base member 12 and radially away from the central axis, A-A, extending through the axial center of the base member 12.

Referring to FIGS. 6A-6E, the lower workpiece-engaging portion 18 includes a central shaft 36 having a proximal end $\mathbf{36}_P$ and a distal end $\mathbf{36}_D$. The central shaft 36 is defined by an elongated body 38 that extends between the proximal end $\mathbf{36}_P$ and the distal end $\mathbf{36}_D$. The central axis, A-A, is axially-aligned with an axial center of the elongated body 38 of the central shaft 36.

The lower workpiece-engaging portion 18 may also include a motor 42 disposed within a motor housing 42. The proximal end $\mathbf{36}_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $\mathbf{36}_D$ of the central shaft 36.

The motor 40 may be actuated in order to, for example, cause rotation, R, of the central shaft 36. In some instances the central shaft 36 may be rotated to a speed between approximately 60 rpm and 120 rpm; in such an example, a speed between approximately 60 rpm and 120 rpm may be considered to be 'low speed' in order to prevent inertia forces for conducting the uniformity function. The motor 40 may also be actuated to impart movement of/spatially manipulate the workpiece-engaging chuck 44. Movement of the workpiece-engaging chuck 44 may include: (1) radial outward movement (for coupling the distal end $\mathbf{36}_D$ of the central shaft 36 to a wheel, W) or (2) radial inward movement (for de-coupling the distal end $\mathbf{36}_D$ of the central shaft 36 from the wheel, W).

Actuation of the motor 40 (for the purpose of rotating, R, the central shaft 36 or causing movement of the workpiece-engaging chuck 44) may occur as a result of a signal sent from a computing resource 75 to the motor 40. The computing resource 75 may be, for example, a digital computer and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

The lower workpiece-engaging portion 18 may also include a plurality of components 46, 48 that are disposed upon the elongated body 38 of the central shaft 36; the plurality of components 46, 48 may include, for example: a workpiece inboard surface-engaging member 46 and an angular encoder 48. The workpiece inboard surface-engaging member 46 may be connected to the elongated body 38 of the central shaft 36 proximate the workpiece-engaging chuck 44 and the distal end $\mathbf{36}_D$ of the central shaft 36. The angular encoder 48 may be connected to the elongated body 38 of the central shaft 36 at any desirable location along the central shaft 36.

In an example, the lower support member 14 may be connected to the lower workpiece-engaging portion 18 as follows. As seen in, for example, FIGS. 6A-6E, a plurality of radially-projecting support arms 54 may extend radially outwardly from a non-rotating structural member of the lower workpiece-engaging portion 18, such as, for example, the motor housing 42. Referring to FIG. 4, the plurality of radially-projecting support arms 54 may include, for example, a first radially-projecting support arm 54*a*, a second radially-projecting support arm 54*b* and a third radially-projecting support arm 54*c*. Each pedestal member 28*a*-28*c* of the plurality of pedestal members 28 may include a shoulder portion 56. A distal end $\mathbf{54}_D$ of each of the first, second and third radially-projecting support arms 54*a*, 54*b*, 54*c* may be disposed upon and connected to the shoulder portion 56 of each pedestal member 28*a*-28*c* of the plurality of pedestal members 28.

Referring to FIGS. 6A-6E, the upper workpiece-engaging portion 20*u* may include an axially-movable cylinder 58. A proximal end $\mathbf{58}_P$ of the axially-movable cylinder 58 is connected to the canopy member 30*u* of the upper support member 16*u*. A distal end $\mathbf{58}_D$ of the axially-movable cylinder 58 includes a recess 60 that is sized for receiving the radially inwardly/outwardly manipulatable workpiece-engaging chuck 44 (when the workpiece-engaging chuck 44 is arranged in the radially-expanded state and engaged with a central passage of a wheel, W).

Referring to FIGS. 4-5 and 6A-6E, the uniformity device 10*u* also includes a tire tread-engaging portion 100*u*. As mentioned above, structural components of the apparatus 10' directed to the uniformity function may include a "u" appended to a reference numeral. Therefore, as seen in the above-described exemplary embodiment, the tire tread-engaging portion 100*u* is exclusive to the uniformity device 10*u*.

As seen in, for example, FIGS. 6A-6E, the tire tread-engaging portion 100*u* may include a pedestal member 102*u*, a radially-movable cylinder or servo mechanism 104*u*, a cylinder or servo lock 106*u*, an applied load-detecting portion 108*u*, a tire uniformity-detecting portion 110*u* and a tire tread-engaging member 112*u*. The pedestal member 102*u* is connected to the radially-movable cylinder or servo mechanism 104*u* such that the radially-movable cylinder or servo mechanism 104*u* may move in a radially inwardly direction toward or away from the central axis, A-A. The cylinder lock 106*c* is connected to the radially-movable cylinder or servo mechanism 104*u*. The applied load-detecting portion 108*u* is connected to the radially-movable cylinder or servo mechanism 104*u*. The tire uniformity detecting portion 110*u* is connected to the radially-movable cylinder or servo mechanism 104*u*.

The uniformity device 10*u* also includes a second tire tread-engaging portion 101*u*. The second tire tread-engaging portion 101*u* is substantially similar to the tire tread-engaging portion 100*u* (as the second tire tread-engaging portion 101*u* includes a pedestal member 102*u*, a radially-movable cylinder or servo mechanism 104*u*, a cylinder or servo lock 106*u*, an applied load-detecting portion 108*u* and a tire tread-engaging member 112*u*) but, in some implementations, may not include a tire uniformity-detecting portion 110*u* (i.e., in some implementations, the second tire-tread engaging portion 101*u* may include a tire uniformity-detecting portion 110*u*). In an example, the first tire tread-engaging portion 100*u* and the second tire tread-engaging portion 101*u* are oppositely arranged with respect to one another relative the central axis, A-A.

Method for Utilizing the Apparatus 10'—Inflated Tire-Wheel Assembly, TW

As described above, the apparatus 10' may determine uniformity of a tire, T, of an inflated tire-wheel assembly, TW. An exemplary method for utilizing the apparatus 10' as described immediately above may be seen at FIGS. 6A-6E.

Figure 6A:
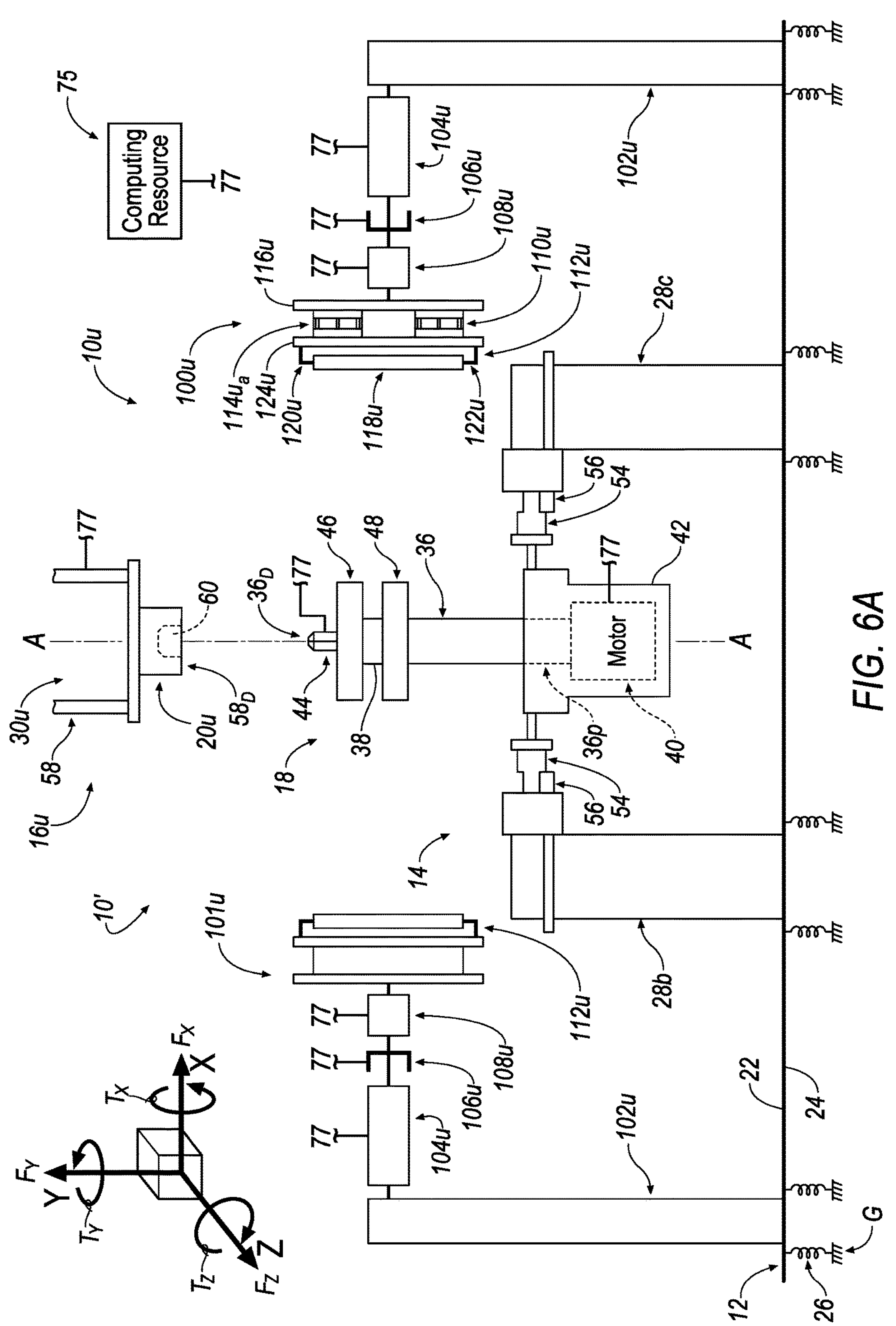
FIG. 6A is a section side view of the apparatus of FIG. 4 according to line 6-6.
Figure 6B:
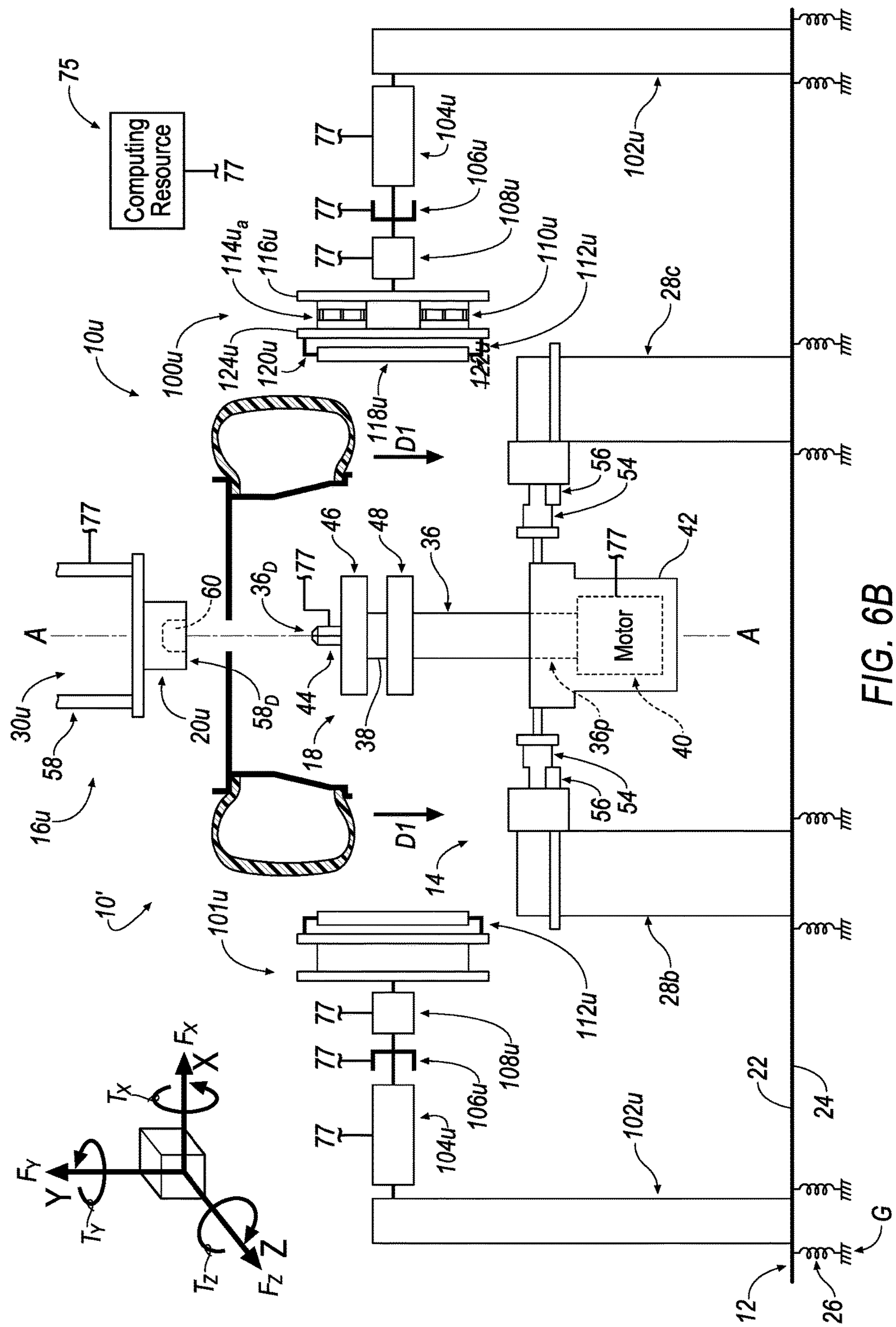
FIG. 6B-6E are section side views of the apparatus of FIG. 6A being interfaced with a tire-wheel assembly.

Referring to FIG. 6B, the inflated tire-wheel assembly, TW, may be arranged upon the workpiece inboard surface-engaging member 46 of the lower workpiece-engaging portion 18. The inflated tire-wheel assembly, TW, may be disposed upon the workpiece inboard surface-engaging member 46 as follows. In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D1, such that the distal end $\mathbf{36}_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Figure 6C:
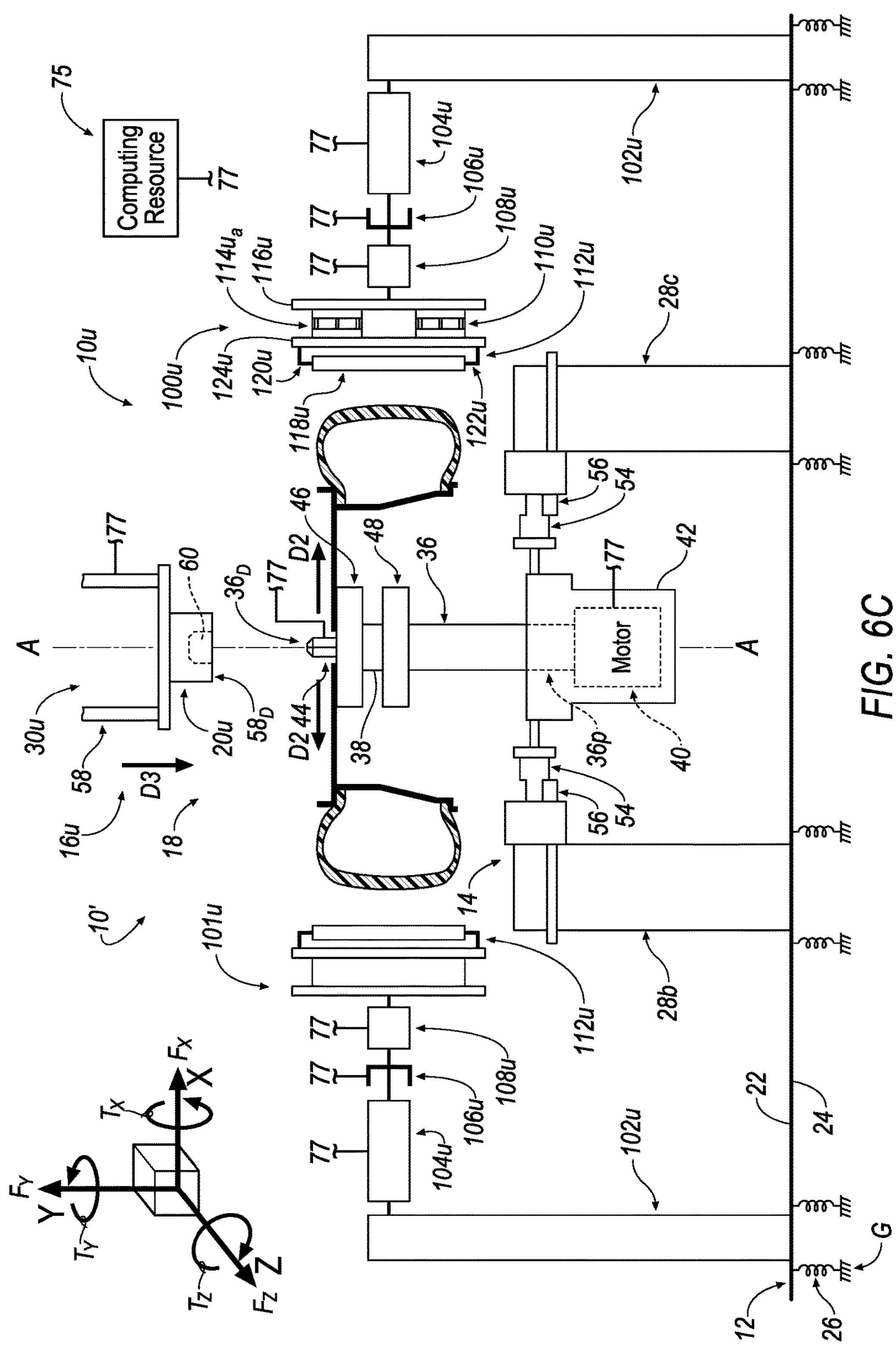

Referring to FIG. 6C, once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D2. Once the inflated tire-wheel assembly, TW, is selectively-retained to the lower workpiece-engaging portion 18 by the radially inwardly/outwardly manipulatable workpiece-engaging chuck 44, the axially-movable cylinder 58 of the upper workpiece-engaging portion 20*u* plunges toward the inflated tire-wheel assembly, TW, and the lower workpiece-engaging portion 18 according to the direction of the arrow, D3, until: (1) the distal end $\mathbf{58}_D$ of the axially-movable cylinder 58 is disposed adjacent an outboard surface, $TW_{OS}$, of the inflated tire-wheel assembly, TW, and (2) the radially inwardly/outwardly manipulatable workpiece-engaging chuck 44 is rotatably-disposed within the recess 60 formed in distal end $\mathbf{58}_D$ of the axially-movable cylinder 58.

Figure 6D:
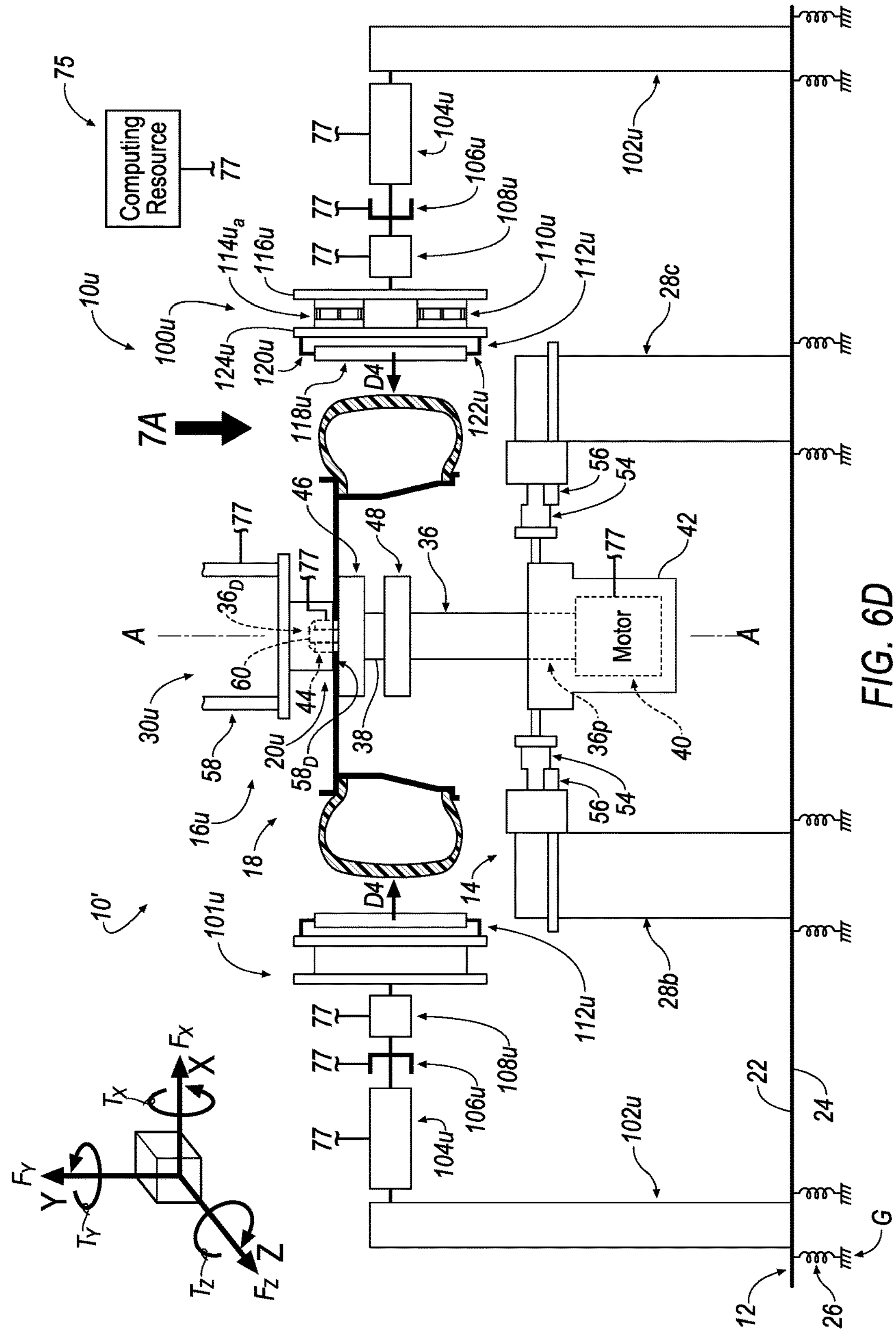

As seen in FIG. 6D, once the distal end $\mathbf{58}_D$ of the axially-movable cylinder 58 is disposed adjacent an outboard surface, $TW_{OS}$, of the tire-wheel assembly, TW, and the radially inwardly/outwardly manipulatable workpiece-engaging chuck 44 is rotatably-disposed within the recess 60 formed in distal end $\mathbf{58}_D$ of the axially-movable cylinder 58 as described above, the tire-wheel assembly, TW, may said to be axially selectively-retained by the apparatus 10' such that the tire-wheel assembly, TW, is rotatably-sandwiched between the lower workpiece-engaging portion 18 and the upper workpiece-engaging portion 20*u* (in order to apply an axial clamping load to the tire-wheel assembly, TW, so as to hold the workpiece firmly against the surface of the chuck assembly). The computing resource 75 may then send a signal to the radially-movable cylinder or servo mechanism 104*u* of each of the first tire tread-engaging portion 100*u* and the second tire tread-engaging portion 101*u* in order to radially plunge according to the direction of the arrow, D4, the radially-movable cylinders or servo mechanisms 104*u* toward the central axis, A-A, in order to radially inwardly plunge according to the direction of the arrow, D4, the tire tread-engaging members 112*u* of each of the first tire tread-engaging portion 100*u* and the second tire tread-engaging portion 101*u* toward the tire-wheel assembly, TW, until the tire tread-engaging members 112*u* of each of the first tire tread-engaging portion 100*u* and the second tire tread-engaging portion 101*u* are disposed adjacent the tread surface, $T_T$, of the tire, T. Radial movement of the radially-movable cylinder or servo mechanism 104*u* of the second tire tread-engaging portion 101*u* toward the central axis, A-A, according to the direction of the arrow, D4, may cease once the applied load-detecting portion 108*u* detects that the tire tread-engaging member 112*u* of the first tire tread-engaging portion 100*u* applies a specified load to the tread surface, $T_T$, of the tire, T. In an example, a 70% load is applied to the tread surface, $T_T$, of the tire, T.

Once the tire-wheel assembly, TW, is rotatably-sandwiched between the lower workpiece-engaging portion 18 and the upper workpiece-engaging portion 20*u*, and, once the radial movement of the radially-movable cylinder or servo mechanism 104*u* of the second tire tread-engaging portion 101*u* toward the central axis, A-A, according to the direction of the arrow, D4, has ceased, the motor 40 may be actuated in order to impart rotation, R, to the central shaft 36, which is connected to both of: the workpiece inboard surface-engaging member 46 and the angular encoder 48; because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18.

Figure 6E:
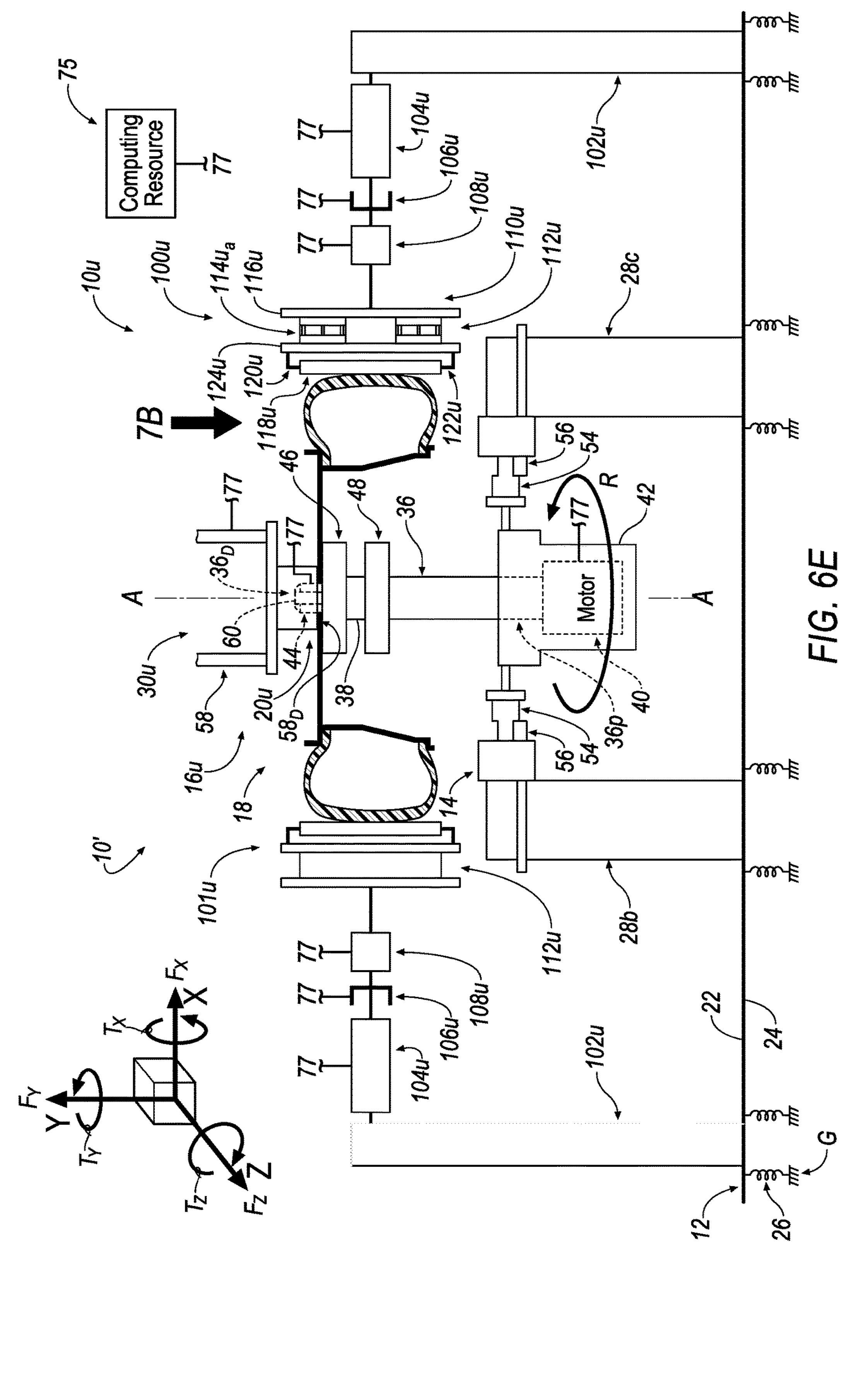

Referring to FIG. 6E, upon rotating, R, the central shaft 36, tire uniformity-detecting portion 110*u* may produce signals that are communicated to the computing resource 75 by way of the one or more communication conduits 77 that are indicative of a uniformity condition or a lack-of-uniformity condition of the tire, T, of the tire-wheel assembly, TW. In some instances, as shown and described, for example, at FIGS. 8-8''', the tire uniformity-detecting portion 110$u$ may include three or more multi-axis load cells 114$u_a$; each of the three or more multi-axis load cells 114$u_a$ may be, for example, a strain gauge transducer or a piezoelectric transducer. In another instance, as shown and described, for example, at FIGS. 9-9''''', the tire uniformity-detecting portion 110$u$ may include three or more air spring members 114$u_b$.

"Fixed Load" Tire Uniformity-Detecting Portion 110$u$

Referring to FIGS. 6A-6E, 7A-7B, 7A'-7B', 8-8''', an exemplary tire uniformity-detecting portion 110$u$ may be referred to as a "fixed load" tire uniformity-detecting portion that includes the plurality of multi-axis load cells 114$u_a$ secured to a support plate 116$u$. In some instances where the tire uniformity-detecting portion 110$u$ may include three or more multi-axis load cells 114$u_a$, the uniformity condition or lack-of-uniformity condition may be over-deterministically calculated in terms of at least one group of signals produced by the tire uniformity-detecting portion 110$u$, including: (1) a group of two or more torque-moment signals (see, e.g., $T_X$, $T_Y$, $T_Z$ in FIGS. 6A-6E) with each torque-moment signal about a respective axis of at least two axes (see, e.g., axes X, Y, Z in FIGS. 6A-6E) and (2) a group of two or more force signals (see, e.g., $F_X$, $F_Y$, $F_Z$ in FIGS. 6A-6E) with each force signal along a respective axis of the at least two axes (see, e.g., axes X, Y, Z in FIGS. 6A-6E). Because the three or more multi-axis load cells 114$u_a$ are coined as "multi-axis" load cells, the term "multi" defines the number of axes monitored by the three or more multi-axis load cells 114$u_a$; further, the number of axes include two or more of the axes that share the same origin and are orthogonal to one another. In an exemplary implementation, the number of axes may include three axes (see, e.g., axes X, Y, Z in FIGS. 6A-6E); although three orthogonal axes, X, Y, Z, are shown in FIGS. 6A-6E, some implementations may include two axes that are orthogonal relative one another such as, for example: (1) axis X orthogonal to axis Y, (2) axis X orthogonal to axis Z, or (3) axis Y orthogonal to axis Z.

Figure 8:
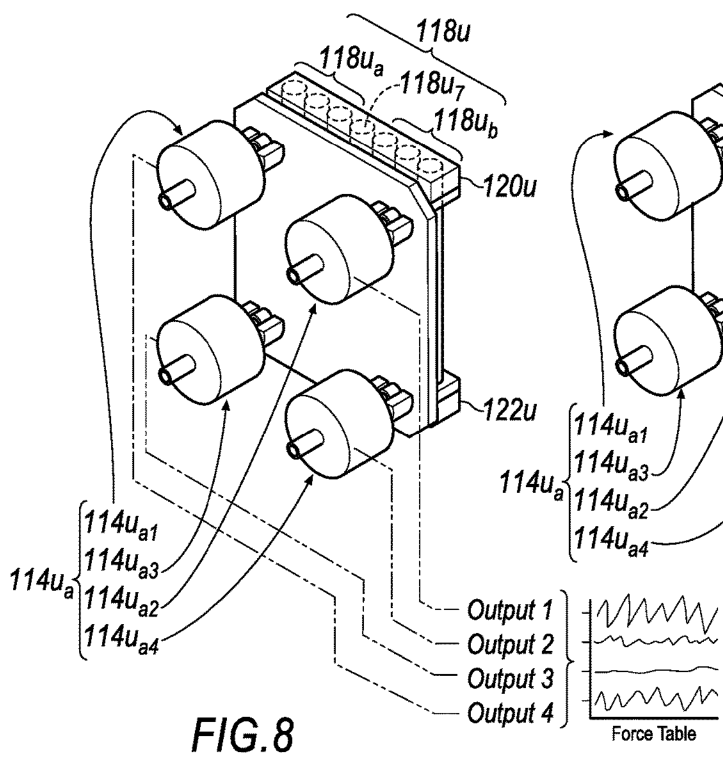
FIG. 8 is a partial perspective view of a portion of the exemplary portion of the apparatus of any of FIGS. 7A, 7B, 7A", 7B".
Figure 8:
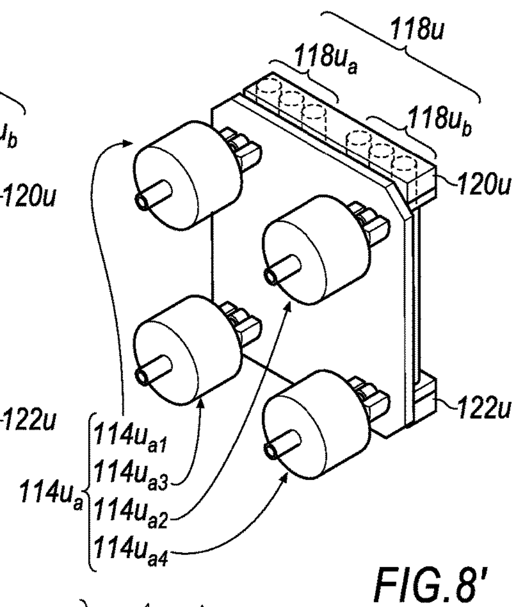
Figure 8:
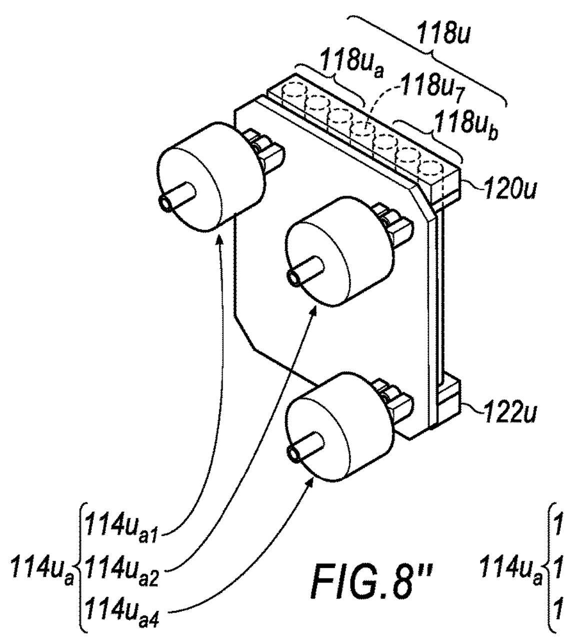
Figure 8:
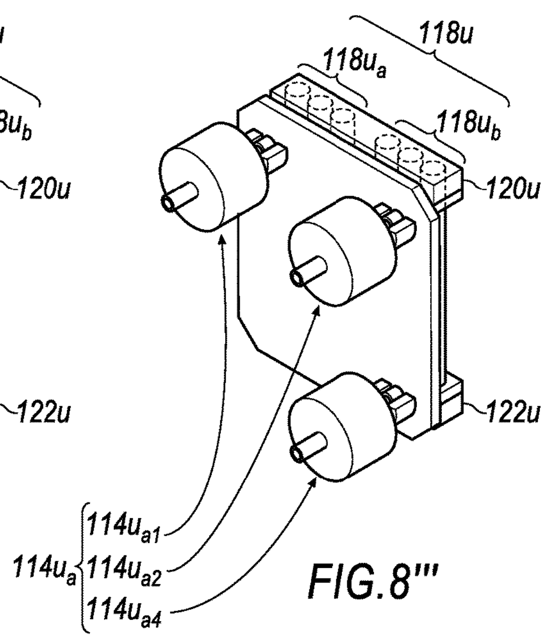

In some instances, each axis (i.e., the X axis, the Y axis and the Z axis) of each multi-axis load cells 114$u_a$ may have its own channel (generally represented by the one or more communication conduits 77); therefore, in some examples, the uniformity device 10$u$ may include, for example, nine channels (when three load cells are incorporated into the design as seen in FIGS. 8'', 8''') or twelve channels (when four load cells are incorporated into the design as seen in FIGS. 8, 8') whereby each channel provides a time domain force or moment ripple output that is communicated to the computing resource 75 over the one or more communication conduits 77. The software associated with the computing resource 75 will sum the time domain force or moment ripple output of each channel and are then subsequently provided to a fast Fourier transform (FFT) analyzer (i.e., this is a fixed-deflection measurement of the imparted "road force" of the workpiece), which will determine uniformity (or lack thereof) of the tire, T. Because, for example, three or more multi-axis load cells 114$u_a$ are used, a variety of uniformity-related measurements may be captured, such as, for example, rocking moments, yaw moments, pitch moments and the like. Each of the plurality of multi-axis load cells 114$u_a$ and the angular encoder 48 may be communicatively-coupled to the computing resource 75 by way of the one or more communication conduits 77 in order to record the lack of uniformity of the tire, T, that was detected by the plurality of multi-axis load cells 114$u_a$ at a particular angular orientation of the tire, T, as determined by the angular encoder 48.

Referring to FIGS. 8-8', in an example, the plurality of multi-axis load cells 114$u_a$ may include four multi-axis load cells 114$u_{a1}$, 114$u_{a2}$, 114$u_{a3}$, 114$u_{a4}$ that are arranged upon the support plate 116$u$ in a "square shape." Referring to FIGS. 8''-8''', in another example, the plurality of multi-axis load cells 114$u_a$ may include three multi-axis load cells 114$u_{a1}$, 114$u_{a2}$, 114$u_{a3}$ that are arranged upon the support plate 116$u$ in an "L shape."

"Fixed Center" Tire Uniformity-Detecting Portion 110$u$

Figure 9:
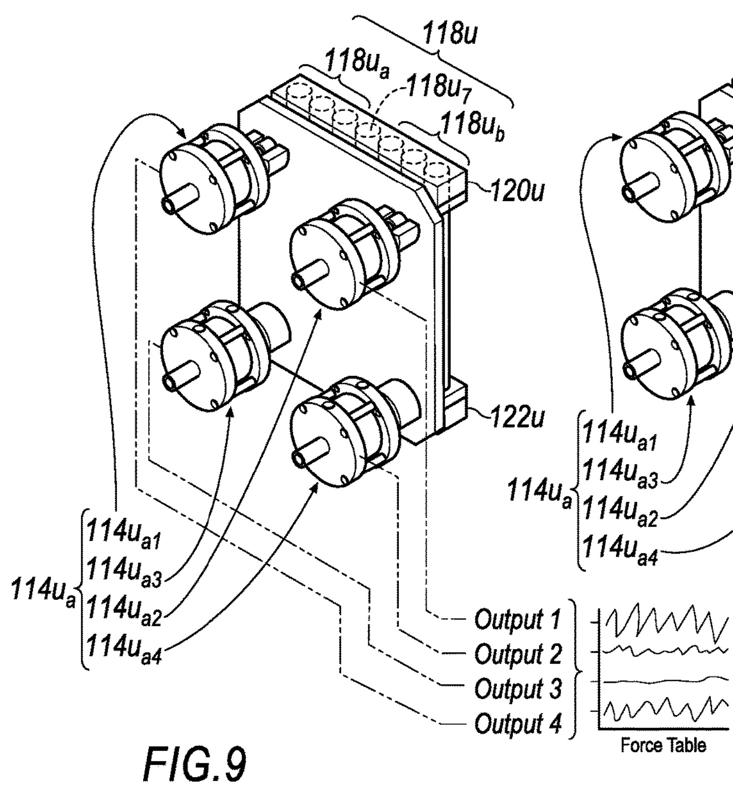
FIG. 9 is a partial perspective view of a portion of the exemplary portion of the apparatus of any of FIGS. 7A, 7B, 7A", 7B".
Figure 9:
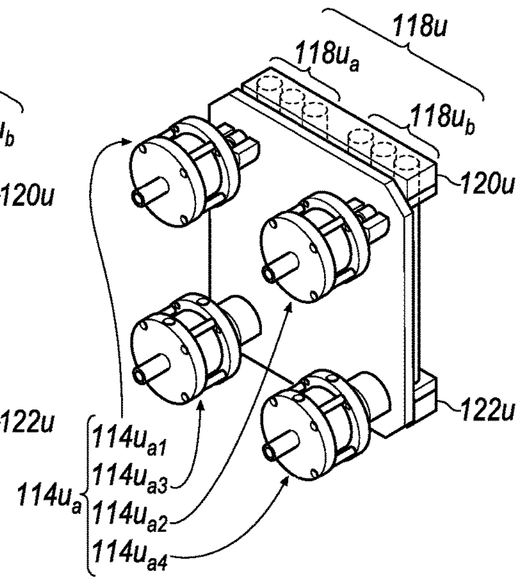
Figure 9:
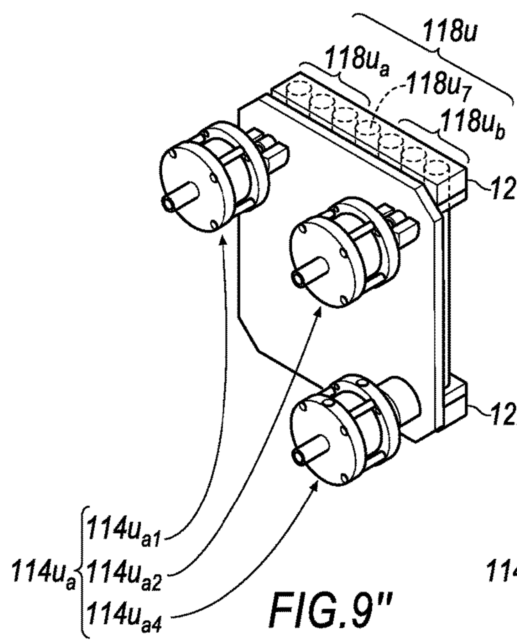
Figure 9:
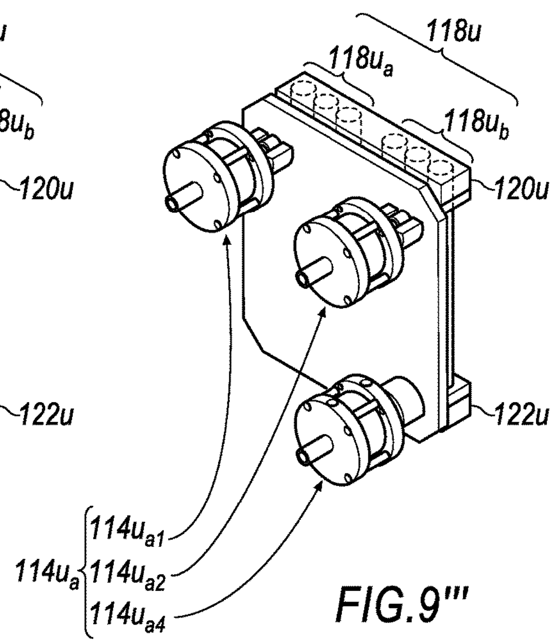

Referring to FIGS. 6A-6E, 7A''-7B'', 7A'''-7B''', 9-9''''', an exemplary tire uniformity-detecting portion 110$u$ may be referred to as a "fixed center" tire uniformity-detecting portion that includes a plurality of air spring members 114$u_b$ secured to a support plate 116$u$. Referring to FIGS. 9-9', in an example, the plurality of air spring members 114$u_b$ may include four air spring members 114$u_{b1}$, 114$u_{b2}$, 114$u_{b3}$, 114$u_{b4}$ secured to the support plate 116$u$ in a "square shape." Referring to FIGS. 9''-9''', in another example, the plurality of air spring members 114$u_b$ may include three air spring members 114$u_{b1}$, 114$u_{b2}$, 114$u_{b3}$ secured to the support plate 116$u$ in an "L shape." Referring to FIGS. 9''''-9''''', in yet another example, the plurality of air spring members 114$u_b$ may include three air spring members 114$u_{b1}$, 114$u_{b2}$, 114$u_{b3}$ secured to the support plate 116$u$ in a "triangular shape." The tire uniformity-detecting portion 110$u$ may also include at least one laser indicator 126 (see, e.g., FIGS. 7A''-7B'', 7A'''-7B'''). The method for utilizing the "fixed center" tire uniformity-detecting portion 110$u$ incorporating the plurality of air spring members 114$u_b$ is described below in further detail.

Tire Tread-Engaging Member 112$u$— Configuration of Roller Members 118$u$ Referring to FIGS. 7A-9''''', the tire tread-engaging member 112$u$ may be configured to include a plurality of roller members 118$u$. The plurality of roller members 118$u$ are rotatably connected to an upper bracket 120$u$ and a lower bracket 122$u$.

Figure 7A:
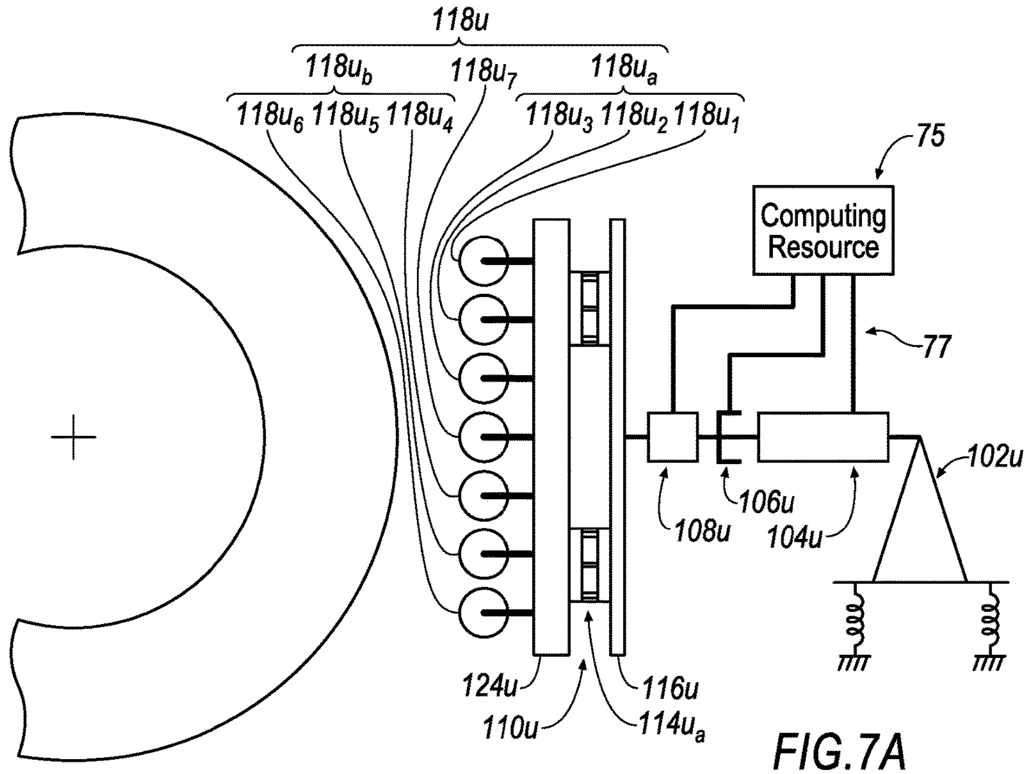
FIG. 7A is a partial top view of an exemplary portion of the apparatus of FIG. 4 according to line 7A of FIG. 6D.
Figure 7B:
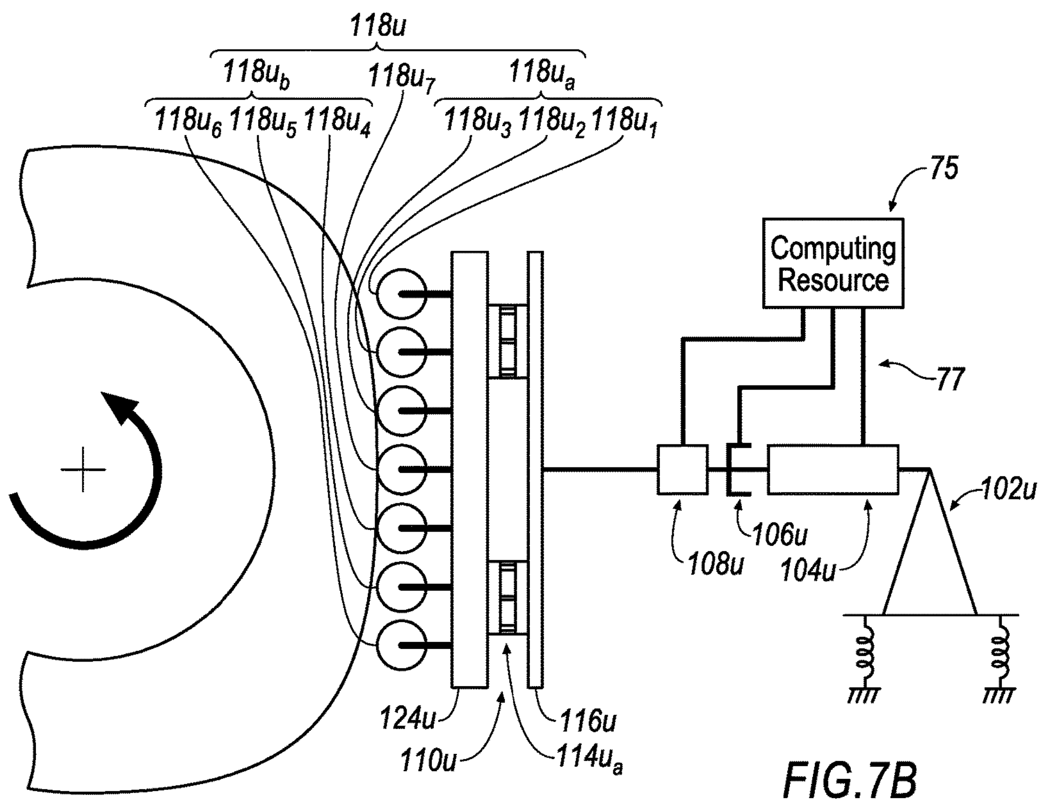
FIG. 7B is a partial top view of an exemplary portion of the apparatus of FIG. 4 according to line 7B of FIG. 6E.
Figure 7A:
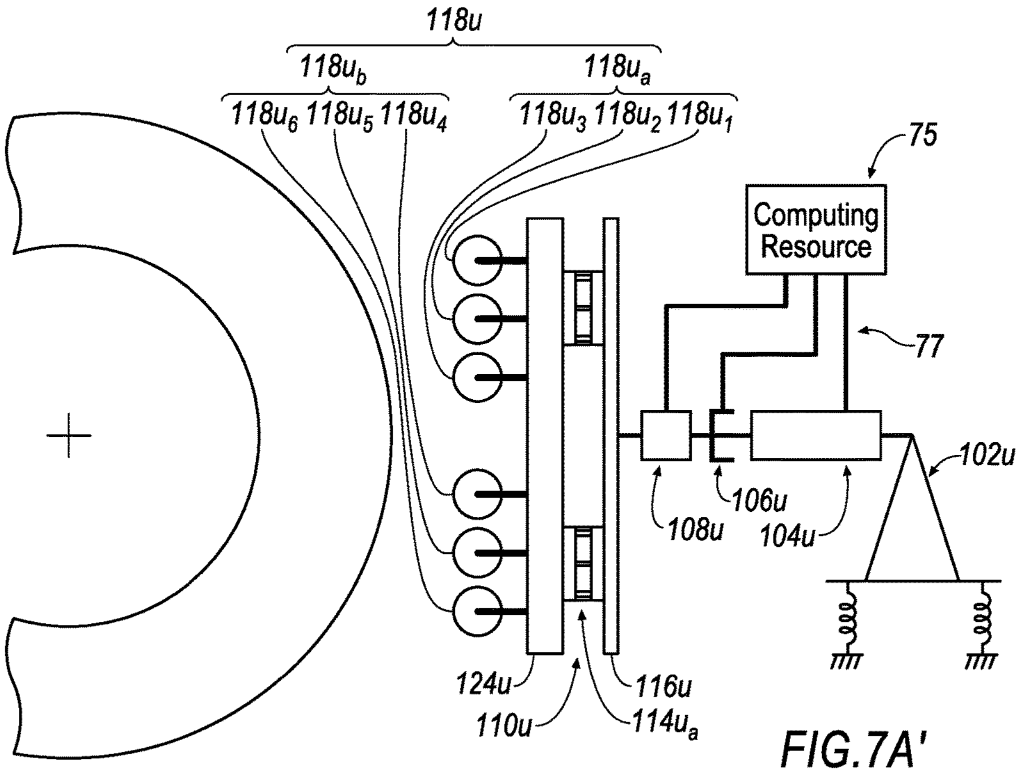
Figure 7B:
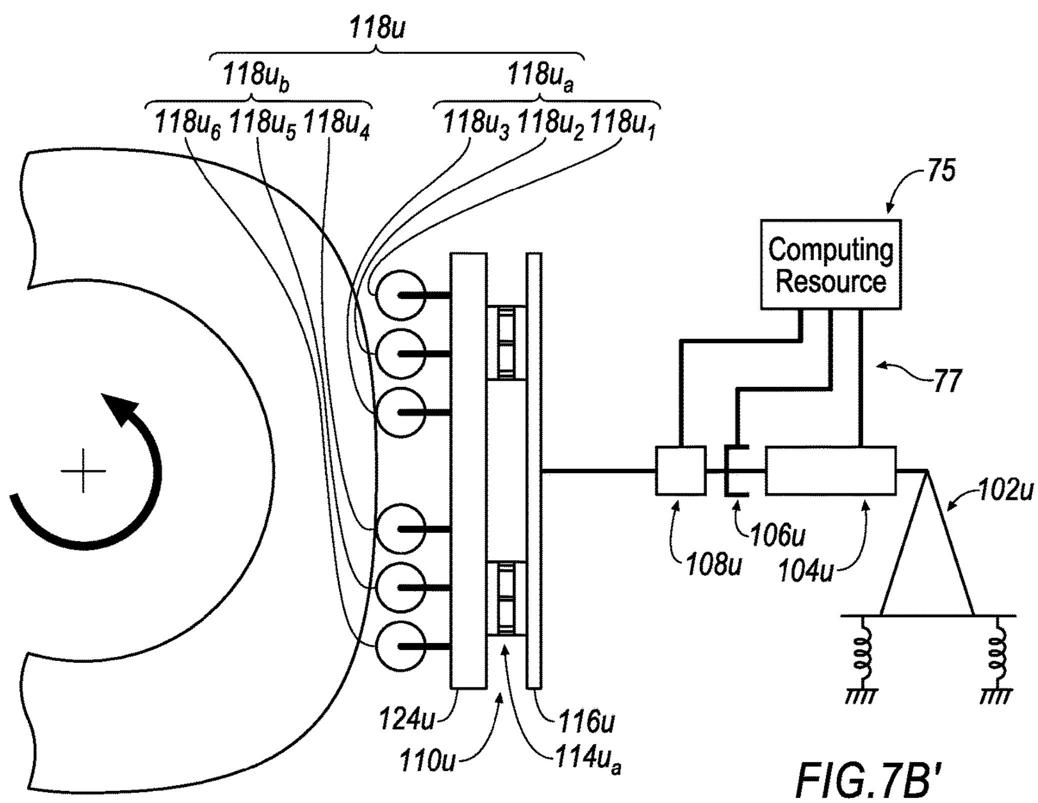
Figure 7A:
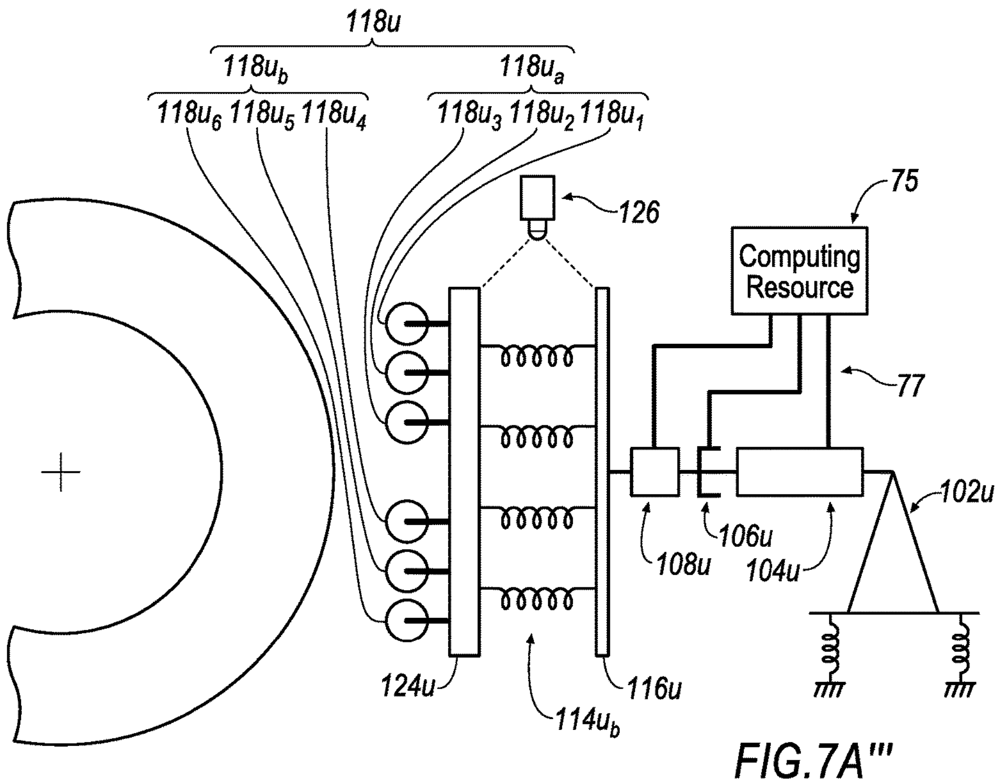
Figure 7B:
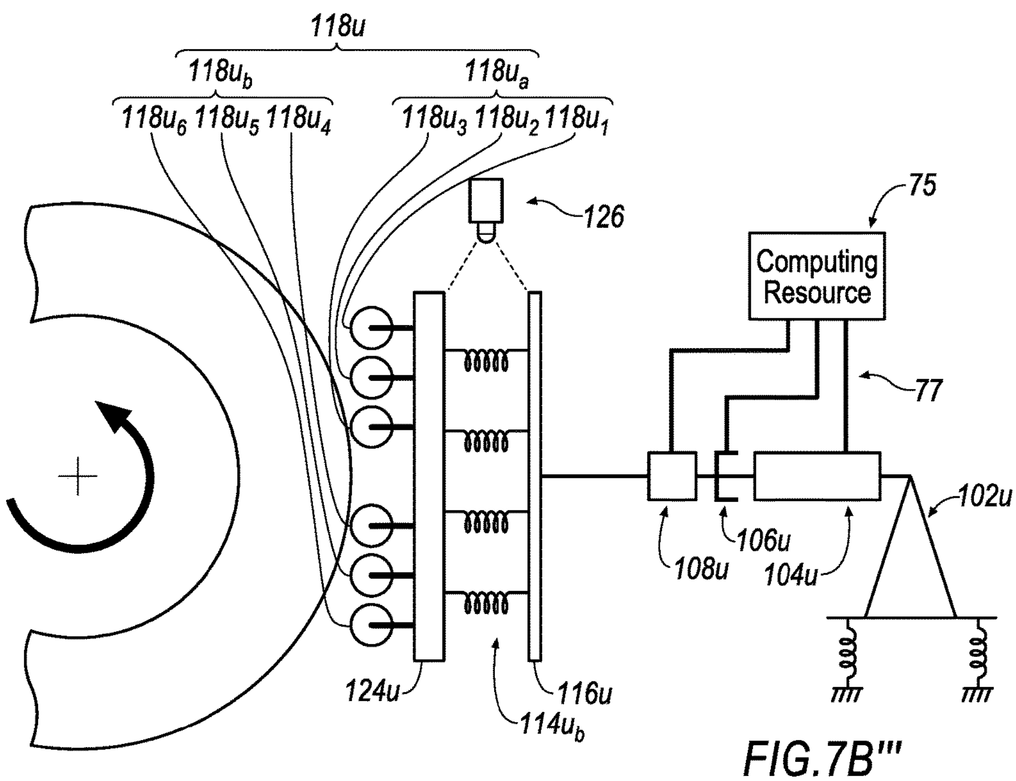

In an example, as seen at FIGS. 7A-7B, 7A''-7B'', 8, 8'', 9, 9'', 9'''', an exemplary tire tread-engaging member 112$u_1$ may include a plurality of roller members 118$u$ rotatably connected to an upper bracket 120$u$ and a lower bracket 122$u$. The plurality of roller members 118$u$ may include seven roller members 118$u_1$, 118$u_2$, 118$u_3$, 118$u_4$, 118$u_5$, 118$u_6$, 118$u_7$, defined by a first grouping 118$u_a$ of three roller members 118$u_1$, 118$u_2$, 118$u_3$ and a second grouping 118$u_b$ of three roller members 118$u_4$, 118$u_5$, 118$u_6$ that are separated by a centrally-located seventh roller member 118$u_7$.

Both of the upper bracket 120$u$ and the lower bracket 122$u$ are secured to a support plate 124$u$. In some instances, the support plate 124$u$ is connected to the plurality of multi-axis load cells 114$u_a$ (of the exemplary embodiment described at FIGS. 6A-6E, 7A-7B, 7A'-7B', 8-8''') or the plurality of air spring members 114$u_b$ (of the exemplary embodiment described at FIGS. 6A-6E, 7A''-7B'', 7A'''-7B''', 9-9''''') such that the plurality of multi-axis load cells 114$u_a$ or the plurality of air spring members 114$u_b$ are "sandwiched" between the support plate 116$u$ of the tire uniformity-detecting portion 110$u_1$/the tire uniformity-detecting portion 110$u_2$ and the support plate 124$u$ of the tire tread-engaging member 112$u_1$.

In an example, as seen at FIGS. 7A'-7B', 7A'''-7B''', 8', 8''', 9', 9''', 9''''', an exemplary tire tread-engaging member 112$u_2$ may include a plurality of roller members 118$u$ rotatably connected to an upper bracket 120$u$ and a lower bracket 122$u$. The plurality of roller members 118$u$ may include six roller members 118$u_1$, 118$u_2$, 118$u_3$, 118$u_4$, 118$u_5$, 118$u_6$ defined by a first grouping 118$u_a$ of three roller members 118$u_1$, 118$u_2$, 118$u_3$ and a second grouping 118$u_b$ of three roller members 118$u_4$, 118$u_5$, 118$u_6$ that are separated by a gap (where there is an absence of a centrally-located seventh roller member 118$u_7$ when compared to the above-described embodiment including seven roller members). The gap spans a leading edge and a trailing edge of a tire contact patch area.

Both of the upper bracket 120$u$ and the lower bracket 122$u$ are secured to a support plate 124$u$. In some instances, the support plate 124$u$ is connected to the plurality of multi-axis load cells 114$u_a$ (of the exemplary embodiment described at FIGS. 6A-6E, 7A-7B, 7A'-7B', 8-8''') or the plurality of air spring members 114$u_b$ (of the exemplary embodiment described at FIGS. 6A-6E, 7A''-7B'', 7A'''-7B''', 9-9''''') such that the plurality of multi-axis load cells 114$u_a$ or the plurality of air spring members 114$u_b$ are "sandwiched" between the support plate 116$u$ of the tire uniformity-detecting portion 110$u_1$/the tire uniformity-detecting portion 110$u_2$ and the support plate 124$u$ of the tire tread-engaging member 112$u_1$.

When the "fixed center" tire uniformity-detecting portion 110$u$ incorporating the plurality of air spring members 114$u_b$ is incorporated into the design of the uniformity device 10$u$, the at least one laser indicator 126, which is positioned proximate the plurality of air spring members 114$u_b$ as well as the support plate 116$u$ and the support plate 124$u$, may detect a difference in an amount distance between the support plate 116$u$ and the support plate 124$u$; accordingly, when a lack of uniformity of the tire, T, may occur at a particular angular revolution of the tire, T, the plurality of air spring members 114$u_b$ may: (1) compress, thereby reducing the distance between the support plates 116$u$, 124$u$, or alternatively, (2) expand, thereby increasing the distance between the support plates 116$u$, 124$u$. Each of the at least one laser indicator 126 and the angular encoder 48 may be communicatively-coupled to the computing resource 75 by way of the one or more communication conduits 77 in order to record the lack of uniformity of the tire, T, that was detected by the at least one laser indicator 126 at a particular angular orientation of the tire, T, as determined by the angular encoder 48.

Functionally, the at least one laser indicator 126 produces at least one signal that is communicated to the computing resource 75 over the one or more communication conduits 77; the at least one signal is a time domain displacement ripple output. If more than one laser indicator 126 is used, software associated with the computing resource 75 sums the time domain displacement ripple output of each signal output by each laser indicator 126, which is then subsequently provided to a fast Fourier transform (FFT) analyzer (i.e., this is a "quasi fixed load" measurement of the loaded radius of the workpiece).

The Apparatus 10''

Figure 10:
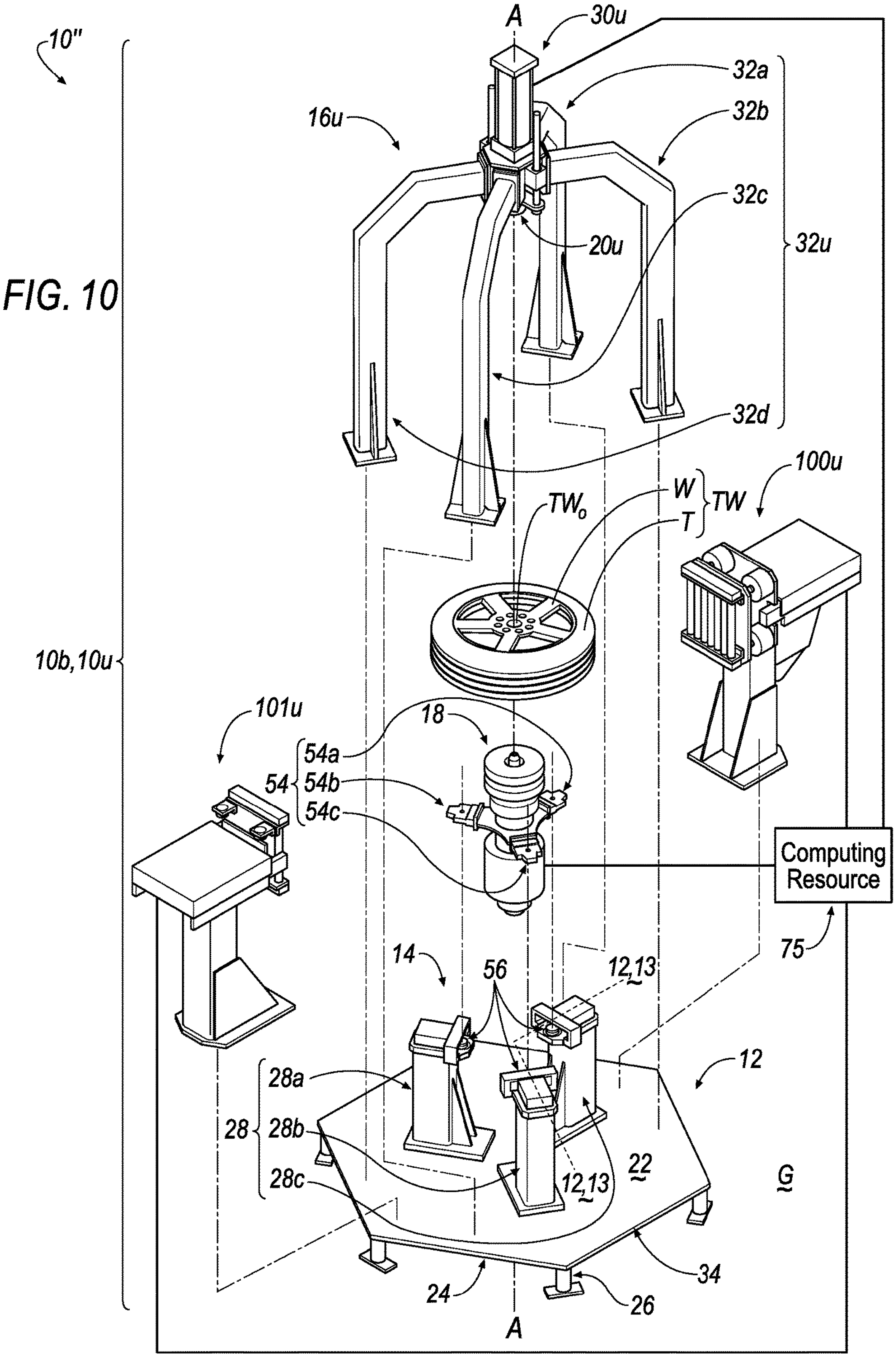
FIG. 10 is an exploded view of an apparatus for processing a tire and a wheel in accordance with an exemplary embodiment of the invention.

Referring to FIG. 10, an exemplary apparatus is shown generally at 10''. In some instances, the apparatus 10'' may be structurally configured in a manner to provide a first function, which may be related to an act of balancing; the act of balancing may include, for example: (1) teaching a computing resource 75 a variety of imbalance configurations that may be exhibited by an inflated tire-wheel assembly, TW, by arranging a calibration disk, CD (as seen in, e.g., FIGS. 12C-12E), upon the apparatus 10'', and (2) arranging an inflated tire-wheel assembly, TW (as seen, e.g., FIGS. 12C'-12E'), upon the apparatus 10'' for determining imbalance (which may be quantified in gram-centimeters), if any, of the inflated tire-wheel assembly, TW (which may be determined in view of, for example, a learned state of imbalance provided to the computing resource 75 from a previous application of the calibration disk, CD, to the apparatus 10'' as described above). Additionally, the apparatus 10'' may be structurally configured in a manner to provide a second function, which may be an act of determining uniformity of a tire, T, of an inflated tire-wheel assembly, TW (as seen, e.g., FIGS. 13A-13E). Therefore, the apparatus 10'' may be generally referred as a "two-in-one" combination apparatus 10'' that may sequentially perform the acts of balancing and determining uniformity, which may expedite the processing of an inflated tire-wheel assembly, TW, due to the fact that the inflated tire-wheel assembly, TW, may be disposed upon one structure (i.e., the apparatus 10'') that is capable of performing more than one tire-wheel assembly processing function (i.e., balancing and determining uniformity).

Structural components of the apparatus 10'' that are exclusive to the balancing function may include a "b" appended to a reference numeral; accordingly, a 'balancing device' is generally represented at, for example reference numeral "10$b$". In a substantially similar manner, structural components of the apparatus 10'' directed to the uniformity function may include a "u" appended to a reference numeral; accordingly, a 'uniformity device' is generally represented at, for example, reference numeral "10$u$". In some instances, structural components may not be appended with a "b" or a "u" reference numeral designation; accordingly, such structural components may be associated with either of the balancing device 10$b$ and the uniformity device 10$u$.

The Balancing Device 10$b$ of the Apparatus 10''

Figure 11:
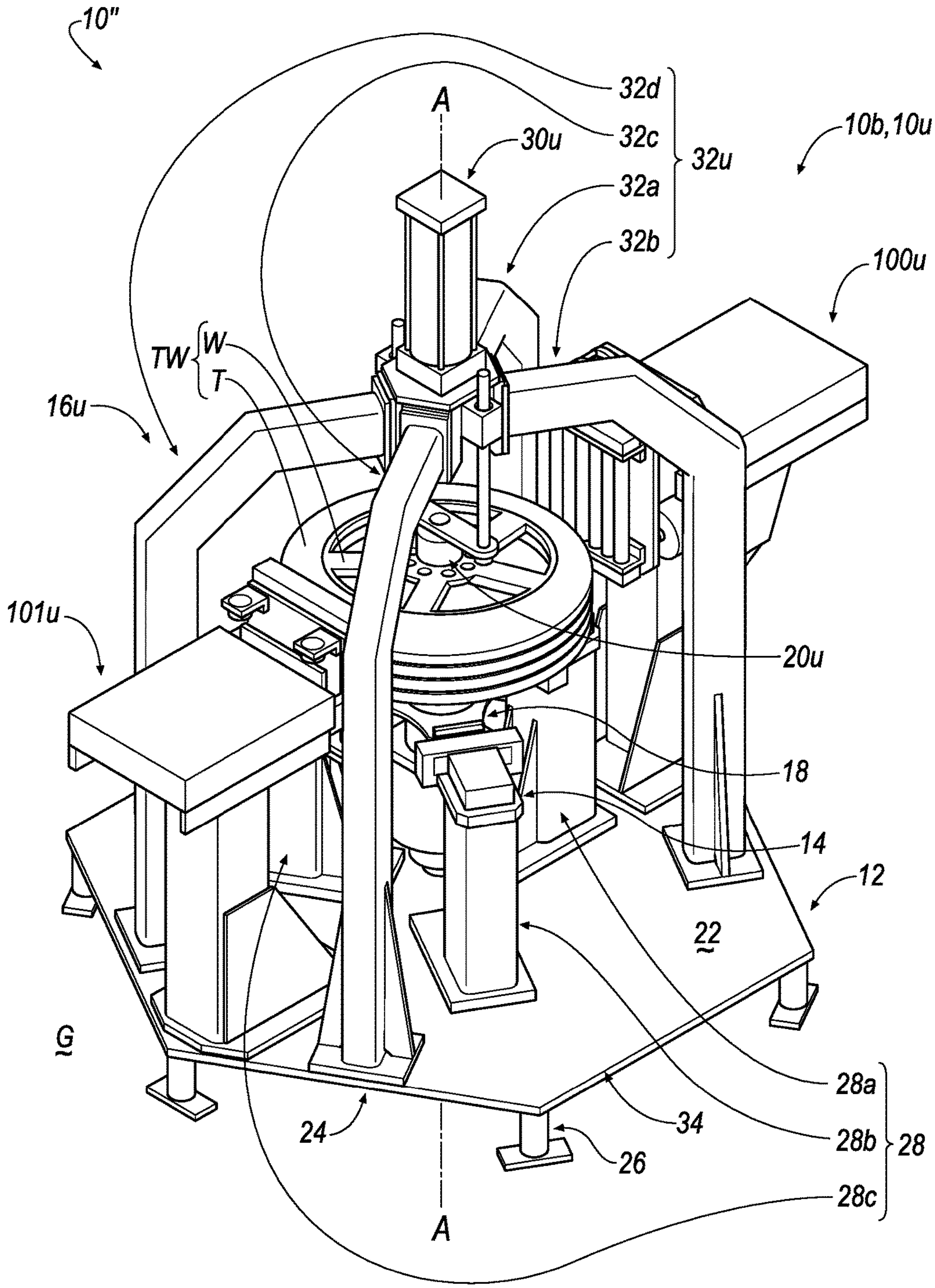
FIG. 11 is an assembled view of the apparatus of FIG. 10.

Referring initially to FIGS. 10-11, the balancing device 10$b$ generally includes a base member 12, a lower support member 14, an upper support member 16$u$, a lower workpiece-engaging portion 18 and an upper workpiece-engaging portion 20$u$. The base member 12 is arranged upon an underlying ground surface, G. The lower support member 14 and the upper support member 16$u$ are arranged upon the base member 12. The lower support member 14 is connected to the lower workpiece-engaging portion 18. The upper support member 16$u$ is connected to the upper workpiece-engaging portion 20$u$.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28$a$, 28$b$, 28$c$.

The upper support member 16$u$ may include a canopy member 30$u$ including a plurality of leg members 32$u$. In an example, the plurality of leg members 32$u$ may include four leg members 32$a$, 32$b$, 32$c$, 32$d$.

Each pedestal member 28$a$-28$c$ of the plurality of pedestal members 28 of the lower support member 14 is disposed upon the upper surface 22 of the base member 12 such that each pedestal member 28$a$-28$c$ of the plurality of pedestal members 28 are arranged radially inwardly closer to a central axis, A-A, extending through an axial center of the base member 12 and away from an outer perimeter 34 of the base member 12. Each leg 32$a$-32$d$ of the plurality of leg members 32$u$ of the upper support member 16$u$ is disposed upon the upper surface 22 of the base member 12 such that each leg 32*a*-32*d* of the plurality of leg members 32*u* are arranged proximate the outer perimeter 34 of the base member 12 and radially away from the central axis, A-A, extending through the axial center of the base member 12.

Referring to FIGS. 12A-12E', the lower workpiece-engaging portion 18 includes a central shaft 36 having a proximal end $\mathbf{36}_P$ and a distal end $\mathbf{36}_D$. The central shaft 36 is defined by an elongated body 38 that extends between the proximal end $\mathbf{36}_P$ and the distal end $\mathbf{36}_D$. The central axis, A-A, is axially-aligned with an axial center of the elongated body 38 of the central shaft 36.

The lower workpiece-engaging portion 18 may also include a motor 40 disposed within a motor housing 42. The proximal end $\mathbf{36}_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $\mathbf{36}_D$ of the central shaft 36.

The motor 40 may be actuated in order to, for example, cause rotation, R, of the central shaft 36. In some instances the central shaft 36 may be rotated approximately 300 rpm; in such an example, 300 rmp may be considered to be 'high speed' in order to impart inertia forces for conducting the balancing function. The motor 40 may also be actuated to impart movement of/spatially manipulate the workpiece-engaging chuck 44. Movement of the workpiece-engaging chuck 44 may include: (1) radial outward movement (for coupling the distal end $\mathbf{36}_D$ of the central shaft 36 to a workpiece, CD/TW) or (2) radial inward movement (for de-coupling the distal end $\mathbf{36}_D$ of the central shaft 36 from the workpiece, CD/W).

Actuation of the motor 40 (for the purpose of rotating, R, the central shaft 36 or causing movement of the workpiece-engaging chuck 44) may occur as a result of a signal sent from the computing resource 75 to the motor 40. The computing resource 75 may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

The lower workpiece-engaging portion 18 may also include a plurality of components 46, 48, 50*b* that are disposed upon the elongated body 38 of the central shaft 36; the plurality of components 46, 48, 50*b* may include, for example: a workpiece inboard surface-engaging member 46, an angular encoder 48 and a multi-axis transducer 50*b*. The workpiece inboard surface-engaging member 46 may be connected to the elongated body 38 of the central shaft 36 proximate the workpiece-engaging chuck 44 and the distal end $\mathbf{36}_D$ of the central shaft 36. The multi-axis transducer 50*b* may be connected to the elongated body 38 of the central shaft 36 proximate, for example, the proximal end $\mathbf{36}_P$ of the central shaft 36; the transducer 50*b* may be, for example, a strain gauge transducer or a piezoelectric transducer. The angular encoder 48 may be connected to the elongated body 38 of the central shaft 36 at, for example, a location between the workpiece inboard surface-engaging member 46 and the multi-axis transducer 50*b*.

As mentioned above, structural components of the apparatus 10" directed to the balancing function may include a "b" appended to a reference numeral. Therefore, as seen in the above-described exemplary embodiment, the multi-axis transducer 50*b* is exclusive to the balancing device 10*b*.

The lower workpiece-engaging portion 18 may also include a lock-up mechanism 52 (e.g., a clutch). Referring to FIGS. 12A-12E', the lock-up mechanism 52 is shown arranged about multi-axis transducer 50*b* of the balancing device 10*b*. The lock-up mechanism 52 is incorporated into the design of the apparatus 10" due to the fact that the apparatus 10" provides both of the functions described above, being: (1) an act of balancing, and (2) determining uniformity.

When the lock-up mechanism 52 is arranged in an "engaged state" (see, e.g., FIG. 12A), the lock-up mechanism 52 selectively mechanically joins the multi-axis transducer 50*b* with the elongated body 38 of the central shaft 36 such that the multi-axis transducer 50*b* is permitted to rotate, R, with the central shaft 36 upon actuation of the motor 40; also, when the lock-up mechanism 52 is arranged in the engaged state, the multi-axis transducer 50*b* may be said to be taken offline/arranged in an "open circuit" state (see, e.g. "X" in a circle at FIGS. 12A and 13A-13E) such that the multi-axis transducer 50*b* is not permitted to communicate signals to the computing resource 75 by way of the one or more communication conduits 77. Conversely, when the lock-up mechanism 52 is arranged in a "disengaged state" (see, e.g., FIG. 12B) the multi-axis transducer 50*b* may be said to be selectively mechanically dis-joined from the elongated body 38 of the central shaft 36 while the multi-axis transducer 50*b* is placed online/arranged in a "closed circuit" state (see, e.g., "check mark" in a circle at FIGS. 12B-12E') such that the multi-axis transducer 50*b* is permitted to communicate signals indicative of an imbalance of a workpiece, CD/TW, to the computing resource 75 by way of the one or more communication conduits 77. Therefore, as a result of selectively-mechanically-disjoining the multi-axis transducer 50*b* with the elongated body 38 of the central shaft 36, the apparatus 10" may be said to operate in a manner that exploits the balancing function of the two available functions of the apparatus 10". As a result of selectively-mechanically-connecting the multi-axis transducer 50*b* to the elongated body 38 of the central shaft 36, the apparatus 10" may be said to operate in a manner that exploits the uniformity function of the two available functions of the apparatus 10". The lock-up mechanism 52 may be communicatively-coupled to the computing resource 75 by way of the one or more communication conduits 77; therefore, the engaged or disengaged state of the lock-up mechanism may be determined in response to a signal communicated from computing resource 75 to the lock-up mechanism 52 over the one or more communication conduits 77.

Aside from permitting the apparatus 10" to be selectively-arranged in a mode of operation that provides one of the balancing function or the uniformity function, the state of the lock-up mechanism 52 may also protect the structural integrity of the multi-axis transducer 50*b* when the mode of the apparatus 10" is selectively-arranged in the uniformity mode of operation. As will be described in the following disclosure, the uniformity device 10*u* exerts a radial load on the central shaft 36 during a uniformity test; therefore, if the multi-axis transducer 50*b* were to otherwise not be mechanically connected to the central shaft 36, the radially-exerted load could be potentially damage the multi-axis transducer 50*b*.

In an example, the lower support member 14 may be connected to the lower workpiece-engaging portion 18 as follows. As seen in, for example, FIGS. 12A-12E', a plurality of radially-projecting support arms 54 may extend radially outwardly from a non-rotating structural member of the lower workpiece-engaging portion 18, such as, for example, the motor housing 42.

With reference to FIG. 10, the plurality of radially-projecting support arms 54 may include, for example, a first radially-projecting support arm 54*a*, a second radially-projecting support arm 54*b* and a third radially-projecting support arm 54*c*. Each pedestal member 28*a*-28*c* of the plurality of pedestal members 28 may include a shoulder portion 56. Referring to FIGS. 12A-12E', a distal end $\mathbf{54}_D$ of each of the first, second and third radially-projecting support arms 54*a*, 54*b*, 54*c* may be disposed upon and connected to the shoulder portion 56 of each pedestal member 28*a*-28*c* of the plurality of pedestal members 28.

With reference to FIGS. 10-11 and 12A-12E', the upper workpiece-engaging portion 20*u* may include an axially-movable cylinder 58. A proximal end $\mathbf{58}_P$ of the axially-movable cylinder 58 is connected to the canopy member 30*u* of the upper support member 16*u*. A distal end $\mathbf{58}_D$ of the axially-movable cylinder 58 includes a recess 60 that is sized for receiving the radially inwardly/outwardly manipulatable workpiece-engaging chuck 44.

Method for Utilizing the Apparatus 10"—Calibration Disk, CD

As described above, one of the acts of balancing provided by the apparatus 10" may include, for example, teaching the computing resource 75 a variety of imbalance configurations that may be exhibited by an inflated tire-wheel assembly, TW, by arranging a calibration disk, CD, upon the apparatus 10". An exemplary method for utilizing the apparatus 10" as described immediately above may be seen at FIGS. 12A-12B and 12C-12E. The balancing device 10*b* may be referred to as a "two plane" balancer for the upper plane (e.g., outboard side) and the lower plane (e.g., inboard side) of the tire-wheel assembly, TW, in order to correct the static component and the couple component of the tire-wheel assembly, TW (i.e., the balancing device 10*b* may contribute to dynamically balancing the tire-wheel assembly, TW).

Figure 12A:
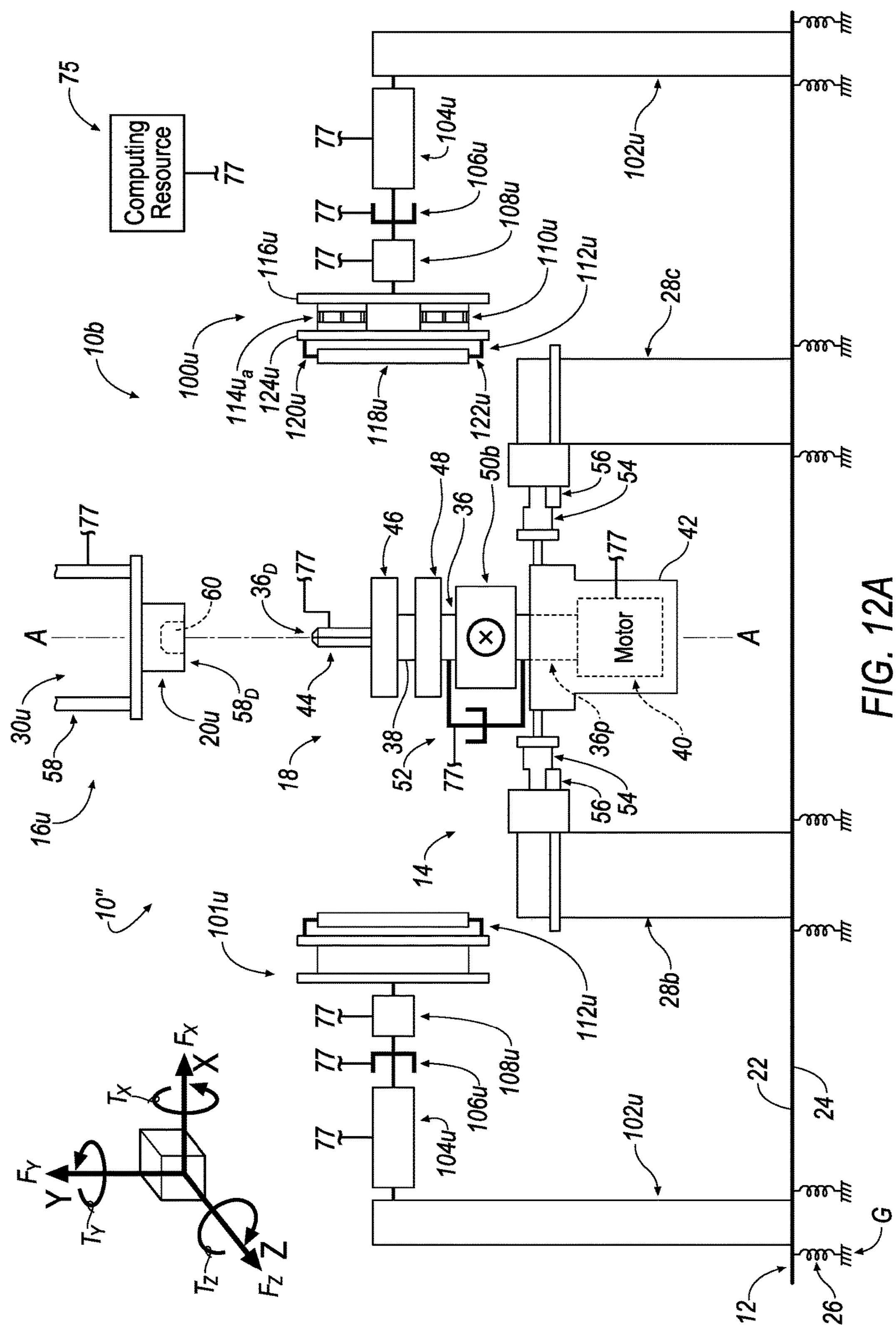
FIG. 12A is a first section side view of the apparatus of FIG. 10 according to line 12, 13-12, 13.

Firstly, as seen in FIG. 12A, the lock-up mechanism 52 is shown in an engaged state such that the multi-axis transducer 50*b* is selectively mechanically connected to the elongated body 38 of the central shaft 36; as a result, the multi-axis transducer 50*b* is permitted to rotate, R, with the central shaft 36 upon actuation of the motor 40. Then, referring to FIG. 12B, upon communicating a signal from computing resource 75 to the lock-up mechanism 52 over the one or more communication conduits 77, the lock-up mechanism 52 may be selectively-arranged in a disengaged state (according to arrow, D1, in FIG. 12A); as a result, the multi-axis transducer 50*b* is not permitted to rotate, R, with the central shaft 36 upon actuation of the motor 40.

Figure 12B:
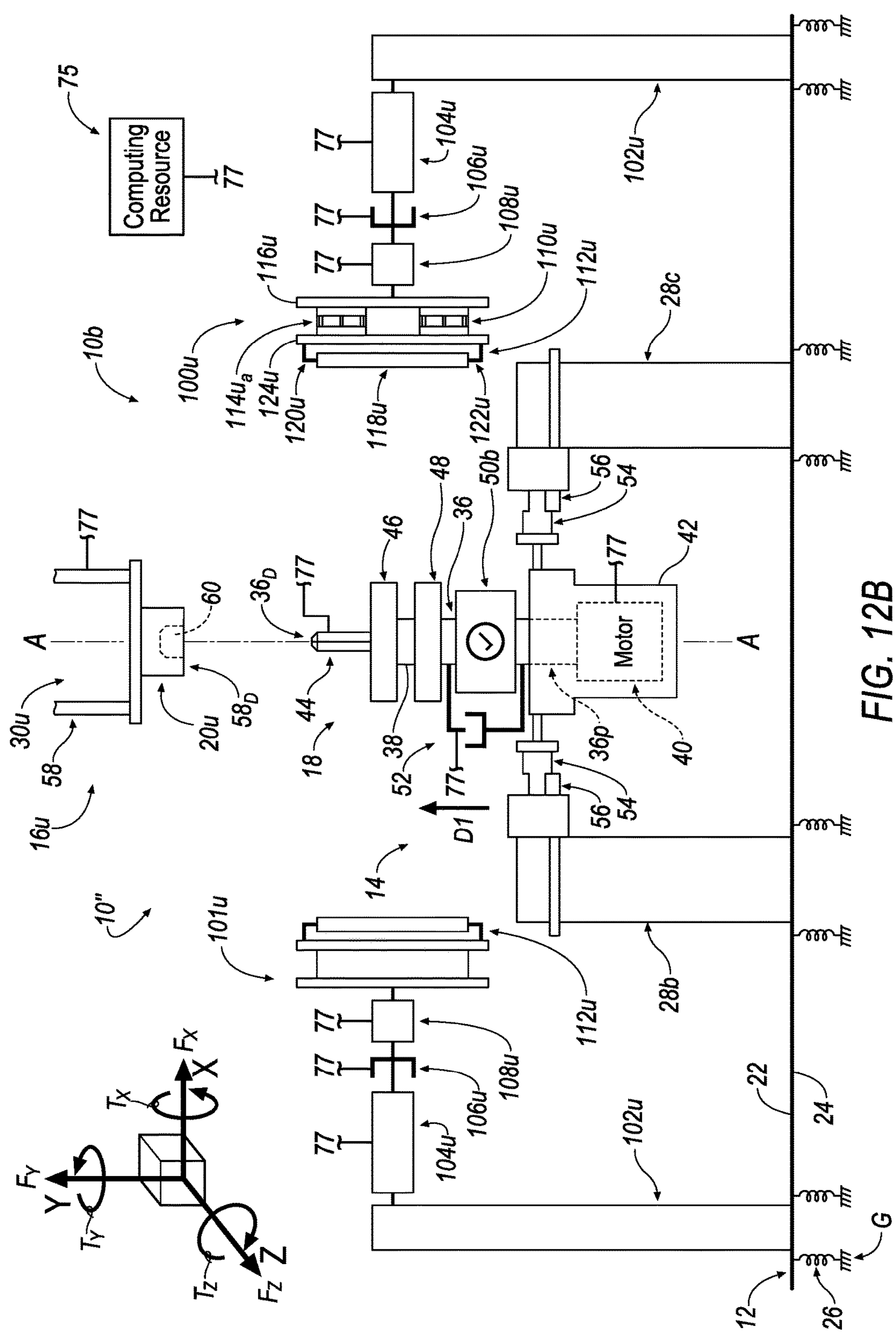
FIG. 12B is a second section side view of the apparatus of FIG. 10 according to line 12, 13-12, 13.
Figure 12C:
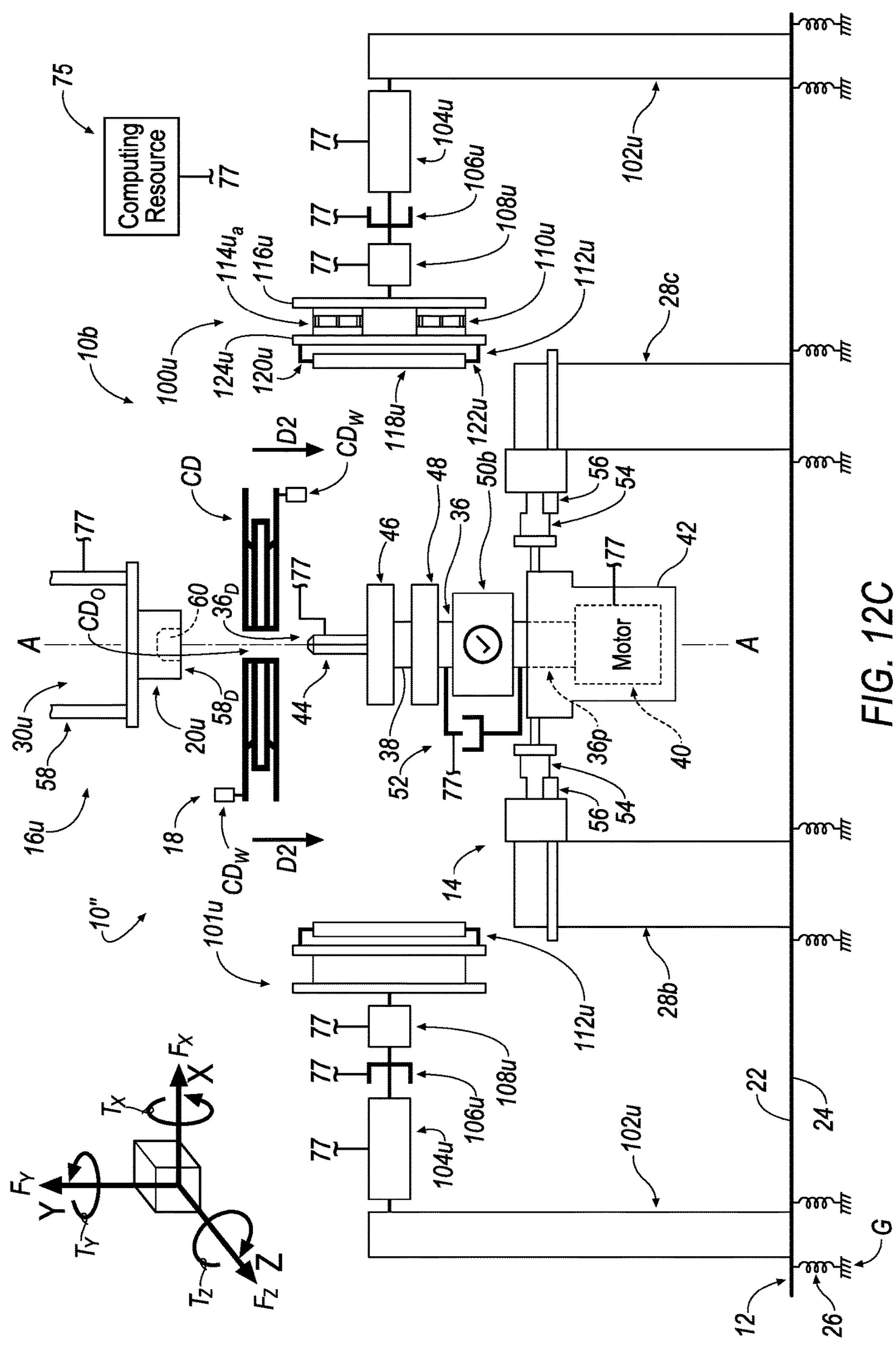
FIGS. 12C-12E are section side views of the apparatus of FIG. 12B being interfaced with a calibration disk.
Figure 12C:
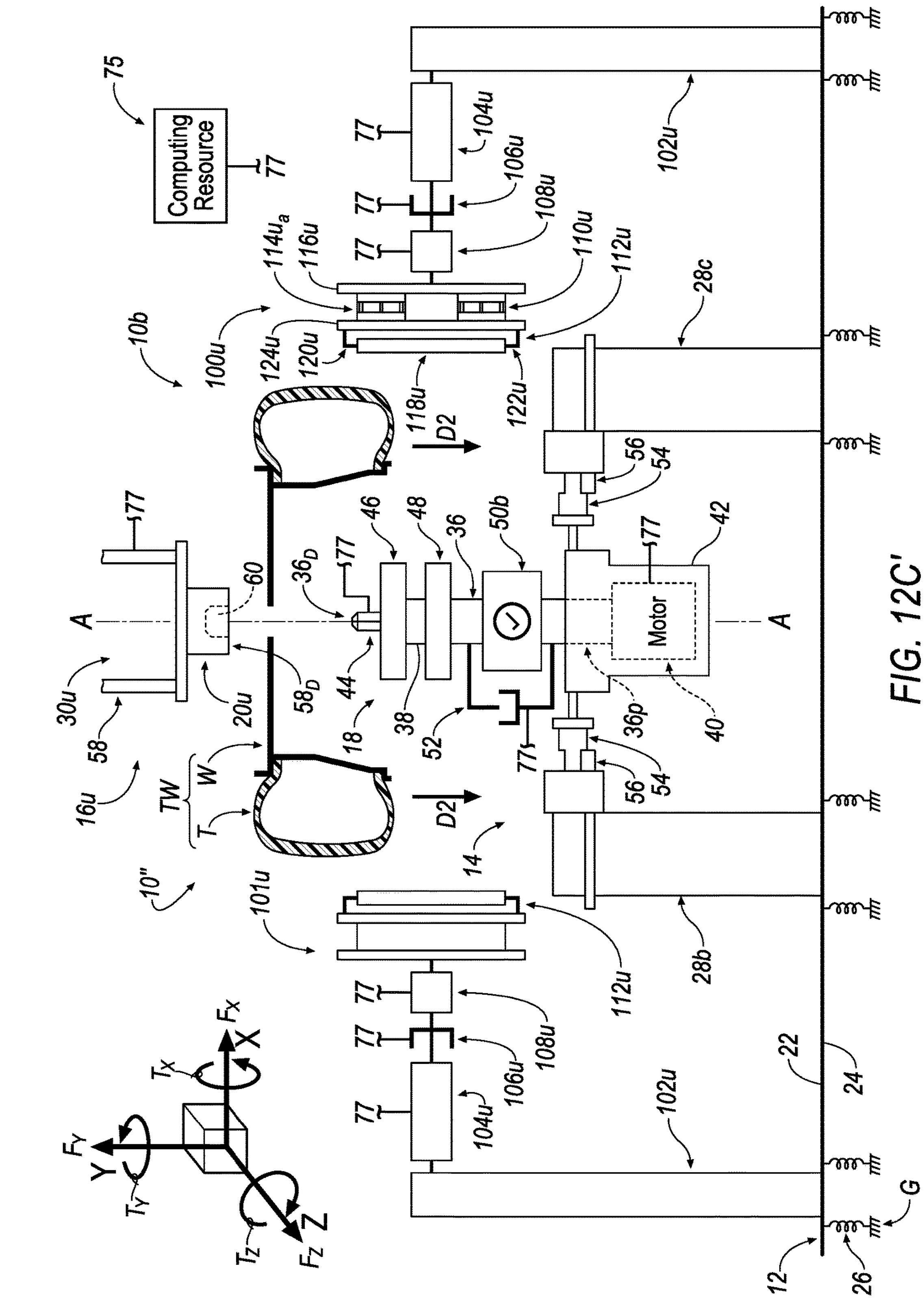

Referring to FIG. 12C, once the multi-axis transducer 50*b* is permitted to rotate, R, with the central shaft 36 as described above, the calibration disk, CD, may be arranged upon the workpiece inboard surface-engaging member 46 of the lower workpiece-engaging portion 18. The calibration disk, CD, may be disposed upon the workpiece inboard surface-engaging member 46 as follows.

In an example, a central opening, $CD_O$, of the calibration disk, CD, may be axially-aligned with the central axis, A-A, such that the central opening, $CD_O$, may be arranged over the radially inwardly/outwardly manipulatable workpiece-engaging chuck 44, which is also axially-aligned with the central axis, A-A. Then, the calibration disk, CD, may be moved according to the direction of the arrow, D2, such that the distal end $\mathbf{36}_D$ of the central shaft 36 is inserted through the central opening, $CD_O$, of the calibration disk, CD, whereby an inboard surface, $CD_{IS}$, of the calibration disk, CD, may be disposed adjacent the workpiece inboard surface-engaging member 46 of the lower workpiece-engaging portion 18.

Figure 12D:
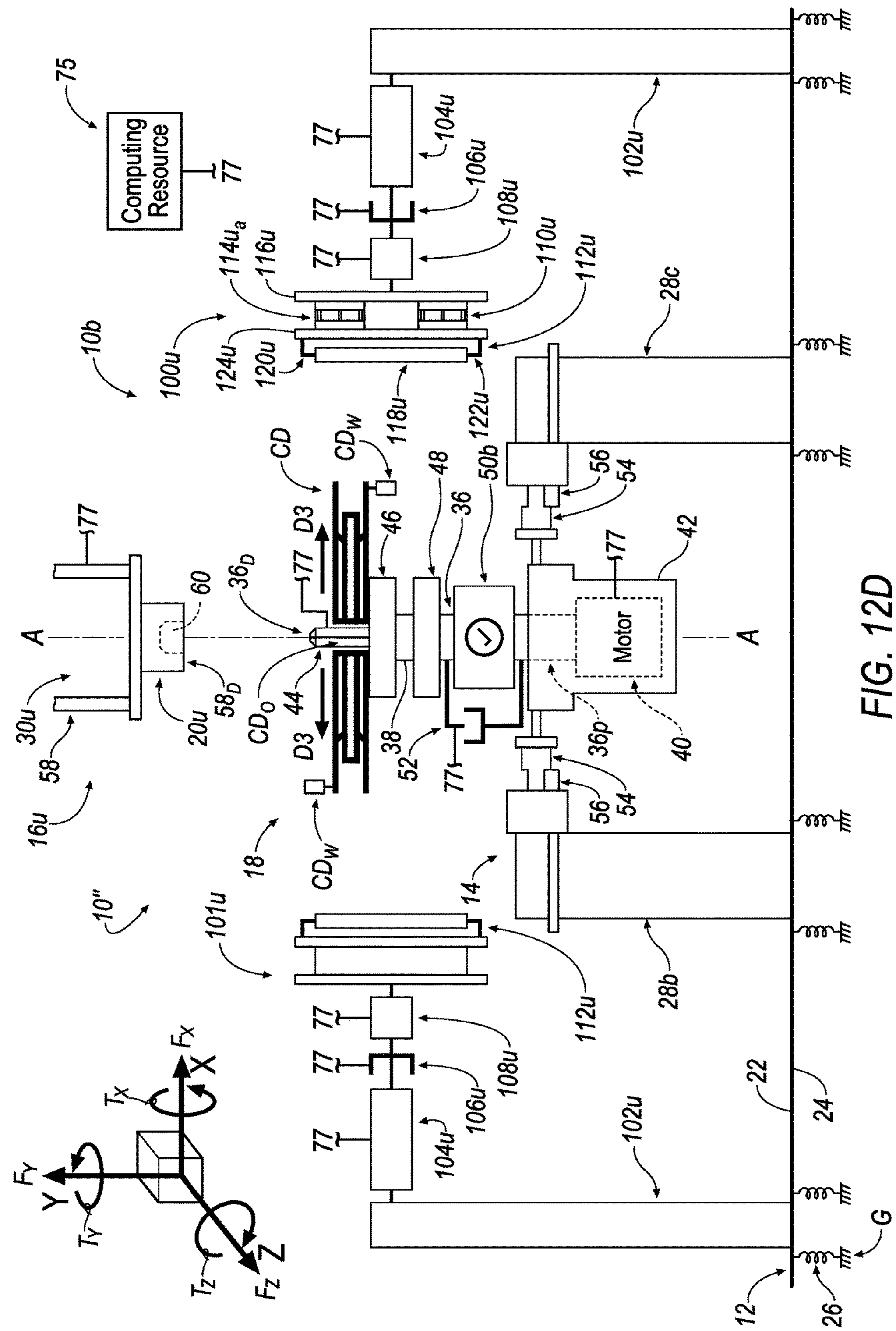
Figure 12D:
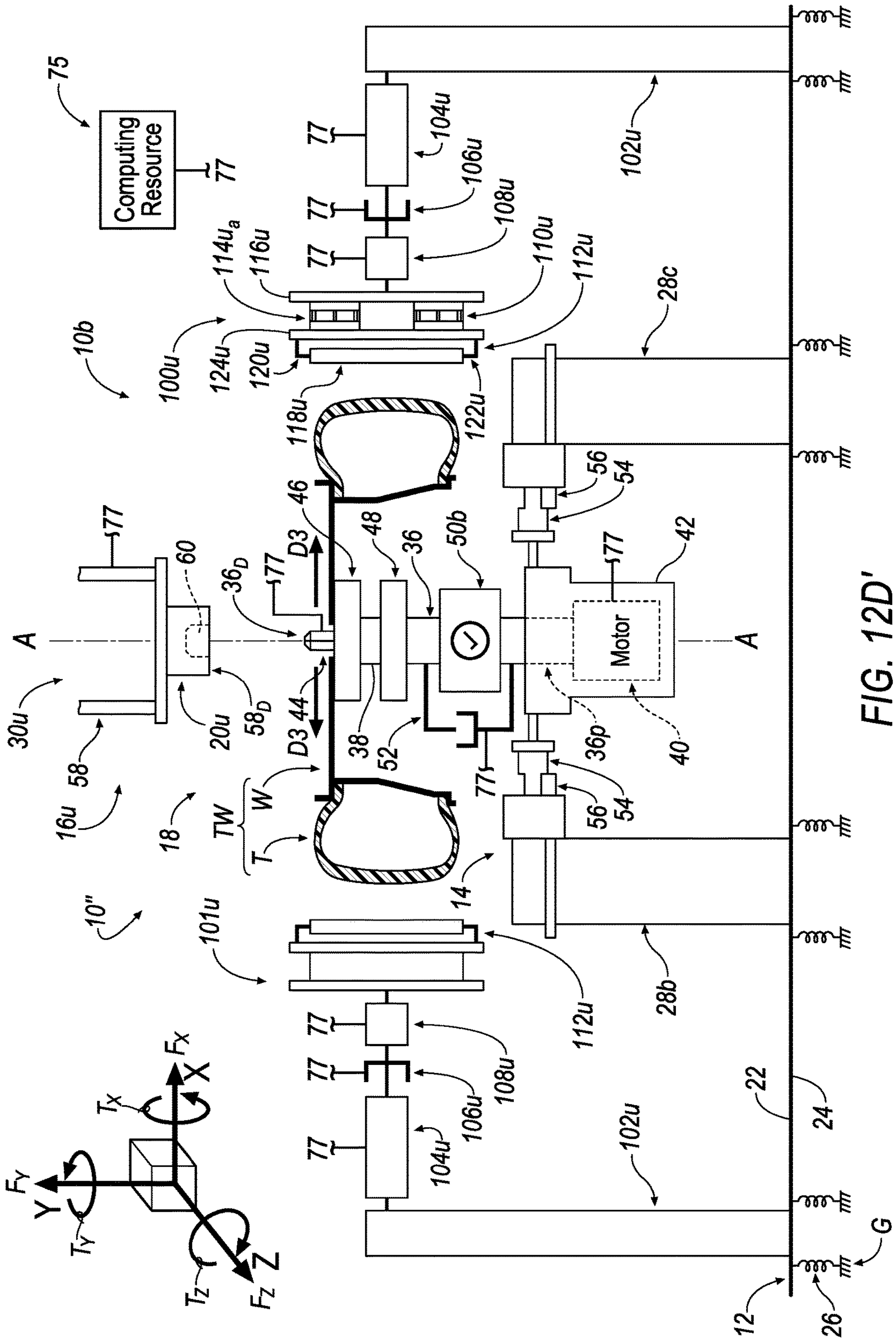

Referring to FIG. 12D, once the calibration disk, CD, is disposed adjacent the workpiece inboard surface-engaging member 46 of the lower workpiece-engaging portion 18, the calibration disk, CD, is selectively-retained to the lower workpiece-engaging portion 18 as a result of the radially inwardly/outwardly manipulatable workpiece-engaging chuck 44 being expanded in a radially outward direction according to the direction of the arrow, D3. Here, it should be noted that the upper workpiece-engaging portion 20*u* does not plunge toward the calibration disk, CD, after the workpiece-engaging chuck 44 expands in a radially outward direction according to the direction of the arrow, D3 (as the upper workpiece-engaging portion 20*u* is not utilized during the balancing mode of the apparatus 10").

Figure 12E:
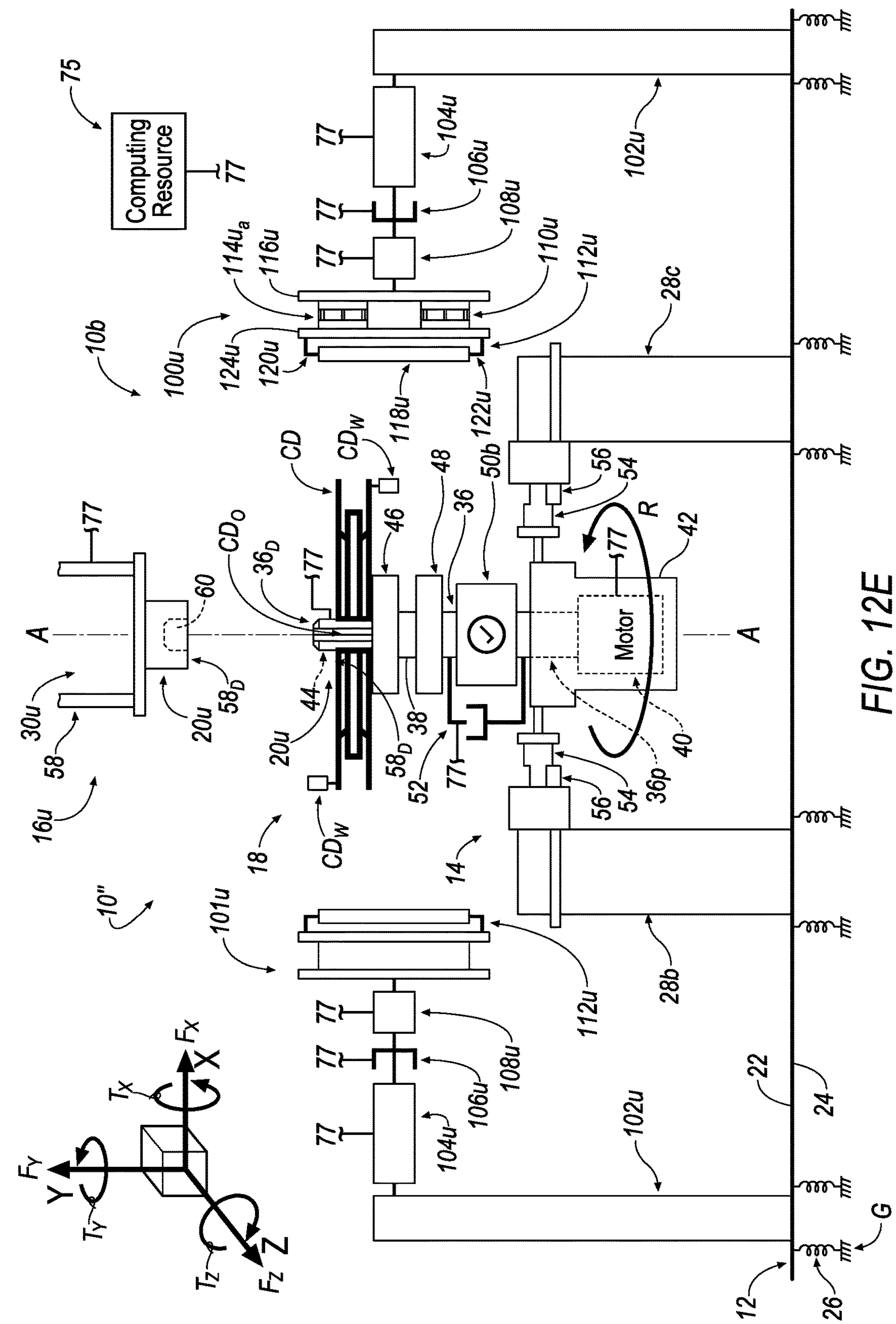
Figure 12E:
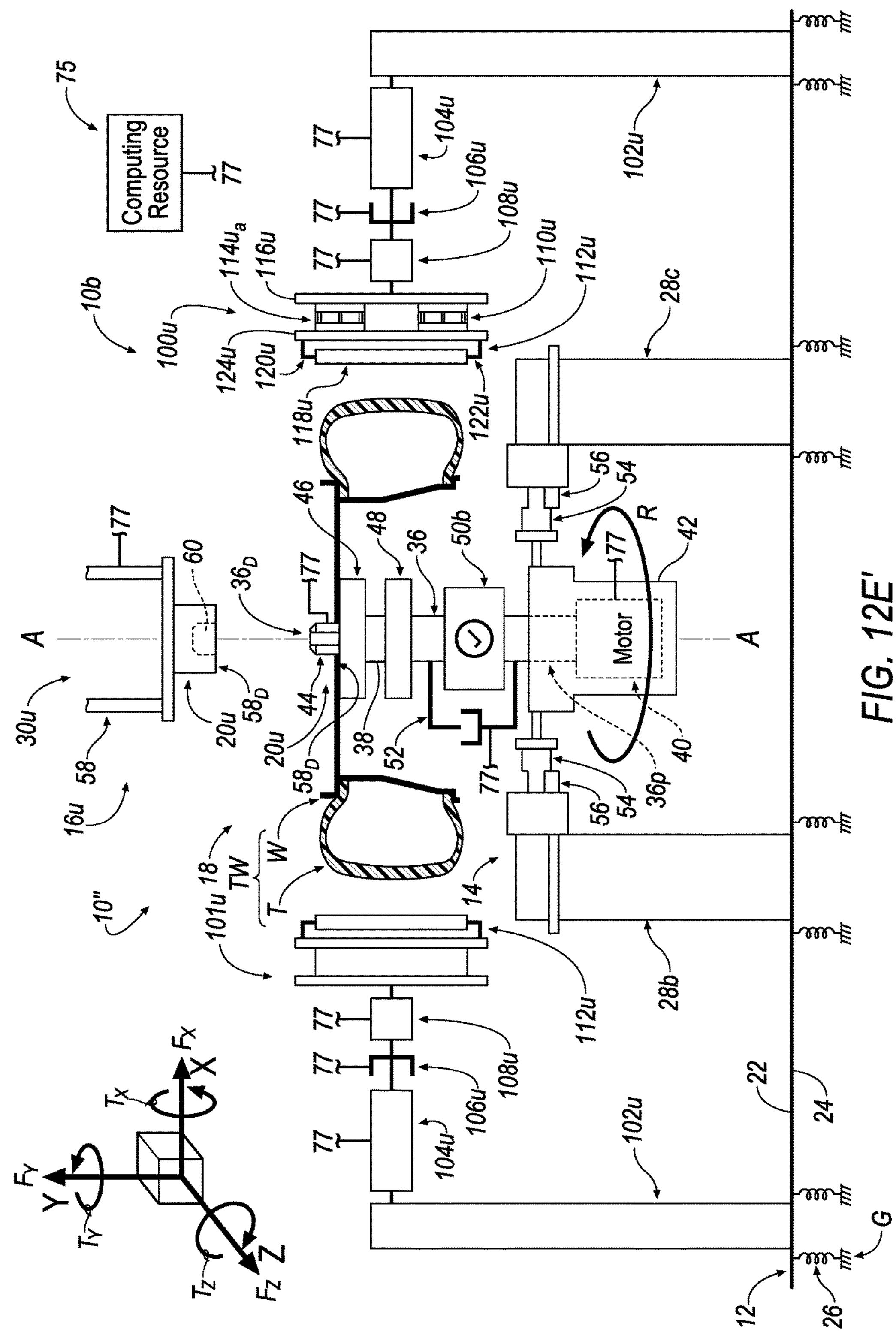

As seen in FIG. 12E, the motor 40 is subsequently actuated in order to impart rotation, R, to the central shaft 36, which is connected to all of: the workpiece inboard surface-engaging member 46, the angular encoder 48 and the multi-axis transducer 50*b*. Because the calibration disk, CD, is disposed adjacent the workpiece inboard surface-engaging member 46 of the lower workpiece-engaging portion 18, the calibration disk, CD, rotates, R, with the workpiece inboard surface-engaging member 46 of the lower workpiece-engaging portion 18 such that the calibration disk, CD, is rotated at sufficient rotational speed for any components of mass imbalance associated therewith to produce measurable inertial forces.

Upon rotating, R, the central shaft 36, the multi-axis transducer 50*b* may produce signals that are indicative of an imbalance of the calibration disk, CD (if an imbalance exists). Any determined imbalance of the calibration disk, CD, is communicated to the computing resource 75 by way of the one or more communication conduits 77 that are communicatively-couple the multi-axis transducer 50*b* to the computing resource 75.

The detected imbalance may be over-deterministically calculated in terms of at least one group of signals produced by the multi-axis transducer 50*b*, including: (1) a group of two or more torque-moment signals (see, e.g., $T_X$, $T_Y$, $T_Z$ in FIGS. 12A-12E) with each torque-moment signal about a respective axis of at least two axes (see, e.g., axes X, Y, Z in FIGS. 12A-12E) and (2) a group of two or more force signals (see, e.g., $F_X$, $F_Y$, $F_Z$ in FIGS. 12A-12E) with each force signal along a respective axis of the at least two axes (see, e.g., axes X, Y, Z in FIGS. 12A-12E). Mathematically, two-plane balancing may be achieved with two independent force or acceleration signals. Because the transducer 50*b* is coined as a "multi-axis" transducer, the term "multi" defines the number of axes monitored by the transducer 50*b*; further, the number of axes include two or more of the axes that share the same origin and are orthogonal to one another. In an exemplary implementation, the number of axes may include three axes (see, e.g., axes X, Y, Z in FIGS. 12A-12E); although three orthogonal axes, X, Y, Z, are shown in FIGS. 12A-12E, some implementations may include two axes that are orthogonal relative one another such as, for example: (1) axis X orthogonal to axis Y, (2) axis X orthogonal to axis Z, or (3) axis Y orthogonal to axis Z. This may be referred to as an "over-determined" system where more channels than absolutely over-deterministically necessary, are used to perform the balancing operation. With the use of a minimum number of channels (i.e., two in the present example), any measurement error in either of the signals may add to significant error in the overall calculation. The device described here uses inverse force estimation, averaging the outputs of as many signals as practical, so as to have the error of any individual signal cause minimal distortion of a final resultant.

The calibration disc, CD, is manufactured to have very little imbalance (i.e., the calibration disc, CD, is purposely manufactured to be balanced with an acceptable imbalance). When attached to the apparatus 10" and rotated, R, as described above, the calibration disk, CD, will functionally teach a computing resource 75 a variety of imbalance configurations that may be exhibited by an inflated tire-wheel assembly, TW; the variety of imbalance configurations may be determined by the computing resource 75 during a 'learning mode' whereby the magnitude and phase of the voltage gain output (e.g., voltage per unit of imbalance of the workpiece, for each plane) of each channel of the transducer 50*b* is communicated to the computing resource 75 over the one or more communication conduits 77. The imbalance configurations are selectively-determined by an operator that attaches one or more imbalance weights, $CD_W$ (see, e.g., FIG. 12E) to one or more of the inboard surface, $CD_{IS}$, and the outboard surface, $CD_{OS}$, of the calibration disk, CD. The selective attachment of the one or more imbalance weights, $CD_W$, may include not only selecting a specific amount of weight but also a specific angular location upon the calibration disk, CD. A process known as inverse force estimation is used whereas the signal gain (e.g., signal output per unit of imbalance) is calculated from the calibration measurements, for each channel of the transducer 50*b* or for each channel of the multi-axis transducer 50*b*.

In an example, one calibration weight, $CD_W$, having an amount of 'X units' may be attached to the outboard surface, $CD_{OS}$, of the calibration disk, CD, at an angular orientation of 279° of the calibration disk, CD. Therefore, upon rotation, R, of the calibration disk from 0° to 279°, the computing resource 75 will receive an imbalance signal produced by the multi-axis transducer 50*b* indicative of 'X units' attached to the outboard surface, $CD_{OS}$, of the calibration disk, CD, at an angular orientation of 279°; accordingly, when an inflated tire-wheel assembly, TW, having an imbalance of 'X units' of the outboard surface at an angular orientation of 279°, is attached to the apparatus 10" and rotated, R, in a substantially similar manner as described above, the computing resource 75 will recognize not only the imbalance amount but also the location of the imbalance. Upon determining the amount and location of the imbalance, the computing resource will record the imbalance and provide an operator or corresponding system with instructions for attaching an amount of weight and location to attach the weight to the wheel, W, of the inflated tire-wheel assembly, TW.

Method for Utilizing the Apparatus 10"—Inflated Tire-Wheel Assembly, TW

As described above, one of the acts of balancing provided by the apparatus 10" may include, for example, determining imbalance (which may be quantified in gram-centimeters), if any, of an inflated tire-wheel assembly, TW. An exemplary method for utilizing the apparatus 10" as described immediately above may be seen at FIGS. 12A-12B and 12C'-12E'.

Firstly, as seen in FIG. 12A, the lock-up mechanism 52 is shown in an engaged state such that the multi-axis transducer 50*b* is selectively mechanically connected to the elongated body 38 of the central shaft 36; as a result, the multi-axis transducer 50*b* is permitted to rotate, R, with the central shaft 36 upon actuation of the motor 40. Then, referring to FIG. 12B, upon communicating a signal from computing resource 75 to the lock-up mechanism 52 over the one or more communication conduits 77, the lock-up mechanism 52 may be selectively-arranged in a disengaged state (according to arrow, D1, in FIG. 12A); as a result, the multi-axis transducer 50*b* is not permitted to rotate, R, with the central shaft 36 upon actuation of the motor 40.

Referring to FIG. 12C', once the multi-axis transducer 50*b* is permitted to rotate, R, with the central shaft 36 as described above, the inflated tire-wheel assembly, TW, may be arranged upon the workpiece inboard surface-engaging member 46 of the lower workpiece-engaging portion 18. The inflated tire-wheel assembly, TW, may be disposed upon the workpiece inboard surface-engaging member 46 as follows.

In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D2, such that the distal end $\mathbf{36}_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Referring to FIG. 12D', once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D3. Here, it should be noted that the upper workpiece-engaging portion 20*u* does not plunge toward the tire-wheel assembly, TW, after the workpiece-engaging chuck 44 expands in a radially outward direction according to the direction of the arrow, D3 (as the upper workpiece-engaging portion 20*u* is not utilized during the balancing mode of the apparatus 10").

As seen in FIG. 12E', the motor 40 is subsequently actuated in order to impart rotation, R, to the central shaft 36, which is connected to all of: the workpiece inboard surface-engaging member 46, the angular encoder 48 and the multi-axis transducer 50*b*. Because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18 such that the tire-wheel assembly, TW, is rotated at sufficient rotational speed for any components of mass imbalance associated therewith to produce measurable inertial forces.

Upon rotating, R, the central shaft 36, the multi-axis transducer 50*b* may produce signals that are indicative of an imbalance of the tire-wheel assembly, TW (if an imbalance exists). The communicated signal may be then used to determine the static and couple components of the imbalance (by firstly averaging the signals and then calculating imbalance from the average by using a geometric transform to convert the measured imbalance to effective imbalance mass magnitudes and phase angles at one or more locations (e.g., one or more correction planes) on the workpiece by comparing the calculation to a library or data look-up table of imbalance signatures that have been previously prepared as described above at FIGS. 3A-3D). Recommended correction masses are then determined using a geometric transform for the given wheel geometry. An ideal recommended correction may be computed directly, such as with the use of "cut-to-length" correction mass material, or an acceptable compromise may be selected from a library or data look-up table of imbalance signals that have been previously prepared as described above at FIGS. 12A-12B and 12C-12E in order to provide an operator or corresponding system with instructions for attaching an amount of weight and location to attach the weight to the wheel, W, of the inflated tire-wheel assembly, TW, in order to correct the determined imbalance of the inflated tire-wheel assembly, TW.

As described above, the detected imbalance may be over-deterministically calculated in terms of at least one group of signals produced by the multi-axis transducer 50*b*, including: (1) a group of two or more torque-moment signals (see, e.g., $T_X$, $T_Y$, $T_Z$ in FIGS. 12A-12B and 12C'-12E') with each torque-moment signal about a respective axis of at least two axes (see, e.g., axes X, Y, Z in FIGS. 12A-12B and 12C'-12E') and (2) a group of two or more force signals (see, e.g., $F_X$, $F_Y$, $F_Z$ in FIGS. 12A-12B and 12C'-12E') with each force signal along a respective axis of the at least two axes (see, e.g., axes X, Y, Z in FIGS. 12A-12B and 12C'-12E'). Mathematically, two-plane balancing may be achieved with two independent force or acceleration signals. Because the transducer 50*b* is coined as a "multi-axis" transducer, the term "multi" defines the number of axes monitored by the transducer 50*b*; further, the number of axes include two or more of the axes that share the same origin and are orthogonal to one another. In an exemplary implementation, the number of axes may include three axes (see, e.g., axes X, Y, Z in FIGS. 12A-12B and 12C'-12E'); although three orthogonal axes, X, Y, Z, are shown in FIGS. 12A-12B and 12C'-12E', some implementations may include two axes that are orthogonal relative one another such as, for example: (1) axis X orthogonal to axis Y, (2) axis X orthogonal to axis Z, or (3) axis Y orthogonal to axis Z.

In some instances, each axis (i.e., the X axis, the Y axis and the Z axis) of the multi-axis transducer 50*b* may have its own channel (generally represented by the one or more communication conduits 77); therefore, in some examples, the balancing device 10*b* may include three channels each providing a voltage gain output (e.g., voltage per unit of imbalance of the workpiece, for each plane) that is communicated to the computing resource 75 over the one or more communication conduits 77. The software associated with the computing resource 75 will average the voltage gain output of each channel, and, if there is noise on any one of the channels, noise will be reduced (in the form of noise cancellation) as a result of the total number (e.g., in the present example, three) of channels being averaged together (i.e., the voltage gain output per unit of imbalance of stochastically measured and calculated by the computing resource 75). This may be referred to as an "over-determined" system where more channels than typically deemed to be absolutely deterministically needed, are used to perform the balancing operation. With the use of a minimum number of channels (i.e., two in the present example), any measurement error in either of the signals may add to significant error in the overall calculation. The device described here uses inverse force estimation, averaging the outputs of as many signals as practical, so as to have the error of any individual signal cause minimal distortion of a final resultant.

The Uniformity Device 10*u* of the Apparatus 10"

Referring initially to FIGS. 10-11, the uniformity device 10*u* generally includes a base member 12, a lower support member 14, an upper support member 16*u*, a lower workpiece-engaging portion 18 and an upper workpiece-engaging portion 20*u*. The base member 12 is arranged upon an underlying ground surface, G. The lower support member 14 and the upper support member 16*u* are arranged upon the base member 12. The lower support member 14 is connected to the lower workpiece-engaging portion 18. The upper support member 16*u* is connected to the upper workpiece-engaging portion 20*u*.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28*a*, 28*b*, 28*c*.

The upper support member 16*u* may include a canopy member 30*u* including a plurality of leg members 32*u*. In an example, the plurality of leg members 32*u* may include four leg members 32*a*, 32*b*, 32*c*, 32*d*.

Each pedestal member 28*a*-28*c* of the plurality of pedestal members 28 of the lower support member 14 is disposed upon the upper surface 22 of the base member 12 such that each pedestal member 28*a*-28*c* of the plurality of pedestal members 28 are arranged radially inwardly closer to a central axis, A-A, extending through an axial center of the base member 12 and away from an outer perimeter 34 of the base member 12. Each leg 32*a*-32*d* of the plurality of leg members 32*u* of the upper support member 16*u* is disposed upon the upper surface 22 of the base member 12 such that each leg 32*a*-32*d* of the plurality of leg members 32*u* are arranged proximate the outer perimeter 34 of the base member 12 and radially away from the central axis, A-A, extending through the axial center of the base member 12.

Referring to FIGS. 13A-13E, the lower workpiece-engaging portion 18 includes a central shaft 36 having a proximal end $\mathbf{36}_P$ and a distal end $\mathbf{36}_D$. The central shaft 36 is defined by an elongated body 38 that extends between the proximal end $\mathbf{36}_P$ and the distal end $\mathbf{36}_D$. The central axis, A-A, is axially-aligned with an axial center of the elongated body 38 of the central shaft 36.

The lower workpiece-engaging portion 18 may also include a motor 42 disposed within a motor housing 42. The proximal end $\mathbf{36}_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $\mathbf{36}_D$ of the central shaft 36.

The motor 40 may be actuated in order to, for example, cause rotation, R, of the central shaft 36. In some instances the central shaft 36 may be rotated to a speed between approximately 60 rpm and 120 rpm; in such an example, a speed between approximately 60 rpm and 120 rpm may be considered to be 'low speed' in order to prevent inertia forces for conducting the uniformity function. The motor 40 may also be actuated to impart movement of/spatially manipulate the workpiece-engaging chuck 44. Movement of the workpiece-engaging chuck 44 may include: (1) radial outward movement (for coupling the distal end $\mathbf{36}_D$ of the central shaft 36 to a wheel, W) or (2) radial inward movement (for de-coupling the distal end $\mathbf{36}_D$ of the central shaft 36 from the wheel, W).

Actuation of the motor 40 (for the purpose of rotating, R, the central shaft 36 or causing movement of the workpiece-engaging chuck 44) may occur as a result of a signal sent from a computing resource 75 to the motor 40. The computing resource 75 may be, for example, a digital computer and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

The lower workpiece-engaging portion 18 may also include a plurality of components 46, 48 that are disposed upon the elongated body 38 of the central shaft 36; the plurality of components 46, 48 may include, for example: a workpiece inboard surface-engaging member 46 and an angular encoder 48. The workpiece inboard surface-engaging member 46 may be connected to the elongated body 38 of the central shaft 36 proximate the workpiece-engaging chuck 44 and the distal end $\mathbf{36}_D$ of the central shaft 36. The angular encoder 48 may be connected to the elongated body 38 of the central shaft 36 at any desirable location along the central shaft 36.

In an example, the lower support member 14 may be connected to the lower workpiece-engaging portion 18 as follows. As seen in, for example, FIGS. 13A-13E, a plurality of radially-projecting support arms 54 may extend radially outwardly from a non-rotating structural member of the lower workpiece-engaging portion 18, such as, for example, the motor housing 42. Referring to FIG. 10, the plurality of radially-projecting support arms 54 may include, for example, a first radially-projecting support arm 54*a*, a second radially-projecting support arm 54*b* and a third radially-projecting support arm 54*c*. Each pedestal member 28*a*-28*c* of the plurality of pedestal members 28 may include a shoulder portion 56. A distal end $\mathbf{54}_D$ of each of the first, second and third radially-projecting support arms 54*a*, 54*b*, 54*c* may be disposed upon and connected to the shoulder portion 56 of each pedestal member 28*a*-28*c* of the plurality of pedestal members 28.

Referring to FIGS. 10-11, the upper workpiece-engaging portion 20*u* may include an axially-movable cylinder 58. A proximal end $\mathbf{58}_P$ of the axially-movable cylinder 58 is connected to the canopy member 30*u* of the upper support member 16*u*. A distal end $\mathbf{58}_D$ of the axially-movable cylinder 58 includes a recess 60 that is sized for receiving the radially inwardly/outwardly manipulatable workpiece-engaging chuck 44 (when the workpiece-engaging chuck 44 is arranged in the radially-expanded state and engaged with a central passage of a wheel, W).

Referring to FIGS. 10-11 and 13A-13E, the uniformity device 10*u* also includes a tire tread-engaging portion 100*u*. As mentioned above, structural components of the apparatus 10" directed to the uniformity function may include a "u" appended to a reference numeral. Therefore, as seen in the above-described exemplary embodiment, the tire tread-engaging portion 100*u* is exclusive to the uniformity device 10*u*.

As seen in, for example, FIGS. 13A-13E, the tire tread-engaging portion 100*u* may include a pedestal member 102*u*, a radially-movable cylinder or servo mechanism 104*u*, cylinder or servo lock 106*u*, an applied load-detecting portion 108*u*, a tire uniformity-detecting portion 110*u* and a tire tread-engaging member 112*u*. The pedestal member 102*u* is connected to the radially-movable cylinder or servo mechanism 104*u* such that the radially-movable cylinder or servo mechanism 104*u* may move in a radially inwardly direction toward or away from the central axis, A-A. The cylinder lock 106*c* is connected to the radially-movable cylinder or servo mechanism 104*u*. The applied load-detecting portion 108*u* is connected to the radially-movable cylinder or servo mechanism 104*u*. The tire uniformity detecting portion 110*u* is connected to the radially-movable cylinder or servo mechanism 104*u*.

The uniformity device 10*u* also includes a second tire tread-engaging portion 101*u*. The second tire tread-engaging portion 101*u* is substantially similar to the tire tread-engaging portion 100*u* (as the second tire tread-engaging portion 101*u* includes a pedestal member 102*u*, a radially-movable cylinder or servo mechanism 104*u*, a cylinder or servo lock 106*u*, an applied load-detecting portion 108*u* and a tire tread-engaging member 112*u*) but, in some implementations, may not include a tire uniformity-detecting portion 110*u* (i.e., in some implementations, the second tire-tread engaging portion 101*u* may include a tire uniformity-detecting portion 110*u*). In an example, the first tire tread-engaging portion 100*u* and the second tire tread-engaging portion 101*u* are oppositely arranged with respect to one another relative the central axis, A-A.

Method for Utilizing the Apparatus 10"—Inflated Tire-Wheel Assembly, TW

As described above, the apparatus 10" may determine uniformity of a tire, T, of an inflated tire-wheel assembly, TW. An exemplary method for utilizing the apparatus 10" as described immediately above may be seen at FIGS. 12A-12B and 13A-13E.

Figure 13A:
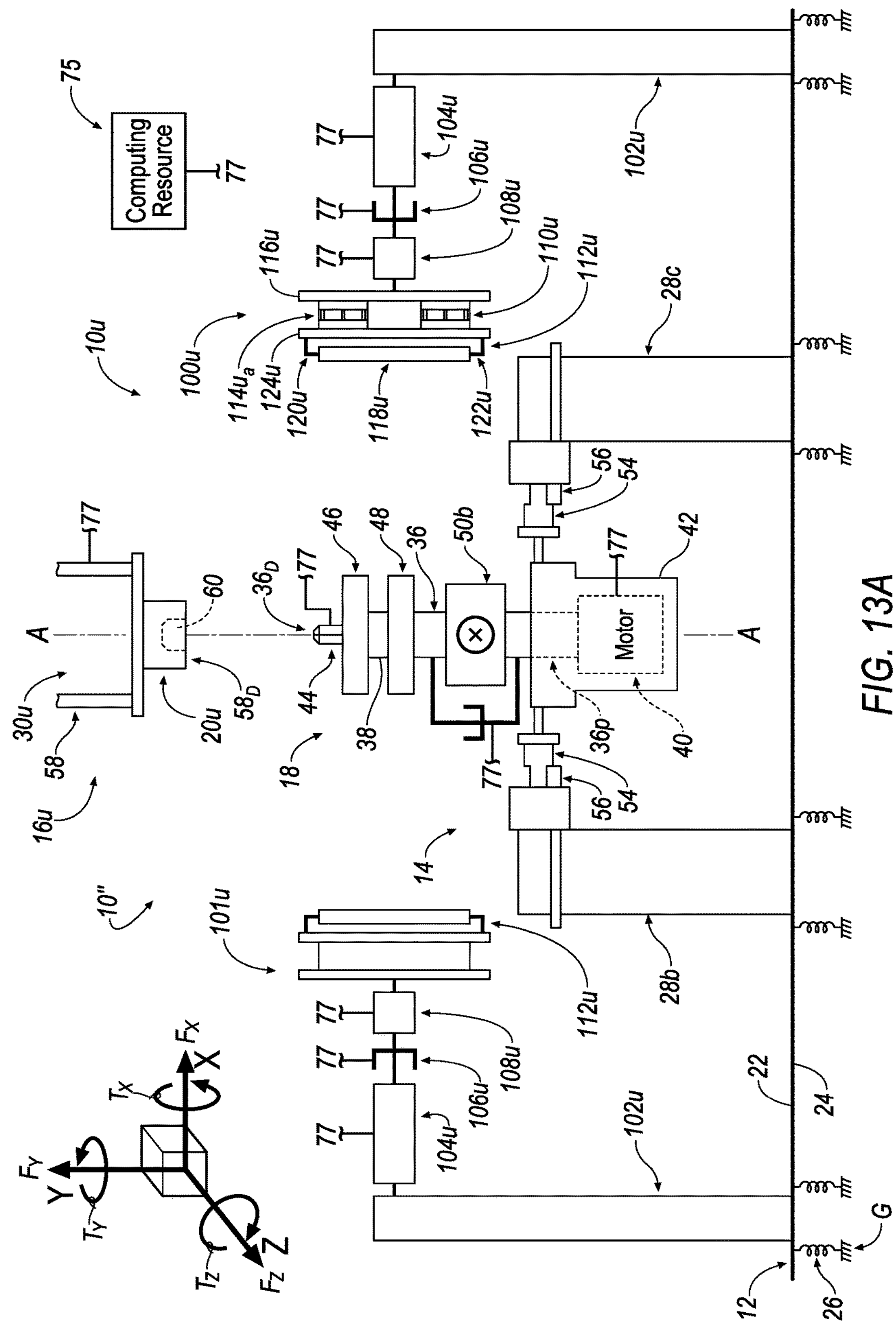
FIG. 13A is a section side view of the apparatus of FIG. 10 according to line 12, 13-12, 13.

Firstly, as seen in FIG. 13A, the lock-up mechanism 52 is shown in an engaged state such that the multi-axis transducer 50*b* is selectively mechanically connected to the elongated body 38 of the central shaft 36; as a result, the multi-axis transducer 50*b* is permitted to rotate, R, with the central shaft 36 upon actuation of the motor 40. Because the multi-axis transducer 50*b* is exclusively-associated with the operation of the balancing function as described above at FIGS. 12C-12E and 12C'-12E', the lock-up mechanism 52 remains in an engaged state throughout the operation of the uniformity function as seen at FIGS. 13A-13E; as a result, the multi-axis transducer 50*b* is never permitted to rotate, R, with the central shaft 36.

Figure 13B:
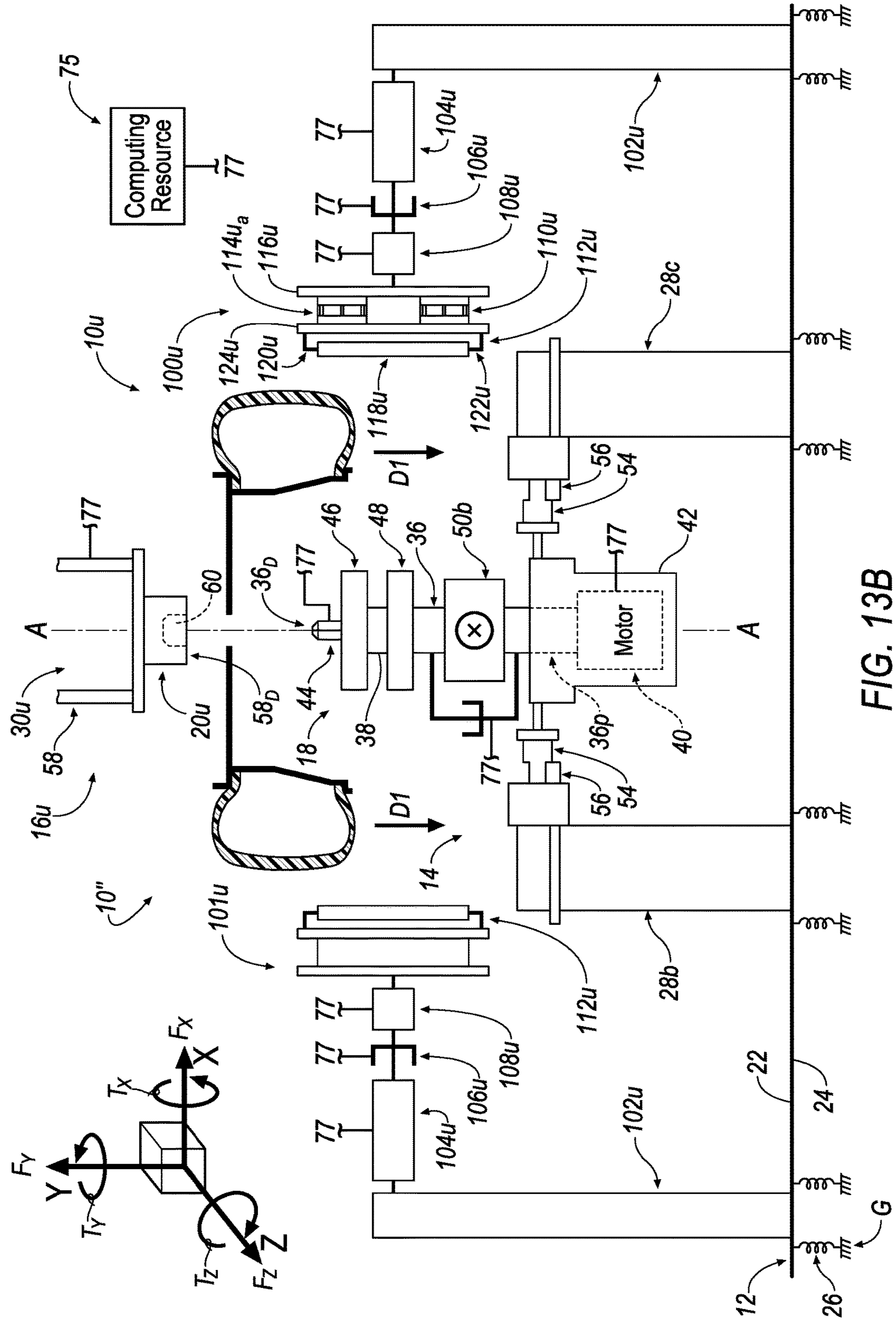
FIG. 13B-13E are section side views of the apparatus of FIG. 12A being interfaced with a tire-wheel assembly.

Referring to FIG. 13B, the inflated tire-wheel assembly, TW, may be arranged upon the workpiece inboard surface-engaging member 46 of the lower workpiece-engaging portion 18. The inflated tire-wheel assembly, TW, may be disposed upon the workpiece inboard surface-engaging member 46 as follows. In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D1, such that the distal end $36_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Figure 13C:
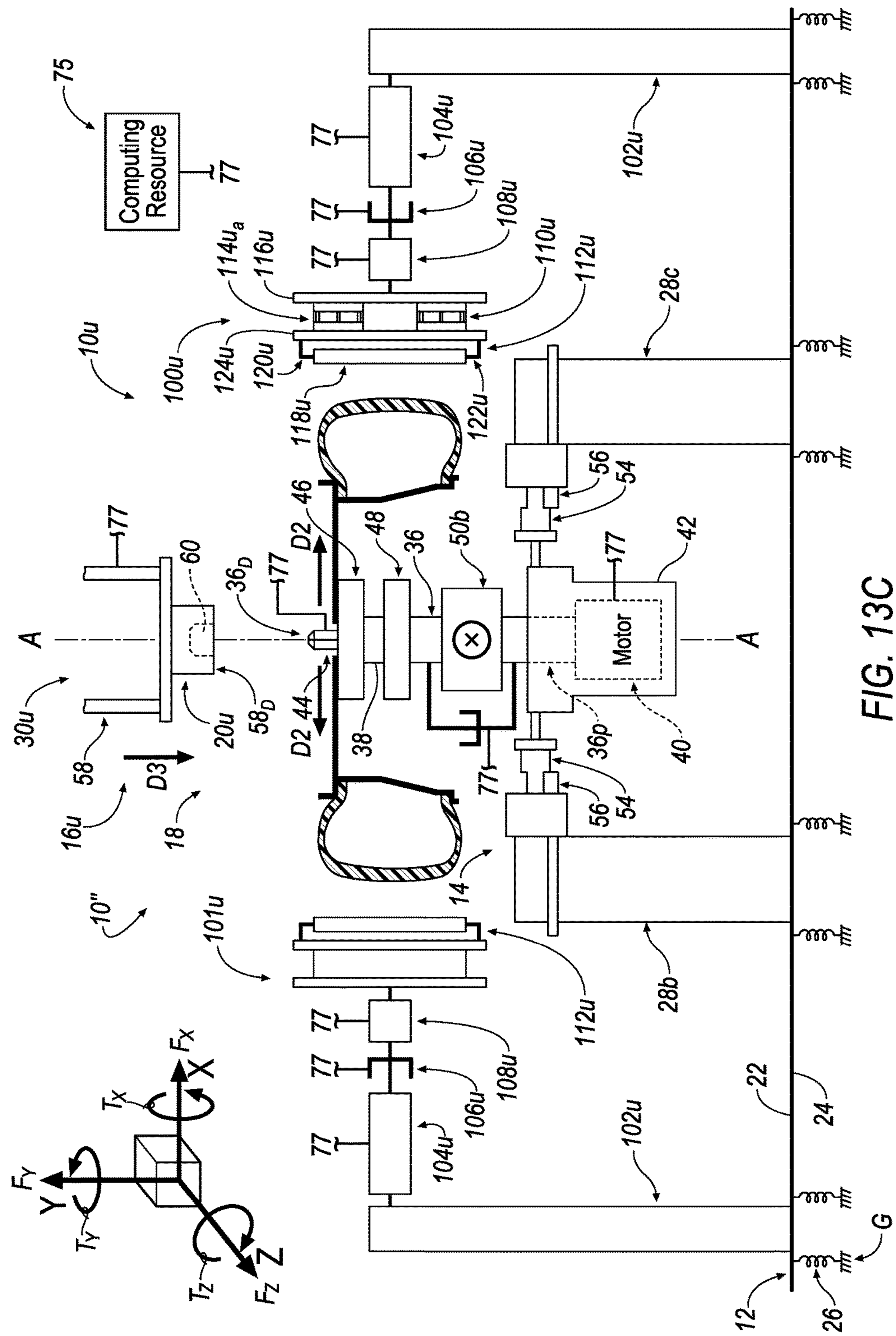

Referring to FIG. 13C, once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D2. Once the inflated tire-wheel assembly, TW, is selectively-retained to the lower workpiece-engaging portion 18 by the radially inwardly/outwardly manipulatable workpiece-engaging chuck 44, the axially-movable cylinder 58 of the upper workpiece-engaging portion 20*u* plunges toward the inflated tire-wheel assembly, TW, and the lower workpiece-engaging portion 18 according to the direction of the arrow, D3, until: (1) the distal end $58_D$ of the axially-movable cylinder 58 is disposed adjacent an outboard surface, $TW_{OS}$, of the inflated tire-wheel assembly, TW, and (2) the radially inwardly/outwardly manipulatable workpiece-engaging chuck 44 is rotatably-disposed within the recess 60 formed in distal end $58_D$ of the axially-movable cylinder 58.

Figure 13D:
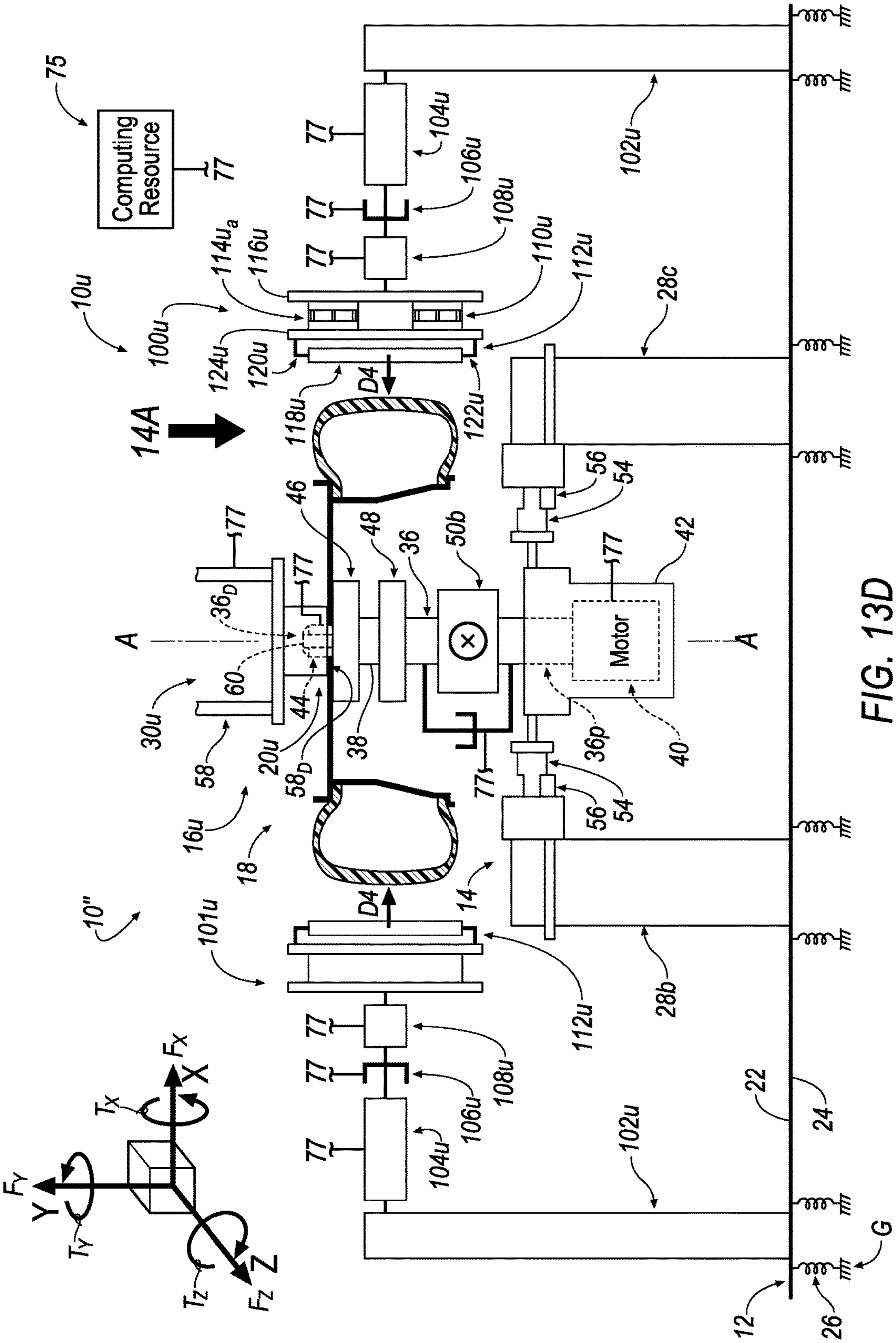

As seen in FIG. 13D, once the distal end $58_D$ of the axially-movable cylinder 58 is disposed adjacent an outboard surface, $TW_{OS}$, of the tire-wheel assembly, TW, and the radially inwardly/outwardly manipulatable workpiece-engaging chuck 44 is rotatably-disposed within the recess 60 formed in distal end $58_D$ of the axially-movable cylinder 58 as described above, the tire-wheel assembly, TW, may said to be axially selectively-retained by the apparatus 10" such that the tire-wheel assembly, TW, is rotatably-sandwiched between the lower workpiece-engaging portion 18 and the upper workpiece-engaging portion 20*u* (in order to apply an axial clamping load to the tire-wheel assembly, TW, so as to hold the workpiece firmly against the surface of the chuck assembly). The computing resource 75 may then send a signal to the radially-movable cylinder or servo mechanism 104*u* of each of the first tire tread-engaging portion 100*u* and the second tire tread-engaging portion 101*u* in order to radially plunge according to the direction of the arrow, D4, the radially-movable cylinders or servo mechanism 104*u* toward the central axis, A-A, in order to radially inwardly plunge according to the direction of the arrow, D4, the tire tread-engaging members 112*u* of each of the first tire tread-engaging portion 100*u* and the second tire tread-engaging portion 101*u* toward the tire-wheel assembly, TW, until the tire tread-engaging members 112*u* of each of the first tire tread-engaging portion 100*u* and the second tire tread-engaging portion 101*u* are disposed adjacent the tread surface, $T_T$, of the tire, T. Radial movement of the radially-movable cylinder or servo mechanism 104*u* of the second tire tread-engaging portion 101*u* toward the central axis, A-A, according to the direction of the arrow, D4, may cease once the applied load-detecting portion 108*u* detects that the tire tread-engaging member 112*u* of the first tire tread-engaging portion 100*u* applies a specified load to the tread surface, $T_T$, of the tire, T. In an example, a 70% load is applied to the tread surface, $T_T$, of the tire, T.

Once the tire-wheel assembly, TW, is rotatably-sandwiched between the lower workpiece-engaging portion 18 and the upper workpiece-engaging portion 20*u*, and, once the radial movement of the radially-movable cylinder or servo mechanism 104*u* of the second tire tread-engaging portion 101*u* toward the central axis, A-A, according to the direction of the arrow, D4, has ceased, the motor 40 may be actuated in order to impart rotation, R, to the central shaft 36, which is connected to both of: the workpiece inboard surface-engaging member 46 and the angular encoder 48; because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18.

Figure 13E:
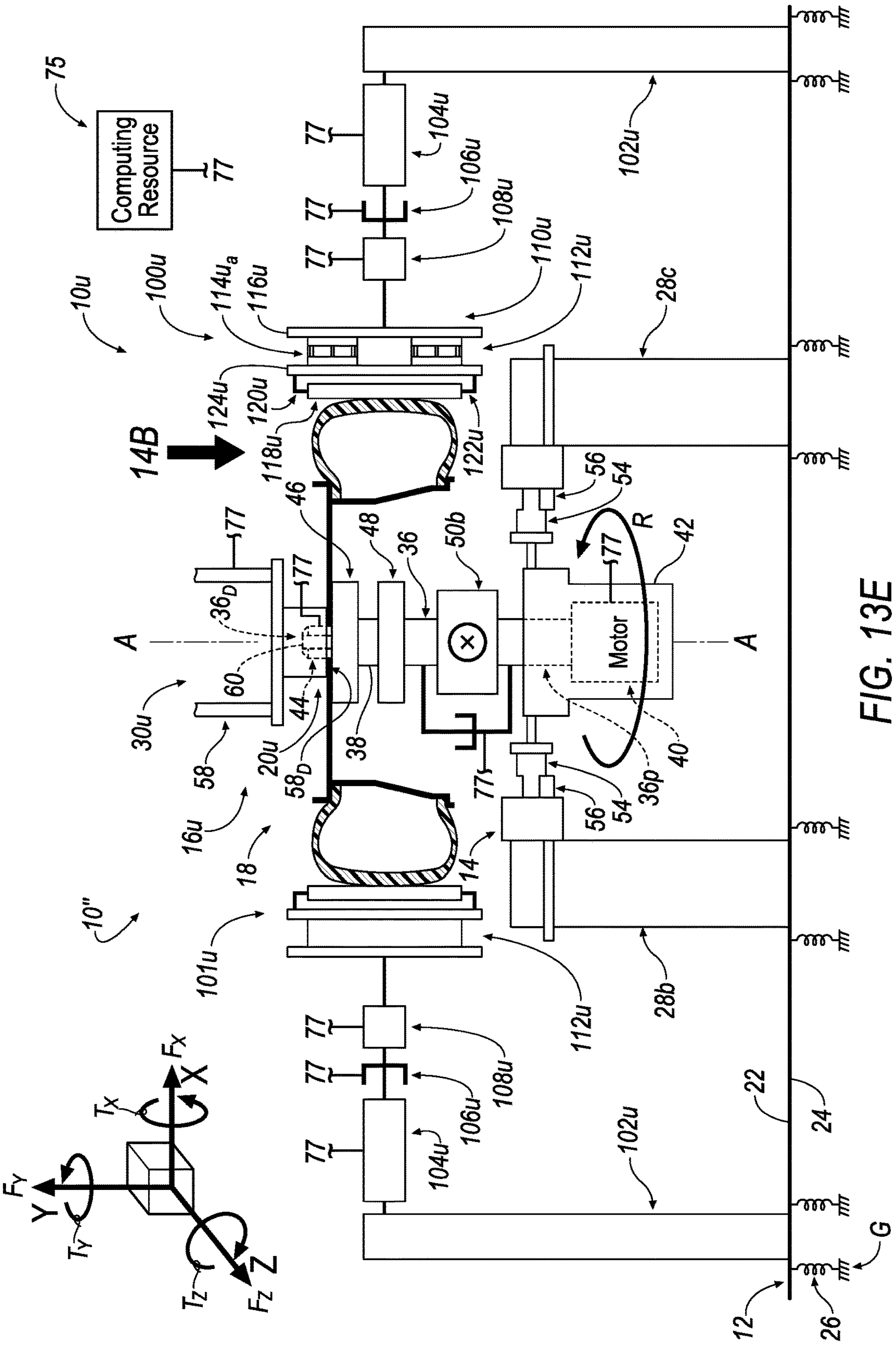

Referring to FIG. 13E, upon rotating, R, the central shaft 36, tire uniformity-detecting portion 110*u* may produce signals that are communicated to the computing resource 75 by way of the one or more communication conduits 77 that are indicative of a uniformity condition or a lack-of-uniformity condition of the tire, T, of the tire-wheel assembly, TW. In some instances, as shown and described, for example, at FIGS. 15-15''', the tire uniformity-detecting portion 110*u* may include three or more multi-axis load cells $\mathbf{114}u_a$; each of the three or more multi-axis load cells $\mathbf{114}u_a$ may be, for example, a strain gauge transducer or a piezoelectric transducer. In another instances, as shown and described, for example, at FIGS. 16-16'''', the tire uniformity-detecting portion 110*u* may include three or more air spring members $\mathbf{114}u_b$.

"Fixed Load" Tire Uniformity-Detecting Portion 110*u*

Referring to FIGS. 13A-13E, 14A-14B, 14A'-14B', 15-15''', an exemplary tire uniformity-detecting portion 110*u* may be referred to as a "fixed load" tire uniformity-detecting portion that includes the plurality of multi-axis load cells $\mathbf{114}u_a$ secured to a support plate 116*u*. In some instances where the tire uniformity-detecting portion 110*u* may include three or more multi-axis load cells $\mathbf{114}u_a$, the uniformity condition or lack-of-uniformity condition may be over-deterministically calculated in terms of at least one group of signals produced by the tire uniformity-detecting portion 110*u*, including: (1) a group of two or more torque-moment signals (see, e.g., $T_X$, $T_Y$, $T_Z$ in FIGS. 12A-12B and 13A-13E) with each torque-moment signal about a respective axis of at least two axes (see, e.g., axes X, Y, Z in FIGS. 12A-12B and 13A-13E) and (2) a group of two or more force signals (see, e.g., $F_X$, $F_Y$, $F_Z$ in FIGS. 12A-12B and 13A-13E) with each force signal along a respective axis of the at least two axes (see, e.g., axes X, Y, Z in FIGS. 12A-12B and 13A-13E). Because the three or more multi-axis load cells $\mathbf{114}u_a$ are coined as "multi-axis" load cells, the term "multi" defines the number of axes monitored by the three or more multi-axis load cells $\mathbf{114}u_a$; further, the number of axes include two or more of the axes that share the same origin and are orthogonal to one another. In an exemplary implementation, the number of axes may include three axes (see, e.g., axes X, Y, Z in FIGS. 12A-12B and 13A-13E); although three orthogonal axes, X, Y, Z, are shown in FIGS. 12A-12B and 13A-13E, some implementations may include two axes that are orthogonal relative one another such as, for example: (1) axis X orthogonal to axis Y, (2) axis X orthogonal to axis Z, or (3) axis Y orthogonal to axis Z.

Figure 15:
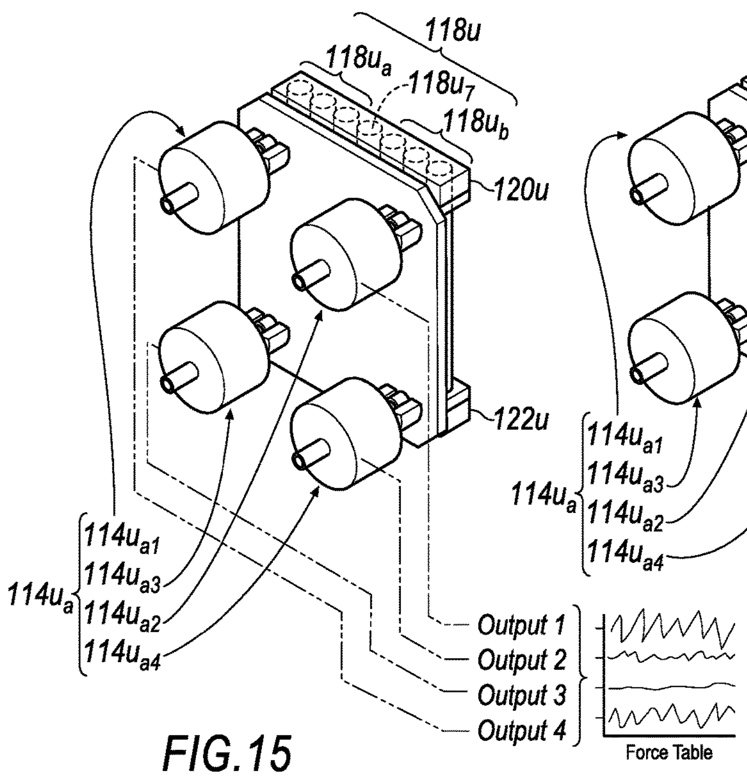
FIG. 15 is a partial perspective view of a portion of the exemplary portion of the apparatus of any of FIGS. 14A, 14B, 14A'', 14B''.
Figure 15:
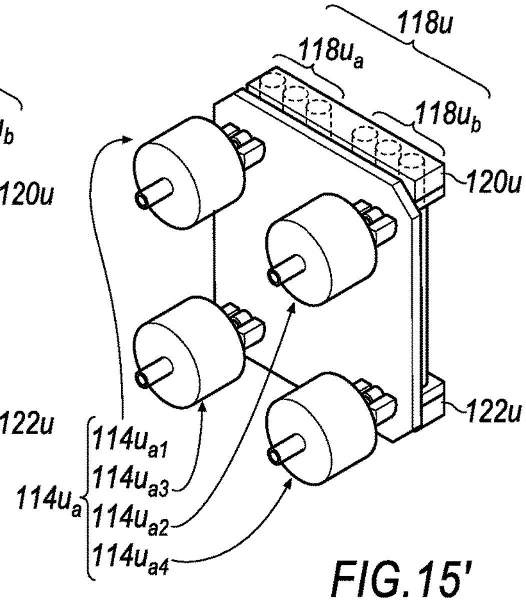
Figure 15:
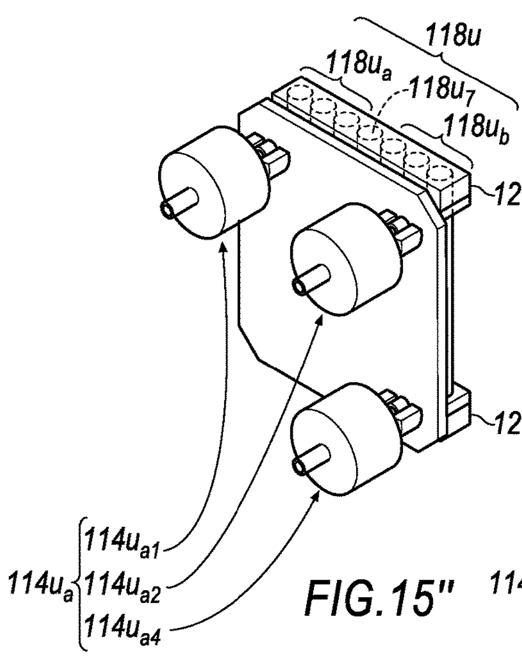
Figure 15:
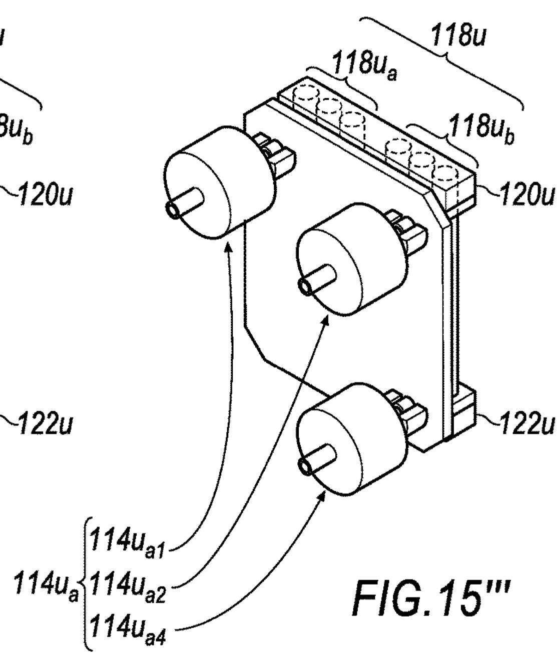

In some instances, each axis (i.e., the X axis, the Y axis and the Z axis) of each multi-axis load cells $\mathbf{114}u_a$ may have its own channel (generally represented by the one or more communication conduits 77); therefore, in some examples, the uniformity device 10*u* may include, for example, nine channels (when three load cells are incorporated into the design as seen in FIGS. 15'', 15''') or twelve channels (when four load cells are incorporated into the design as seen in FIGS. 15, 15') whereby each channel provides a time domain force or moment ripple output that is communicated to the computing resource 75 over the one or more communication conduits 77. The software associated with the computing resource 75 will sum the time domain force or moment ripple output of each channel and are then subsequently provided to a fast Fourier transform (FFT) analyzer (i.e., this is a fixed-deflection measurement of the imparted "road force" of the workpiece), which will determine uniformity (or lack thereof) of the tire, T. Because, for example, three or more multi-axis load cells 114$u_a$ are used, a variety of uniformity-related measurements may be captured, such as, for example, rocking moments, yaw moments, pitch moments and the like. Each of the plurality of multi-axis load cells 114$u_a$ and the angular encoder 48 may be communicatively-coupled to the computing resource 75 by way of the one or more communication conduits 77 in order to record the lack of uniformity of the tire, T, that was detected by the plurality of multi-axis load cells 114$u_a$ at a particular angular orientation of the tire, T, as determined by the angular encoder 48.

Referring to FIGS. 15-15', in an example, the plurality of multi-axis load cells 114$u_a$ may include four multi-axis load cells 114$u_{a1}$, 114$u_{a2}$, 114$u_{a3}$, 114$u_{a4}$ that are arranged upon the support plate 116*u* in a "square shape." Referring to FIGS. 15''-15''', in another example, the plurality of multi-axis load cells 114$u_a$ may include three multi-axis load cells 114$u_{a1}$, 114$u_{a2}$, 114$u_{a3}$ that are arranged upon the support plate 116*u* in an "L shape."

"Fixed Center" Tire Uniformity-Detecting Portion 110*u*

Figure 16:
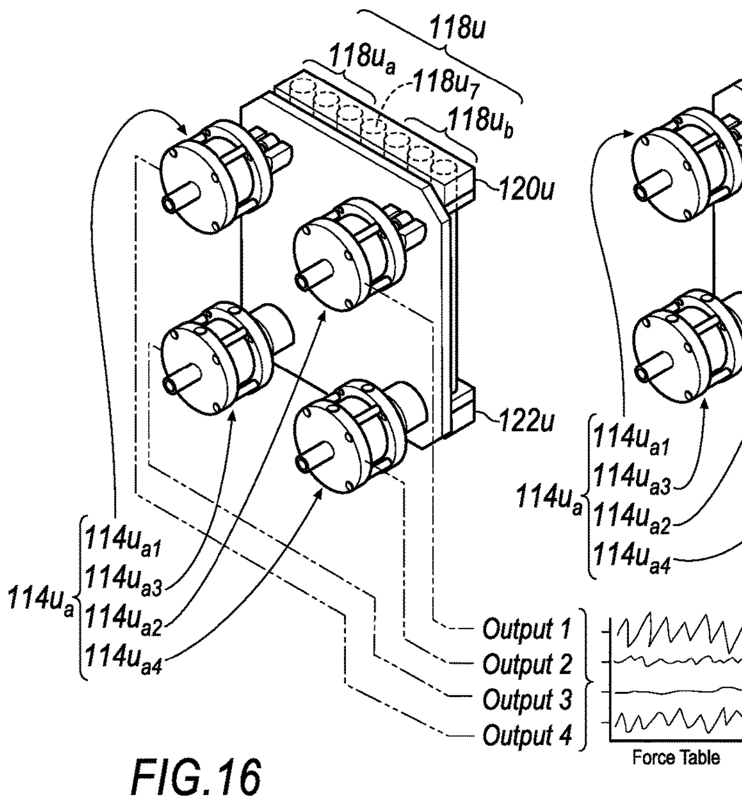
FIG. 16 is a partial perspective view of a portion of the exemplary portion of the apparatus of any of FIGS. 14A, 14B, 14A'', 14B''.
Figure 16:
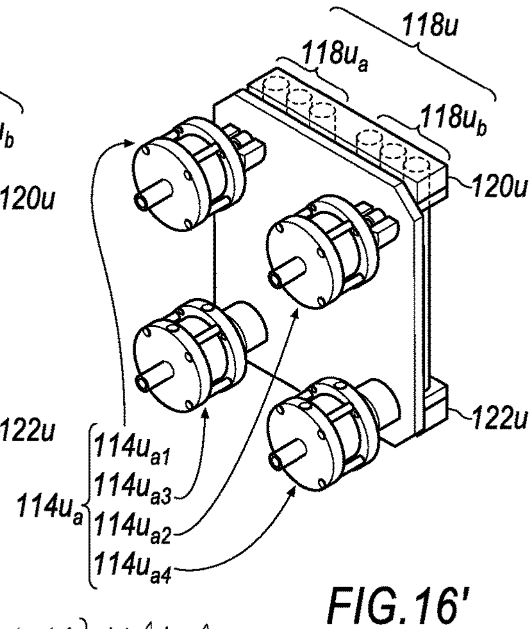
Figure 16:
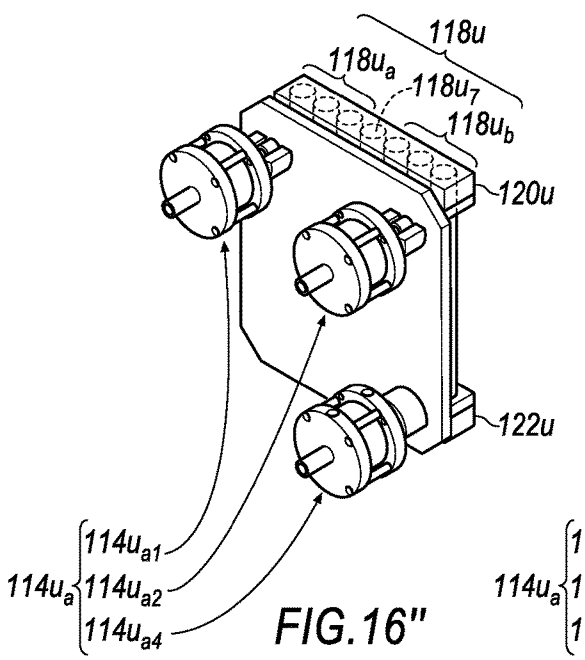
Figure 16:
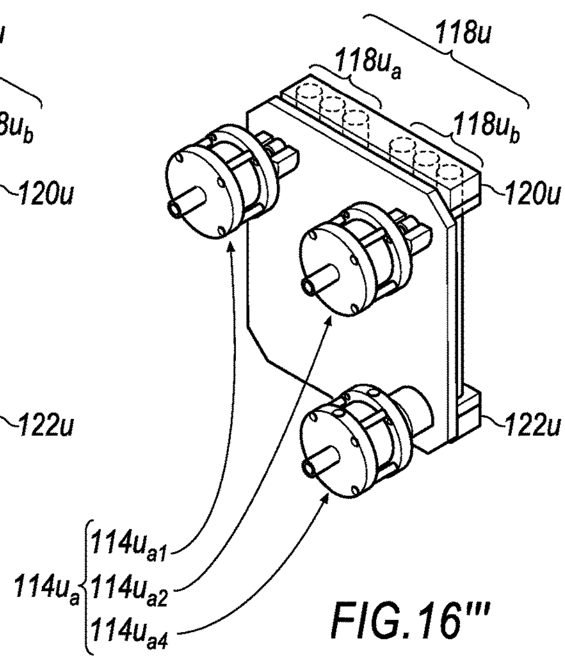

Referring to FIGS. 13A-13E, 14A''-14B'', 14A'''-14B''', 16-16''''', an exemplary tire uniformity-detecting portion 110*u* may be referred to as a "fixed center" tire uniformity-detecting portion that includes a plurality of air spring members 114$u_b$ secured to a support plate 116*u*. Referring to FIGS. 16-16', in an example, the plurality of air spring members 114$u_b$ may include four air spring members 114$u_{b1}$, 114$u_{b2}$, 114$u_{b3}$, 114$u_{b4}$ secured to the support plate 116*u* in a "square shape." Referring to FIGS. 16''-16''', in another example, the plurality of air spring members 114$u_b$ may include three air spring members 114$u_{b1}$, 114$u_{b2}$, 114$u_{b3}$ secured to the support plate 116*u* in an "L shape." Referring to FIGS. 16''''-16''''', in yet another example, the plurality of air spring members 114$u_b$ may include three air spring members 114$u_{b1}$, 114$u_{b2}$, 114$u_{b3}$ secured to the support plate 116*u* in a "triangular shape." The tire uniformity-detecting portion 110*u* may also include at least one laser indicator 126 (see, e.g., FIGS. 14A''-14B'', 14A'''-14B'''). The method for utilizing the "fixed center" tire uniformity-detecting portion 110*u* incorporating the plurality of air spring members 114$u_b$ is described below in further detail.

Tire Tread-Engaging Member 112*u*— Configuration of Roller Members 118*u*

Referring to FIGS. 14A-16''''', the tire tread-engaging member 112*u* may be configured to include a plurality of roller members 118*u*. The plurality of roller members 118*u* are rotatably connected to an upper bracket 120*u* and a lower bracket 122*u*.

Figure 14A:
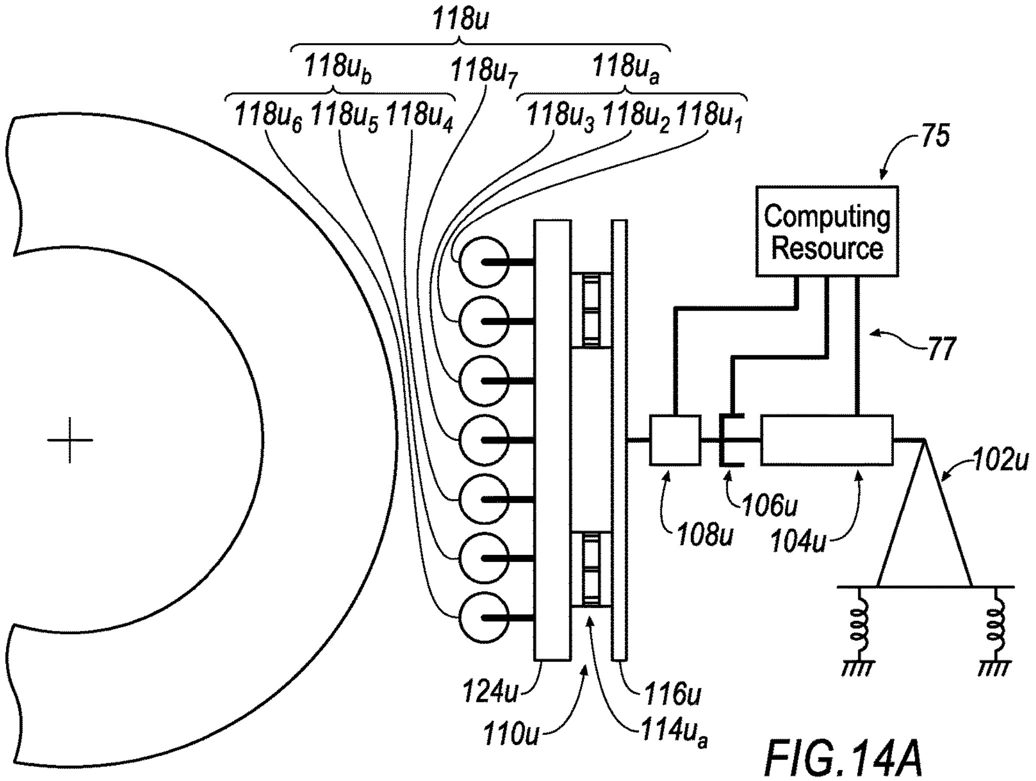
FIG. 14A is a partial top view of an exemplary portion of the apparatus of FIG. 10 according to line 14A of FIG. 13D.
Figure 14B:
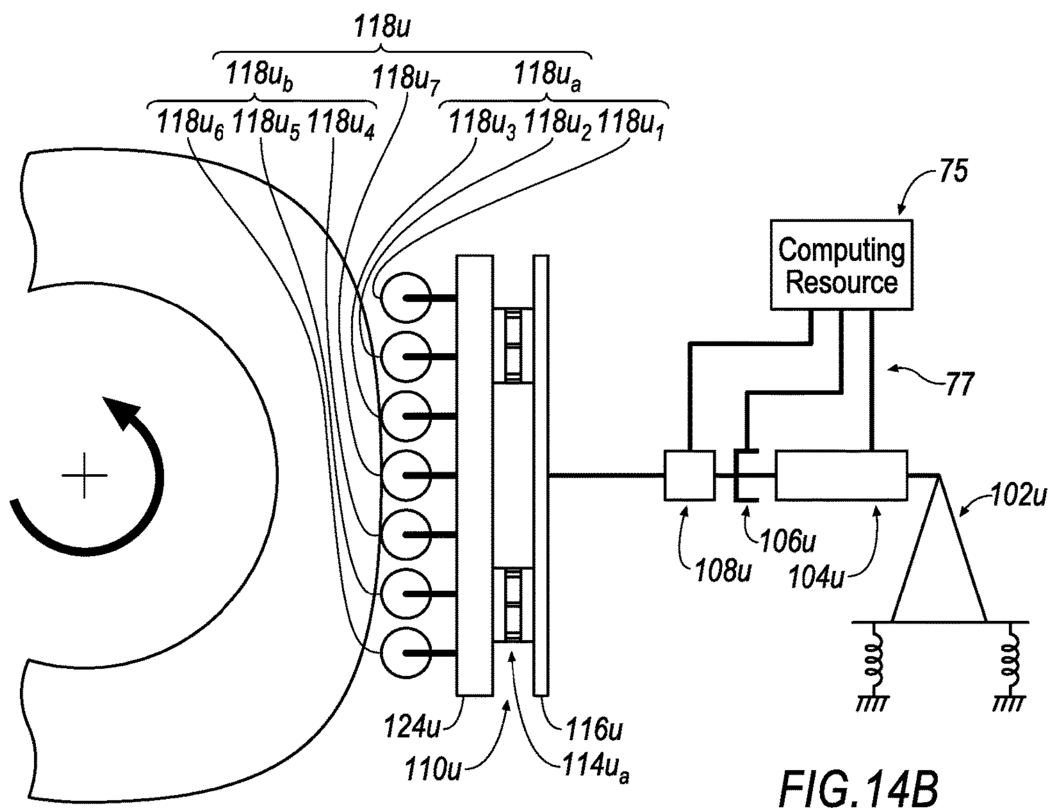
FIG. 14B is a partial top view of an exemplary portion of the apparatus of FIG. 10 according to line 14B of FIG. 13E.
Figure 14A:
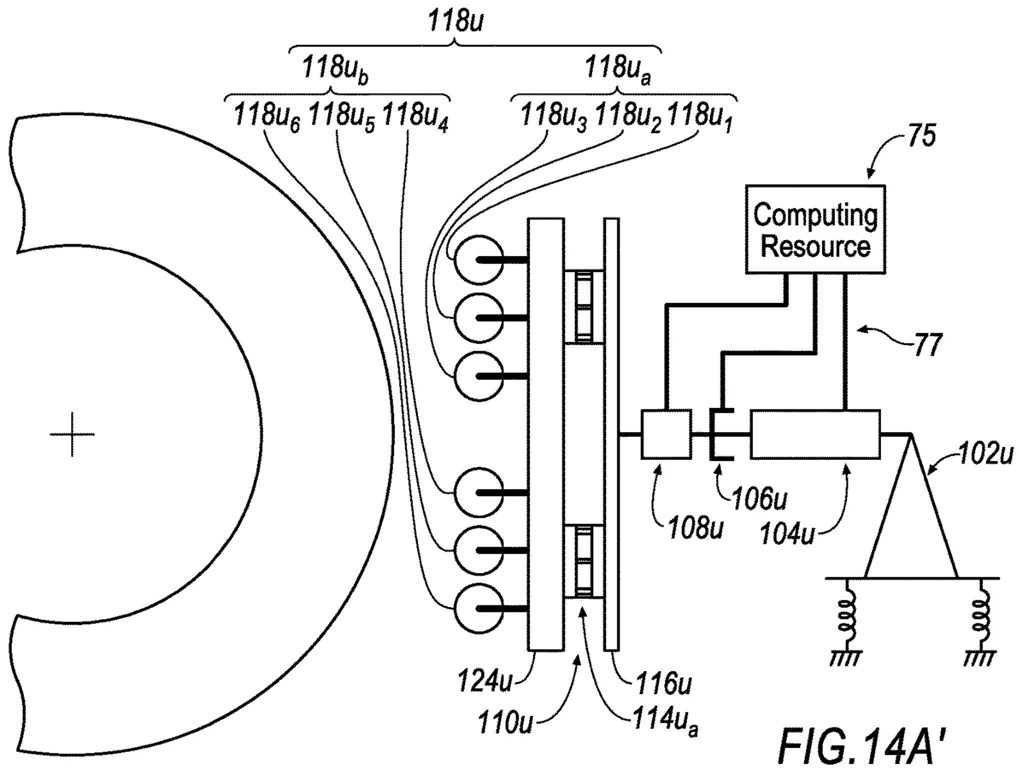
Figure 14B:
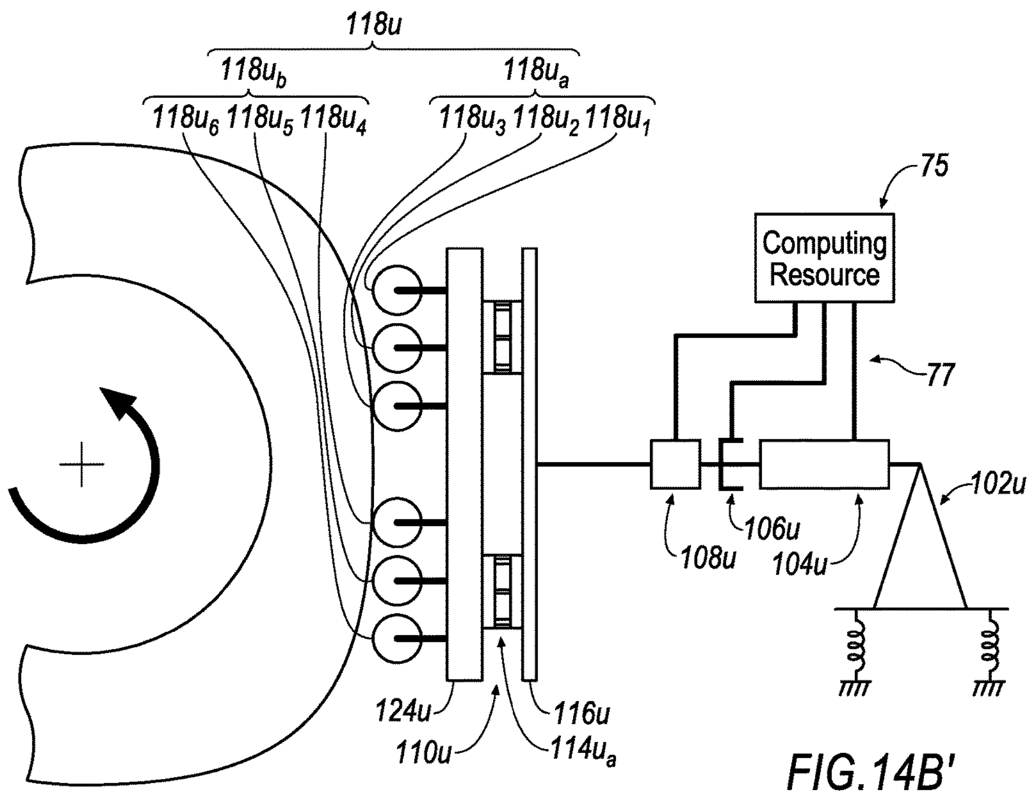
Figure 14A:
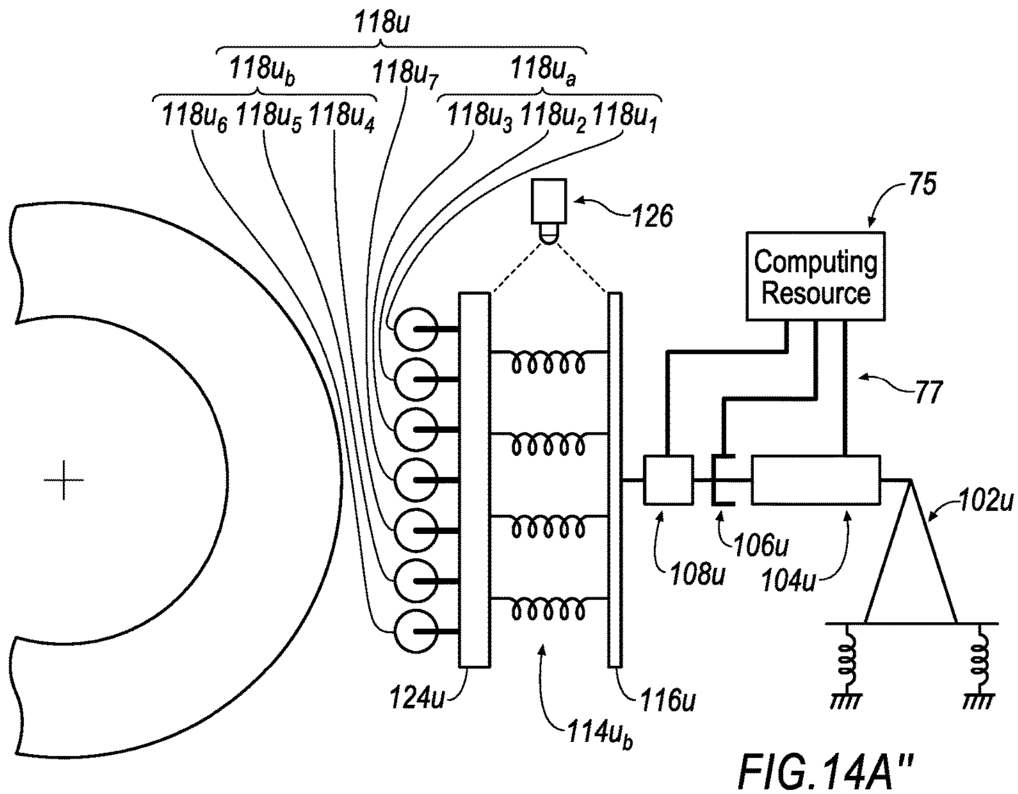
Figure 14B:
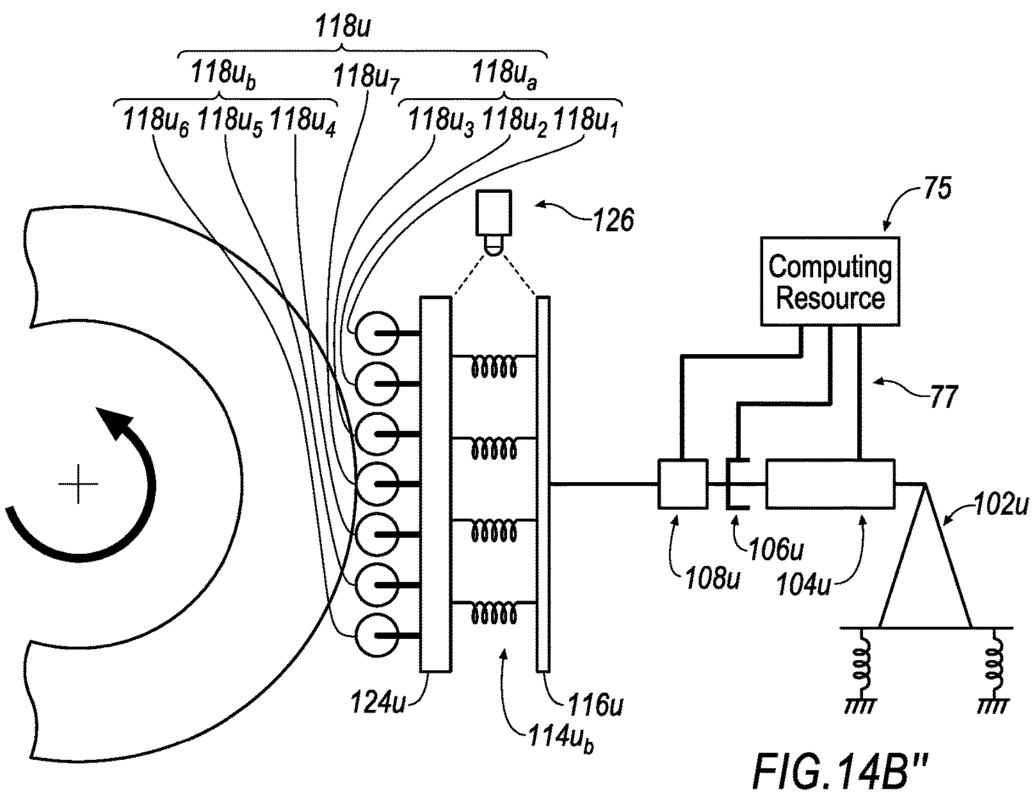
Figure 14A:
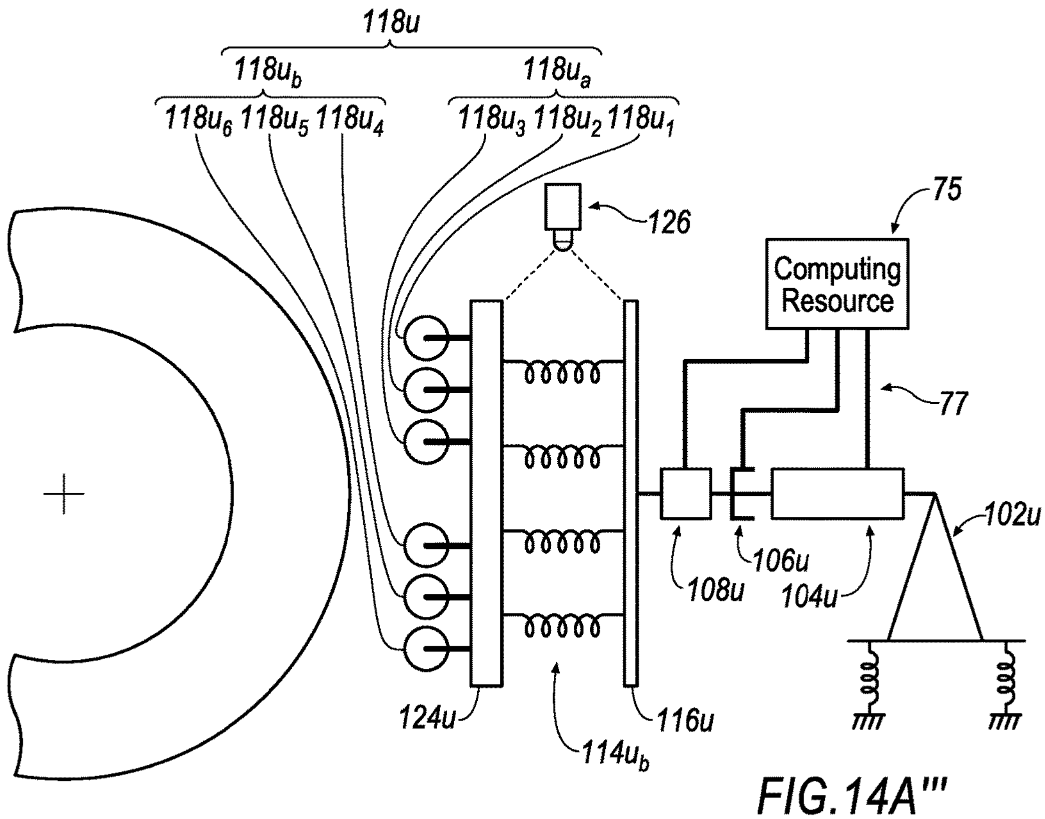
Figure 14B:
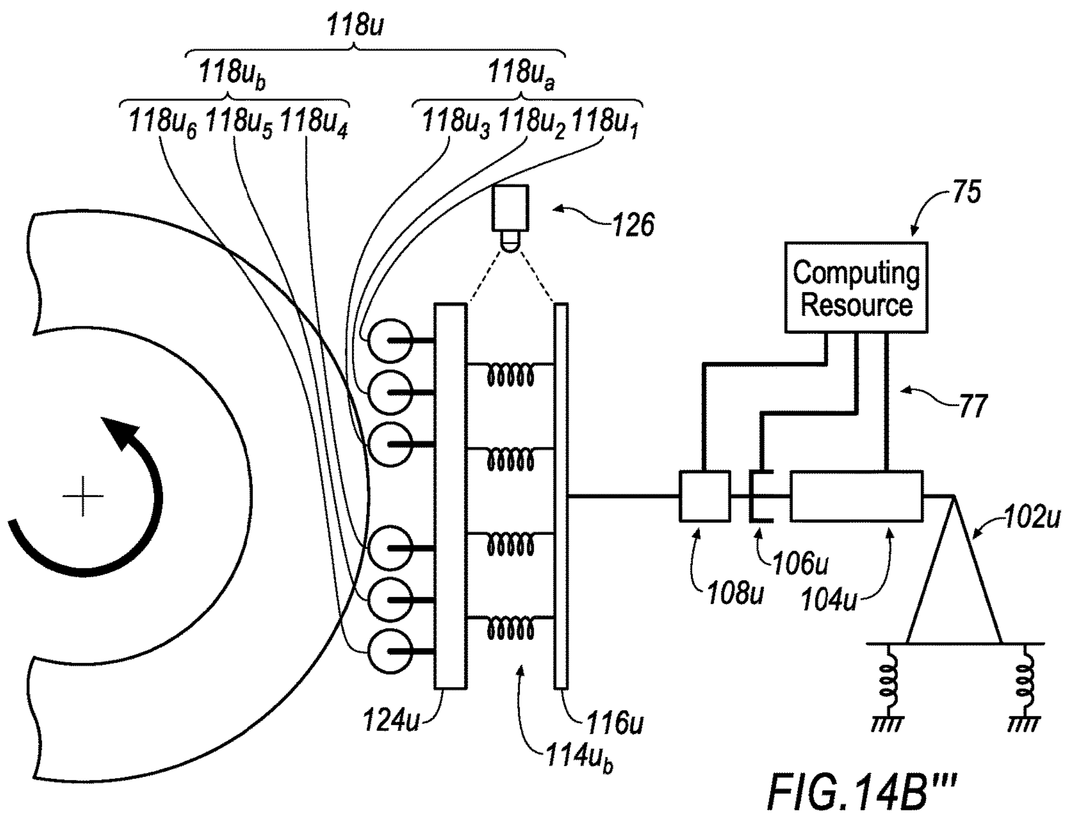

In an example, as seen at FIGS. 14A-14B, 14A''-14B'', 15, 15'', 16, 16'', 16'''', an exemplary tire tread-engaging member 112$u_1$ may include a plurality of roller members 118*u* rotatably connected to an upper bracket 120*u* and a lower bracket 122*u*. The plurality of roller members 118*u* may include seven roller members 118$u_1$, 118$u_2$, 118$u_3$, 118$u_4$, 118$u_5$, 118$u_6$, 118$u_7$, defined by a first grouping 118$u_a$ of three roller members 118$u_1$, 118$u_2$, 118$u_3$ and a second grouping 118$u_b$ of three roller members 118$u_4$, 118$u_5$, 118$u_6$ that are separated by a centrally-located seventh roller member 118$u_7$.

Both of the upper bracket 120*u* and the lower bracket 122*u* are secured to a support plate 124*u*. In some instances, the support plate 124*u* is connected to the plurality of multi-axis load cells 114$u_a$ (of the exemplary embodiment described at FIGS. 13A-13E, 14A-14B, 14A'-14B', 15-15') or the plurality of air spring members 114$u_b$ (of the exemplary embodiment described at FIGS. 13A-13E, 14A''-14B'', 14A'''-14B''', 16-16''''') such that the plurality of multi-axis load cells 114$u_a$ or the plurality of air spring members 114$u_b$ are "sandwiched" between the support plate 116*u* of the tire uniformity-detecting portion 110$u_1$/the tire uniformity-detecting portion 110$u_2$ and the support plate 124*u* of the tire tread-engaging member 112$u_1$.

In an example, as seen at FIGS. 14A'-14B', 14A'''-14B''', 15', 15''', 16', 16''', 16''''', an exemplary tire tread-engaging member 112$u_2$ may include a plurality of roller members 118*u* rotatably connected to an upper bracket 120*u* and a lower bracket 122*u*. The plurality of roller members 118*u* may include six roller members 118$u_1$, 118$u_2$, 118$u_3$, 118$u_4$, 118$u_5$, 118$u_6$ defined by a first grouping 118$u_a$ of three roller members 118$u_1$, 118$u_2$, 118$u_3$ and a second grouping 118$u_b$ of three roller members 118$u_4$, 118$u_5$, 118$u_6$ that are separated by a gap (where there is an absence of a centrally-located seventh roller member 118$u_7$ when compared to the above-described embodiment including seven roller members). The gap spans a leading edge and a trailing edge of a tire contact patch area.

Both of the upper bracket 120*u* and the lower bracket 122*u* are secured to a support plate 124*u*. In some instances, the support plate 124*u* is connected to the plurality of multi-axis load cells 114$u_a$ (of the exemplary embodiment described at FIGS. 13A-13E, 14A-14B, 14A'-14B', 15-15''') or the plurality of air spring members 114$u_b$ (of the exemplary embodiment described at FIGS. 13A-13E, 14A''-14B'', 14A'''-14B''', 16-16''''') such that the plurality of multi-axis load cells 114$u_a$ or the plurality of air spring members 114$u_b$ are "sandwiched" between the support plate 116*u* of the tire uniformity-detecting portion 110$u_1$/the tire uniformity-detecting portion 110$u_2$ and the support plate 124*u* of the tire tread-engaging member 112$u_1$.

When the "fixed center" tire uniformity-detecting portion 110*u* incorporating the plurality of air spring members 114$u_b$ is incorporated into the design of the uniformity device 10*u*, the at least one laser indicator 126, which is positioned proximate the plurality of air spring members 114$u_b$ as well as the support plate 116*u* and the support plate 124*u*, may detect a difference in an amount distance between the support plate 116*u* and the support plate 124*u*; accordingly, when a lack of uniformity of the tire, T, may occur at a particular angular revolution of the tire, T, the plurality of air spring members 114$u_b$ may: (1) compress, thereby reducing the distance between the support plates 116*u*, 124*u*, or alternatively, (2) expand, thereby increasing the distance between the support plates 116*u*, 124*u*. Each of the at least one laser indicator 126 and the angular encoder 48 may be communicatively-coupled to the computing resource 75 by way of the one or more communication conduits 77 in order to record the lack of uniformity of the tire, T, that was detected by the at least one laser indicator 126 at a particular angular orientation of the tire, T, as determined by the angular encoder 48.

Functionally, the at least one laser indicator 126 produces at least one signal that is communicated to the computing resource 75 over the one or more communication conduits 77; the at least one signal is a time domain displacement ripple output. If more than one laser indicator 126 is used, software associated with the computing resource 75 sums the time domain displacement ripple output of each signal output by each laser indicator 126, which is then subsequently provided to a fast Fourier transform (FFT) analyzer (i.e., this is a "quasi fixed load" measurement of the loaded radius of the workpiece).

The Apparatus 10'''

Figure 17:
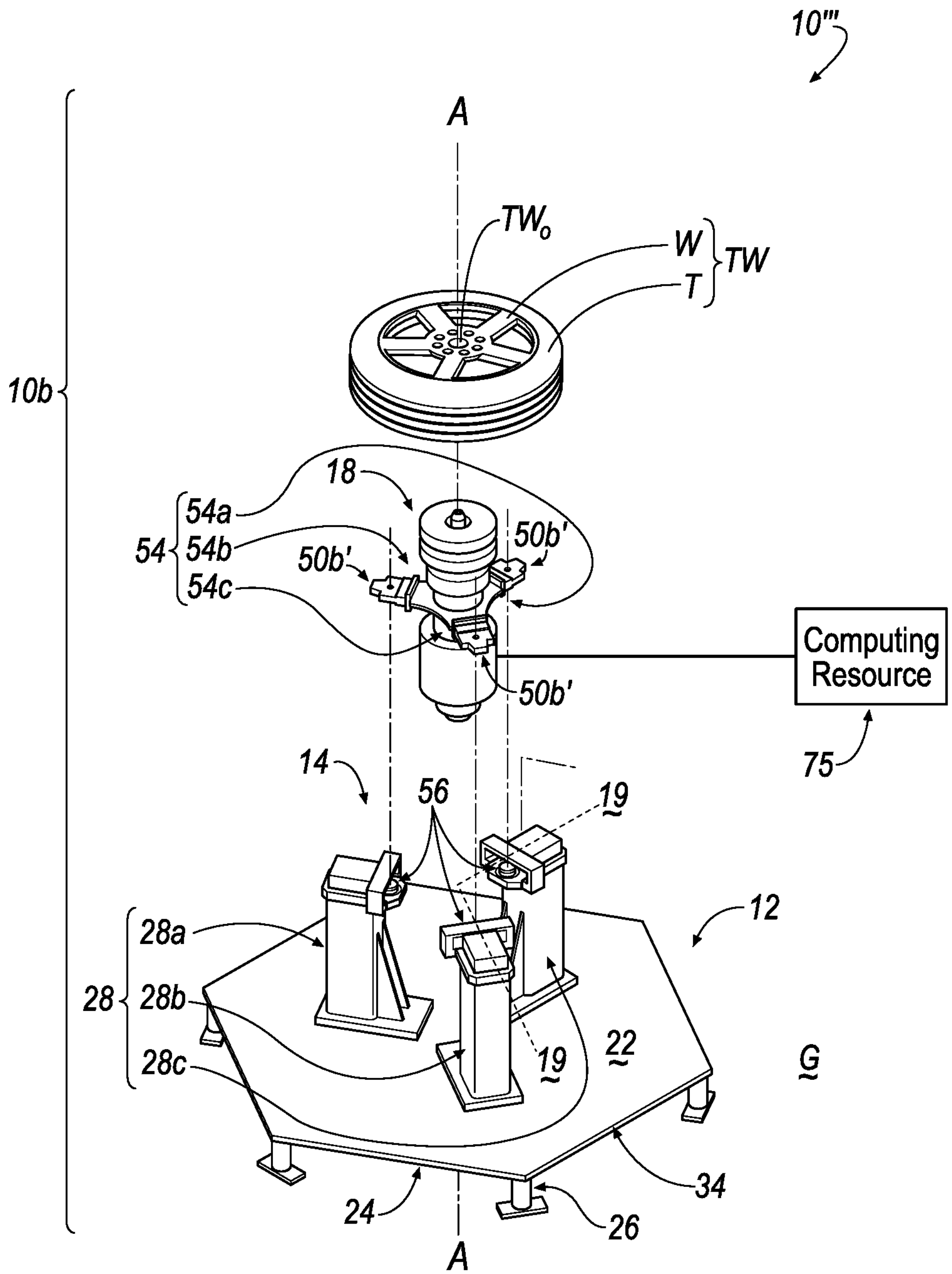
FIG. 17 is an exploded view of an apparatus for processing a tire and a wheel in accordance with an exemplary embodiment of the invention.

Referring to FIG. 17, an exemplary apparatus is shown generally at 10'''. In some instances, the apparatus 10''' may be structurally configured in a manner to provide only one function being an act of balancing. The act of balancing may include, for example: (1) teaching a computing resource 75 a variety of imbalance configurations that may be exhibited by an inflated tire-wheel assembly, TW, by arranging a calibration disk, CD (as seen in, e.g., 19B-19D), upon the apparatus 10''', and (2) arranging an inflated tire-wheel assembly, TW (as seen, e.g., FIGS. 19B'-19D'), upon the apparatus 10''' for determining imbalance (which may be quantified in gram-centimeters), if any, of the inflated tire-wheel assembly, TW (which may be determined in view of, for example, a learned state of imbalance provided to the computing resource 75 from a previous application of the calibration disk, CD, to the apparatus 10''' as described above).

Because the apparatus 10''' is directed to providing a balancing function, one or more reference numerals identifying a 'balancing device' of the apparatus 10''' includes a "b" appended to the one or more reference numerals; accordingly, a 'balancing device' is generally represented at, for example reference numeral "10*b*".

The Balancing Device 10*b* of the Apparatus 10'''

Figure 18:
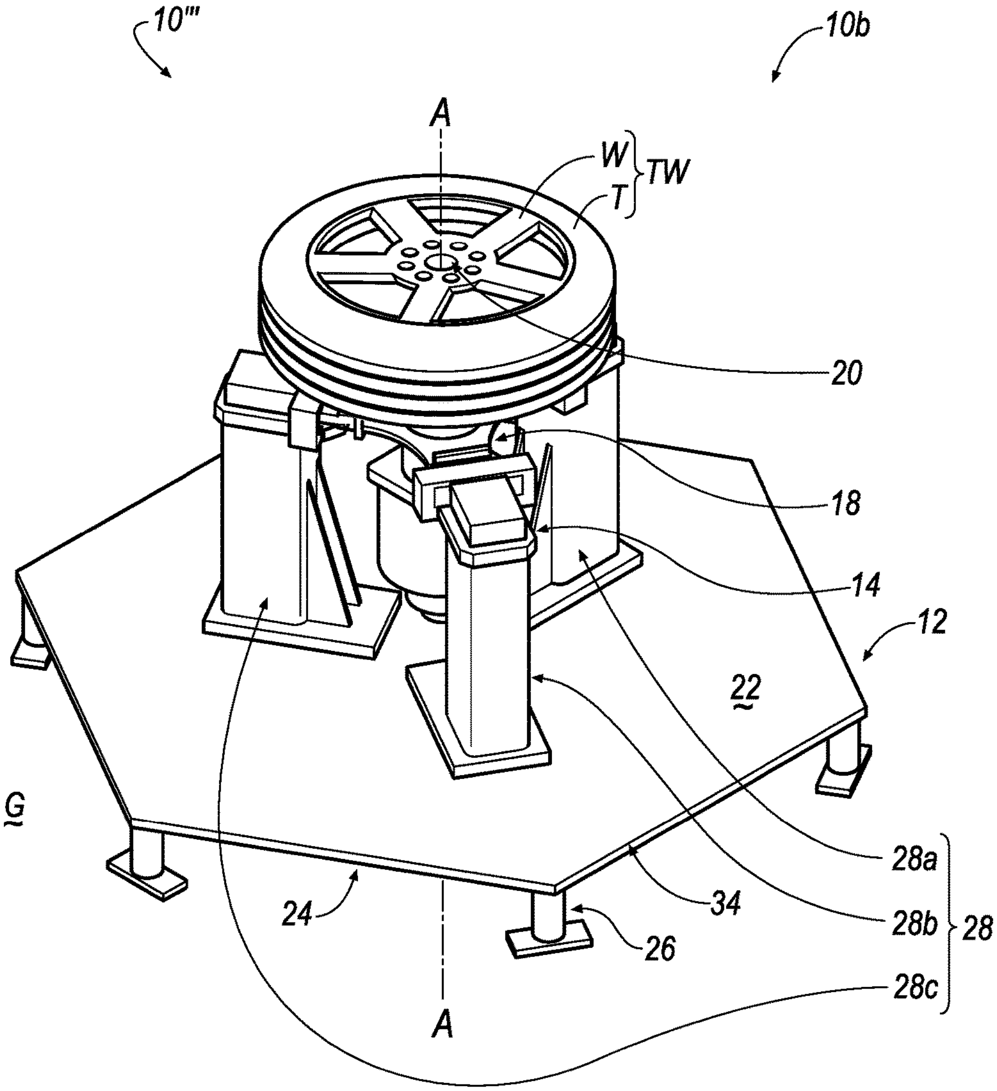
FIG. 18 is an assembled view of the apparatus of FIG. 17.

Referring initially to FIGS. 17-18, the balancing device 10*b* generally includes a base member 12, a lower support member 14 and a lower workpiece-engaging portion 18. The base member 12 is arranged upon an underlying ground surface, G. The lower support member 14 is arranged upon the base member 12. The lower support member 14 is connected to the lower workpiece-engaging portion 18.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28*a*, 28*b*, 28*c*.

Each pedestal member 28*a*-28*c* of the plurality of pedestal members 28 of the lower support member 14 is disposed upon the upper surface 22 of the base member 12 such that each pedestal member 28*a*-28*c* of the plurality of pedestal members 28 are arranged radially inwardly closer to a central axis, A-A, extending through an axial center of the base member 12 and away from an outer perimeter 34 of the base member 12.

Referring to FIGS. 19A-19D', the lower workpiece-engaging portion 18 includes a central shaft 36 having a proximal end $36_P$ and a distal end $36_D$. The central shaft 36 is defined by an elongated body 38 that extends between the proximal end $36_P$ and the distal end $36_D$. The central axis, A-A, is axially-aligned with an axial center of the elongated body 38 of the central shaft 36.

The lower workpiece-engaging portion 18 may also include a motor 40 disposed within a motor housing 42. The proximal end $36_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $36_D$ of the central shaft 36.

The motor 40 may be actuated in order to, for example, cause rotation, R, of the central shaft 36. In some instances the central shaft 36 may be rotated approximately 300 rpm; in such an example, 300 rmp may be considered to be 'high speed' in order to impart inertia forces for conducting the balancing function. The motor 40 may also be actuated to impart movement of/spatially manipulate the workpiece-engaging chuck 44. Movement of the workpiece-engaging chuck 44 may include: (1) radial outward movement (for coupling the distal end $36_D$ of the central shaft 36 to a workpiece, CD/TW) or (2) radial inward movement (for de-coupling the distal end $36_D$ of the central shaft 36 from the workpiece, CD/W).

Actuation of the motor 40 (for the purpose of rotating, R, the central shaft 36 or causing movement of the workpiece-engaging chuck 44) may occur as a result of a signal sent from the computing resource 75 to the motor 40. The computing resource 75 may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

The lower workpiece-engaging portion 18 may also include a plurality of components 46, 48, 50*b*' that are disposed upon the elongated body 38 of the central shaft 36; the plurality of components 46, 48, 50*b*' may include, for example: a workpiece inboard surface-engaging member 46, an angular encoder 48 and a plurality of multi-axis transducers 50*b*'; as seen in FIG. 17, the balancing device 10*b* may include three transducers defining the plurality of multi-axis transducers 50*b*'. The workpiece inboard surface-engaging member 46 may be connected to the elongated body 38 of the central shaft 36 proximate the workpiece-engaging chuck 44 and the distal end $36_D$ of the central shaft 36. The plurality of multi-axis transducers 50*b*' may be connected to the elongated body 38 of the central shaft 36 proximate, for example, the proximal end $36_P$ of the central shaft 36; each transducer of the plurality of multi-axis transducers 50*b*' may be, for example, a strain gauge transducer or a piezoelectric transducer. The angular encoder 48 may be connected to the elongated body 38 of the central shaft 36 at, for example, a location between the workpiece inboard surface-engaging member 46 and the plurality of multi-axis transducers 50*b*'.

In an example, the lower support member 14 may be connected to the lower workpiece-engaging portion 18 as follows. As seen in, for example, FIGS. 19A-19D', a plurality of radially-projecting support arms 54 may extend radially outwardly from a non-rotating structural member of the lower workpiece-engaging portion 18, such as, for example, a bearing bracket 55 that is connected to the motor housing 42.

With reference to FIG. 17, the plurality of radially-projecting support arms 54 may include, for example, a first radially-projecting support arm 54*a*, a second radially-projecting support arm 54*b* and a third radially-projecting support arm 54*c*. Each transducer of the plurality of multi-axis transducers 50*b*' is arranged upon or connected to a distal end of each radially-projecting support arm 54*a*-54*c* of the plurality of radially-projecting support arms 54. Each pedestal member 28*a*-28*c* of the plurality of pedestal members 28 may include a shoulder portion 56. Referring to FIGS. 19A-19D', each transducer of the plurality of multi-axis transducers 50*b*' is arranged upon or connected to a distal end of each radially-projecting support arm 54*a*-54*c* of the plurality of radially-projecting support arms 54 may be disposed upon and connected to the shoulder portion 56 of each pedestal member 28*a*-28*c* of the plurality of pedestal members 28.

Method for Utilizing the Apparatus 10'''—Calibration Disk, CD

As described above, one of the acts of balancing provided by the apparatus 10''' may include, for example, teaching the computing resource 75 a variety of imbalance configurations that may be exhibited by an inflated tire-wheel assembly, TW, by arranging a calibration disk, CD, upon the apparatus 10'''. An exemplary method for utilizing the apparatus 10''' as described immediately above may be seen at FIGS. 19A-19D. The balancing device 10*b* may be referred to as a "two plane" balancer for the upper plane (e.g., outboard side) and the lower plane (e.g., inboard side) of the tire-wheel assembly, TW, in order to correct the static component and the couple component of the tire-wheel assembly, TW (i.e., the balancing device 10*b* may contribute to dynamically balancing the tire-wheel assembly, TW).

Figure 19A:
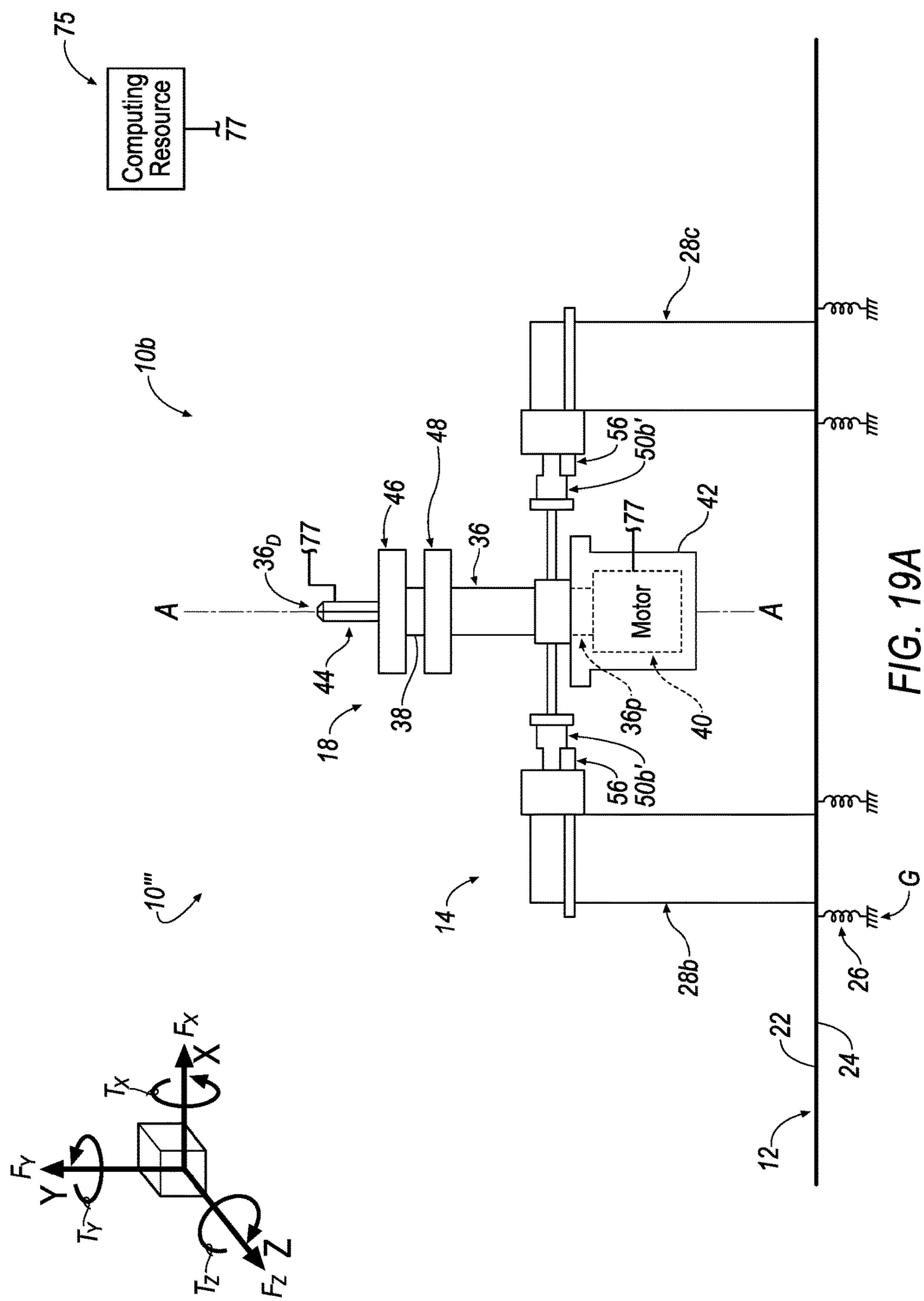
FIG. 19A is a section side view of the apparatus of FIG. 17 according to line 19-19.
Figure 19B:
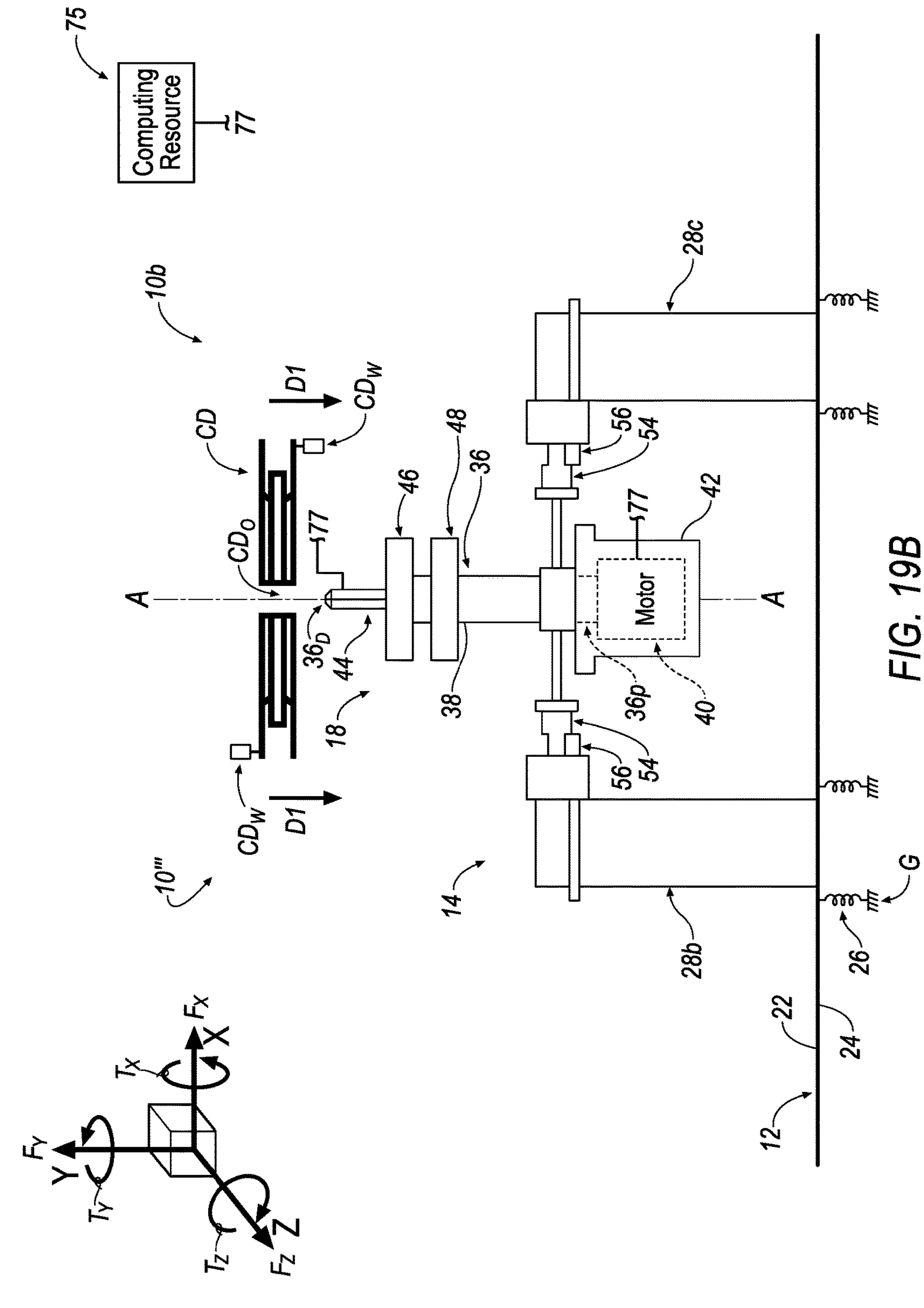
FIGS. 19B-19D are section side views of the apparatus of FIG. 19A being interfaced with a calibration disk.
Figure 19B:
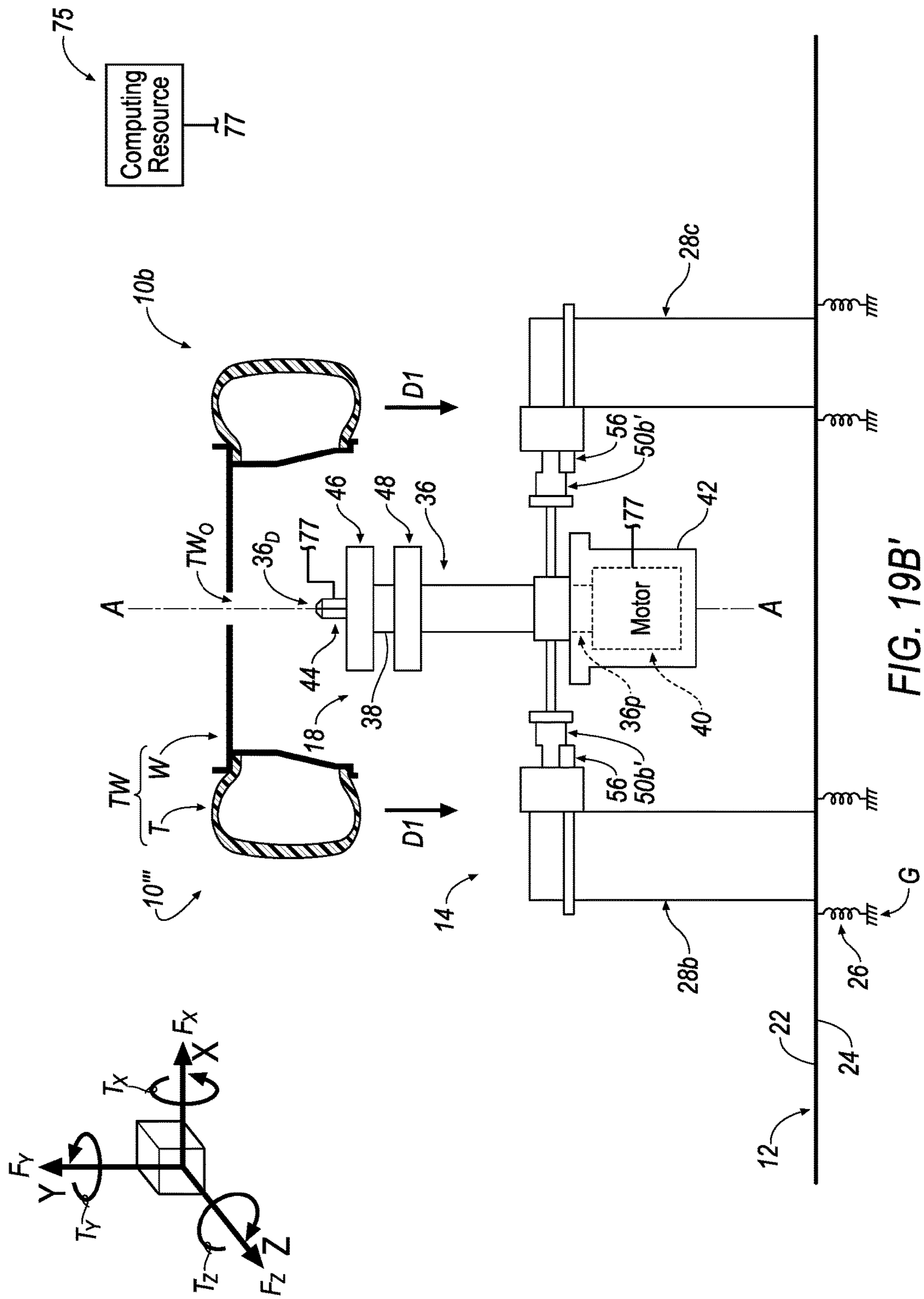

Referring to FIG. 19B, the calibration disk, CD, may be arranged upon the workpiece inboard surface-engaging member 46 of the lower workpiece-engaging portion 18. The calibration disk, CD, may be disposed upon the workpiece inboard surface-engaging member 46 as follows.

In an example, a central opening, $CD_O$, of the calibration disk, CD, may be axially-aligned with the central axis, A-A, such that the central opening, $CD_O$, may be arranged over the radially inwardly/outwardly manipulatable workpiece-engaging chuck 44, which is also axially-aligned with the central axis, A-A. Then, the calibration disk, CD, may be moved according to the direction of the arrow, D1, such that the distal end $\mathbf{36}_D$ of the central shaft 36 is inserted through the central opening, $CD_O$, of the calibration disk, CD, whereby an inboard surface, $CD_{IS}$, of the calibration disk, CD, may be disposed adjacent the workpiece inboard surface-engaging member 46 of the lower workpiece-engaging portion 18.

Figure 19C:
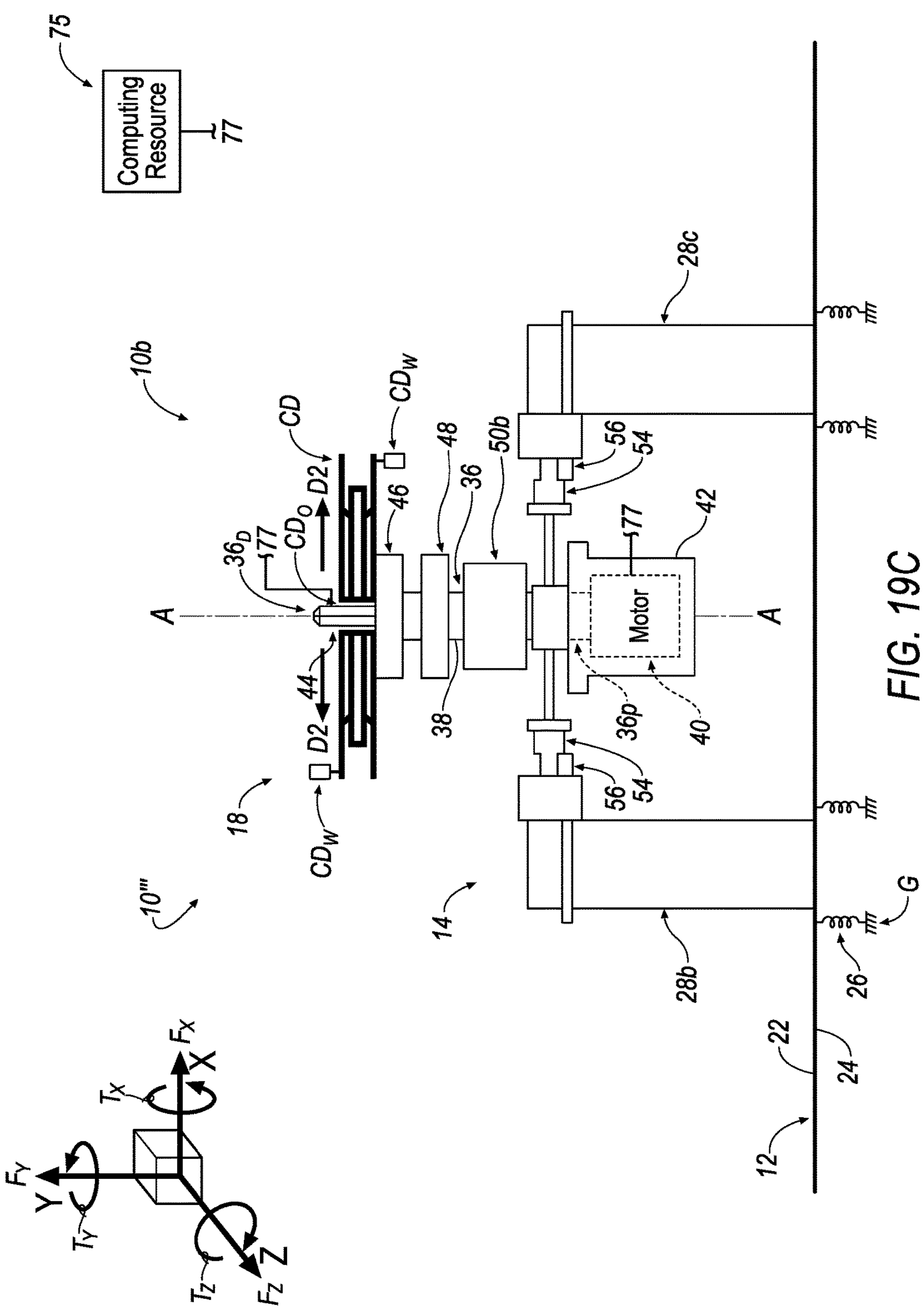
Figure 19C:
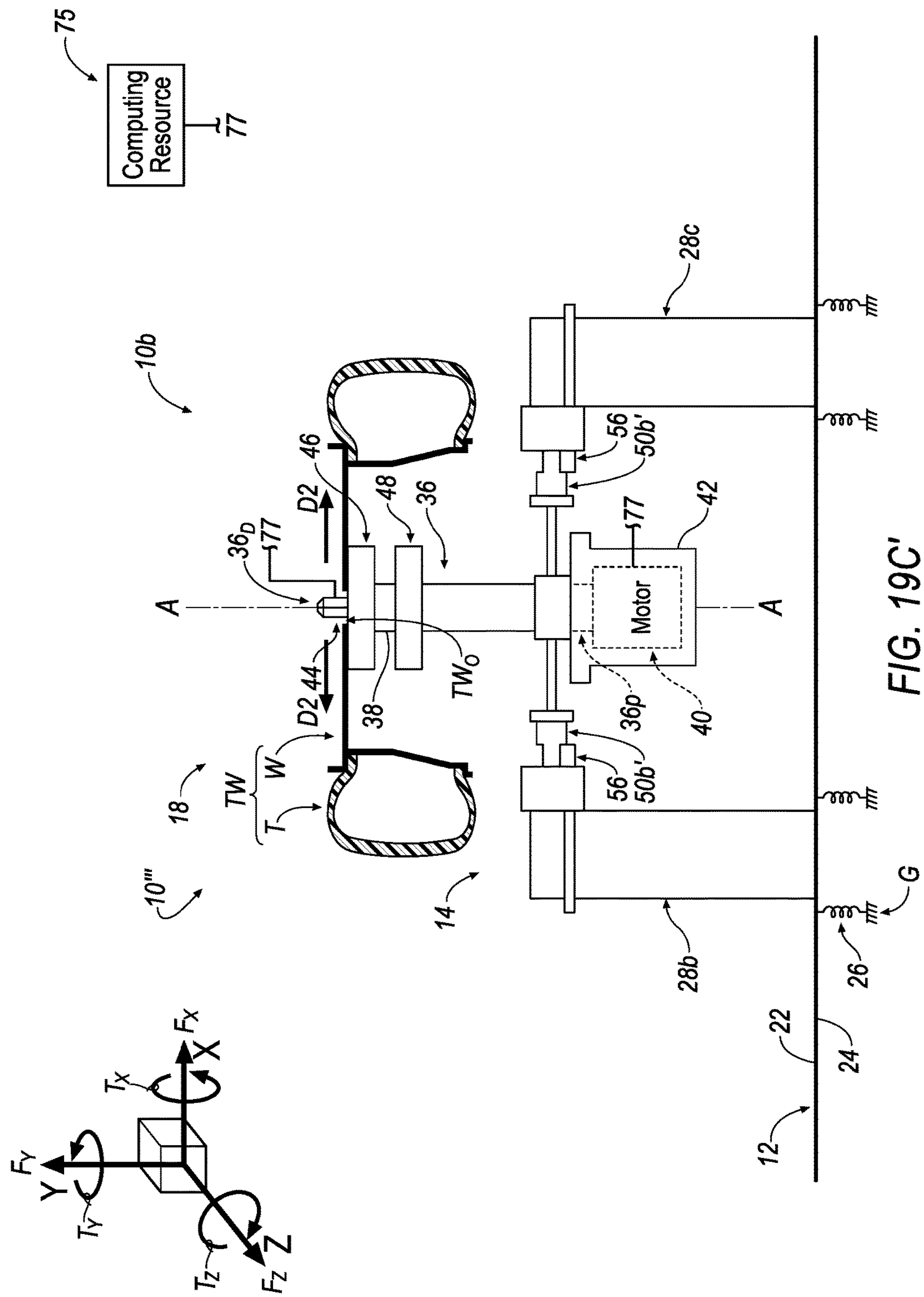
Figure 19D:
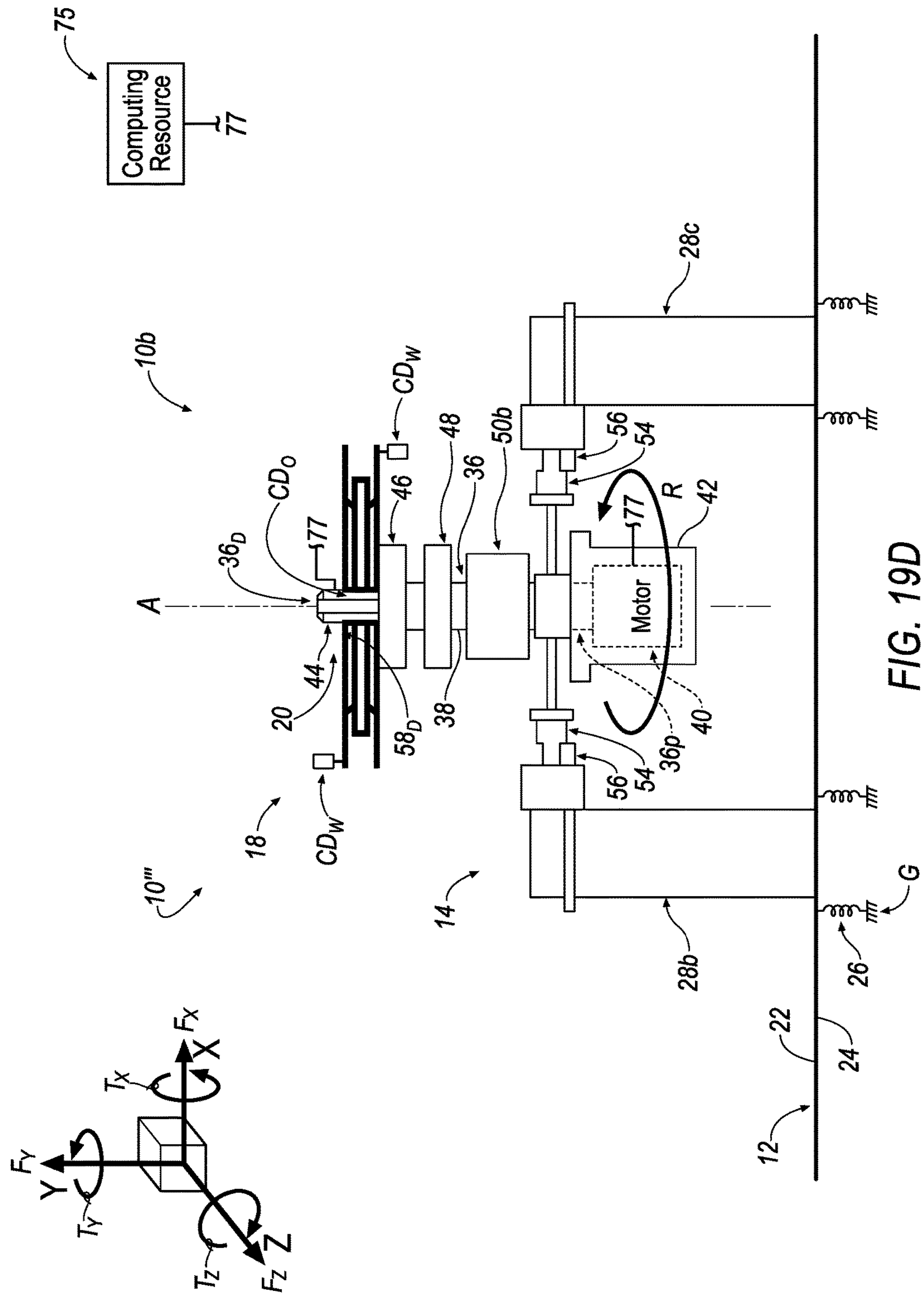
Figure 19D:
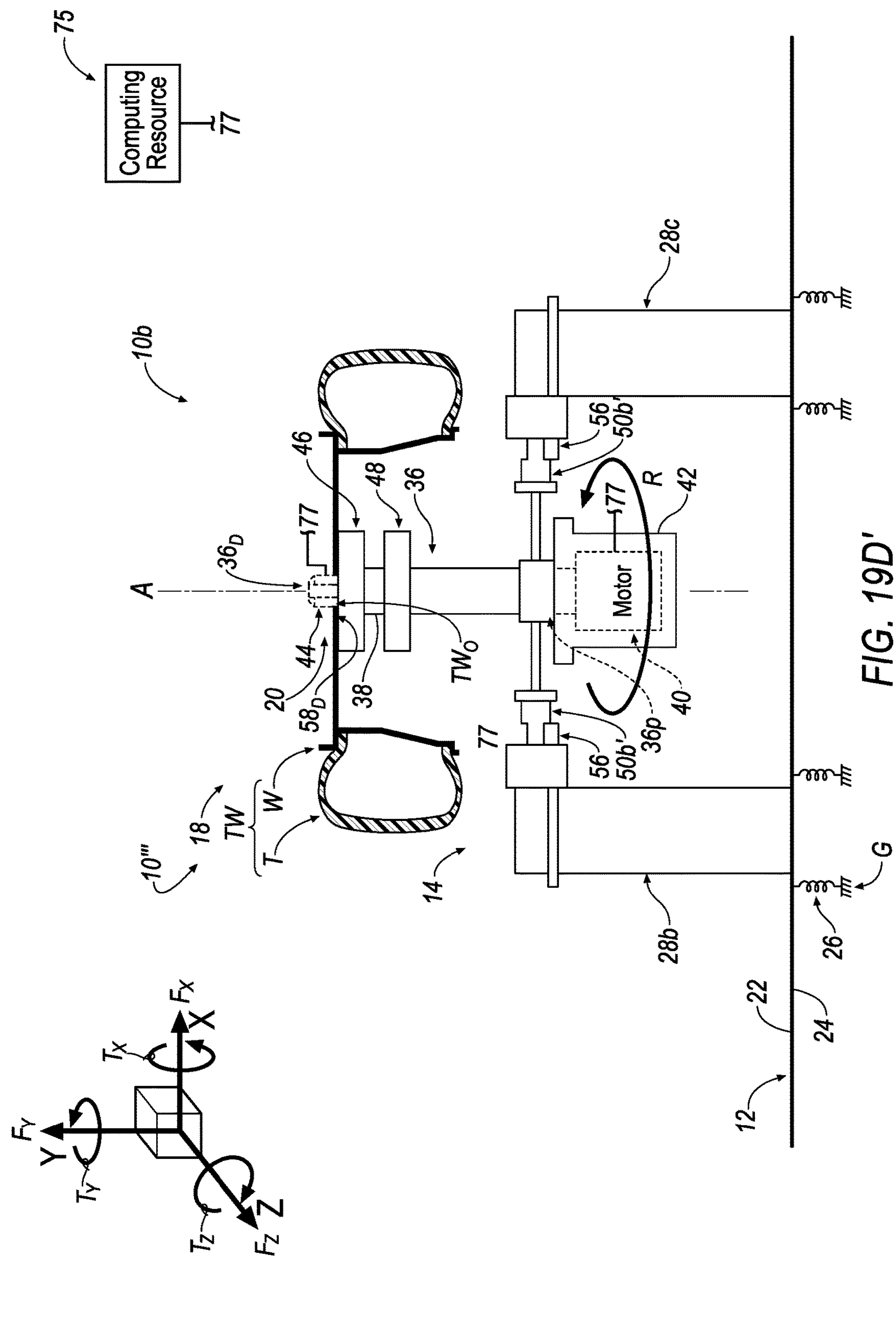

Referring to FIG. 19C, once the calibration disk, CD, is disposed adjacent the workpiece inboard surface-engaging member 46 of the lower workpiece-engaging portion 18, the calibration disk, CD, is selectively-retained to the lower workpiece-engaging portion 18 as a result of the radially inwardly/outwardly manipulatable workpiece-engaging chuck 44 being expanded in a radially outward direction according to the direction of the arrow, D2.

Once the calibration disk, CD, is rotatably-connected to the lower workpiece-engaging portion 18, the motor 40 may be actuated in order to impart rotation, R, to the central shaft 36, which is connected to all of: the workpiece inboard surface-engaging member 46 and the angular encoder 48; because the calibration disk, CD, is disposed adjacent the workpiece inboard surface-engaging member 46 of the lower workpiece-engaging portion 18, the calibration disk, CD, rotates, R, with the workpiece inboard surface-engaging member 46 of the lower workpiece-engaging portion 18 such that the calibration disk, CD, is rotated at sufficient rotational speed for any components of mass imbalance associated therewith to produce measurable inertial forces.

Upon rotating, R, the central shaft 36, the plurality of multi-axis transducers 50*b*' may produce signals that are indicative of an imbalance of the calibration disk, CD (if an imbalance exists). Any determined imbalance of the calibration disk, CD, is communicated to the computing resource 75 by way of the one or more communication conduits 77 that are communicatively-coupled to each transducer of the plurality of multi-axis transducers 50*b*' to the computing resource 75.

The detected imbalance may be over-deterministically calculated in terms of at least one group of signals produced by the plurality of multi-axis transducers 50*b*', including: (1) a group of two or more torque-moment signals (see, e.g., $T_X$, $T_Y$, $T_Z$ in FIGS. 19A-19D) with each torque-moment signal about a respective axis of at least two axes (see, e.g., axes X, Y, Z in FIGS. 19A-19D) and (2) a group of two or more force signals (see, e.g., $F_X$, $F_Y$, $F_Z$ in FIGS. 19A-19D) with each force signal along a respective axis of the at least two axes (see, e.g., axes X, Y, Z in FIGS. 19A-19D). Mathematically, two-plane balancing may be achieved with two independent force or acceleration signals. Because each transducer of the plurality of multi-axis transducers 50*b*' is coined as a "multi-axis" transducer, the term "multi" defines the number of axes monitored by each transducer of the plurality of multi-axis transducers 50*b*'; further, the number of axes include two or more of the axes that share the same origin and are orthogonal to one another. In an exemplary implementation, the number of axes may include three axes (see, e.g., axes X, Y, Z in FIGS. 19A-19D); although three orthogonal axes, X, Y, Z, are shown in FIGS. 19A-19D, some implementations may include two axes that are orthogonal relative one another such as, for example: (1) axis X orthogonal to axis Y, (2) axis X orthogonal to axis Z, or (3) axis Y orthogonal to axis Z.

In some instances, each axis (i.e., the X axis, the Y axis and the Z axis) of each transducer of the plurality of multi-axis transducers 50*b*' may have its own channel (generally represented by the one or more communication conduits 77); therefore, in some examples, the balancing device 10*b* may include nine channels each providing a voltage gain output (e.g., voltage per unit of imbalance of the workpiece, for each plane) that is communicated to the computing resource 75 over the one or more communication conduits 77. The software associated with the computing resource 75 will average the voltage gain output of each channel, and, if there is noise on any one of the channels, noise will be reduced (in the form of noise cancellation) as a result of the total number (e.g., in the present example, nine) of channels being averaged together (i.e., the voltage gain output per unit of imbalance of stochastically measured and calculated by the computing resource 75). This may be referred to as an "over-determined" system where more channels than absolutely over-deterministically necessary, are used to perform the balancing operation. With the use of a minimum number of channels (i.e., two in the present example), any measurement error in either of the signals may add to significant error in the overall calculation. The device described here uses inverse force estimation, averaging the outputs of as many signals as practical, so as to have the error of any individual signal cause minimal distortion of a final resultant.

The calibration disc, CD, is manufactured to have very little imbalance (i.e., the calibration disc, CD, is purposely manufactured to be balanced with an acceptable imbalance).

When attached to the apparatus 10''' and rotated, R, as described above, the calibration disk, CD, will functionally teach a computing resource 75 a variety of imbalance configurations that may be exhibited by an inflated tire-wheel assembly, TW; the variety of imbalance configurations may be determined by the computing resource 75 during a 'learning mode' whereby the magnitude and phase of the voltage gain output (e.g., voltage per unit of imbalance of the workpiece, for each plane) of each channel of each transducer of the plurality of multi-axis transducers 50*b*' is communicated to the computing resource 75 over the one or more communication conduits 77. The imbalance configurations are selectively-determined by an operator that attaches one or more imbalance weights, $CD_W$ (see, e.g., FIG. 19D) to one or more of the inboard surface, $CD_{IS}$, and the outboard surface, $CD_{OS}$, of the calibration disk, CD. The selective attachment of the one or more imbalance weights, $CD_W$, may include not only selecting a specific amount of weight but also a specific angular location upon the calibration disk, CD. A process known as inverse force estimation is used whereas the signal gain (e.g., signal output per unit of imbalance) is calculated from the calibration measurements, for each channel of the transducer 50*b* or for each channel of the plurality of multi-axis transducers 50*b'*.

In an example, one calibration weight, $CD_W$, having an amount of 'X units' may be attached to the outboard surface, $CD_{OS}$, of the calibration disk, CD, at an angular orientation of 279° of the calibration disk, CD. Therefore, upon rotation, R, of the calibration disk from 0° to 279°, the computing resource 75 will receive an imbalance signal produced by each transducer of the plurality of multi-axis transducers 50*b*' indicative of 'X units' attached to the outboard surface, $CD_{OS}$, of the calibration disk, CD, at an angular orientation of 279°; accordingly, when an inflated tire-wheel assembly, TW, having an imbalance of 'X units' of the outboard surface at an angular orientation of 279°, is attached to the apparatus 10''' and rotated, R, in a substantially similar manner as described above, the computing resource 75 will recognize not only the imbalance amount but also the location of the imbalance. Upon determining the amount and location of the imbalance, the computing resource will record the imbalance and provide an operator or corresponding system with instructions for attaching an amount of weight and location to attach the weight to the wheel, W, of the inflated tire-wheel assembly, TW.

Method for Utilizing the Apparatus 10'''—Inflated Tire-Wheel Assembly, TW

As described above, one of the acts of balancing provided by the apparatus 10''' may include, for example, determining imbalance (which may be quantified in gram-centimeters), if any, of an inflated tire-wheel assembly, TW. An exemplary method for utilizing the apparatus 10''' as described immediately above may be seen at FIGS. 19A and 19B'-19D'.

Referring to FIGS. 19B', the inflated tire-wheel assembly, TW, may be arranged over the workpiece inboard surface-engaging member 46 of the lower workpiece-engaging portion 18. The inflated tire-wheel assembly, TW, may be then be disposed upon the workpiece inboard surface-engaging member 46 as follows.

In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D1, such that the distal end $36_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Referring to FIG. 19C', once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D2.

Once the tire-wheel assembly, TW, is rotatably-connected to the lower workpiece-engaging portion 18, the motor 40 may be actuated in order to impart rotation, R, to the central shaft 36, which is connected to all of: the workpiece inboard surface-engaging member 46 and the angular encoder 48; because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18 such that the tire-wheel assembly, TW, is rotated at sufficient rotational speed for any components of mass imbalance associated therewith to produce measurable inertial forces.

Upon rotating, R, the central shaft 36, each transducer of the plurality of multi-axis transducers 50*b*' may produce signals that are indicative of an imbalance of the tire-wheel assembly, TW (if an imbalance exists). The communicated signal may be then used to determine the static and couple components of the imbalance (by firstly averaging the signals and then calculating imbalance from the average by using a geometric transform to convert the measured imbalance to effective imbalance mass magnitudes and phase angles at one or more locations (e.g., one or more correction planes) on the workpiece by comparing the calculation to a library or data look-up table of imbalance signatures that have been previously prepared as described above at FIGS. 3A-3D). Recommended correction masses are then determined using a geometric transform for the given wheel geometry. An ideal recommended correction may be computed directly, such as with the use of "cut-to-length" correction mass material, or an acceptable compromise may be selected from a library or data look-up table of imbalance signals that have been previously prepared as described above at FIGS. 19A-19D in order to provide an operator or corresponding system with instructions for attaching an amount of weight and location to attach the weight to the wheel, W, of the inflated tire-wheel assembly, TW, in order to correct the determined imbalance of the inflated tire-wheel assembly, TW.

As described above, the detected imbalance may be over-deterministically calculated in terms of at least one group of signals produced by each transducer of the plurality of multi-axis transducers 50*b*', including: (1) a group of two or more torque-moment signals (see, e.g., $T_X$, $T_Y$, $T_Z$ in FIGS. 19A and 19B'-19D') with each torque-moment signal about a respective axis of at least two axes (see, e.g., axes X, Y, Z in FIGS. 19A and 19B'-19D') and (2) a group of two or more force signals (see, e.g., $F_X$, $F_Y$, $F_Z$ in FIGS. 19A and 19B'-19D') with each force signal along a respective axis of the at least two axes (see, e.g., axes X, Y, Z in FIGS. 19A and 19B'-19D'). Mathematically, two-plane balancing may be achieved with two independent force or acceleration signals. Because each transducer of the plurality of multi-axis transducers 50*b*' is coined as a "multi-axis" transducer, the term "multi" defines the number of axes monitored by each transducer of the plurality of multi-axis transducers 50*b*'; further, the number of axes include two or more of the axes that share the same origin and are orthogonal to one another. In an exemplary implementation, the number of axes may include three axes (see, e.g., axes X, Y, Z in FIGS. 19A and 19B'-19D'); although three orthogonal axes, X, Y, Z, are shown in FIGS. 19A and 19B'-19D', some implementations may include two axes that are orthogonal relative one another such as, for example: (1) axis X orthogonal to axis Y, (2) axis X orthogonal to axis Z, or (3) axis Y orthogonal to axis Z.

The Apparatus 10""

Figure 20:
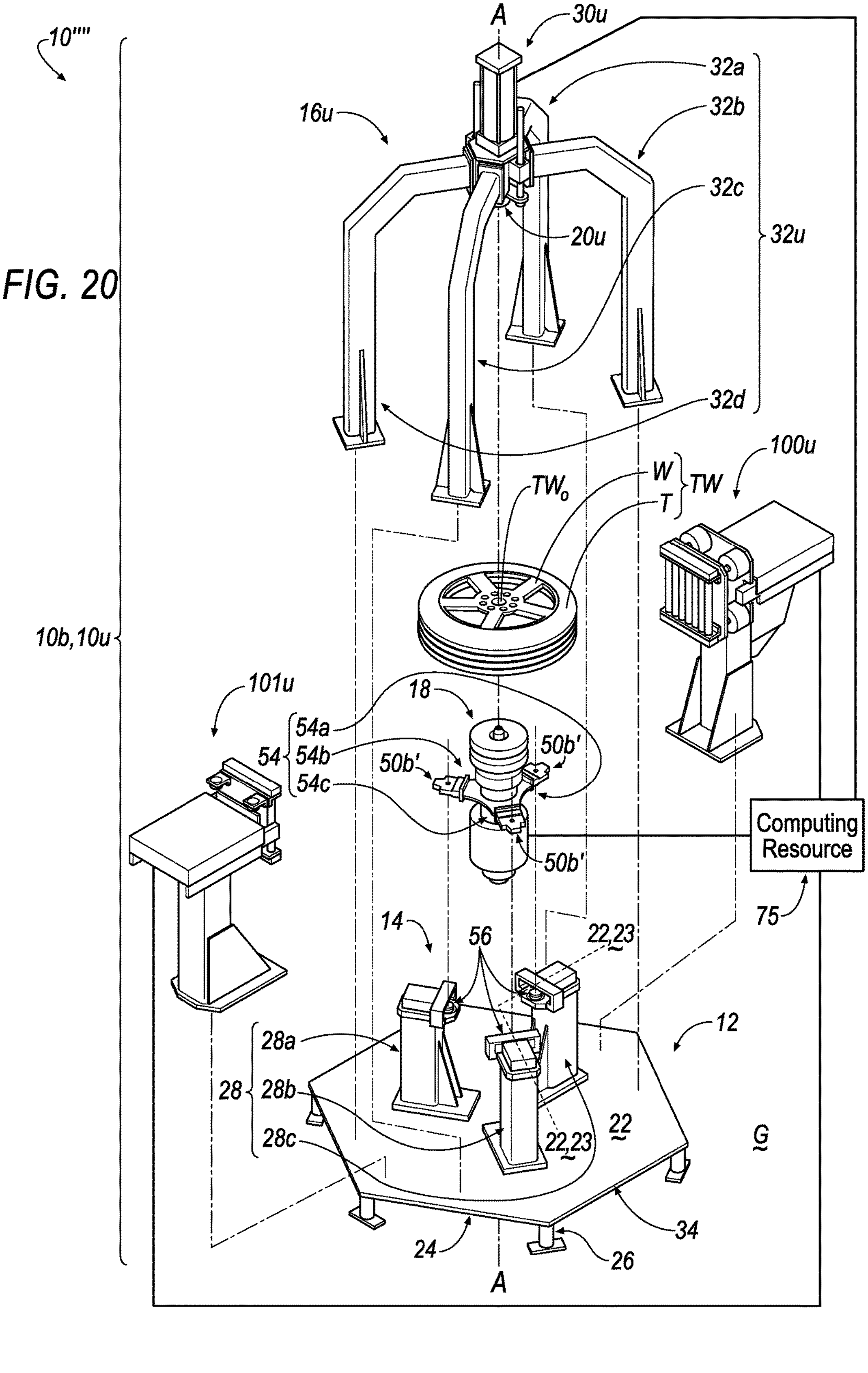
FIG. 20 is an exploded view of an apparatus for processing a tire and a wheel in accordance with an exemplary embodiment of the invention.

Referring to FIG. 20, an exemplary apparatus is shown generally at 10"". In some instances, the apparatus 10"" may be structurally configured in a manner to provide a first function, which may be related to an act of balancing; the act of balancing may include, for example: (1) teaching a computing resource 75 a variety of imbalance configurations that may be exhibited by an inflated tire-wheel assembly, TW, by arranging a calibration disk, CD (as seen in, e.g., FIGS. 22C-22E), upon the apparatus 10"", and (2) arranging an inflated tire-wheel assembly, TW (as seen, e.g., FIGS. 22C'-22E'), upon the apparatus 10"" for determining imbalance (which may be quantified in gram-centimeters), if any, of the inflated tire-wheel assembly, TW (which may be determined in view of, for example, a learned state of imbalance provided to the computing resource 75 from a previous application of the calibration disk, CD, to the apparatus 10"" as described above). Additionally, the apparatus 10"" may be structurally configured in a manner to provide a second function, which may be an act of determining uniformity of a tire, T, of an inflated tire-wheel assembly, TW (as seen, e.g., FIGS. 23A-23E). Therefore, the apparatus 10"" may be generally referred as a "two-in-one" combination apparatus 10"" that may sequentially perform the acts of balancing and determining uniformity, which may expedite the processing of an inflated tire-wheel assembly, TW, due to the fact that the inflated tire-wheel assembly, TW, may be disposed upon one structure (i.e., the apparatus 10"") that is capable of performing more than one tire-wheel assembly processing function (i.e., balancing and determining uniformity).

Structural components of the apparatus 10"" that are exclusive to the balancing function may include a "b" appended to a reference numeral; accordingly, a 'balancing device' is generally represented at, for example reference numeral "10*b*". In a substantially similar manner, structural components of the apparatus 10"" directed to the uniformity function may include a "u" appended to a reference numeral; accordingly, a 'uniformity device' is generally represented at, for example, reference numeral "10*u*". In some instances, structural components may not be appended with a "b" or a "u" reference numeral designation; accordingly, such structural components may be associated with either of the balancing device 10*b* and the uniformity device 10*u*.

The Balancing Device 10*b* of the Apparatus 10""

Figure 21:
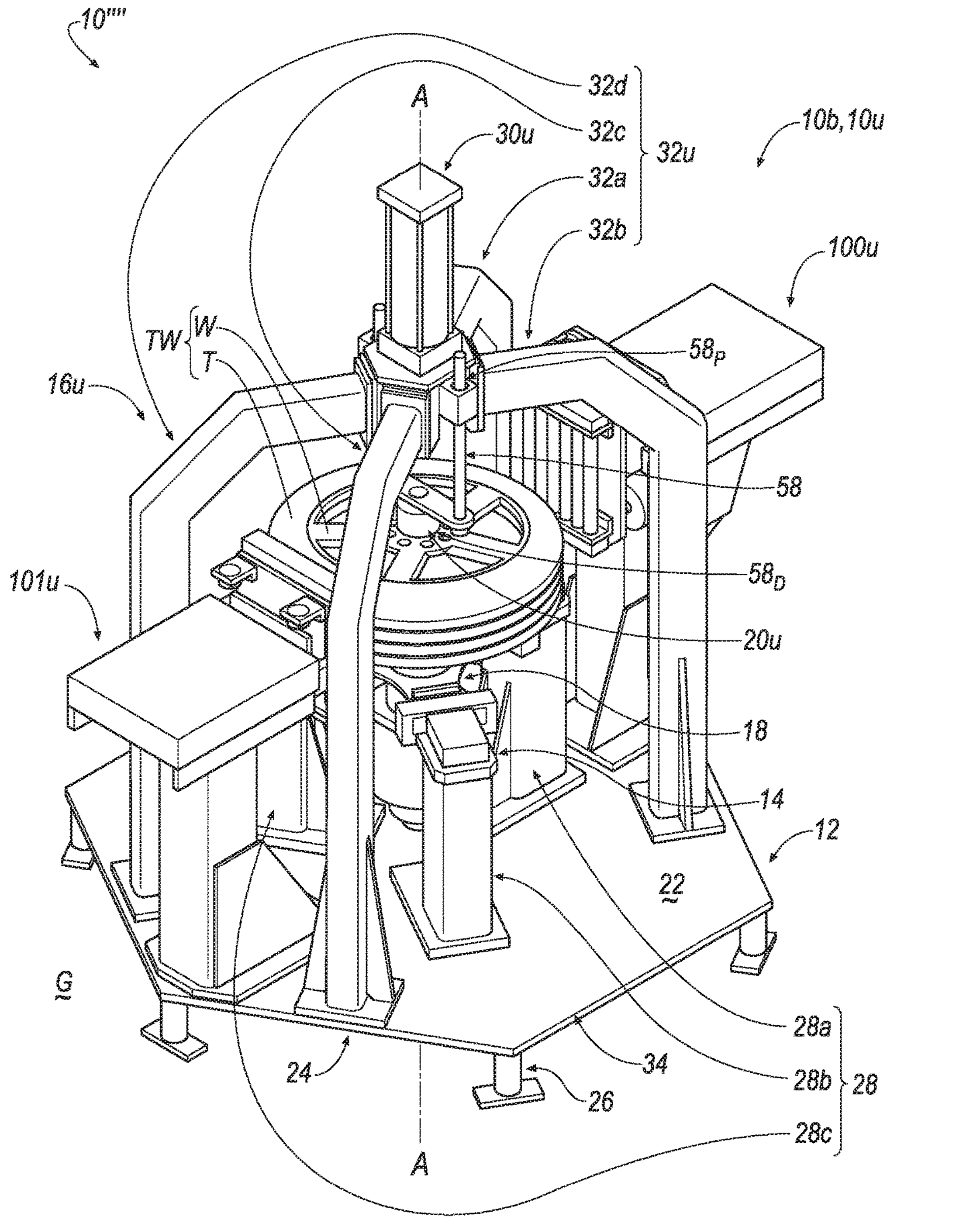
FIG. 21 is an assembled view of the apparatus of FIG. 20.

Referring initially to FIGS. 20-21, the balancing device 10*b* generally includes a base member 12, a lower support member 14, an upper support member 16*u*, a lower workpiece-engaging portion 18 and an upper workpiece-engaging portion 20*u*. The base member 12 is arranged upon an underlying ground surface, G. The lower support member 14 and the upper support member 16*u* are arranged upon the base member 12. The lower support member 14 is connected to the lower workpiece-engaging portion 18. The upper support member 16*u* is connected to the upper workpiece-engaging portion 20*u*.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28*a*, 28*b*, 28*c*.

The upper support member 16*u* may include a canopy member 30*u* including a plurality of leg members 32*u*. In an example, the plurality of leg members 32*u* may include four leg members 32*a*, 32*b*, 32*c*, 32*d*.

Each pedestal member 28*a*-28*c* of the plurality of pedestal members 28 of the lower support member 14 is disposed upon the upper surface 22 of the base member 12 such that each pedestal member 28*a*-28*c* of the plurality of pedestal members 28 are arranged radially inwardly closer to a central axis, A-A, extending through an axial center of the base member 12 and away from an outer perimeter 34 of the base member 12. Each leg 32*a*-32*d* of the plurality of leg members 32*u* of the upper support member 16*u* is disposed upon the upper surface 22 of the base member 12 such that each leg 32*a*-32*d* of the plurality of leg members 32*u* are arranged proximate the outer perimeter 34 of the base member 12 and radially away from the central axis, A-A, extending through the axial center of the base member 12.

Referring to FIGS. 22A-22E', the lower workpiece-engaging portion 18 includes a central shaft 36 having a proximal end $\mathbf{36}_P$ and a distal end $\mathbf{36}_D$. The central shaft 36 is defined by an elongated body 38 that extends between the proximal end $\mathbf{36}_P$ and the distal end $\mathbf{36}_D$. The central axis, A-A, is axially-aligned with an axial center of the elongated body 38 of the central shaft 36.

The lower workpiece-engaging portion 18 may also include a motor 40 disposed within a motor housing 42. The proximal end $\mathbf{36}_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $\mathbf{36}_D$ of the central shaft 36.

The motor 40 may be actuated in order to, for example, cause rotation, R, of the central shaft 36. In some instances the central shaft 36 may be rotated approximately 300 rpm; in such an example, 300 rmp may be considered to be 'high speed' in order to impart inertia forces for conducting the balancing function. The motor 40 may also be actuated to impart movement of/spatially manipulate the workpiece-engaging chuck 44. Movement of the workpiece-engaging chuck 44 may include: (1) radial outward movement (for coupling the distal end $\mathbf{36}_D$ of the central shaft 36 to a workpiece, CD/TW) or (2) radial inward movement (for de-coupling the distal end $\mathbf{36}_D$ of the central shaft 36 from the workpiece, CD/W).

Actuation of the motor 40 (for the purpose of rotating, R, the central shaft 36 or causing movement of the workpiece-engaging chuck 44) may occur as a result of a signal sent from the computing resource 75 to the motor 40. The computing resource 75 may be, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

The lower workpiece-engaging portion 18 may also include a plurality of components 46, 48, 50b' that are disposed upon the elongated body 38 of the central shaft 36; the plurality of components 46, 48, 50b' may include, for example: a workpiece inboard surface-engaging member 46, an angular encoder 48 and a plurality of multi-axis transducers 50b'; as seen in FIG. 20u, the balancing device 10b may include three transducers defining the plurality of multi-axis transducers 50b'. The workpiece inboard surface-engaging member 46 may be connected to the elongated body 38 of the central shaft 36 proximate the workpiece-engaging chuck 44 and the distal end $36_D$ of the central shaft 36. The plurality of multi-axis transducers 50b' may be connected to the elongated body 38 of the central shaft 36 proximate, for example, the proximal end $36_P$ of the central shaft 36; each transducer of the plurality of multi-axis transducers 50b' may be, for example, a strain gauge transducer or a piezoelectric transducer. The angular encoder 48 may be connected to the elongated body 38 of the central shaft 36 at, for example, a location between the workpiece inboard surface-engaging member 46 and the plurality of multi-axis transducers 50b'.

As mentioned above, structural components of the apparatus 10"" directed to the balancing function may include a "b" appended to a reference numeral. Therefore, as seen in the above-described exemplary embodiment, the plurality of multi-axis transducer 50b' are exclusive to the balancing device 10b.

The lower workpiece-engaging portion 18 may also include at least one lock-up mechanism 52 (e.g., at least one clutch). Referring to FIGS. 22A-22E', the at least one lock-up mechanism 52 is/are shown arranged about each multi-axis transducer 50b' of the balancing device 10b. The at least one lock-up mechanism 52 is/are incorporated into the design of the apparatus 10"" due to the fact that the apparatus 10"" provides both of the functions described above, being: (1) an act of balancing, and (2) determining uniformity.

When the at least one lock-up mechanism 52 is/are arranged in an "engaged state" (see, e.g., FIG. 22A), the at least one lock-up mechanism 52 selectively mechanically joins each multi-axis transducer 50b' with the elongated body 38 of the central shaft 36 such that each multi-axis transducer 50b' mechanically locks-out moment forces imparted during rotation, R, of the central shaft 36 upon actuation of the motor 40; also, when the at least one lock-up mechanism 52 is/are arranged in the engaged state, the at least one multi-axis transducer 50b may be said to be taken offline/arranged in an "open circuit" state (see, e.g. "X" in a circle at FIGS. 22A and 23A-23E) such that the at least one multi-axis transducer 50b is not permitted to communicate signals to the computing resource 75 by way of the one or more communication conduits 77. Conversely, when the at least one lock-up mechanism 52 is/are arranged in a "disengaged state" (see, e.g., FIG. 12B) the at least one multi-axis transducer 50b may be said to be selectively mechanically open with the elongated body 38 of the central shaft 36 (thereby permitting the at least one multi-axis transducer 50b to sense moment forces imparted during rotation, R, of the central shaft upon actuation of the motor 40) while the at least one multi-axis transducer 50b is placed online/arranged in a "closed circuit" (see, e.g., "check mark" in a circle at FIGS. 22B-22E') state such that the at least one multi-axis transducer 50b is permitted to communicate signals indicative of an imbalance of a workpiece, CD/TW, to the computing resource 75 by way of the one or more communication conduits 77. Therefore, as a result of selectively-mechanically-disjoining the multi-axis transducer 50b' with the elongated body 38 of the central shaft 36, the apparatus 10"" may be said to operate in a manner that exploits the balancing function of the two available functions of the apparatus 10"". As a result of selectively-mechanically-connecting the multi-axis transducer 50b' to the elongated body 38 of the central shaft 36, the apparatus 10"" may be said to operate in a manner that exploits the uniformity function of the two available functions of the apparatus 10"". The at least one lock-up mechanism 52 may be communicatively-coupled to the computing resource 75 by way of the one or more communication conduits 77; therefore, the engaged or disengaged state of the lock-up mechanism may be determined in response to a signal communicated from computing resource 75 to the at least one lock-up mechanism 52 over the one or more communication conduits 77.

Aside from permitting the apparatus 10"" to be selectively-arranged in a mode of operation that provides one of the balancing function or the uniformity function, the state of the at least one lock-up mechanism 52 may also protect the structural integrity of the multi-axis transducer 50b' when the mode of the apparatus 10"" is selectively-arranged in the uniformity mode of operation. As will be described in the following disclosure, the uniformity device 10u exerts a radial load on the central shaft 36 during a uniformity test; therefore, if the multi-axis transducer 50b' were to otherwise not be mechanically connected to the central shaft 36, the radially-exerted load could be potentially damage the multi-axis transducer 50b'.

In an example, the lower support member 14 may be connected to the lower workpiece-engaging portion 18 as follows. As seen in, for example, FIGS. 22A-22E', a plurality of radially-projecting support arms 54 may extend radially outwardly from a non-rotating structural member of the lower workpiece-engaging portion 18, such as, for example, a bearing bracket 55 that is connected to the motor housing 42.

With reference to FIG. 20, the plurality of radially-projecting support arms 54 may include, for example, a first radially-projecting support arm 54a, a second radially-projecting support arm 54b and a third radially-projecting support arm 54c. Each transducer of the plurality of multi-axis transducers 50b' is arranged upon or connected to a distal end of each radially-projecting support arm 54a-54c of the plurality of radially-projecting support arms 54. Each pedestal member 28a-28c of the plurality of pedestal members 28 may include a shoulder portion 56. Referring to FIGS. 22A-22E', each transducer of the plurality of multi-axis transducers 50b' is arranged upon or connected to a distal end of each radially-projecting support arm 54a-54c of the plurality of radially-projecting support arms 54 may be disposed upon and connected to the shoulder portion 56 of each pedestal member 28a-28c of the plurality of pedestal members 28.

With reference to FIGS. 20-21 and 22A-22E', the upper workpiece-engaging portion 20u may include an axially-movable cylinder 58. A proximal end $58_P$ of the axially-movable cylinder 58 is connected to the canopy member 30u of the upper support member 16*u*. A distal end $58_D$ of the axially-movable cylinder 58 includes a recess 60 that is sized for receiving the radially inwardly/outwardly manipulatable workpiece-engaging chuck 44.

Method for Utilizing the Apparatus 10""—Calibration Disk, CD

As described above, one of the acts of balancing provided by the apparatus 10"" may include, for example, teaching the computing resource 75 a variety of imbalance configurations that may be exhibited by an inflated tire-wheel assembly, TW, by arranging a calibration disk, CD, upon the apparatus 10"". An exemplary method for utilizing the apparatus 10"" as described immediately above may be seen at FIGS. 22A-22B and 22C-22E. The balancing device 10*b* may be referred to as a "two plane" balancer for the upper plane (e.g., outboard side) and the lower plane (e.g., inboard side) of the tire-wheel assembly, TW, in order to correct the static component and the couple component of the tire-wheel assembly, TW (i.e., the balancing device 10*b* may contribute to dynamically balancing the tire-wheel assembly, TW).

Figure 22A:
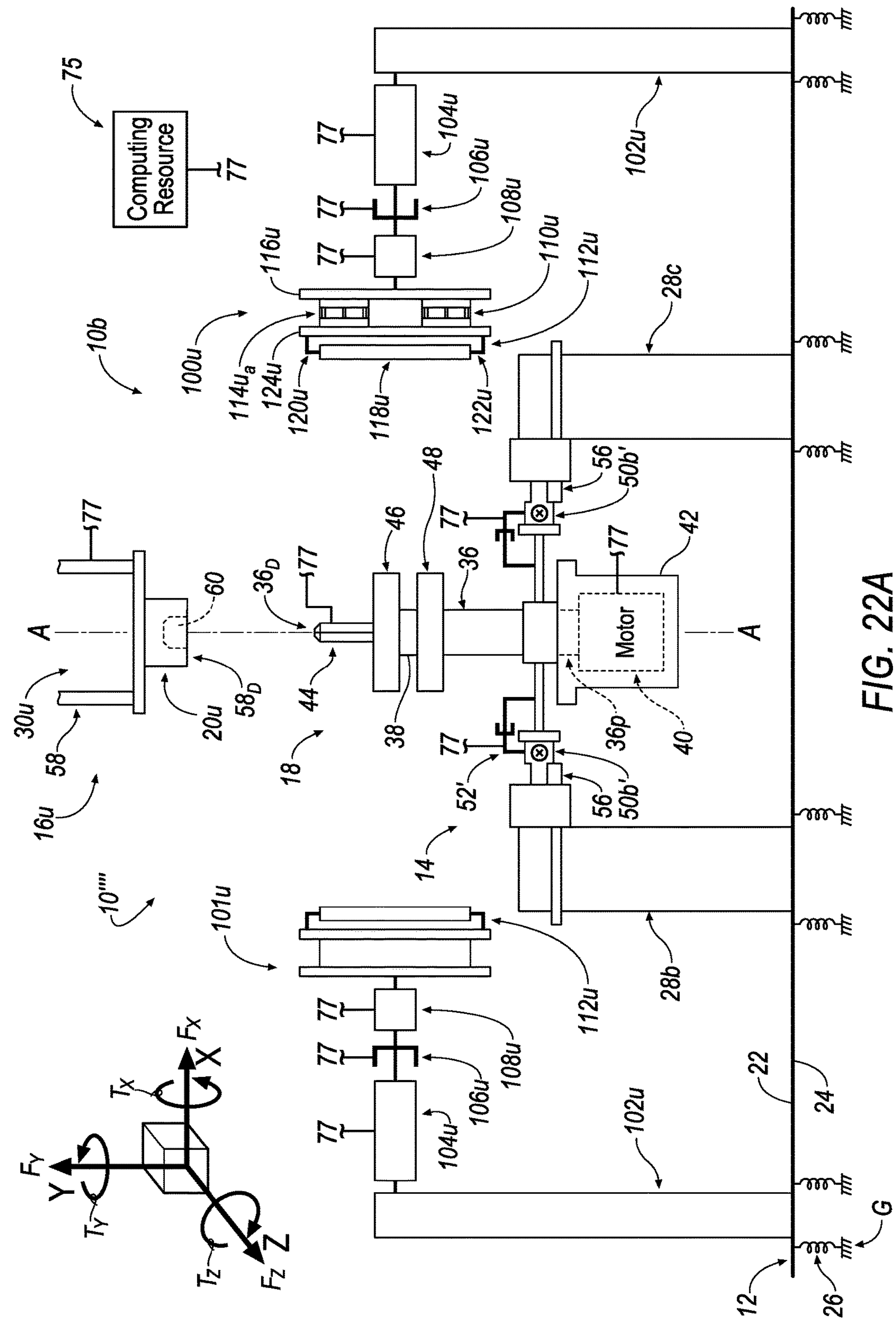
FIG. 22A is a first section side view of the apparatus of FIG. 20 according to line 22, 23-22, 23.

Firstly, as seen in FIG. 22A, the at least one lock-up mechanism 52 is shown in an engaged state such that the multi-axis transducer 50*b*' is selectively mechanically connected to the elongated body 38 of the central shaft 36; as a result, the multi-axis transducer 50*b*' mechanically locks-out moment forces imparted during rotation, R, of the central shaft 36 upon actuation of the motor 40. Then, referring to FIG. 22B, upon communicating a signal from computing resource 75 to the at least one lock-up mechanism 52 over the one or more communication conduits 77, the at least one lock-up mechanism 52 may be selectively-arranged in a disengaged state (according to arrow, D1, in FIG. 22A) thereby permitting the at least one multi-axis transducer 50*b* to sense moment forces imparted during rotation, R, of the central shaft 36 upon actuation of the motor.

Figure 22B:
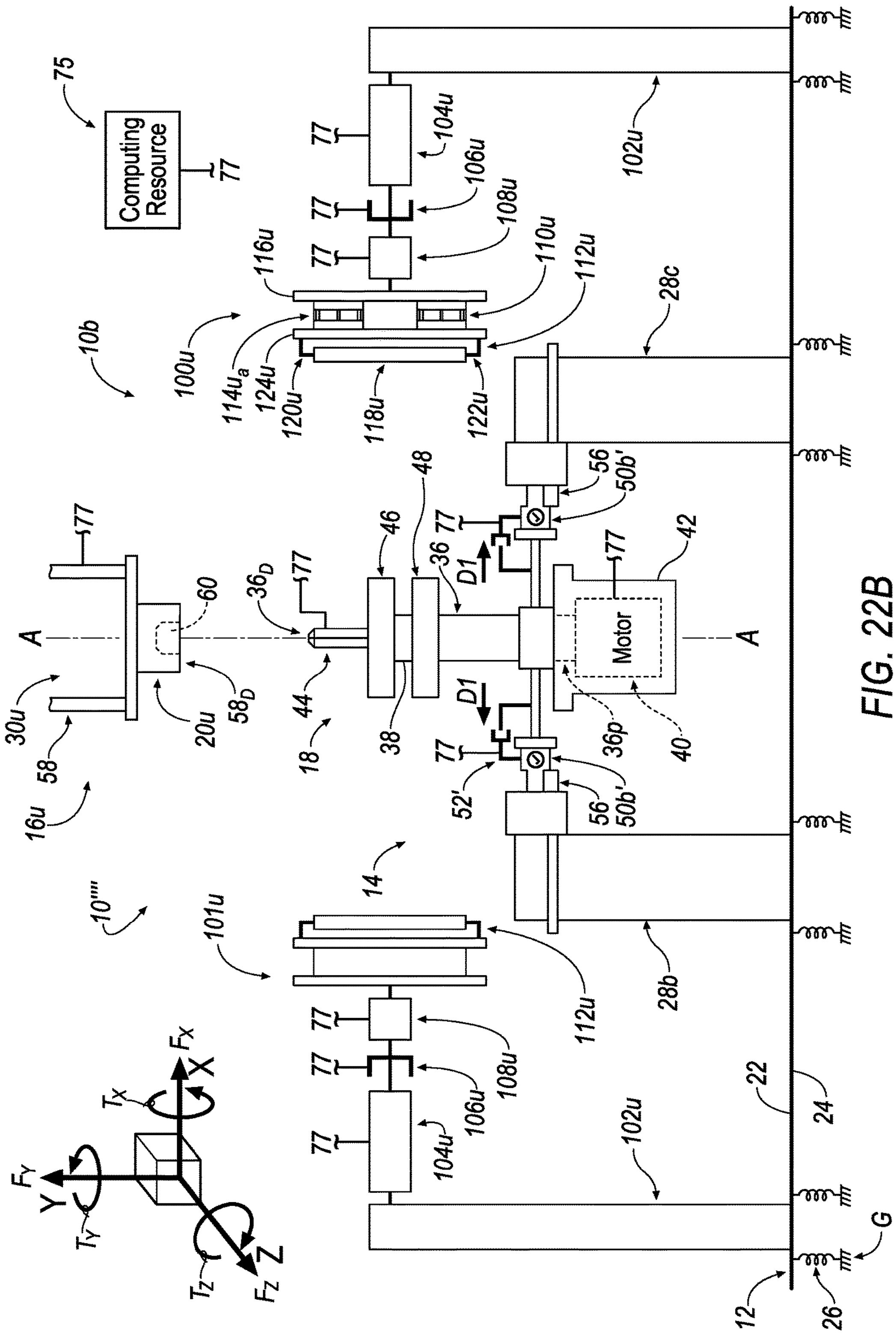
FIG. 22B is a second section side view of the apparatus of FIG. 20 according to line 22, 23-22, 23.
Figure 22C:
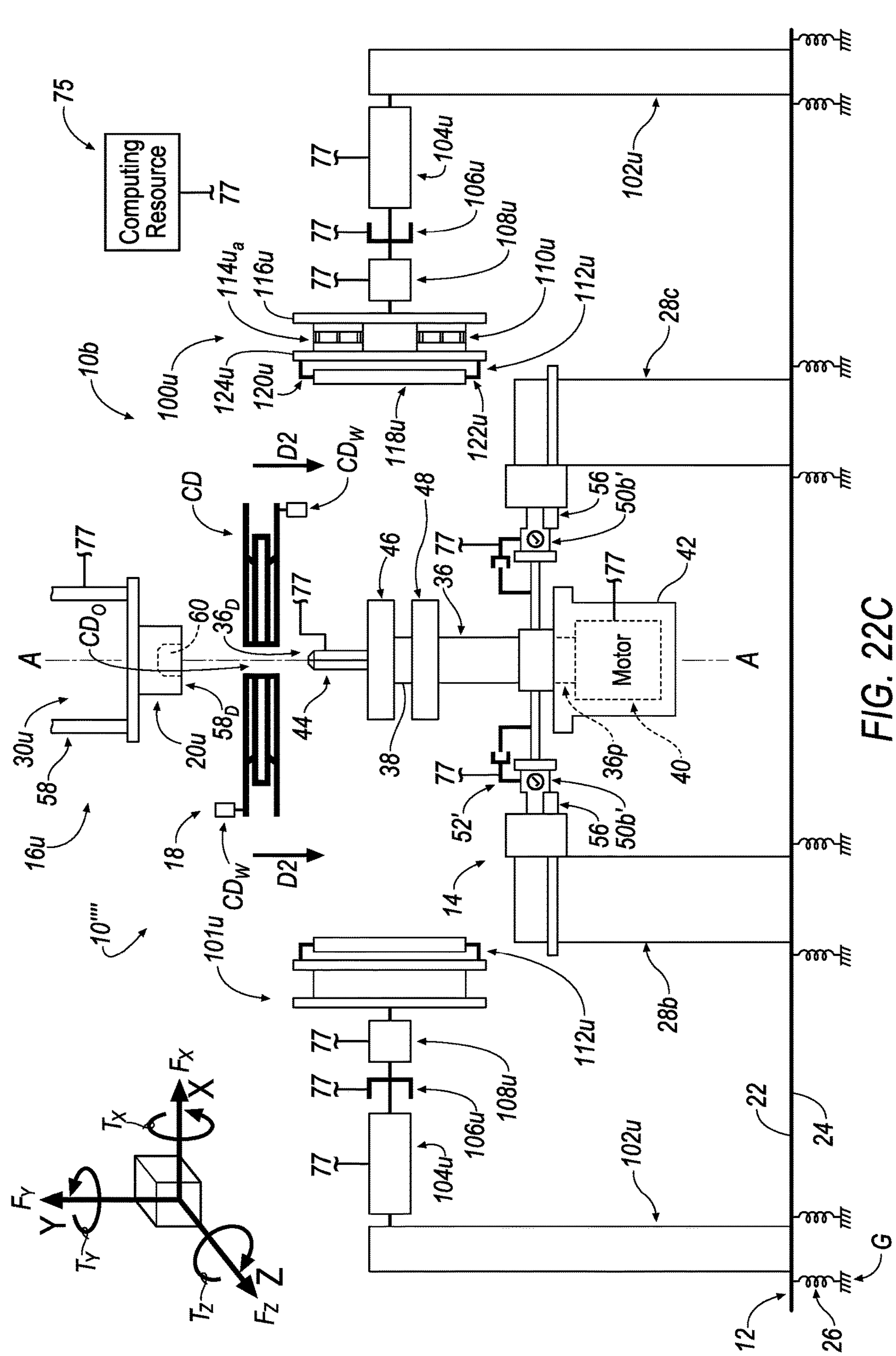
FIGS. 22C-22E are section side views of the apparatus of FIG. 22B being interfaced with a calibration disk.
Figure 22C:
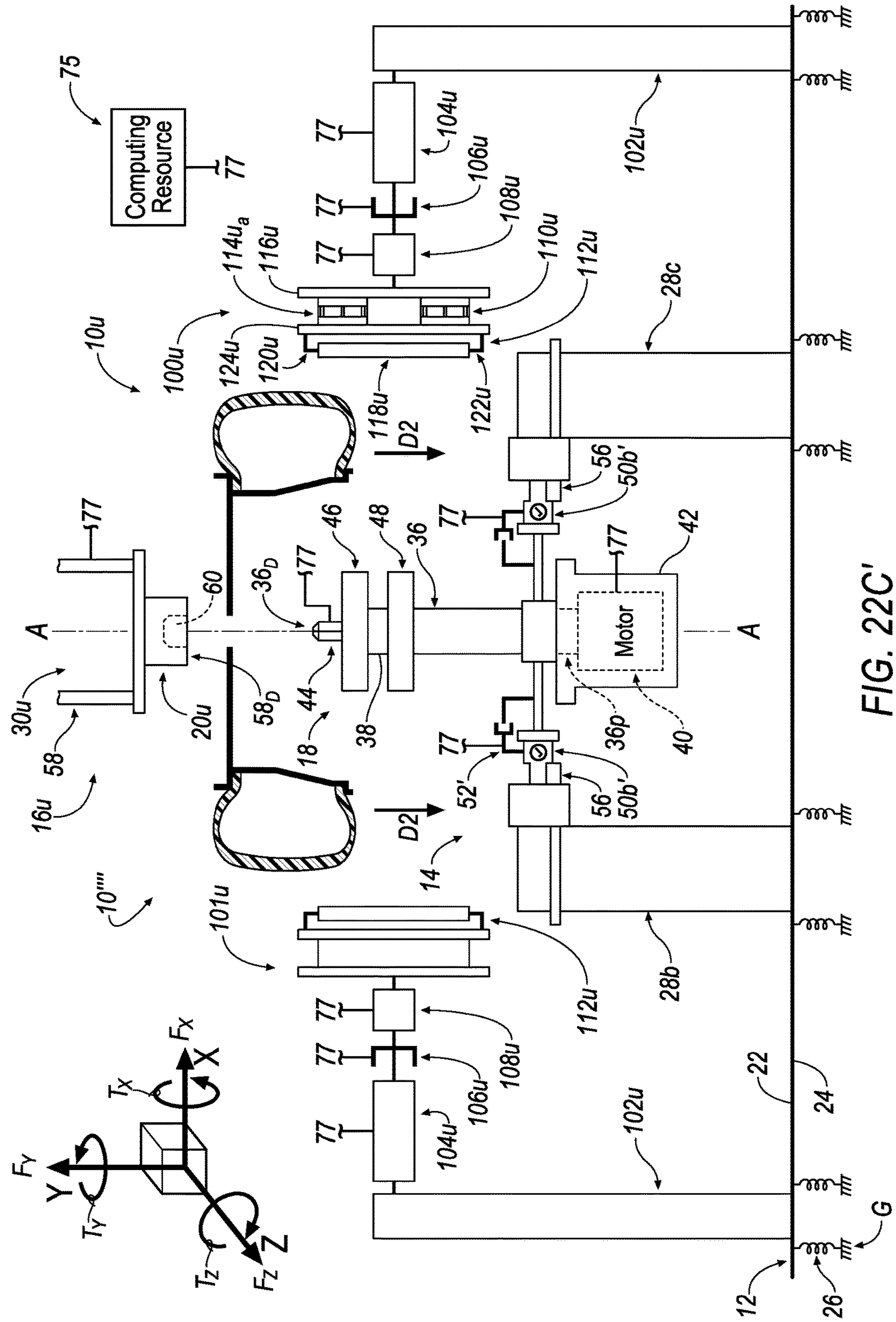

Referring to FIG. 22C, once the multi-axis transducer 50*b*' is permitted to rotate, R, with the central shaft 36 as described above, the calibration disk, CD, may be arranged upon the workpiece inboard surface-engaging member 46 of the lower workpiece-engaging portion 18. The calibration disk, CD, may be disposed upon the workpiece inboard surface-engaging member 46 as follows.

In an example, a central opening, $CD_O$, of the calibration disk, CD, may be axially-aligned with the central axis, A-A, such that the central opening, $CD_O$, may be arranged over the radially inwardly/outwardly manipulatable workpiece-engaging chuck 44, which is also axially-aligned with the central axis, A-A. Then, the calibration disk, CD, may be moved according to the direction of the arrow, D2, such that the distal end $36_D$ of the central shaft 36 is inserted through the central opening, $CD_O$, of the calibration disk, CD, whereby an inboard surface, $CD_{IS}$, of the calibration disk, CD, may be disposed adjacent the workpiece inboard surface-engaging member 46 of the lower workpiece-engaging portion 18.

Figure 22D:
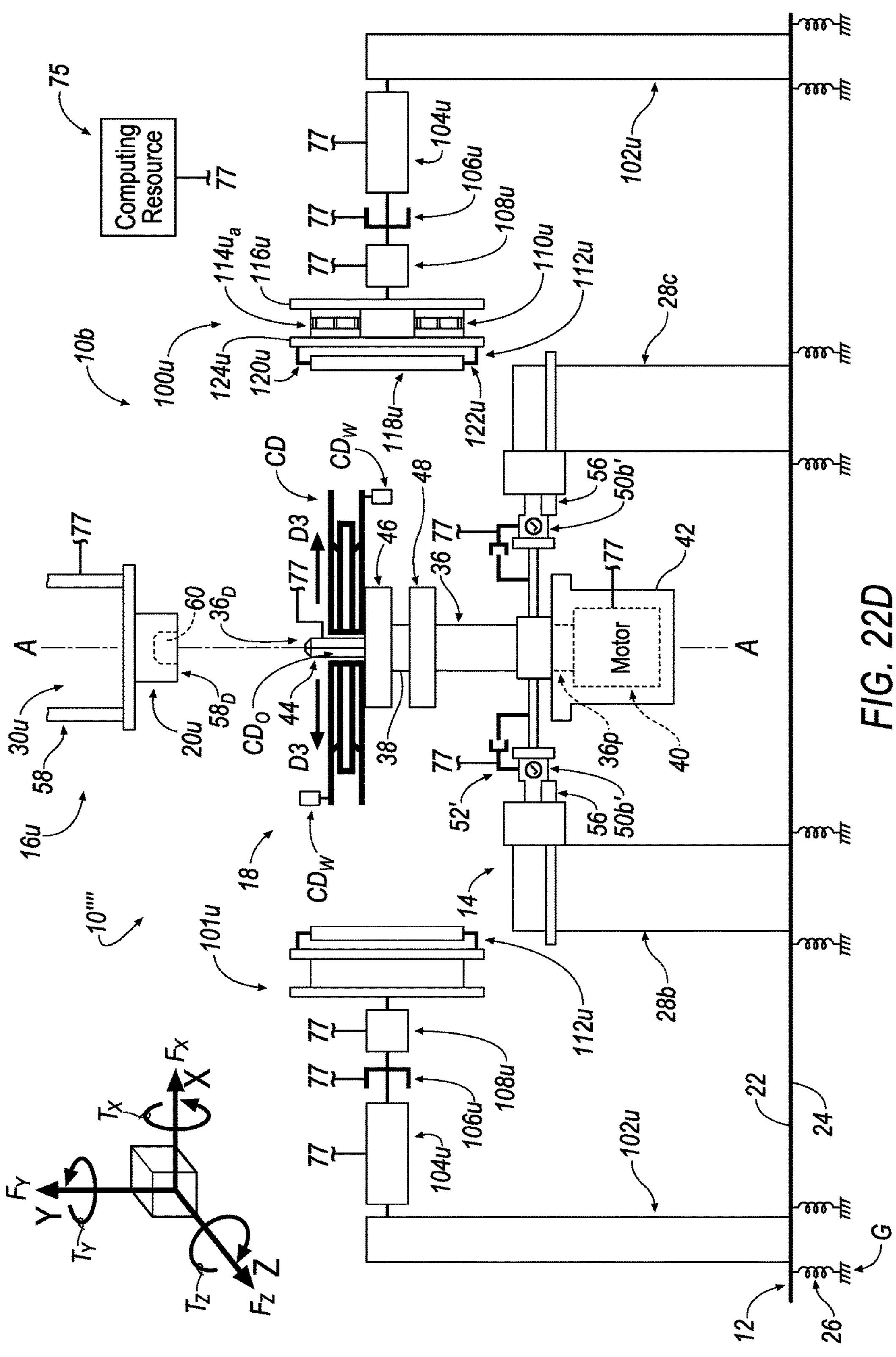
Figure 22D:
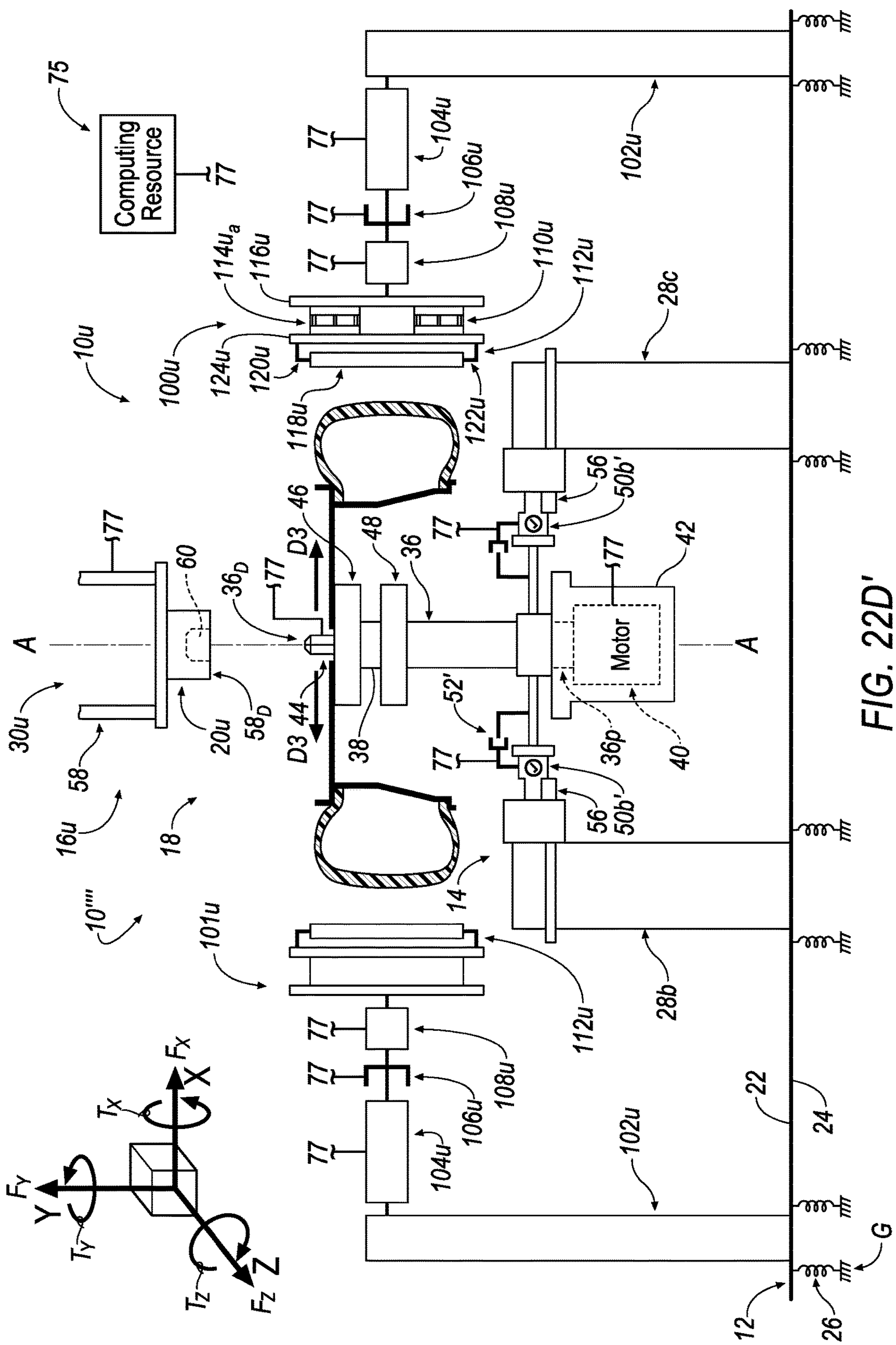

Referring to FIG. 22D, once the calibration disk, CD, is disposed adjacent the workpiece inboard surface-engaging member 46 of the lower workpiece-engaging portion 18, the calibration disk, CD, is selectively-retained to the lower workpiece-engaging portion 18 as a result of the radially inwardly/outwardly manipulatable workpiece-engaging chuck 44 being expanded in a radially outward direction according to the direction of the arrow, D3. Here, it should be noted that the upper workpiece-engaging portion 20*u* does not plunge toward the calibration disk, CD, after the workpiece-engaging chuck 44 expands in a radially outward direction according to the direction of the arrow, D3 (as the upper workpiece-engaging portion 20*u* is not utilized during the balancing mode of the apparatus 10"").

Figure 22E:
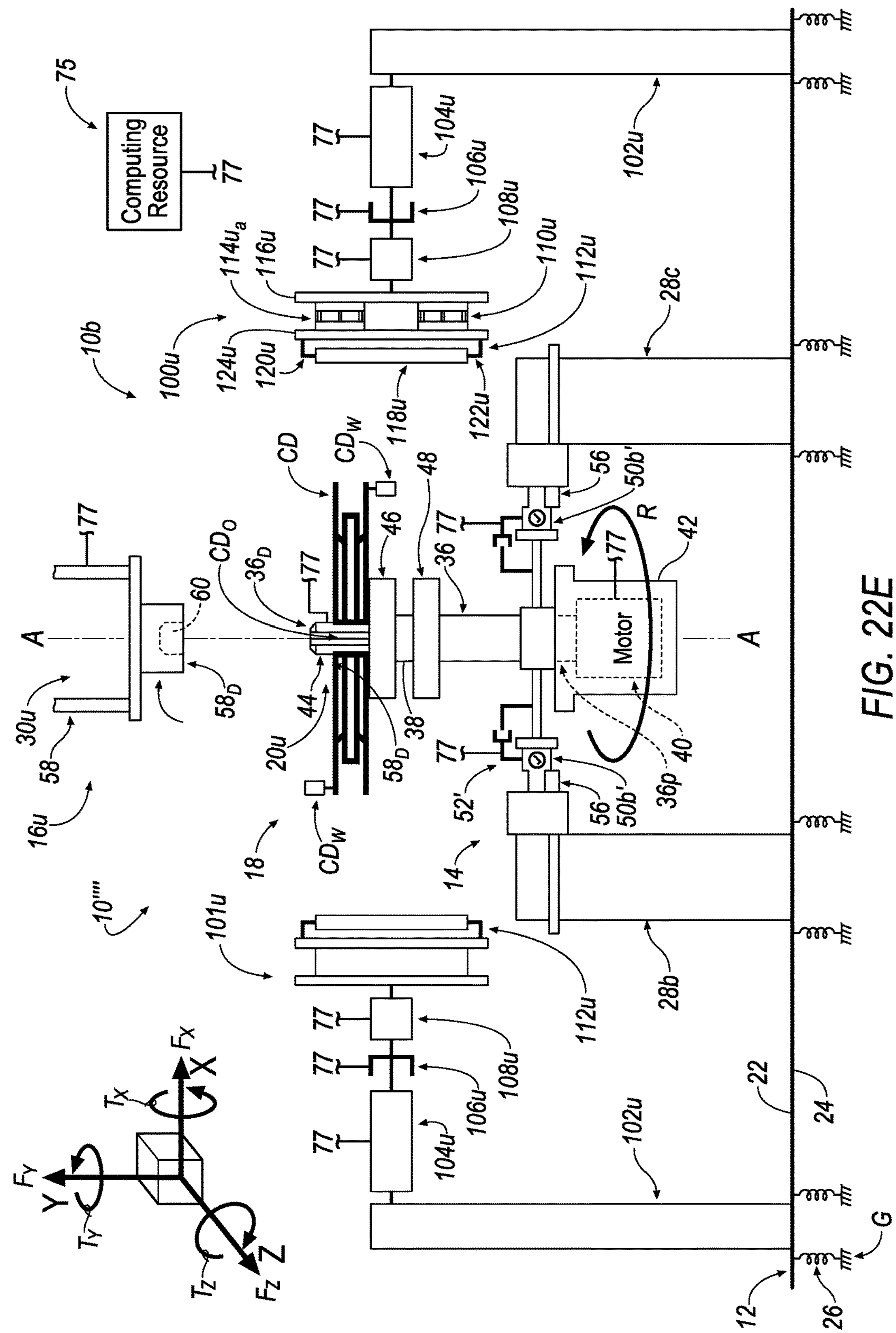
Figure 22E:
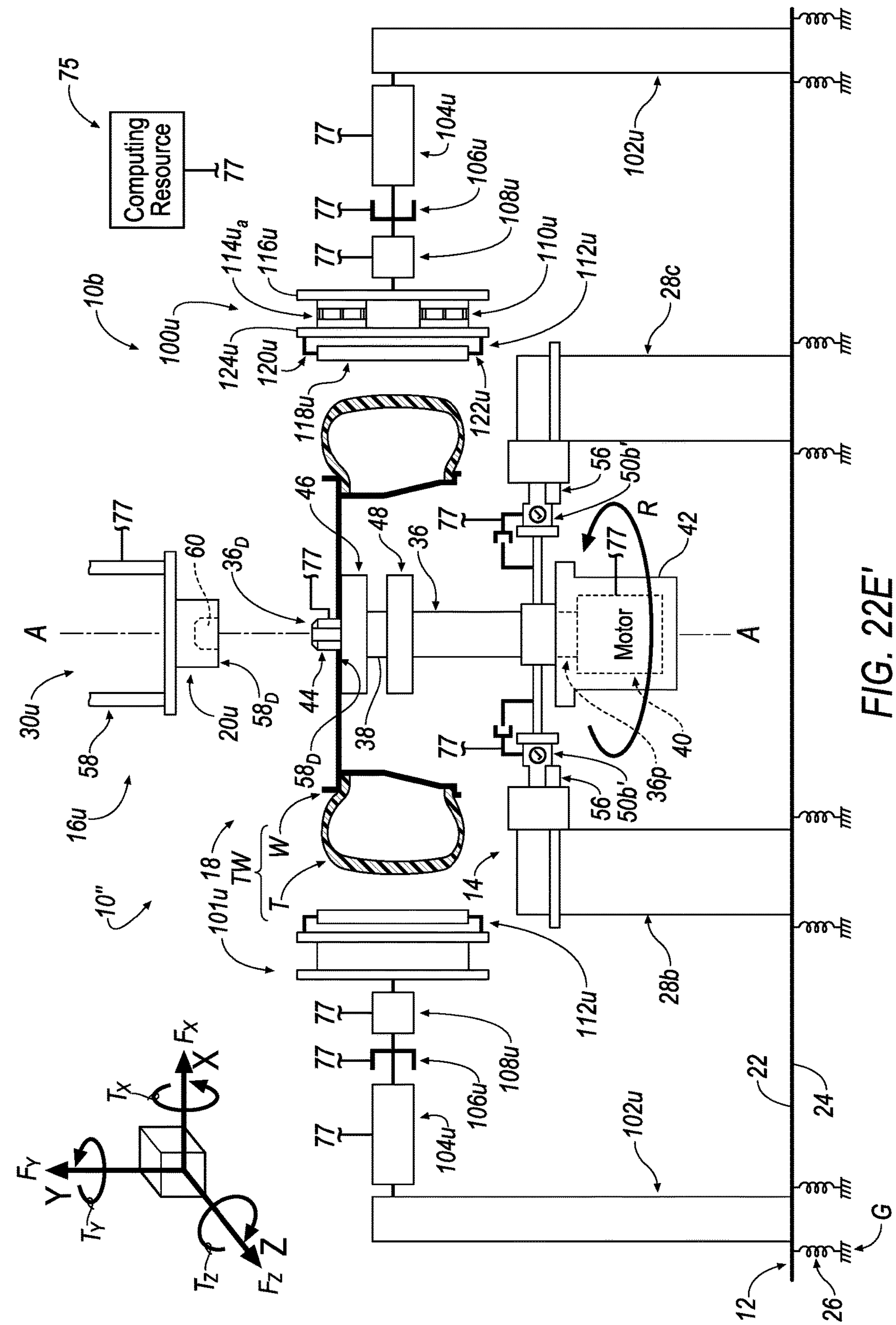

As seen in FIG. 22E, the motor 40 is subsequently actuated in order to impart rotation, R, to the central shaft 36, which is connected to all of: the workpiece inboard surface-engaging member 46 and the angular encoder 48. Because the calibration disk, CD, is disposed adjacent the workpiece inboard surface-engaging member 46 of the lower workpiece-engaging portion 18, the calibration disk, CD, rotates, R, with the workpiece inboard surface-engaging member 46 of the lower workpiece-engaging portion 18 such that the calibration disk, CD, is rotated at sufficient rotational speed for any components of mass imbalance associated therewith to produce measurable inertial forces.

Upon rotating, R, the central shaft 36, the plurality of multi-axis transducers 50*b*' may produce signals that are indicative of an imbalance of the calibration disk, CD (if an imbalance exists). Any determined imbalance of the calibration disk, CD, is communicated to the computing resource 75 by way of the one or more communication conduits 77 that are communicatively-coupled to each transducer of the plurality of multi-axis transducers 50*b*' to the computing resource 75.

The detected imbalance may be over-deterministically calculated in terms of at least one group of signals produced by the plurality of multi-axis transducers 50*b*', including: (1) a group of two or more torque-moment signals (see, e.g., $T_X$, $T_Y$, $T_Z$ in FIGS. 22A-22E) with each torque-moment signal about a respective axis of at least two axes (see, e.g., axes X, Y, Z in FIGS. 22A-22E) and (2) a group of two or more force signals (see, e.g., $F_X$, $F_Y$, $F_Z$ in FIGS. 22A-22E) with each force signal along a respective axis of the at least two axes (see, e.g., axes X, Y, Z in FIGS. 22A-22E). Mathematically, two-plane balancing may be achieved with two independent force or acceleration signals. Because each transducer of the plurality of multi-axis transducers 50*b*' is coined as a "multi-axis" transducer, the term "multi" defines the number of axes monitored by each transducer of the plurality of transducers 50*b*'; further, the number of axes include two or more of the axes that share the same origin and are orthogonal to one another. In an exemplary implementation, the number of axes may include three axes (see, e.g., axes X, Y, Z in FIGS. 22A-22E); although three orthogonal axes, X, Y, Z, are shown in FIGS. 22A-22E, some implementations may include two axes that are orthogonal relative one another such as, for example: (1) axis X orthogonal to axis Y, (2) axis X orthogonal to axis Z, or (3) axis Y orthogonal to axis Z. This may be referred to as an "over-determined" system where more channels than absolutely over-deterministically necessary, are used to perform the balancing operation. With the use of a minimum number of channels (i.e., two in the present example), any measurement error in either of the signals may add to significant error in the overall calculation. The device described here uses inverse force estimation, averaging the outputs of as many signals as practical, so as to have the error of any individual signal cause minimal distortion of a final resultant.

The calibration disc, CD, is manufactured to have very little imbalance (i.e., the calibration disc, CD, is purposely manufactured to be balanced with an acceptable imbalance). When attached to the apparatus 10"" and rotated, R, as described above, the calibration disk, CD, will functionally teach a computing resource 75 a variety of imbalance configurations that may be exhibited by an inflated tire-wheel assembly, TW; the variety of imbalance configurations may be determined by the computing resource 75 during a 'learning mode' whereby the magnitude and phase of the voltage gain output (e.g., voltage per unit of imbalance of the workpiece, for each plane) of each channel of each transducer of the plurality of multi-axis transducers 50$b'$ is communicated to the computing resource 75 over the one or more communication conduits 77. The imbalance configurations are selectively-determined by an operator that attaches one or more imbalance weights, $CD_W$ (see, e.g., FIG. 22E) to one or more of the inboard surface, $CD_{IS}$, and the outboard surface, $CD_{OS}$, of the calibration disk, CD. The selective attachment of the one or more imbalance weights, $CD_W$, may include not only selecting a specific amount of weight but also a specific angular location upon the calibration disk, CD. A process known as inverse force estimation is used whereas the signal gain (e.g., signal output per unit of imbalance) is calculated from the calibration measurements, for each channel of the transducer 50$b$ or for each channel of the plurality of multi-axis transducers 50$b'$.

In an example, one calibration weight, $CD_W$, having an amount of ‘X units’ may be attached to the outboard surface, $CD_{OS}$, of the calibration disk, CD, at an angular orientation of 279° of the calibration disk, CD. Therefore, upon rotation, R, of the calibration disk from 0° to 279°, the computing resource 75 will receive an imbalance signal produced by each transducer of the plurality of multi-axis transducers 50$b'$ indicative of ‘X units’ attached to the outboard surface, $CD_{OS}$, of the calibration disk, CD, at an angular orientation of 279°; accordingly, when an inflated tire-wheel assembly, TW, having an imbalance of ‘X units’ of the outboard surface at an angular orientation of 279°, is attached to the apparatus 10"" and rotated, R, in a substantially similar manner as described above, the computing resource 75 will recognize not only the imbalance amount but also the location of the imbalance. Upon determining the amount and location of the imbalance, the computing resource will record the imbalance and provide an operator or corresponding system with instructions for attaching an amount of weight and location to attach the weight to the wheel, W, of the inflated tire-wheel assembly, TW.

Method for Utilizing the Apparatus 10""—Inflated Tire-Wheel Assembly, TW

As described above, one of the acts of balancing provided by the apparatus 10"" may include, for example, determining imbalance (which may be quantified in gram-centimeters), if any, of an inflated tire-wheel assembly, TW. An exemplary method for utilizing the apparatus 10"" as described immediately above may be seen at FIGS. 22A-22B and 22C'-22E'.

Firstly, as seen in FIG. 22A, the at least one lock-up mechanism 52 is shown in an engaged state such that the multi-axis transducer 50$b'$ mechanically locks-out moment forces imparted during rotation, R, of the central shaft 36. Then, referring to FIG. 22B, upon communicating a signal from computing resource 75 to the at least one lock-up mechanism 52 over the one or more communication conduits 77, the at least one lock-up mechanism 52 may be selectively-arranged in a disengaged state (according to arrow, D1, in FIG. 22A); as a result, the multi-axis transducer 50$b'$ is permitted to sense moment forces imparted during rotation of the central shaft 36 upon actuation of the motor 40.

Referring to FIG. 22C', once the multi-axis transducer 50$b'$ is permitted to rotate, R, with the central shaft 36 as described above, the inflated tire-wheel assembly, TW, may be arranged upon the workpiece inboard surface-engaging member 46 of the lower workpiece-engaging portion 18.

The inflated tire-wheel assembly, TW, may be disposed upon the workpiece inboard surface-engaging member 46 as follows.

In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D2, such that the distal end 36$_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Referring to FIG. 22D', once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D3. Here, it should be noted that the upper workpiece-engaging portion 20$u$ does not plunge toward the tire-wheel assembly, TW, after the workpiece-engaging chuck 44 expands in a radially outward direction according to the direction of the arrow, D3 (as the upper workpiece-engaging portion 20$u$ is not utilized during the balancing mode of the apparatus 10").

As seen in FIG. 22E', the motor 40 is subsequently actuated in order to impart rotation, R, to the central shaft 36, which is connected to all of: the workpiece inboard surface-engaging member 46 and the angular encoder 48. Because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18 such that the tire-wheel assembly, TW, is rotated at sufficient rotational speed for any components of mass imbalance associated therewith to produce measurable inertial forces.

Upon rotating, R, the central shaft 36, each transducer of the plurality of multi-axis transducers 50$b'$ may produce signals that are indicative of an imbalance of the tire-wheel assembly, TW (if an imbalance exists). The communicated signal may be then used to determine the static and couple components of the imbalance (by firstly averaging the signals and then calculating imbalance from the average by using a geometric transform to convert the measured imbalance to effective imbalance mass magnitudes and phase angles at one or more locations (e.g., one or more correction planes) on the workpiece by comparing the calculation to a library or data look-up table of imbalance signatures that have been previously prepared as described above at FIGS. 3A-3D). Recommended correction masses are then determined using a geometric transform for the given wheel geometry. An ideal recommended correction may be computed directly, such as with the use of “cut-to-length” correction mass material, or an acceptable compromise may be selected from a library or data look-up table of imbalance signals that have been previously prepared as described above at FIGS. 22A-22B and 22C-22E in order to provide an operator or corresponding system with instructions for attaching an amount of weight and location to attach the weight to the wheel, W, of the inflated tire-wheel assembly, TW, in order to correct the determined imbalance of the inflated tire-wheel assembly, TW.

As described above, the detected imbalance may be over-deterministically calculated in terms of at least one group of signals produced by each transducer of the plurality of multi-axis transducers 50$b'$, including: (1) a group of two or more torque-moment signals (see, e.g., $T_X$, $T_Y$, $T_Z$ in FIGS. 22A-22B and 22C'-22E') with each torque-moment signal about a respective axis of at least two axes (see, e.g., axes X, Y, Z in FIGS. 22A-22B and 22C'-22E') and (2) a group of two or more force signals (see, e.g., $F_X$, $F_Y$, $F_Z$ in FIGS. 22A-22B and 22C'-22E') with each force signal along a respective axis of the at least two axes (see, e.g., axes X, Y, Z in FIGS. 22A-22B and 22C'-22E'). Mathematically, two-plane balancing may be achieved with two independent force or acceleration signals. Because each transducer of the plurality of transducers 50$b'$ is coined as a "multi-axis" transducer, the term "multi" defines the number of axes monitored by the transducer 50$b'$; further, the number of axes include two or more of the axes that share the same origin and are orthogonal to one another. In an exemplary implementation, the number of axes may include three axes (see, e.g., axes X, Y, Z in FIGS. 22A-22B and 22C'-22E'); although three orthogonal axes, X, Y, Z, are shown in FIGS. 22A-22B and 22C'-22E', some implementations may include two axes that are orthogonal relative one another such as, for example: (1) axis X orthogonal to axis Y, (2) axis X orthogonal to axis Z, or (3) axis Y orthogonal to axis Z.

In some instances, each axis (i.e., the X axis, the Y axis and the Z axis) of the multi-axis transducer 50$b'$ may have its own channel (generally represented by the one or more communication conduits 77); therefore, in some examples, the balancing device 10$b$ may include three channels each providing a voltage gain output (e.g., voltage per unit of imbalance of the workpiece, for each plane) that is communicated to the computing resource 75 over the one or more communication conduits 77. The software associated with the computing resource 75 will average the voltage gain output of each channel, and, if there is noise on any one of the channels, noise will be reduced (in the form of noise cancellation) as a result of the total number (e.g., in the present example, three) of channels being averaged together (i.e., the voltage gain output per unit of imbalance of stochastically measured and calculated by the computing resource 75). This may be referred to as an "over-determined" system where more channels than typically deemed to be absolutely deterministically needed, are used to perform the balancing operation. With the use of a minimum number of channels (i.e., two in the present example), any measurement error in either of the signals may add to significant error in the overall calculation. The device described here uses inverse force estimation, averaging the outputs of as many signals as practical, so as to have the error of any individual signal cause minimal distortion of a final resultant.

The Uniformity Device 10$u$ of the Apparatus 10""

Referring initially to FIGS. 20-21, the uniformity device 10$u$ generally includes a base member 12, a lower support member 14, an upper support member 16$u$, a lower workpiece-engaging portion 18 and an upper workpiece-engaging portion 20$u$. The base member 12 is arranged upon an underlying ground surface, G. The lower support member 14 and the upper support member 16$u$ are arranged upon the base member 12. The lower support member 14 is connected to the lower workpiece-engaging portion 18. The upper support member 16$u$ is connected to the upper workpiece-engaging portion 20$u$.

The base member 12 may include a platform having an upper surface 22 and a lower surface 24. The base member 12 may include a plurality foot members 26 extending from the lower surface 24 that elevates the base member 12 away from the underlying ground surface, G.

The lower support member 14 may include a plurality of pedestal members 28. In an example, the plurality of pedestal members 28 may include three pedestal members 28$a$, 28$b$, 28$c$.

The upper support member 16$u$ may include a canopy member 30$u$ including a plurality of leg members 32$u$. In an example, the plurality of leg members 32$u$ may include four leg members 32$a$, 32$b$, 32$c$, 32$d$.

Each pedestal member 28$a$-28$c$ of the plurality of pedestal members 28 of the lower support member 14 is disposed upon the upper surface 22 of the base member 12 such that each pedestal member 28$a$-28$c$ of the plurality of pedestal members 28 are arranged radially inwardly closer to a central axis, A-A, extending through an axial center of the base member 12 and away from an outer perimeter 34 of the base member 12. Each leg 32$a$-32$d$ of the plurality of leg members 32$u$ of the upper support member 16$u$ is disposed upon the upper surface 22 of the base member 12 such that each leg 32$a$-32$d$ of the plurality of leg members 32$u$ are arranged proximate the outer perimeter 34 of the base member 12 and radially away from the central axis, A-A, extending through the axial center of the base member 12.

Referring to FIGS. 23A-23E, the lower workpiece-engaging portion 18 includes a central shaft 36 having a proximal end $36_P$ and a distal end $36_D$. The central shaft 36 is defined by an elongated body 38 that extends between the proximal end $36_P$ and the distal end $36_D$. The central axis, A-A, is axially-aligned with an axial center of the elongated body 38 of the central shaft 36.

The lower workpiece-engaging portion 18 may also include a motor 42 disposed within a motor housing 42. The proximal end $36_P$ of the central shaft 36 is connected to the motor 40. In some instances, the motor 40 may be, for example, a servo motor.

The lower workpiece-engaging portion 18 may also include a radially inwardly/outwardly manipulatable workpiece-engaging chuck 44. The radially inwardly/outwardly manipulatable workpiece-engaging chuck 44 is connected to the distal end $36_D$ of the central shaft 36.

The motor 40 may be actuated in order to, for example, cause rotation, R, of the central shaft 36. In some instances the central shaft 36 may be rotated to a speed between approximately 60 rpm and 120 rpm; in such an example, a speed between approximately 60 rpm and 120 rpm may be considered to be 'low speed' in order to prevent inertia forces for conducting the uniformity function. The motor 40 may also be actuated to impart movement of/spatially manipulate the workpiece-engaging chuck 44. Movement of the workpiece-engaging chuck 44 may include: (1) radial outward movement (for coupling the distal end $36_D$ of the central shaft 36 to a wheel, W) or (2) radial inward movement (for de-coupling the distal end $36_D$ of the central shaft 36 from the wheel, W).

Actuation of the motor 40 (for the purpose of rotating, R, the central shaft 36 or causing movement of the workpiece-engaging chuck 44) may occur as a result of a signal sent from a computing resource 75 to the motor 40. The computing resource 75 may be, for example, a digital computer and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing resource 75 may be communicatively-coupled (e.g., wirelessly or hardwired by, for example, one or more communication conduits 77 to, for example, the motor 40).

The lower workpiece-engaging portion 18 may also include a plurality of components 46, 48 that are disposed upon the elongated body 38 of the central shaft 36; the plurality of components 46, 48 may include, for example: a workpiece inboard surface-engaging member 46 and an angular encoder 48. The workpiece inboard surface-engaging member 46 may be connected to the elongated body 38 of the central shaft 36 proximate the workpiece-engaging chuck 44 and the distal end $36_D$ of the central shaft 36. The angular encoder 48 may be connected to the elongated body 38 of the central shaft 36 at any desirable location along the central shaft 36.

In an example, the lower support member 14 may be connected to the lower workpiece-engaging portion 18 as follows. As seen in, for example, FIGS. 23A-23E, a plurality of radially-projecting support arms 54 may extend radially outwardly from a non-rotating structural member of the lower workpiece-engaging portion 18, such as, for example, the motor housing 42. Referring to FIG. 20, the plurality of radially-projecting support arms 54 may include, for example, a first radially-projecting support arm 54*a*, a second radially-projecting support arm 54*b* and a third radially-projecting support arm 54*c*. Each pedestal member 28*a*-28*c* of the plurality of pedestal members 28 may include a shoulder portion 56. A distal end $54_D$ of each of the first, second and third radially-projecting support arms 54*a*, 54*b*, 54*c* may be disposed upon and connected to the shoulder portion 56 of each pedestal member 28*a*-28*c* of the plurality of pedestal members 28.

Referring to FIGS. 20-21, the upper workpiece-engaging portion 20*u* may include an axially-movable cylinder 58. A proximal end $58_P$ of the axially-movable cylinder 58 is connected to the canopy member 30*u* of the upper support member 16*u*. A distal end $58_D$ of the axially-movable cylinder 58 includes a recess 60 that is sized for receiving the radially inwardly/outwardly manipulatable workpiece-engaging chuck 44 (when the workpiece-engaging chuck 44 is arranged in the radially-expanded state and engaged with a central passage of a wheel, W).

Referring to FIGS. 20-21 and 23A-23E, the uniformity device 10*u* also includes a tire tread-engaging portion 100*u*. As mentioned above, structural components of the apparatus 10"" directed to the uniformity function may include a "u" appended to a reference numeral. Therefore, as seen in the above-described exemplary embodiment, the tire tread-engaging portion 100*u* is exclusive to the uniformity device 10*u*.

As seen in, for example, FIGS. 23A-23E, the tire tread-engaging portion 100*u* may include a pedestal member 102*u*, a radially-movable cylinder or servo mechanism 104*u*, cylinder or servo lock 106*u*, an applied load-detecting portion 108*u*, a tire uniformity-detecting portion 110*u* and a tire tread-engaging member 112*u*. The pedestal member 102*u* is connected to the radially-movable cylinder or servo mechanism 104*u* such that the radially-movable cylinder or servo mechanism 104*u* may move in a radially inwardly direction toward or away from the central axis, A-A. The cylinder lock 106*c* is connected to the radially-movable cylinder or servo mechanism 104*u*. The applied load-detecting portion 108*u* is connected to the radially-movable cylinder or servo mechanism 104*u*. The tire uniformity detecting portion 110*u* is connected to the radially-movable cylinder or servo mechanism 104*u*.

The uniformity device 10*u* also includes a second tire tread-engaging portion 101*u*. The second tire tread-engaging portion 101*u* is substantially similar to the tire tread-engaging portion 100*u* (as the second tire tread-engaging portion 101*u* includes a pedestal member 102*u*, a radially-movable cylinder or servo mechanism 104*u*, a cylinder or servo lock 106*u*, an applied load-detecting portion 108*u* and a tire tread-engaging member 112*u*) but, in some implementations, may not include a tire uniformity-detecting portion 110*u* (i.e., in some implementations, the second tire-tread engaging portion 101*u* may include a tire uniformity-detecting portion 110*u*). In an example, the first tire tread-engaging portion 100*u* and the second tire tread-engaging portion 101*u* are oppositely arranged with respect to one another relative the central axis, A-A.

Method for Utilizing the Apparatus 10""—Inflated Tire-Wheel Assembly, TW

As described above, the apparatus 10"" may determine uniformity of a tire, T, of an inflated tire-wheel assembly, TW. An exemplary method for utilizing the apparatus 10"" as described immediately above may be seen at FIGS. 22A-22B and 23A-23E.

Figure 23A:
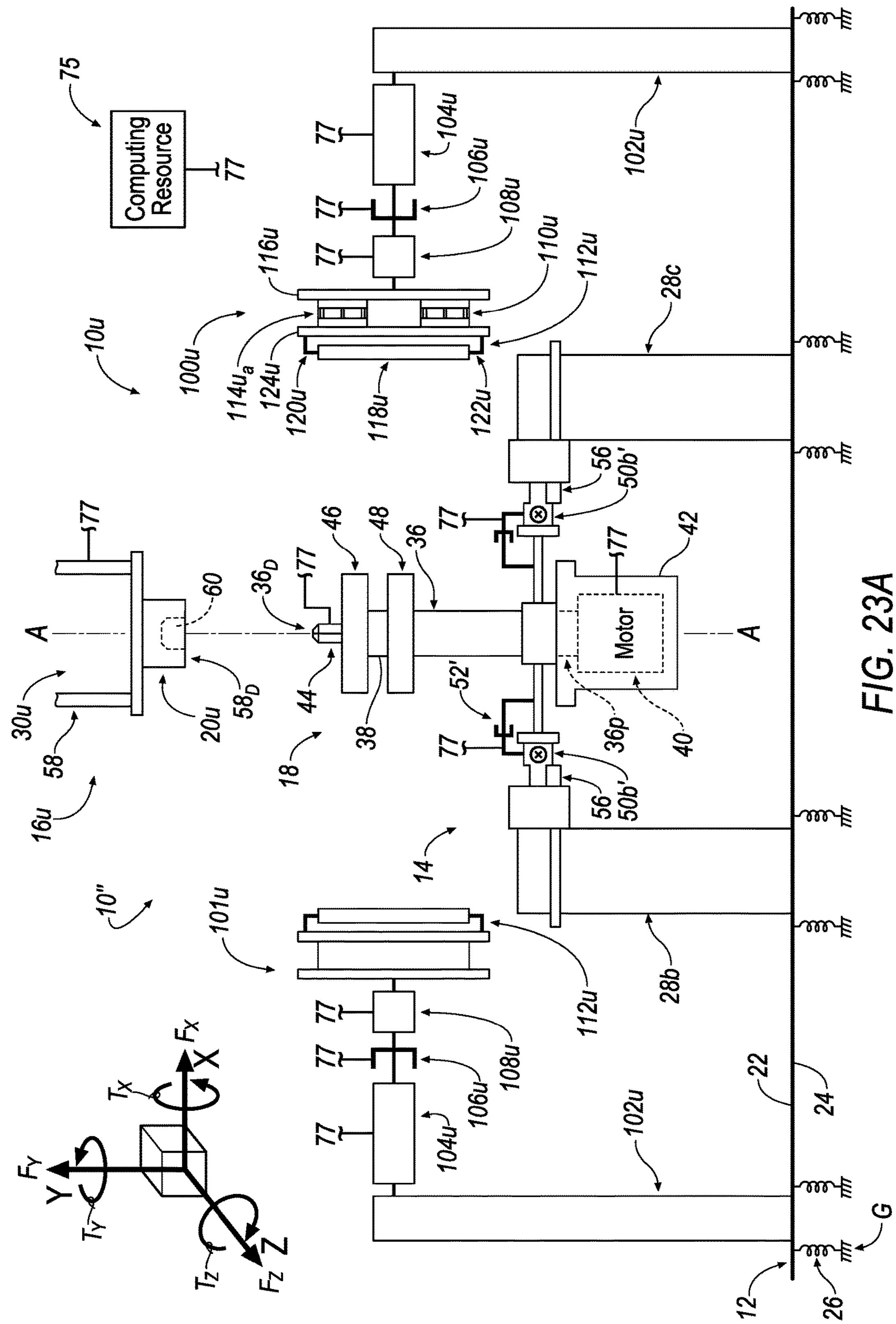
FIG. 23A is a section side view of the apparatus of FIG. 20 according to line 22, 23-22, 23.

Firstly, as seen in FIG. 23A, the at least one lock-up mechanism 52 is shown in an engaged state such that the multi-axis transducer 50*b*' is selectively mechanically connected to the elongated body 38 of the central shaft 36; as a result, the multi-axis transducer 50*b*' mechanically locks-out moment forces imparted during rotation, R, of central shaft 36 upon actuation of the motor 40. Because the multi-axis transducer 50*b*' is exclusively-associated with the operation of the balancing function as described above at FIGS. 22C-22E and 22C'-22E', the at least one lock-up mechanism 52 remains in an engaged state throughout the operation of the uniformity function as seen at FIGS. 23A-23E.

Figure 23B:
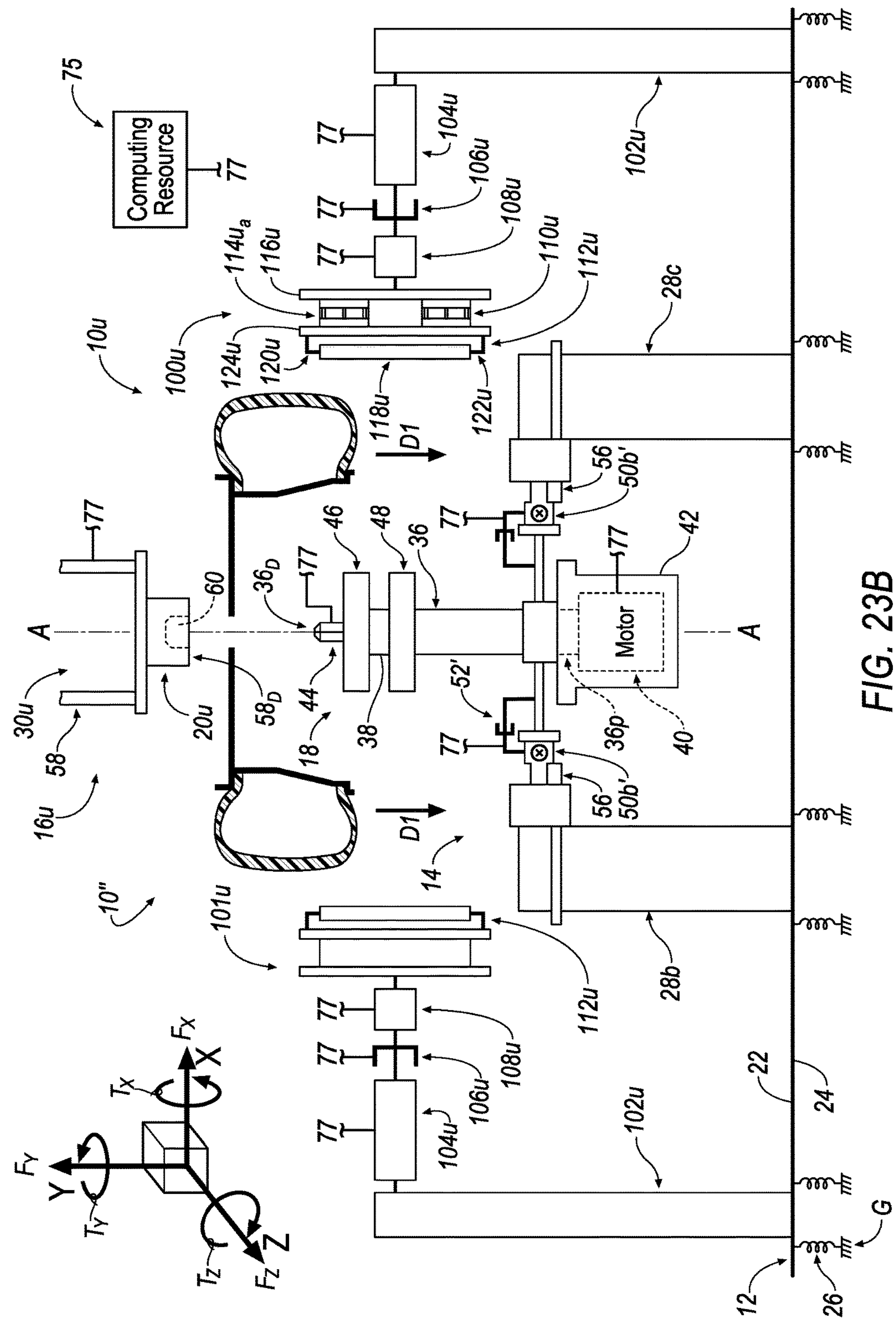
FIG. 23B-23E are section side views of the apparatus of FIG. 22A being interfaced with a tire-wheel assembly.

Referring to FIG. 23B, the inflated tire-wheel assembly, TW, may be arranged upon the workpiece inboard surface-engaging member 46 of the lower workpiece-engaging portion 18. The inflated tire-wheel assembly, TW, may be disposed upon the workpiece inboard surface-engaging member 46 as follows. In an example, a central opening, $TW_O$, of the inflated tire-wheel assembly, TW, may be axially-aligned with the central axis, A-A, such that the central opening, $TW_O$, may be arranged over the radially inwardly/outwardly manipulatable workpiece-engaging chuck 44, which is also axially-aligned with the central axis, A-A. Then, the inflated tire-wheel assembly, TW, may be moved according to the direction of the arrow, D1, such that the distal end $36_D$ of the central shaft 36 is inserted through the central opening, $TW_O$, of the inflated tire-wheel assembly, TW, whereby an inboard surface, $TW_{IS}$, of the inflated tire-wheel assembly, TW, may be disposed adjacent the workpiece inboard surface-engaging member 46 of the lower workpiece-engaging portion 18.

Figure 23C:
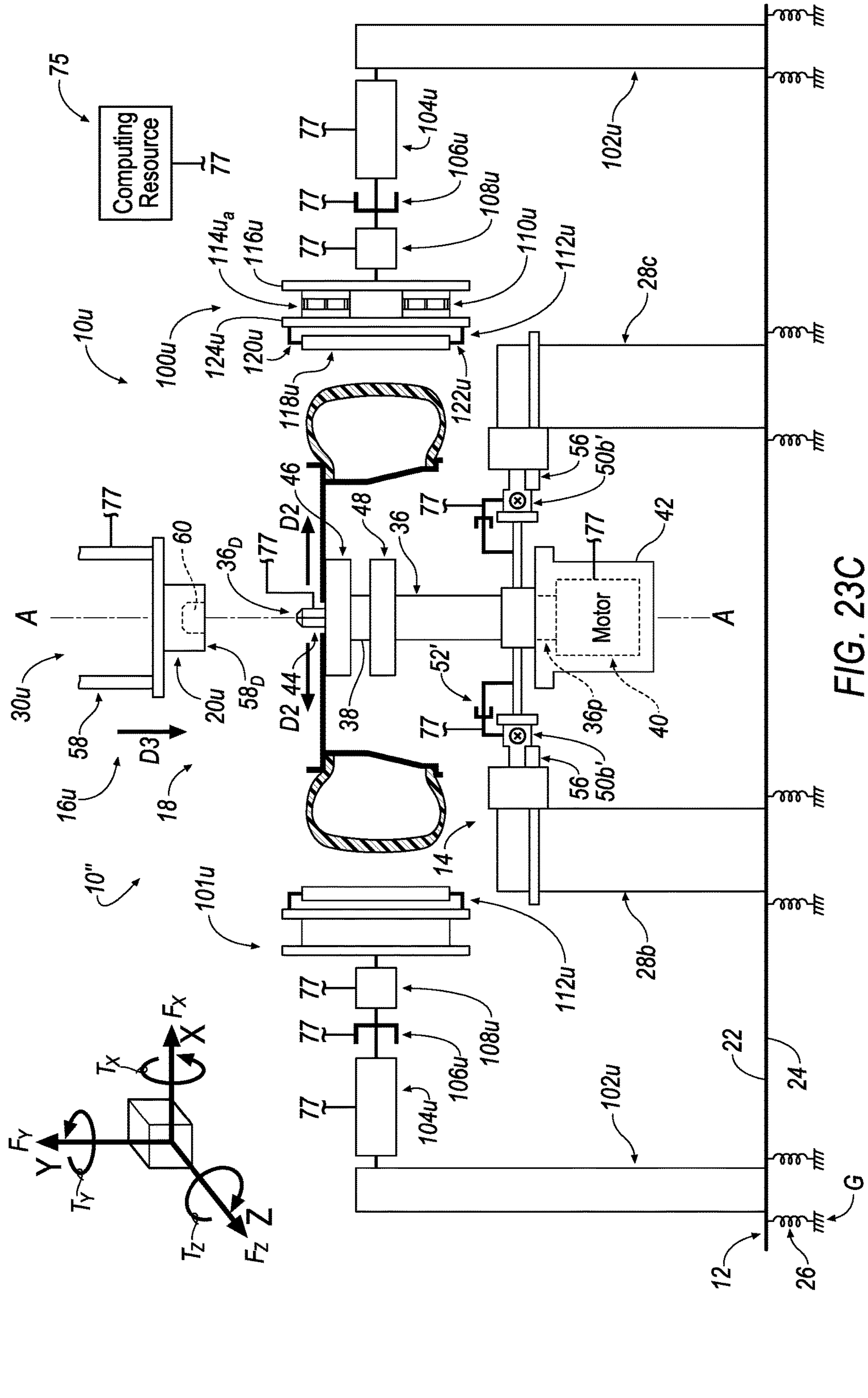

Referring to FIG. 23C, once the inflated tire-wheel assembly, TW, is disposed adjacent the workpiece inboard surface-engaging member 46 of the lower workpiece-engaging portion 18, the inflated tire-wheel assembly, TW, is selectively-retained to the lower workpiece-engaging portion 18 as a result of the radially inwardly/outwardly manipulatable workpiece-engaging chuck 44 being expanded in a radially outward direction according to the direction of the arrow, D2. Once the inflated tire-wheel assembly, TW, is selectively-retained to the lower workpiece-engaging portion 18 by the radially inwardly/outwardly manipulatable workpiece-engaging chuck 44, the axially-movable cylinder 58 of the upper workpiece-engaging portion 20*u* plunges toward the inflated tire-wheel assembly, TW, and the lower workpiece-engaging portion 18 according to the direction of the arrow, D3, until: (1) the distal end $\mathbf{58}_D$ of the axially-movable cylinder 58 is disposed adjacent an outboard surface, $TW_{OS}$, of the inflated tire-wheel assembly, TW, and (2) the radially inwardly/outwardly manipulatable workpiece-engaging chuck 44 is rotatably-disposed within the recess 60 formed in distal end $\mathbf{58}_D$ of the axially-movable cylinder 58.

Figure 23D:
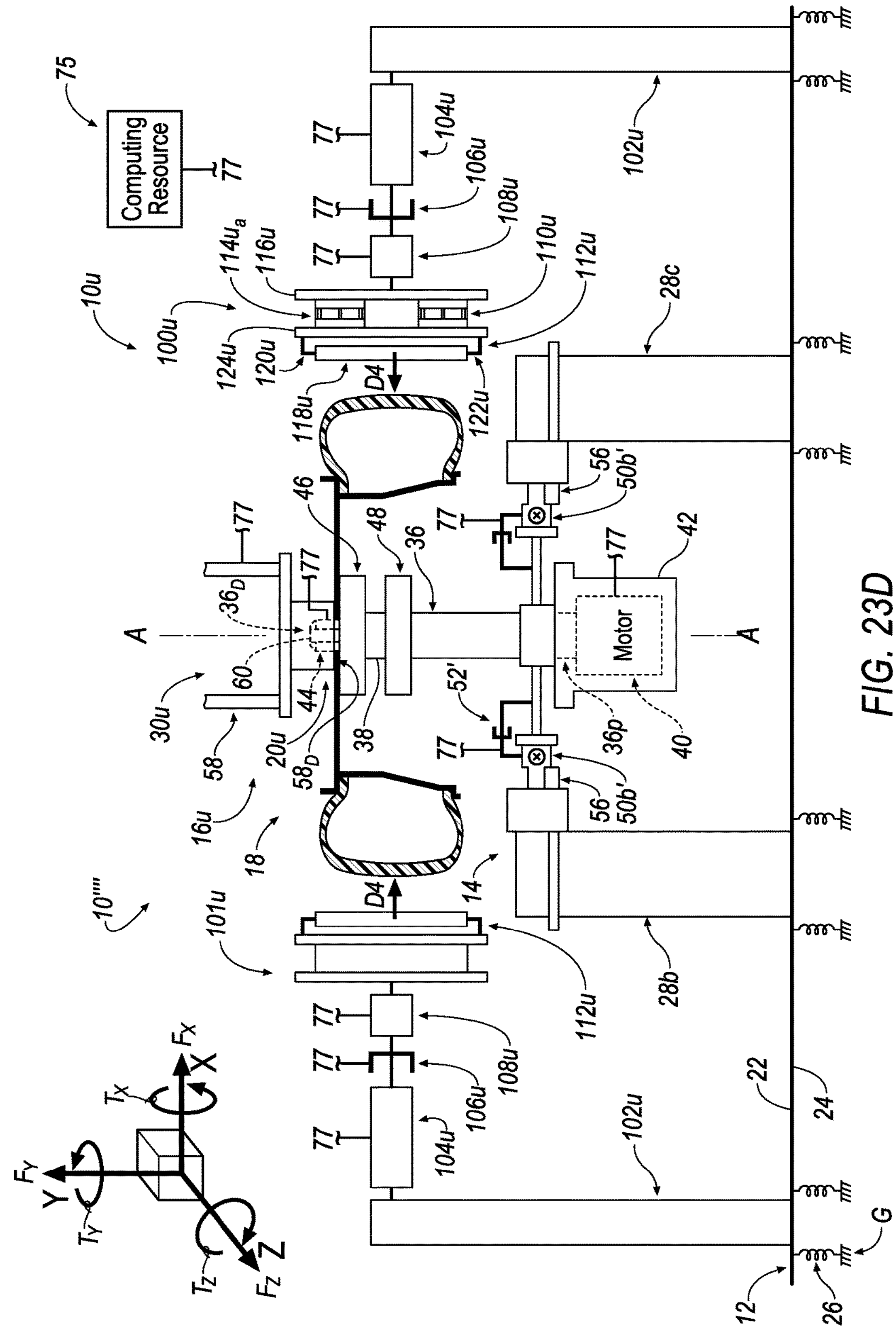

As seen in FIG. 23D, once the distal end $\mathbf{58}_D$ of the axially-movable cylinder 58 is disposed adjacent an outboard surface, $TW_{OS}$, of the tire-wheel assembly, TW, and the radially inwardly/outwardly manipulatable workpiece-engaging chuck 44 is rotatably-disposed within the recess 60 formed in distal end $\mathbf{58}_D$ of the axially-movable cylinder 58 as described above, the tire-wheel assembly, TW, may said to be axially selectively-retained by the apparatus 10'''' such that the tire-wheel assembly, TW, is rotatably-sandwiched between the lower workpiece-engaging portion 18 and the upper workpiece-engaging portion 20*u* (in order to apply an axial clamping load to the tire-wheel assembly, TW, so as to hold the workpiece firmly against the surface of the chuck assembly). The computing resource 75 may then send a signal to the radially-movable cylinder or servo mechanism 104*u* of each of the first tire tread-engaging portion 100*u* and the second tire tread-engaging portion 101*u* in order to radially plunge according to the direction of the arrow, D4, the radially-movable cylinders or servo mechanism 104*u* toward the central axis, A-A, in order to radially inwardly plunge according to the direction of the arrow, D4, the tire tread-engaging members 112*u* of each of the first tire tread-engaging portion 100*u* and the second tire tread-engaging portion 101*u* toward the tire-wheel assembly, TW, until the tire tread-engaging members 112*u* of each of the first tire tread-engaging portion 100*u* and the second tire tread-engaging portion 101*u* are disposed adjacent the tread surface, $T_T$, of the tire, T. Radial movement of the radially-movable cylinder or servo mechanism 104*u* of the second tire tread-engaging portion 101*u* toward the central axis, A-A, according to the direction of the arrow, D4, may cease once the applied load-detecting portion 108*u* detects that the tire tread-engaging member 112*u* of the first tire tread-engaging portion 100*u* applies a specified load to the tread surface, $T_T$, of the tire, T. In an example, a 70% load is applied to the tread surface, $T_T$, of the tire, T.

Once the tire-wheel assembly, TW, is rotatably-sandwiched between the lower workpiece-engaging portion 18 and the upper workpiece-engaging portion 20*u*, and, once the radial movement of the radially-movable cylinder or servo mechanism 104*u* of the second tire tread-engaging portion 101*u* toward the central axis, A-A, according to the direction of the arrow, D4, has ceased, the motor 40 may be actuated in order to impart rotation, R, to the central shaft 36, which is connected to both of: the workpiece inboard surface-engaging member 46 and the angular encoder 48; because the tire-wheel assembly, TW, is disposed adjacent the workpiece inboard surface-engaging member 46 of the lower workpiece-engaging portion 18, the tire-wheel assembly, TW, rotates, R, with the workpiece inboard surface-engaging member 46 of the lower workpiece-engaging portion 18.

Figure 23E:
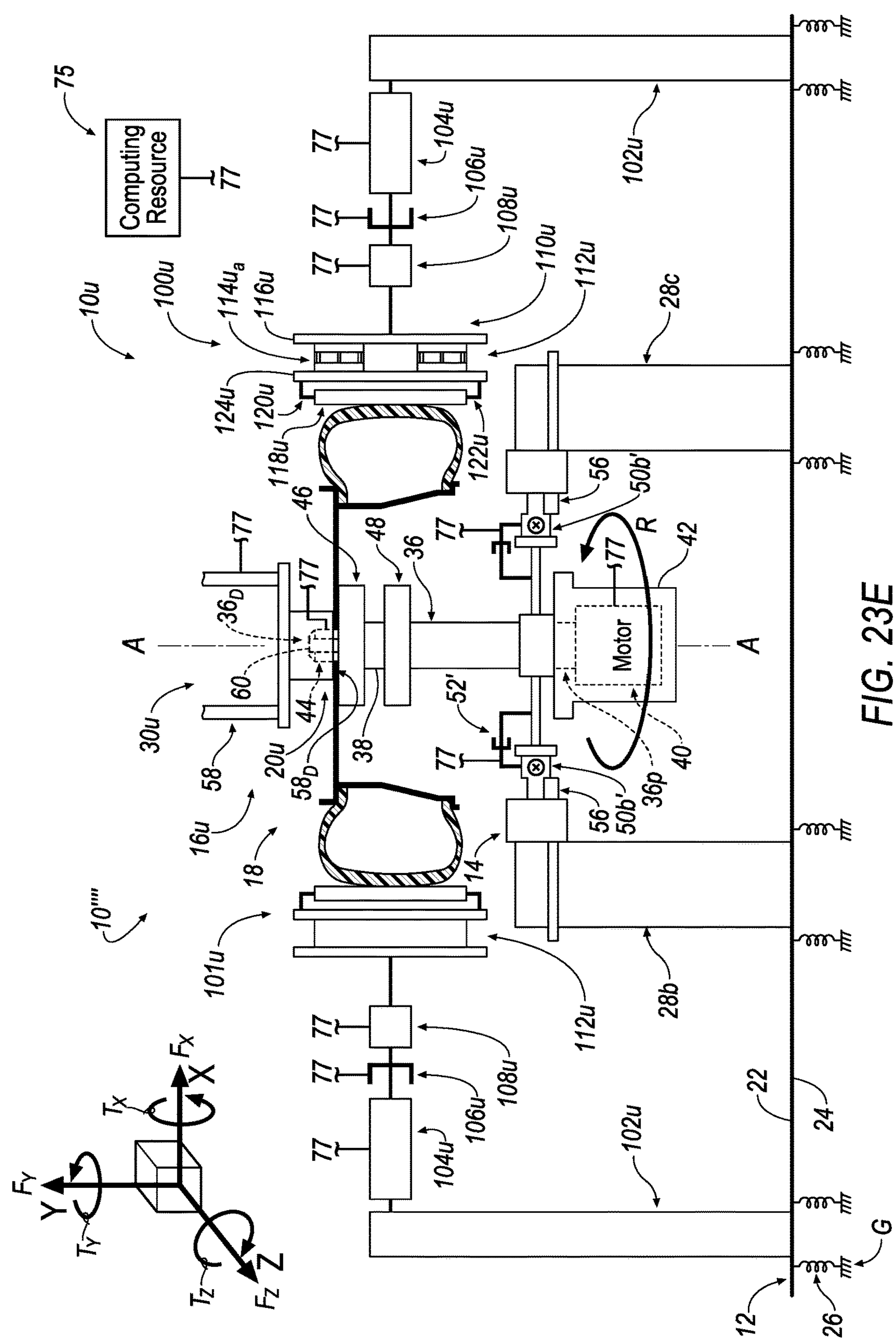

Referring to FIG. 23E, upon rotating, R, the central shaft 36, tire uniformity-detecting portion 110*u* may produce signals that are communicated to the computing resource 75 by way of the one or more communication conduits 77 that are indicative of a uniformity condition or a lack-of-uniformity condition of the tire, T, of the tire-wheel assembly, TW. In some instances, as shown and described, for example, at FIGS. 25-25''', the tire uniformity-detecting portion 110*u* may include three or more multi-axis load cells $\mathbf{114}u_a$; each of the three or more multi-axis load cells $\mathbf{114}u_a$ may be, for example, a strain gauge transducer or a piezoelectric transducer. In another instances, as shown and described, for example, at FIGS. 26-26''''', the tire uniformity-detecting portion 110*u* may include three or more air spring members $\mathbf{114}u_b$.

"Fixed Load" Tire Uniformity-Detecting Portion 110*u*

Referring to FIGS. 23A-23E, 24A-24B, 24A'-24B', 25-25''', an exemplary tire uniformity-detecting portion 110*u* may be referred to as a "fixed load" tire uniformity-detecting portion that includes the plurality of multi-axis load cells $\mathbf{114}u_a$ secured to a support plate 116*u*. In some instances where the tire uniformity-detecting portion 110*u* may include three or more multi-axis load cells $\mathbf{114}u_a$, the uniformity condition or lack-of-uniformity condition may be over-deterministically calculated in terms of at least one group of signals produced by the tire uniformity-detecting portion 110*u*, including: (1) a group of two or more torque-moment signals (see, e.g., $T_X$, $T_Y$, $T_Z$ in FIGS. 22A-22B and 23A-23E) with each torque-moment signal about a respective axis of at least two axes (see, e.g., axes X, Y, Z in FIGS. 22A-22B and 23A-23E) and (2) a group of two or more force signals (see, e.g., $F_X$, $F_Y$, $F_Z$ in FIGS. 22A-22B and 23A-23E) with each force signal along a respective axis of the at least two axes (see, e.g., axes X, Y, Z in FIGS. 22A-22B and 23A-23E). Because the three or more multi-axis load cells $\mathbf{114}u_a$ are coined as "multi-axis" load cells, the term "multi" defines the number of axes monitored by the three or more multi-axis load cells $\mathbf{114}u_a$; further, the number of axes include two or more of the axes that share the same origin and are orthogonal to one another. In an exemplary implementation, the number of axes may include three axes (see, e.g., axes X, Y, Z in FIGS. 22A-22B and 23A-23E); although three orthogonal axes, X, Y, Z, are shown in FIGS. 22A-22B and 23A-23E, some implementations may include two axes that are orthogonal relative one another such as, for example: (1) axis X orthogonal to axis Y, (2) axis X orthogonal to axis Z, or (3) axis Y orthogonal to axis Z.

Figure 25:
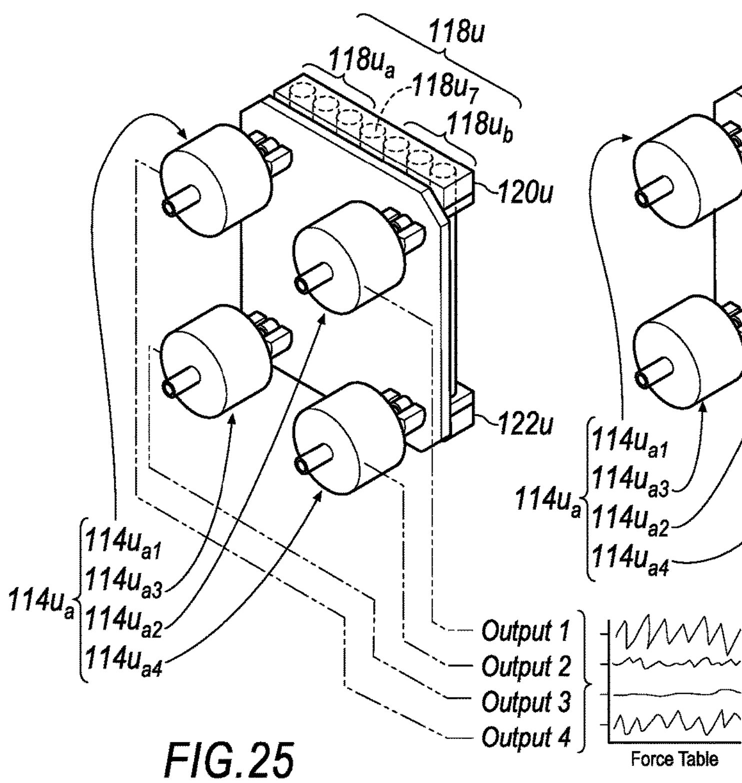
FIG. 25 is a partial perspective view of a portion of the exemplary portion of the apparatus of any of FIGS. 24A, 24B, 24A'', 24B''.
Figure 25:
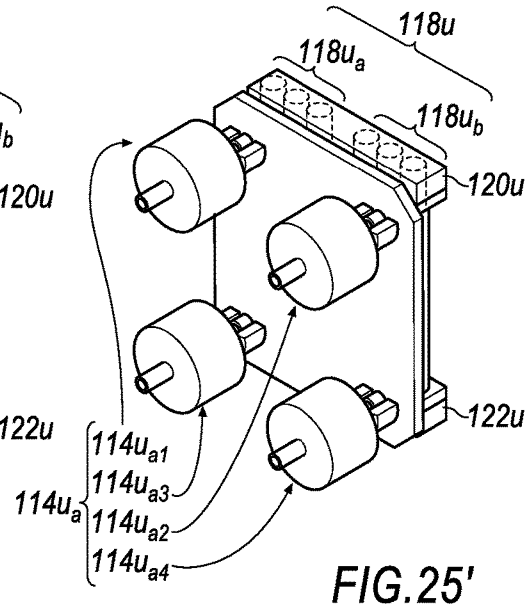
Figure 25:
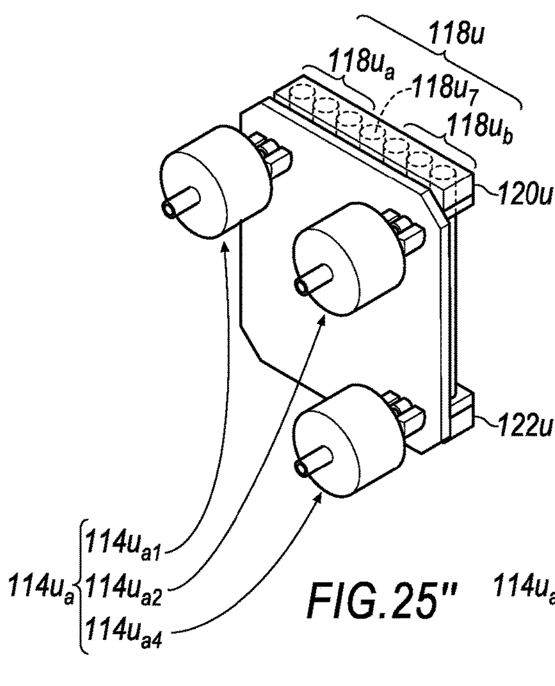
Figure 25:
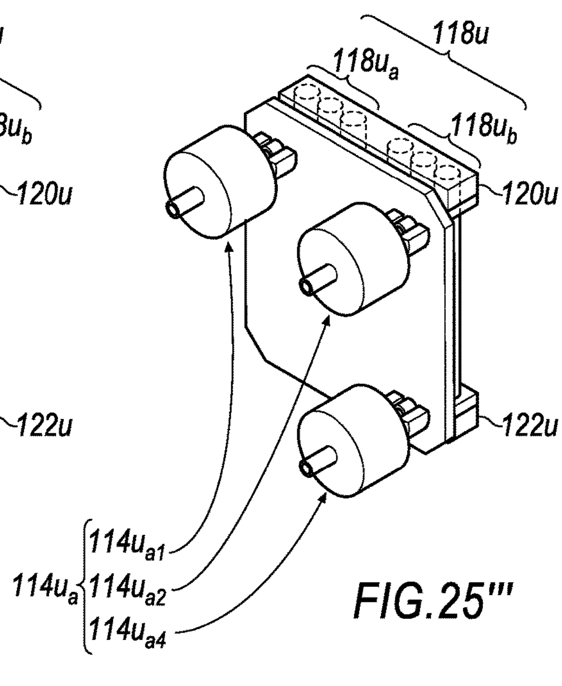

In some instances, each axis (i.e., the X axis, the Y axis and the Z axis) of each multi-axis load cells $\mathbf{114}u_a$ may have its own channel (generally represented by the one or more communication conduits 77); therefore, in some examples, the uniformity device 10*u* may include, for example, nine channels (when three load cells are incorporated into the design as seen in FIGS. 25'', 25''') or twelve channels (when four load cells are incorporated into the design as seen in FIGS. 25, 25') whereby each channel provides a time domain force or moment ripple output that is communicated to the computing resource 75 over the one or more communication conduits 77. The software associated with the computing resource 75 will sum the time domain force or moment ripple output of each channel and are then subsequently provided to a fast Fourier transform (FFT) analyzer (i.e., this is a fixed-deflection measurement of the imparted "road force" of the workpiece), which will determine uniformity (or lack thereof) of the tire, T. Because, for example, three or more multi-axis load cells $\mathbf{114}u_a$ are used, a variety of uniformity-related measurements may be captured, such as, for example, rocking moments, yaw moments, pitch moments and the like. Each of the plurality of multi-axis load cells $\mathbf{114}u_a$ and the angular encoder 48 may be communicatively-coupled to the computing resource 75 by way of the one or more communication conduits 77 in order to record the lack of uniformity of the tire, T, that was detected by the plurality of multi-axis load cells 114$u_a$ at a particular angular orientation of the tire, T, as determined by the angular encoder 48.

Referring to FIGS. 25-25', in an example, the plurality of multi-axis load cells 114$u_a$ may include four multi-axis load cells 114$u_{a1}$, 114$u_{a2}$, 114$u_{a3}$, 114$u_{a4}$ that are arranged upon the support plate 116$u$ in a "square shape." Referring to FIGS. 25"-25''', in another example, the plurality of multi-axis load cells 114$u_a$ may include three multi-axis load cells 114$u_{a1}$, 114$u_{a2}$, 114$u_{a3}$ that are arranged upon the support plate 116$u$ in an "L shape."

"Fixed Center" Tire Uniformity-Detecting Portion 110$u$

Figure 26:
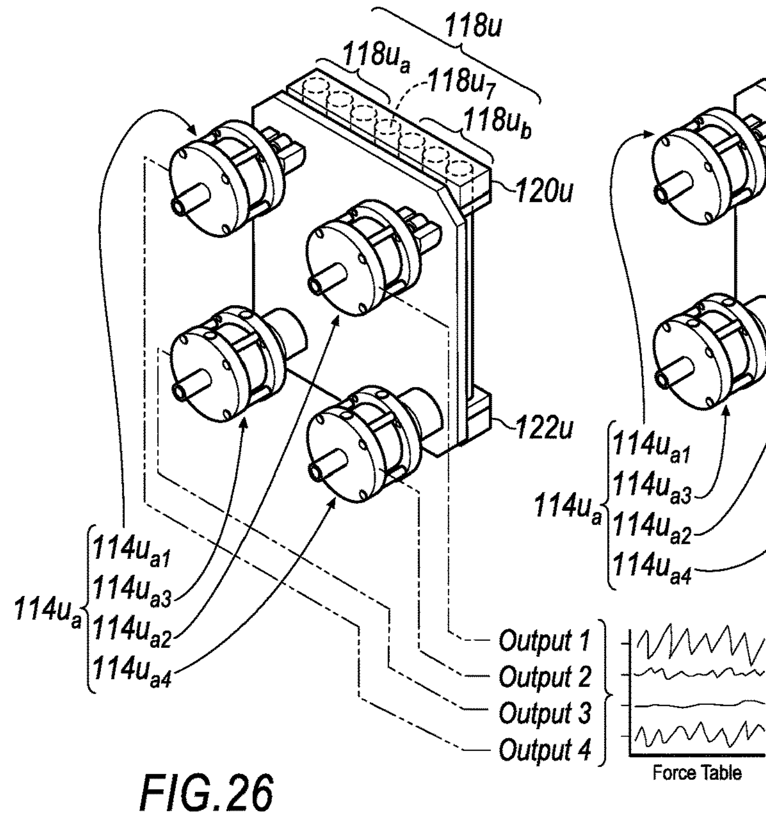
FIG. 26 is a partial perspective view of a portion of the exemplary portion of the apparatus of any of FIGS. 24A, 24B, 24A'', 24B''.
Figure 26:
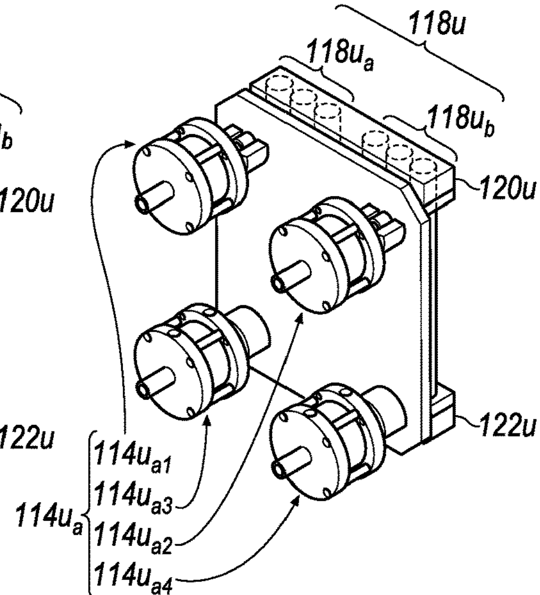
Figure 26:
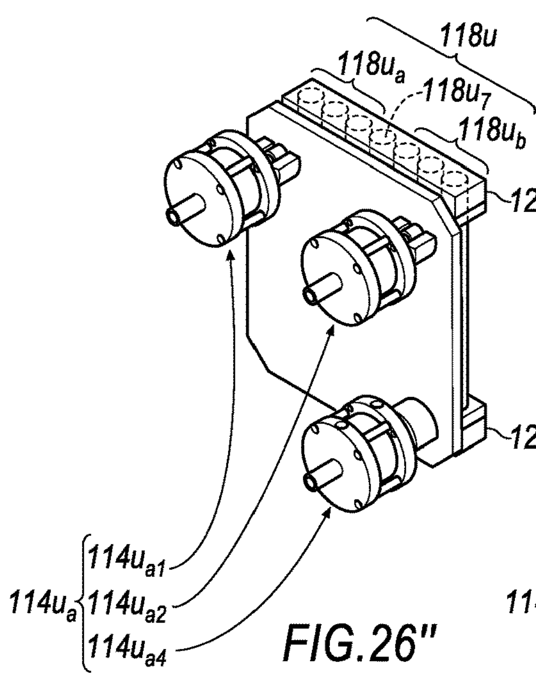
Figure 26:
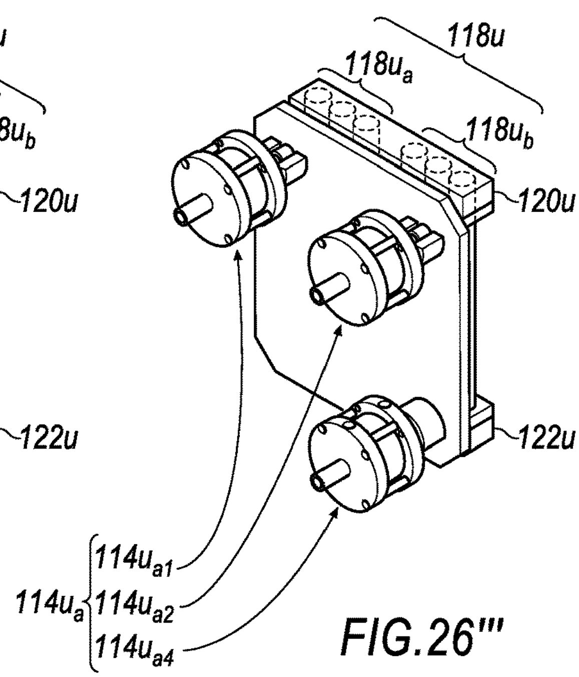

Referring to FIGS. 23A-23E, 24A"-24B", 24A'''-24B''', 26-26''''', an exemplary tire uniformity-detecting portion 110$u$ may be referred to as a "fixed center" tire uniformity-detecting portion that includes a plurality of air spring members 114$u_b$ secured to a support plate 116$u$. Referring to FIGS. 26-26', in an example, the plurality of air spring members 114$u_b$ may include four air spring members 114$u_{b1}$, 114$u_{b2}$, 114$u_{b3}$, 114$u_{b4}$ secured to the support plate 116$u$ in a "square shape." Referring to FIGS. 26"-26''', in another example, the plurality of air spring members 114$u_b$ may include three air spring members 114$u_{b1}$, 114$u_{b2}$, 114$u_{b3}$ secured to the support plate 116$u$ in an "L shape." Referring to FIGS. 26''''-26''''', in yet another example, the plurality of air spring members 114$u_b$ may include three air spring members 114$u_{b1}$, 114$u_{b2}$, 114$u_{b3}$ secured to the support plate 116$u$ in a "triangular shape." The tire uniformity-detecting portion 110$u$ may also include at least one laser indicator 126 (see, e.g., FIGS. 24A"-24B", 24A'''-24B'''). The method for utilizing the "fixed center" tire uniformity-detecting portion 110$u$ incorporating the plurality of air spring members 114$u_b$ is described below in further detail.

Tire Tread-Engaging Member 112$u$—Configuration of Roller Members 118$u$ Referring to FIGS. 24A-26''''', the tire tread-engaging member 112$u$ may be configured to include a plurality of roller members 118$u$. The plurality of roller members 118$u$ are rotatably connected to an upper bracket 120$u$ and a lower bracket 122$u$.

Figure 24A:
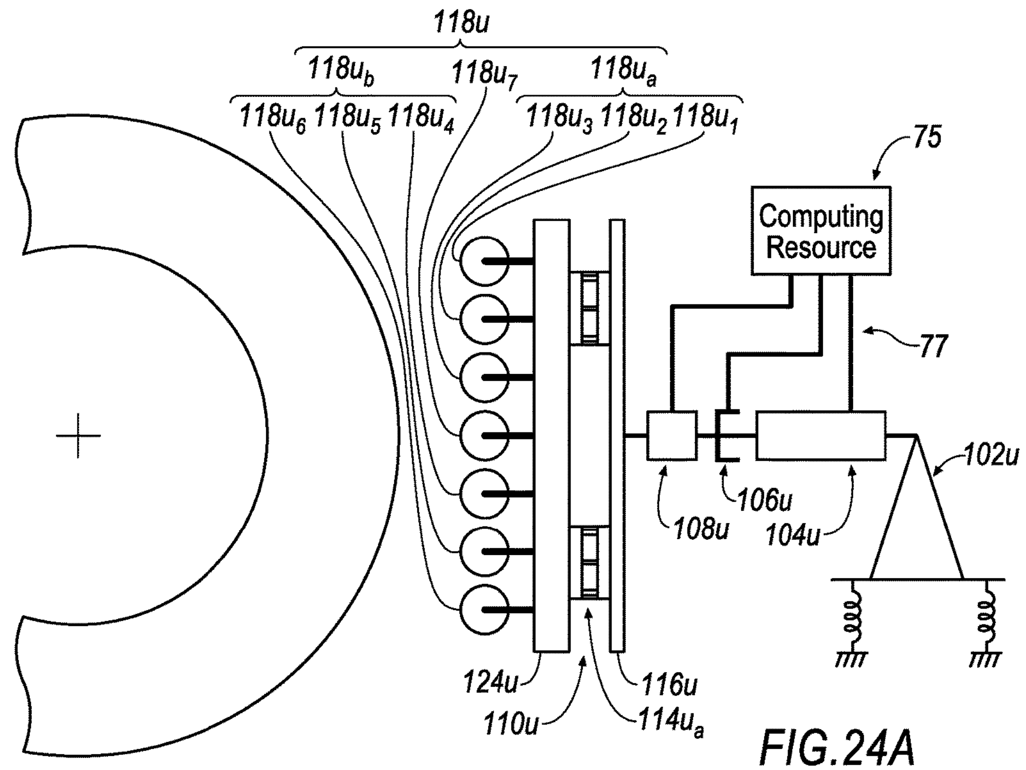
FIG. 24A is a partial top view of an exemplary portion of the apparatus of FIG. 20 according to line 24A of FIG. 23D.
Figure 24B:
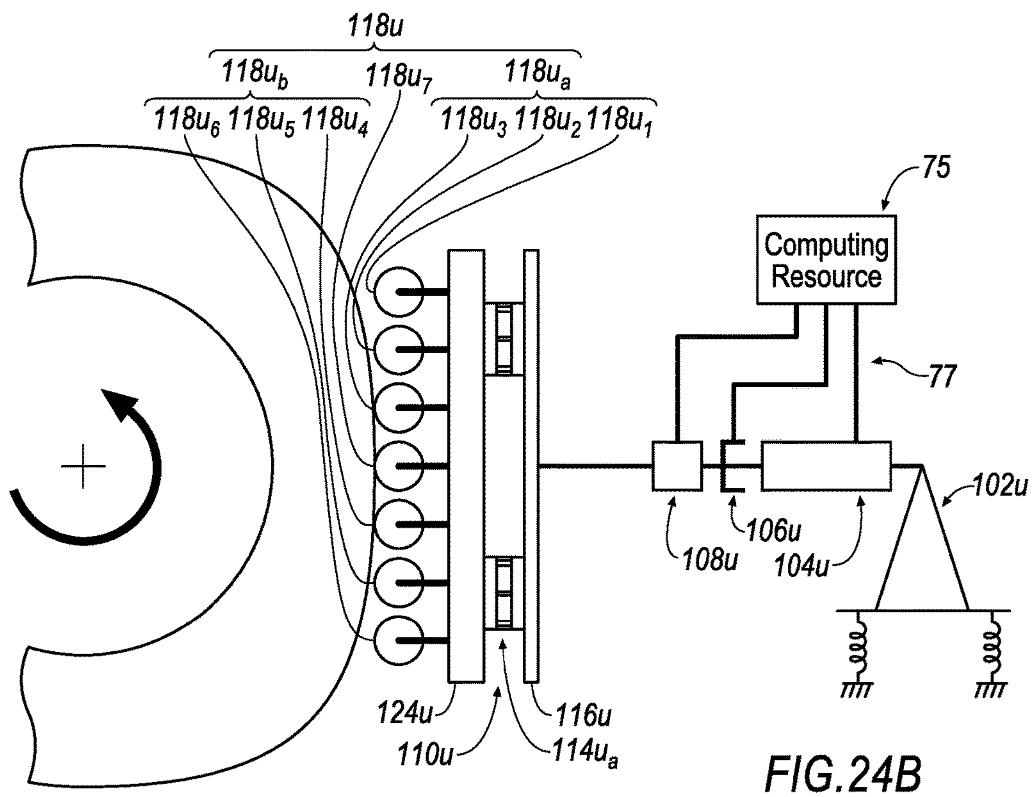
FIG. 24B is a partial top view of an exemplary portion of the apparatus of FIG. 20 according to line 24B of FIG. 23E.
Figure 24A:
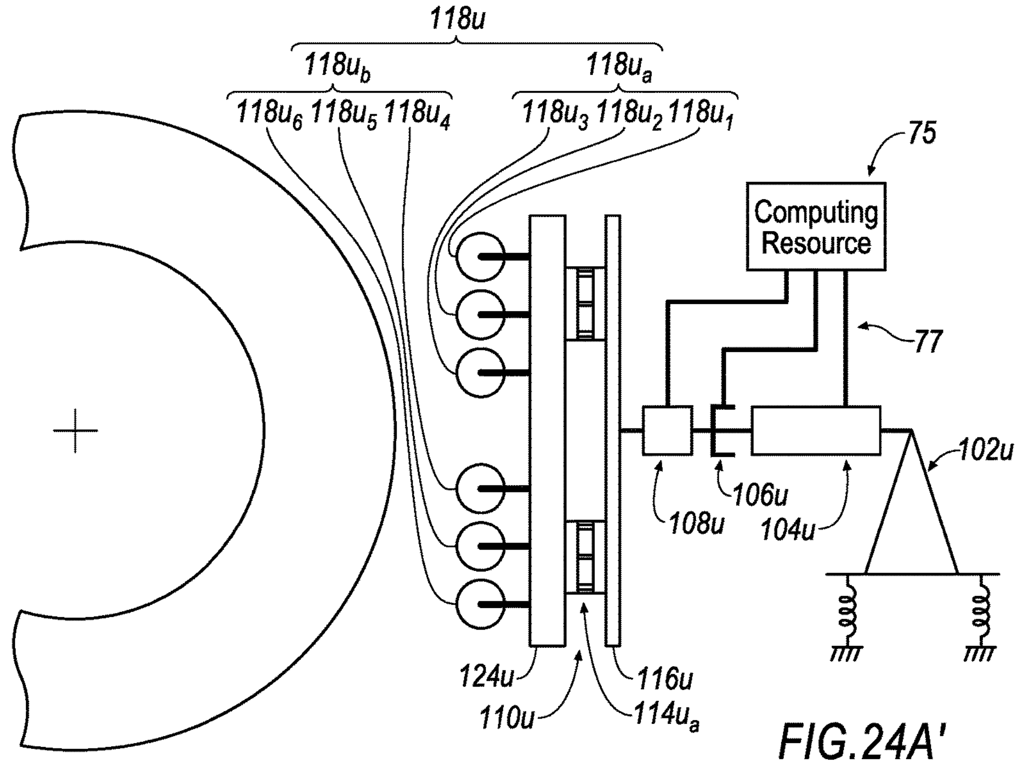
Figure 24B:
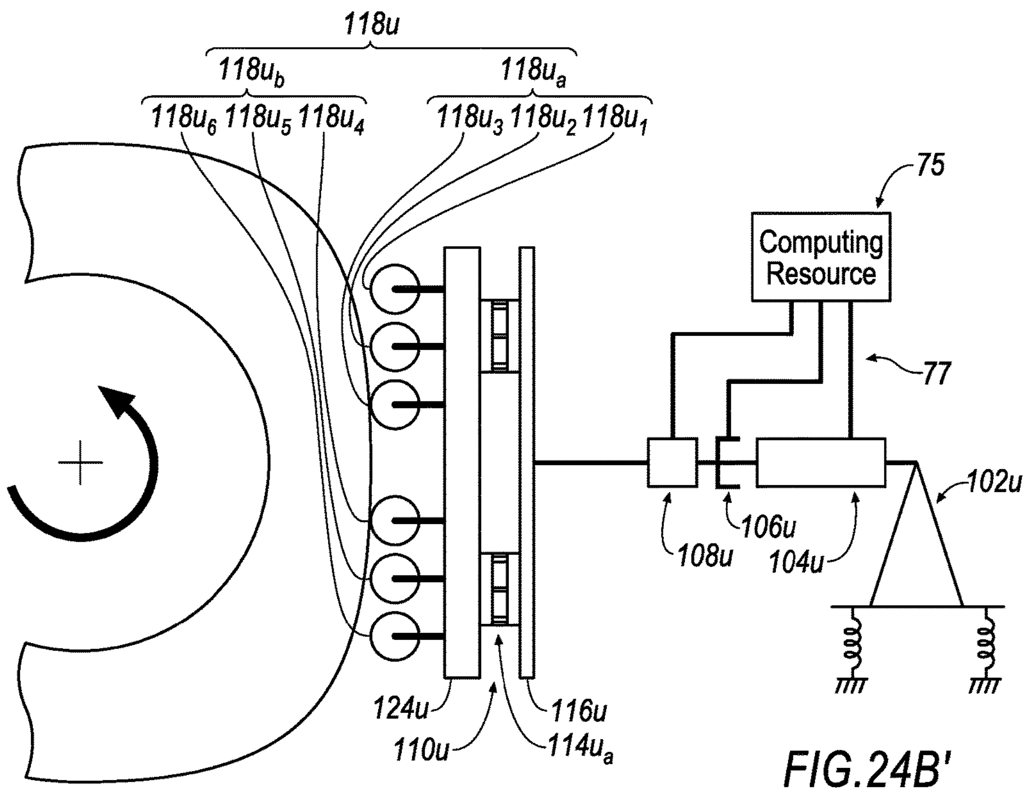
Figure 24A:
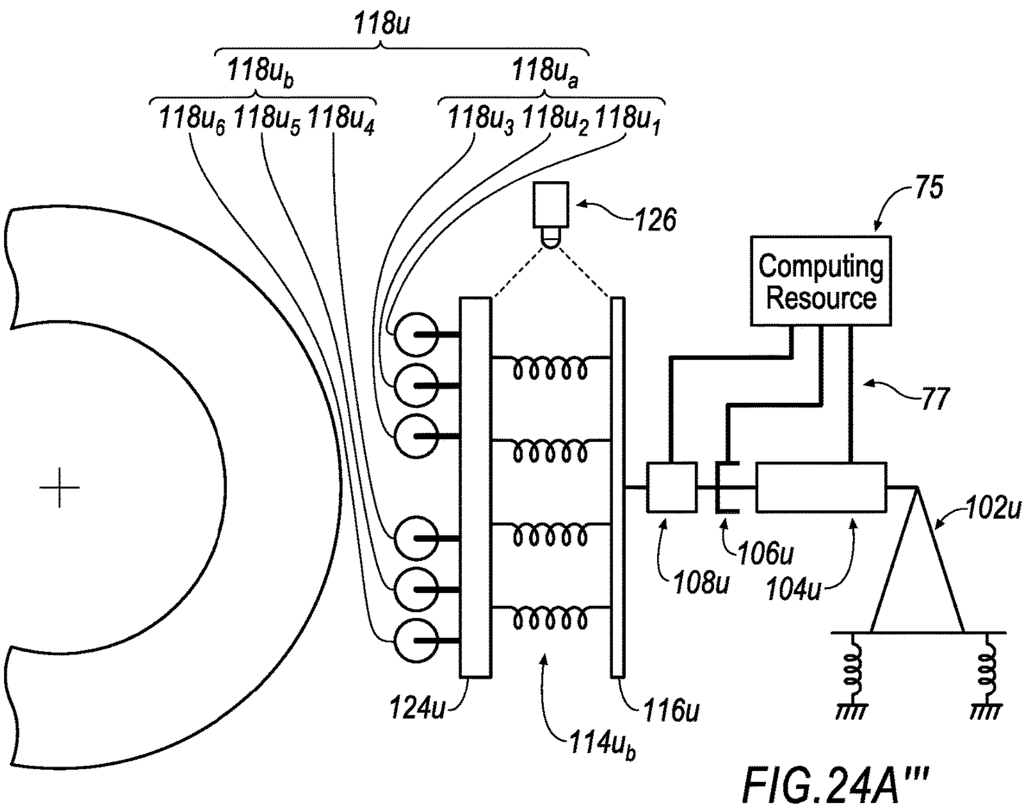
Figure 24B:
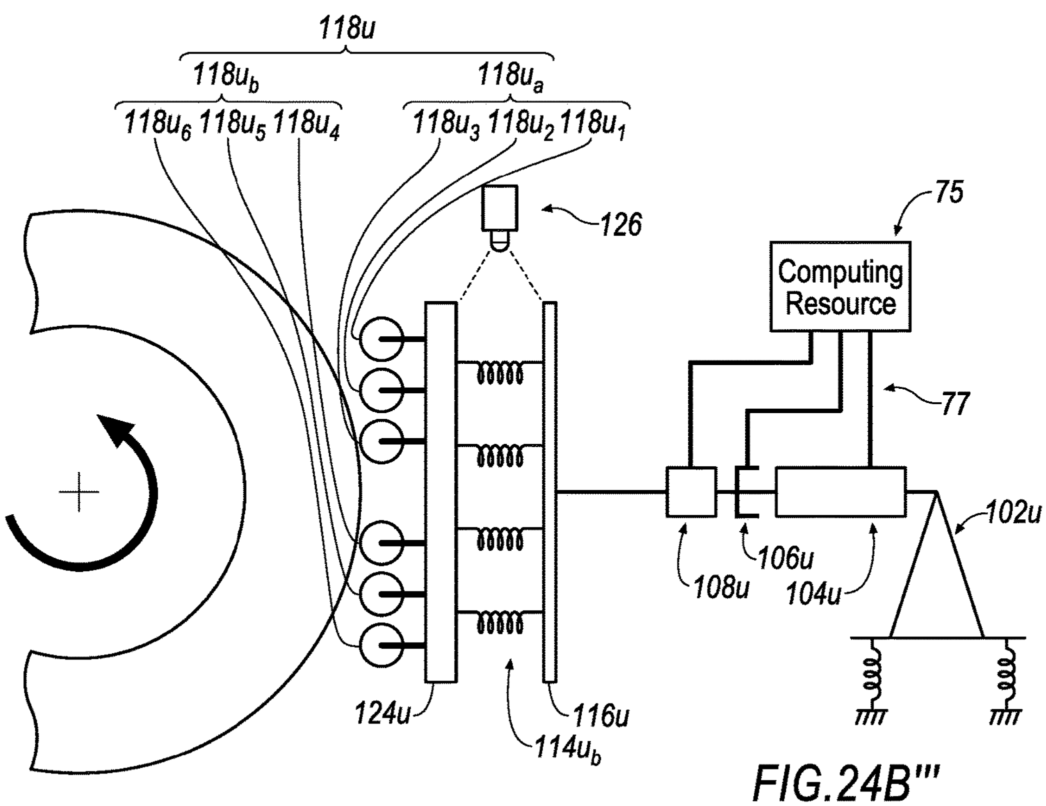

In an example, as seen at FIGS. 24A-24B, 24A"-24B", 25, 25", 26, 26", 26'''', an exemplary tire tread-engaging member 112$u_1$ may include a plurality of roller members 118$u$ rotatably connected to an upper bracket 120$u$ and a lower bracket 122$u$. The plurality of roller members 118$u$ may include seven roller members 118$u_1$, 118$u_2$, 118$u_3$, 118$u_4$, 118$u_5$, 118$u_6$, 118$u_7$, defined by a first grouping 118$u_a$ of three roller members 118$u_1$, 118$u_2$, 118$u_3$ and a second grouping 118$u_b$ of three roller members 118$u_4$, 118$u_5$, 118$u_6$ that are separated by a centrally-located seventh roller member 118$u_7$.

Both of the upper bracket 120$u$ and the lower bracket 122$u$ are secured to a support plate 124$u$. In some instances, the support plate 124$u$ is connected to the plurality of multi-axis load cells 114$u_a$ (of the exemplary embodiment described at FIGS. 23A-23E, 24A-24B, 24A'-24B', 25-25''') or the plurality of air spring members 114$u_b$ (of the exemplary embodiment described at FIGS. 23A-23E, 24A"-24B", 24A'''-24B''', 26-26''''') such that the plurality of multi-axis load cells 114$u_a$ or the plurality of air spring members 114$u_b$ are "sandwiched" between the support plate 116$u$ of the tire uniformity-detecting portion 110$u_1$/the tire uniformity-detecting portion 110$u_2$ and the support plate 124$u$ of the tire tread-engaging member 112$u_1$.

In an example, as seen at FIGS. 24A'-24B', 24A'''-24B''', 25', 25''', 26', 26''', 26''''', an exemplary tire tread-engaging member 112$u_2$ may include a plurality of roller members 118$u$ rotatably connected to an upper bracket 120$u$ and a lower bracket 122$u$. The plurality of roller members 118$u$ may include six roller members 118$u_1$, 118$u_2$, 118$u_3$, 118$u_4$, 118$u_5$, 118$u_6$ defined by a first grouping 118$u_a$ of three roller members 118$u_1$, 118$u_2$, 118$u_3$ and a second grouping 118$u_b$ of three roller members 118$u_4$, 118$u_5$, 118$u_6$ that are separated by a gap (where there is an absence of a centrally-located seventh roller member 118$u_7$ when compared to the above-described embodiment including seven roller members). The gap spans a leading edge and a trailing edge of a tire contact patch area.

Both of the upper bracket 120$u$ and the lower bracket 122$u$ are secured to a support plate 124$u$. In some instances, the support plate 124$u$ is connected to the plurality of multi-axis load cells 114$u_a$ (of the exemplary embodiment described at FIGS. 23A-23E, 24A-24B, 24A'-24B', 25-25''') or the plurality of air spring members 114$u_b$ (of the exemplary embodiment described at FIGS. 23A-23E, 24A"-24B", 24A'''-24B''', 26-26''''') such that the plurality of multi-axis load cells 114$u_a$ or the plurality of air spring members 114$u_b$ are "sandwiched" between the support plate 116$u$ of the tire uniformity-detecting portion 110$u_1$/the tire uniformity-detecting portion 110$u_2$ and the support plate 124$u$ of the tire tread-engaging member 112$u_1$.

When the "fixed center" tire uniformity-detecting portion 110$u$ incorporating the plurality of air spring members 114$u_b$ is incorporated into the design of the uniformity device 10$u$, the at least one laser indicator 126, which is positioned proximate the plurality of air spring members 114$u_b$ as well as the support plate 116$u$ and the support plate 124$u$, may detect a difference in an amount distance between the support plate 116$u$ and the support plate 124$u$; accordingly, when a lack of uniformity of the tire, T, may occur at a particular angular revolution of the tire, T, the plurality of air spring members 114$u_b$ may: (1) compress, thereby reducing the distance between the support plates 116$u$, 124$u$, or alternatively, (2) expand, thereby increasing the distance between the support plates 116$u$, 124$u$. Each of the at least one laser indicator 126 and the angular encoder 48 may be communicatively-coupled to the computing resource 75 by way of the one or more communication conduits 77 in order to record the lack of uniformity of the tire, T, that was detected by the at least one laser indicator 126 at a particular angular orientation of the tire, T, as determined by the angular encoder 48.

Functionally, the at least one laser indicator 126 produces at least one signal that is communicated to the computing resource 75 over the one or more communication conduits 77; the at least one signal is a time domain displacement ripple output. If more than one laser indicator 126 is used, software associated with the computing resource 75 sums the time domain displacement ripple output of each signal output by each laser indicator 126, which is then subsequently provided to a fast Fourier transform (FFT) analyzer (i.e., this is a "quasi fixed load" measurement of the loaded radius of the workpiece).

"Fixed Load" Tire Uniformity-Detecting Portion 110$u$

Referring to FIGS. 23A-23E, 27A-27B, 28-28', an exemplary tire uniformity-detecting portion 110$u$ may be referred to as a "fixed load" tire uniformity-detecting portion that includes the plurality of multi-axis load cells 114$u_a$ secured to a support plate 116$u$. In some instances where the tire uniformity-detecting portion 110$u$ may include three or more multi-axis load cells 114$u_a$, the uniformity condition or lack-of-uniformity condition may be over-deterministically calculated in terms of at least one group of signals produced by the tire uniformity-detecting portion 110*u*, including: (1) a group of two or more torque-moment signals (see, e.g., $T_X$, $T_Y$, $T_Z$ in FIGS. 22A-22B and 23A-23E) with each torque-moment signal about a respective axis of at least two axes (see, e.g., axes X, Y, Z in FIGS. 22A-22B and 23A-23E) and (2) a group of two or more force signals (see, e.g., $F_X$, $F_Y$, $F_Z$ in FIGS. 22A-22B and 23A-23E) with each force signal along a respective axis of the at least two axes (see, e.g., axes X, Y, Z in FIGS. 22A-22B and 23A-23E). Because the three or more multi-axis load cells 114*u*$_a$ are coined as "multi-axis" load cells, the term "multi" defines the number of axes monitored by the three or more multi-axis load cells 114*u*$_a$; further, the number of axes include two or more of the axes that share the same origin and are orthogonal to one another. In an exemplary implementation, the number of axes may include three axes (see, e.g., axes X, Y, Z in FIGS. 22A-22B and 23A-23E); although three orthogonal axes, X, Y, Z, are shown in FIGS. 22A-22B and 23A-23E, some implementations may include two axes that are orthogonal relative one another such as, for example: (1) axis X orthogonal to axis Y, (2) axis X orthogonal to axis Z, or (3) axis Y orthogonal to axis Z.

Figure 28:
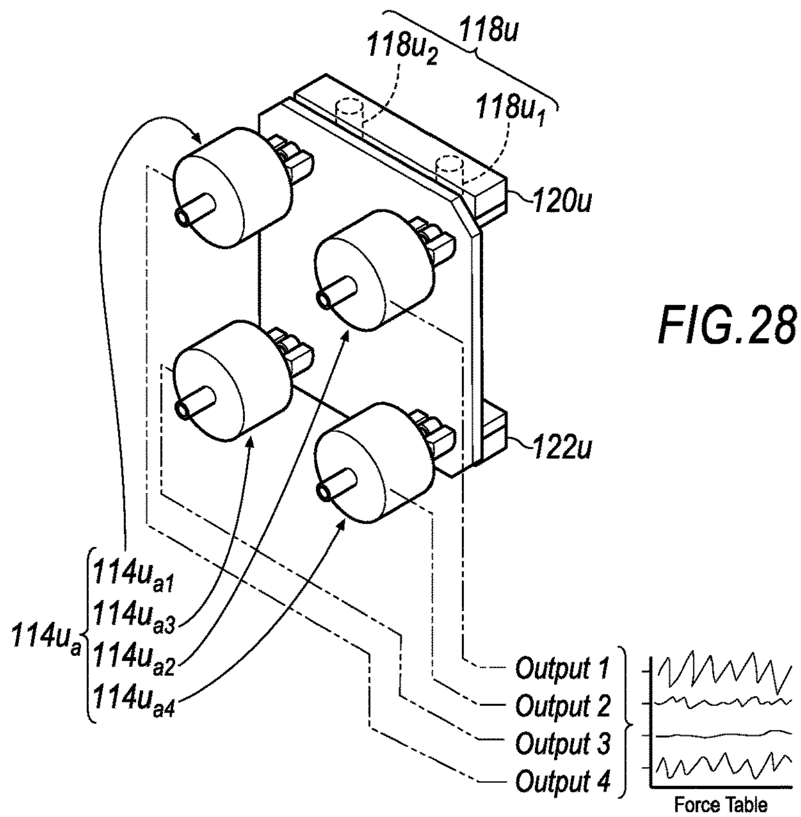
FIG. 28 is a partial perspective view of a portion of the exemplary portion of the apparatus of FIG. 27A.
Figure 28:
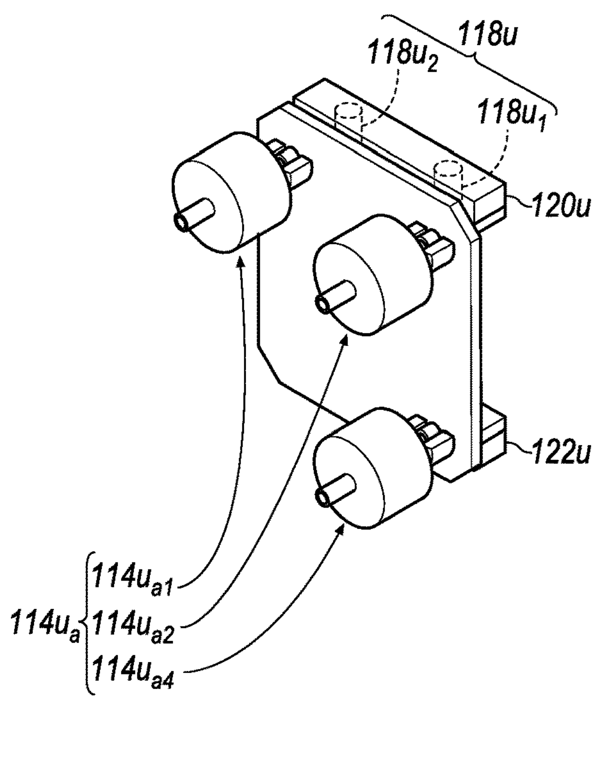

In some instances, each axis (i.e., the X axis, the Y axis and the Z axis) of each multi-axis load cells 114*u*$_a$ may have its own channel (generally represented by the one or more communication conduits 77); therefore, in some examples, the uniformity device 10*u* may include, for example, nine channels (when three load cells are incorporated into the design as seen in FIGS. 28', 28") or twelve channels (when four load cells are incorporated into the design as seen in FIG. 28) whereby each channel provides a time domain force or moment ripple output that is communicated to the computing resource 75 over the one or more communication conduits 77. The software associated with the computing resource 75 will sum the time domain force or moment ripple output of each channel and are then subsequently provided to a fast Fourier transform (FFT) analyzer (i.e., this is a fixed-deflection measurement of the imparted "road force" of the workpiece), which will determine uniformity (or lack thereof) of the tire, T. Because, for example, three or more multi-axis load cells 114*u*$_a$ are used, a variety of uniformity-related measurements may be captured, such as, for example, rocking moments, yaw moments, pitch moments and the like. Each of the plurality of multi-axis load cells 114*u*$_a$ and the angular encoder 48 may be communicatively-coupled to the computing resource 75 by way of the one or more communication conduits 77 in order to record the lack of uniformity of the tire, T, that was detected by the plurality of multi-axis load cells 114*u*$_a$ at a particular angular orientation of the tire, T, as determined by the angular encoder 48.

Referring to FIG. 28, in an example, the plurality of multi-axis load cells 114*u*$_a$ may include four multi-axis load cells 114*u*$_{a1}$, 114*u*$_{a2}$, 114*u*$_{a3}$, 114*u*$_{a4}$ that are arranged upon the support plate 116*u* in a "square shape." Referring to FIG. 28', in another example, the plurality of multi-axis load cells 114*u*$_a$ may include three multi-axis load cells 114*u*$_{a1}$, 114*u*$_{a2}$, 114*u*$_{a3}$ that are arranged upon the support plate 116*u* in an "L shape."

"Fixed Center" Tire Uniformity-Detecting Portion 110*u*

Figure 29:
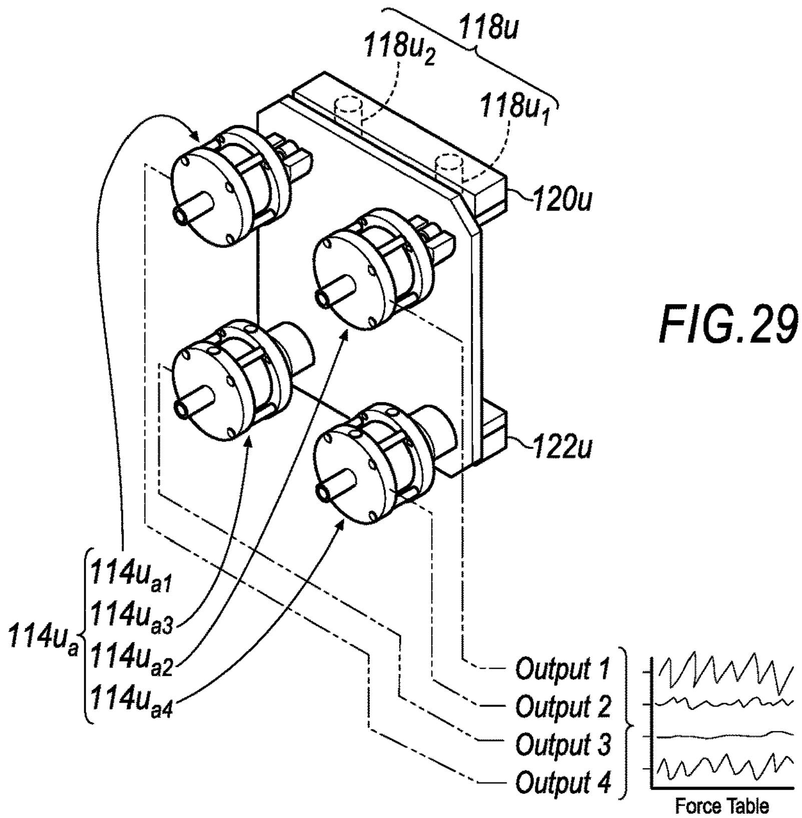
FIG. 29 is a partial perspective view of a portion of the exemplary portion of the apparatus of FIG. 27A'.
Figure 29:
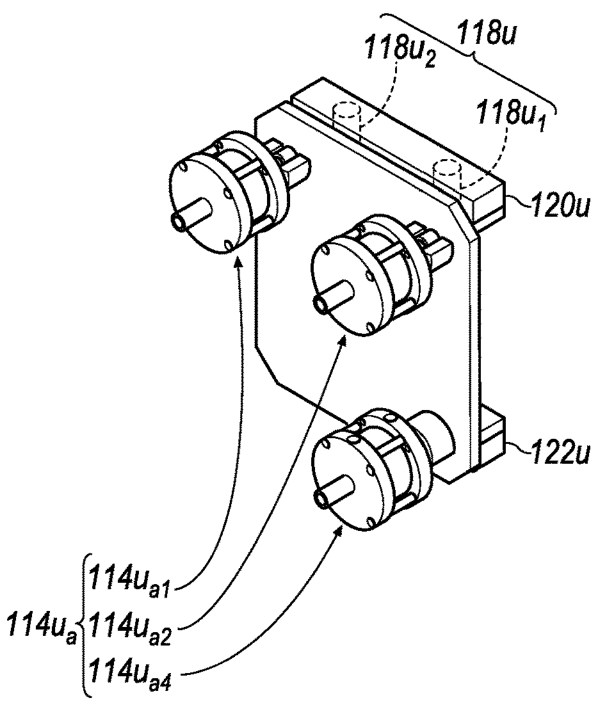

Referring to FIGS. 23A-23E, 27A-27B', 29-29", an exemplary tire uniformity-detecting portion 110*u* may be referred to as a "fixed center" tire uniformity-detecting portion that includes a plurality of air spring members 114*u*$_b$ secured to a support plate 116*u*. Referring to FIG. 29, in an example, the plurality of air spring members 114*u*$_b$ may include four air spring members 114*u*$_{b1}$, 114*u*$_{b2}$, 114*u*$_{b3}$, 114*u*$_{b4}$ secured to the support plate 116*u* in a "square shape." Referring to FIG. 29', in another example, the plurality of air spring members 114*u*$_b$ may include three air spring members 114*u*$_{b1}$, 114*u*$_{b2}$, 114*u*$_{b3}$ secured to the support plate 116*u* in an "L shape." Referring to FIG. 29", in yet another example, the plurality of air spring members 114*u*$_b$ may include three air spring members 114*u*$_{b1}$, 114*u*$_{b2}$, 114*u*$_{b3}$ secured to the support plate 116*u* in a "triangular shape." The tire uniformity-detecting portion 110*u* may also include at least one laser indicator 126 (see, e.g., FIGS. 27A'-27B'). The method for utilizing the "fixed center" tire uniformity-detecting portion 110*u* incorporating the plurality of air spring members 114*u*$_b$ is described below in further detail.

Tire Tread-Engaging Member 112*u*— Configuration of Roller Members 118*u*

Referring to FIGS. 27A-29", the tire tread-engaging member 112*u* may be configured to include a plurality of roller members 118*u*. The plurality of roller members 118*u* are rotatably connected to an upper bracket 120*u* and a lower bracket 122*u*.

In an example, as seen at FIGS. 27A-29", an exemplary tire tread-engaging member 112*u*$_1$ may include a plurality of roller members 118*u* rotatably connected to an upper bracket 120*u* and a lower bracket 122*u*. The plurality of roller members 118*u* may include only two roller members 118*u*$_1$, 118*u*$_2$, being a first roller member 118*u*$_1$ and a second roller member 118*u*$_2$.

Figure 27A:
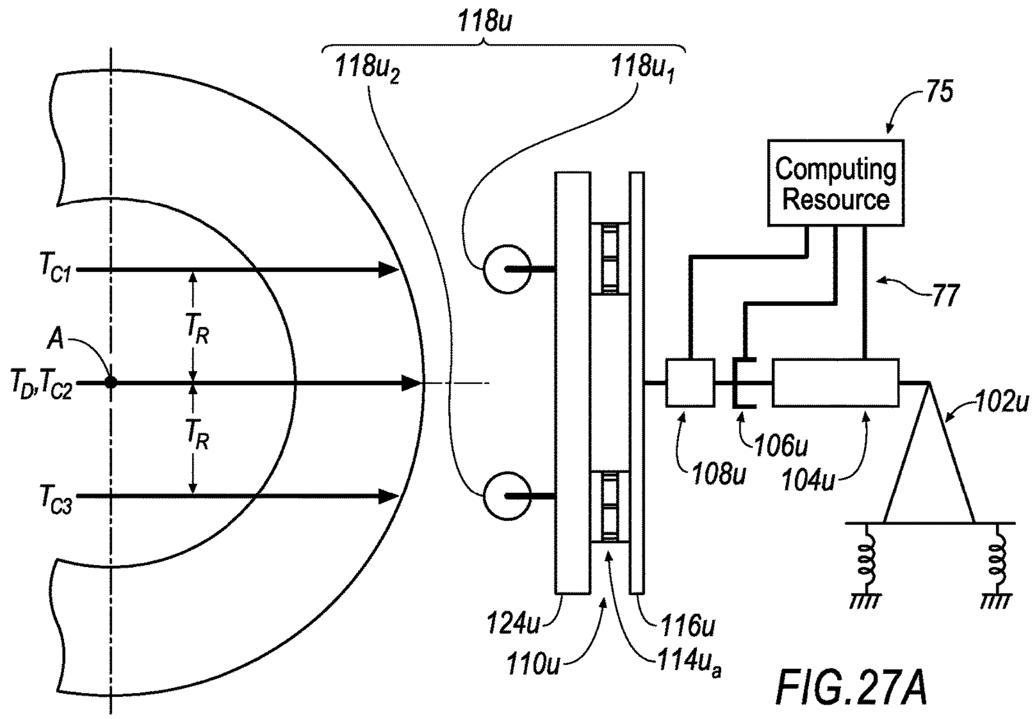
FIG. 27A is a partial top view of an exemplary portion of the apparatus of FIG. 20 according to line 27A of FIG. 23D.
Figure 27B:
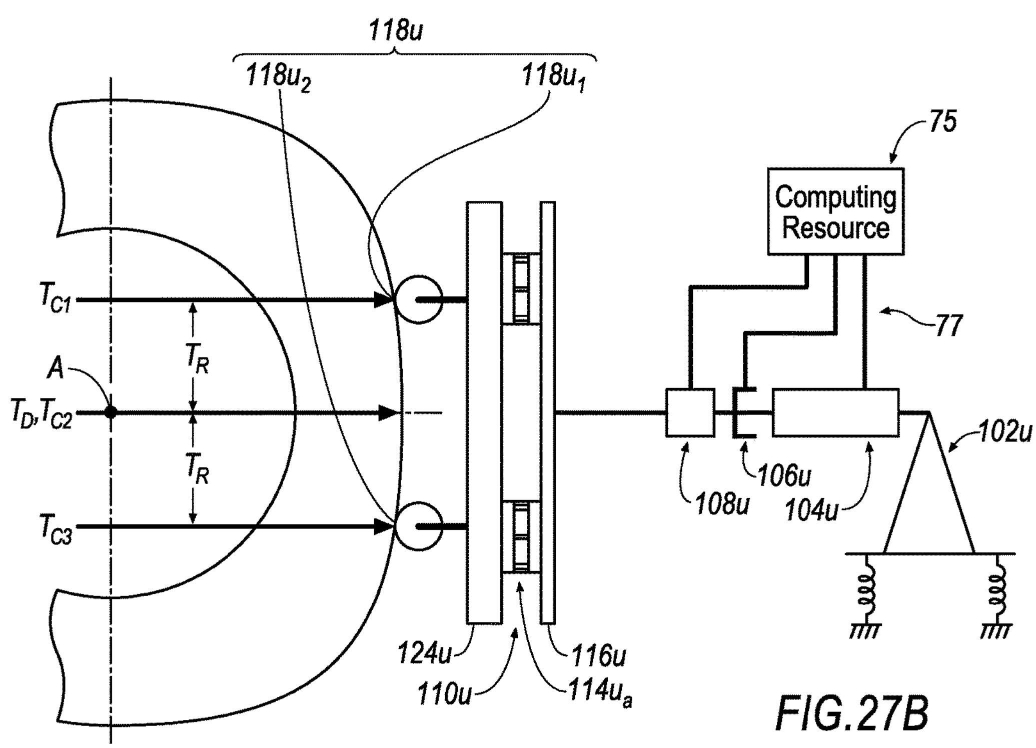
FIG. 27B is a partial top view of an exemplary portion of the apparatus of FIG. 20 according to line 27B of FIG. 23E.
Figure 27A:
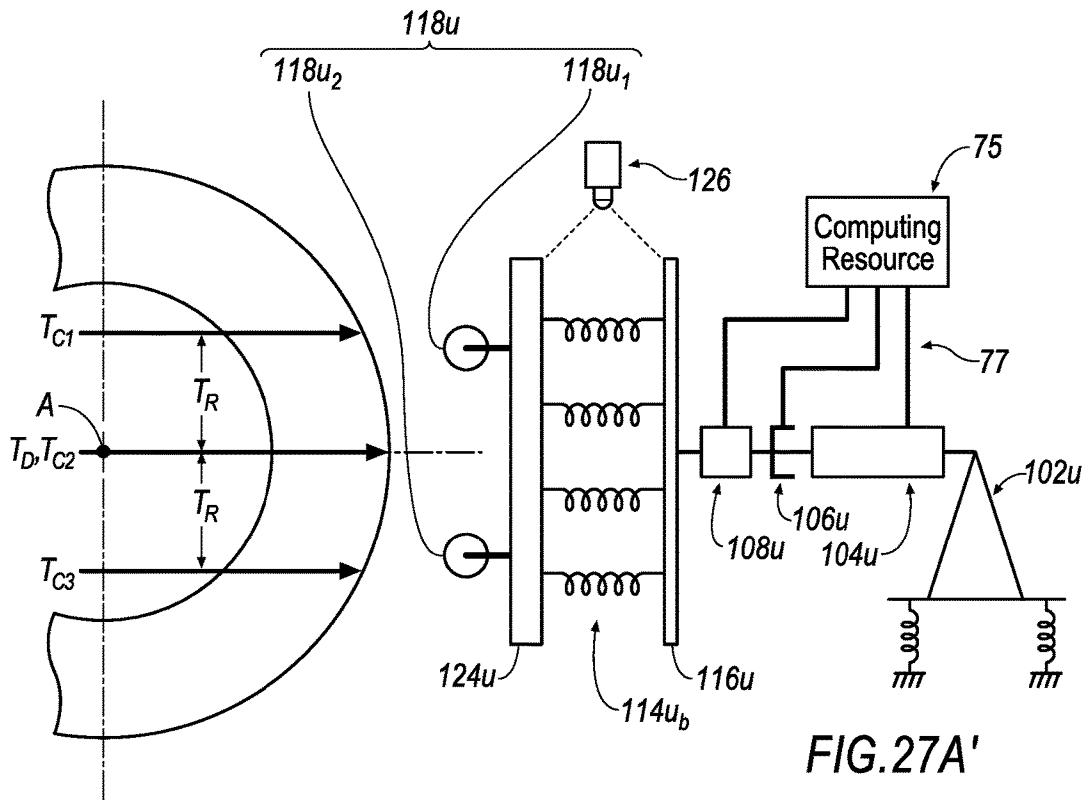
Figure 27B:
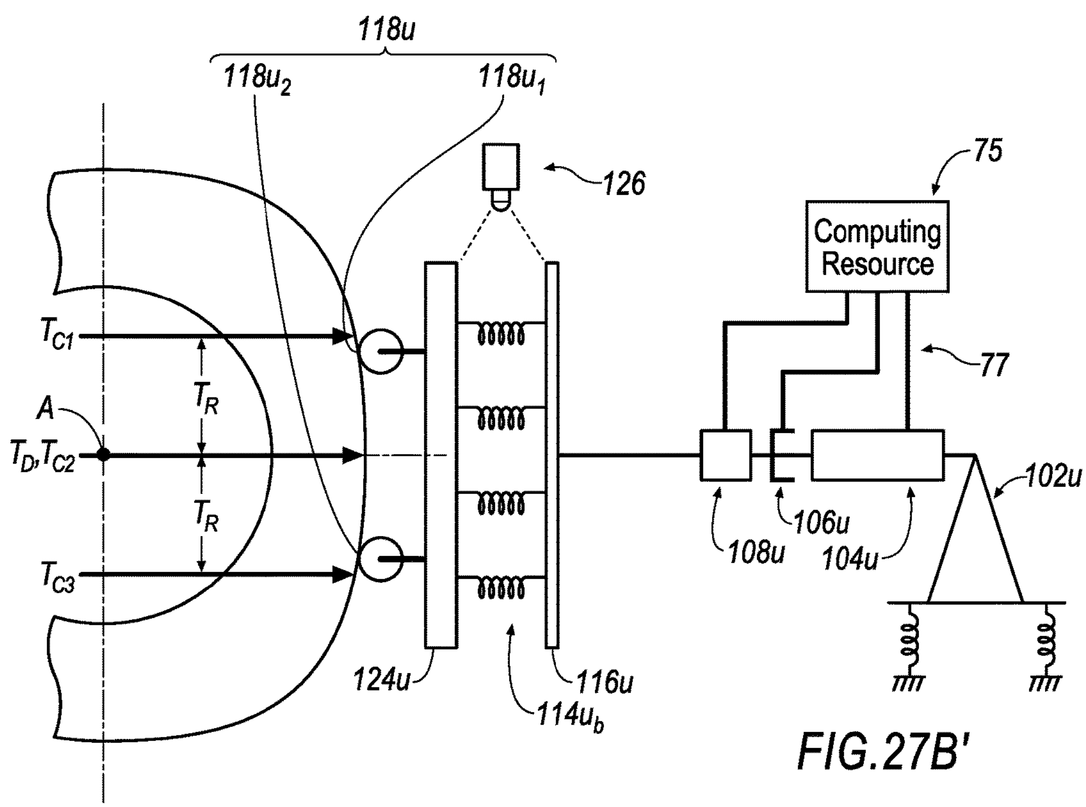

As seen in each of FIGS. 27A and 27A', the first roller member 118*u*$_1$ and the second roller member 118*u*$_2$ are arranged in a spaced-apart, non-contact orientation with respect to a tread surface $T_T$ of the tire T. Referring to each of FIGS. 27B and 27B', the first roller member 118*u*$_1$ and the second roller member 118*u*$_2$ are arranged in an engaged, contact orientation with respect to the tread surface $T_T$ of the tire T for applying a specified load to the tread surface, $T_T$, of the tire, T.

In a substantially similar manner as described above at FIGS. 30A and 30D, several chords are shown extending across the tire T at $T_{C1}$, $T_{C2}$ (i.e., the tire diameter, $T_D$) and $T_{C3}$. The cord $T_{C2}$ may be referred to as a "central" chord that extends across the diameter of the tire, T and, also, orthogonally with respect to the central axis/axis of rotation A-A of the tire T. Each of the first chord $T_{C1}$ (associated with the first roller member 118*u*$_1$) and the second chord $T_{C3}$ (associated with the second roller member 118*u*$_2$) are parallel with one another. In some implementations, the first chord $T_{C1}$ and the second chord $T_{C3}$ are equally radially spaced from the central chord $T_{C2}$ at a radial distance $T_R$. Movement of each of the first roller member 118*u*$_1$ and the second roller member 118*u*$_2$ as described above to/from the spaced-apart, non-contact orientation and the engaged, contact orientation occurs, respectively, along a first cord $T_{C1}$ and a second cord $T_{C3}$ extending across the tire T.

Both of the upper bracket 120*u* and the lower bracket 122*u* are secured to a support plate 124*u*. In some instances, the support plate 124*u* is connected to the plurality of multi-axis load cells 114*u*$_a$ (of the exemplary embodiment described at FIGS. 23A-23E, 27A-27B, 28-28') or the plurality of air spring members 114*u*$_b$ (of the exemplary embodiment described at FIGS. 23A-23E, 27A'-27B', 29-29") such that the plurality of multi-axis load cells 114*u*$_a$ or the plurality of air spring members 114*u*$_b$ are "sandwiched" between the support plate 116*u* of the tire uniformity-detecting portion $110u_1$/the tire uniformity-detecting portion $110u_2$ and the support plate 124*u* of the tire tread-engaging member $112u_1$.

When the "fixed center" tire uniformity-detecting portion 110*u* incorporating the plurality of air spring members $114u_b$ is incorporated into the design of the uniformity device 10*u*, the at least one laser indicator 126, which is positioned proximate the plurality of air spring members $114u_b$ as well as the support plate 116*u* and the support plate 124*u*, may detect a difference in an amount distance between the support plate 116*u* and the support plate 124*u*; accordingly, when a lack of uniformity of the tire, T, may occur at a particular angular revolution of the tire, T, the plurality of air spring members $114u_b$ may: (1) compress, thereby reducing the distance between the support plates 116*u*, 124*u*, or alternatively, (2) expand, thereby increasing the distance between the support plates 116*u*, 124*u*. Each of the at least one laser indicator 126 and the angular encoder 48 may be communicatively-coupled to the computing resource 75 by way of the one or more communication conduits 77 in order to record the lack of uniformity of the tire, T, that was detected by the at least one laser indicator 126 at a particular angular orientation of the tire, T, as determined by the angular encoder 48.

Functionally, the at least one laser indicator 126 produces at least one signal that is communicated to the computing resource 75 over the one or more communication conduits 77; the at least one signal is a time domain displacement ripple output. If more than one laser indicator 126 is used, software associated with the computing resource 75 sums the time domain displacement ripple output of each signal output by each laser indicator 126, which is then subsequently provided to a fast Fourier transform (FFT) analyzer (i.e., this is a "quasi fixed load" measurement of the loaded radius of the workpiece).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An apparatus, comprising:

a uniformity device that determines uniformity of a workpiece, wherein the uniformity device includes: a lower workpiece-engaging portion that interfaces with an upper workpiece-engaging portion; and a computing resource communicatively-coupled to one or more components of one or both of the lower workpiece-engaging portion and the upper workpiece-engaging portion by one or more communication conduits, wherein the lower workpiece-engaging portion includes a central shaft having a proximal end and a distal end and an elongated body that extends between the proximal end and the distal end, wherein the lower workpiece-engaging portion includes a motor, wherein the proximal end of the central shaft is connected to the motor, wherein the lower workpiece-engaging portion includes a radially manipulatable workpiece-engaging chuck that is connected to the distal end of the central shaft, wherein the upper workpiece-engaging portion includes an axially-movable cylinder having a proximal end and a distal end forming a recess that is sized for receiving the radially manipulatable workpiece-engaging chuck; and a first tire tread-engaging portion opposingly-arranged with respect to a second tire tread-engaging portion, wherein each of the first tire tread-engaging portion and the second tire tread-engaging portion includes a tire tread-engaging member, wherein the first tire tread-engaging portion includes a uniformity-detecting portion connected to the tire tread-engaging member having a tire tread-engaging member including a plurality of roller members rotatably connected to an upper bracket and a lower bracket, wherein the plurality of roller members consists of: only two roller members, wherein the uniformity-detecting portion includes three or more multi-axis load cells disposed between and connecting a first support plate to a second support plate, wherein the second support plate is connected to the upper bracket and the lower bracket.

2. The apparatus according to claim 1, wherein a first roller member of the two roller members is arranged for movement along a first path, wherein a second roller member of the two roller members is arranged for movement along a second path, wherein the first path and the second path are arranged in parallel.

3. The apparatus according to claim 1 further comprising:

a balancing device that determines imbalance of the workpiece, wherein the balancing device includes: the lower workpiece-engaging portion; and the computing resource communicatively-coupled to the lower workpiece-engaging portion by one or more communication conduits, wherein the lower workpiece-engaging portion includes at least one multi-axis transducer.

4. The apparatus according to claim 1, wherein information relating to uniformity of the workpiece is provided by the three or more multi-axis load cells and is over-deterministically calculated in terms of at least one group of signals associated with respective axes of at least two axes that are produced by the three or more multi-axis load cells, wherein the at least one group of signals includes:

a group of two or more torque-moment signals with each torque-moment signal associated with a respective axis of the at least two axes, or a group of two or more force signals with each force signal associated with a respective axis of the at least two axes, wherein all axes of the at least two axes share the same origin and are orthogonal to one another.

5. The apparatus according to claim 4, wherein each signal of the at least one group of signals is communicated from the three or more multi-axis load cells to the computing resource by the one or more communication conduits, wherein the one or more communication conduits includes a plurality of signal communication channels equal a quantity of axes of the at least two axes of the three or more multi-axis load cells.

6. The apparatus according to claim 5, wherein the three or more multi-axis load cells includes three multi-axis load cells and wherein the at least two axes includes two axes thereby constituting the plurality of signal communication channels of the one or more communication conduits communicatively-connecting the three or more multi-axis load cells to the computing resource to include a total of six signal communication channels.

7. The apparatus according to claim 5, wherein the three or more multi-axis load cells includes three multi-axis load cells and wherein the at least two axes includes three axes thereby constituting the plurality of signal communication channels of the one or more communication conduits communicatively-connecting the three or more multi-axis load cells to the computing resource to include a total of nine signal communication channels.

8. The apparatus according to claim 5, wherein the three or more multi-axis load cells includes four multi-axis load cells and wherein the at least two axes includes two axes thereby constituting the plurality of signal communication channels of the one or more communication conduits communicatively-connecting the three or more multi-axis load cells to the computing resource to include a total of eight signal communication channels.

9. The apparatus according to claim 5, wherein the three or more multi-axis load cells includes four multi-axis load cells and wherein the at least two axes includes three axes thereby constituting the plurality of signal communication channels of the one or more communication conduits communicatively-connecting the three or more multi-axis load cells to the computing resource to include a total of twelve signal communication channels.

10. The apparatus according to claim 5, wherein each signal of the at least one group of signals is a time domain force or moment ripple output that is communicated to the computing resource over the one or more communication conduits, wherein software associated with the computing resource sums the time domain force or moment ripple output of each channel and are then subsequently provided to a fast Fourier transform analyzer.

11. The apparatus according to claim 1, wherein information relating to uniformity of the workpiece is provided by the three or more multi-axis load cells and is over-deterministically calculated in terms of at least one group of signals associated with respective axes of at least two axes that are produced by the three or more multi-axis load cells, wherein the at least one group of signals includes:

a group of two or more torque-moment signals with each torque-moment signal associated with a respective axis of the at least two axes, and a group of two or more force signals with each force signal associated with a respective axis of the at least two axes, wherein all axes of the at least two axes share the same origin and are orthogonal to one another.

12. The apparatus according to claim 11, wherein each signal of the at least one group of signals is communicated from the three or more multi-axis load cells to the computing resource by the one or more communication conduits, wherein the one or more communication conduits includes a plurality of signal communication channels equal a quantity of axes of the at least two axes of the three or more multi-axis load cells.

13. The apparatus according to claim 12, wherein the three or more multi-axis load cells includes three multi-axis load cells and wherein the at least two axes includes two axes thereby constituting the plurality of signal communication channels of the one or more communication conduits communicatively-connecting the three or more multi-axis load cells to the computing resource to include a total of six signal communication channels.

14. The apparatus according to claim 12, wherein the three or more multi-axis load cells includes three multi-axis load cells and wherein the at least two axes includes three axes thereby constituting the plurality of signal communication channels of the one or more communication conduits communicatively-connecting the three or more multi-axis load cells to the computing resource to include a total of nine signal communication channels.

15. The apparatus according to claim 12, wherein the three or more multi-axis load cells includes four multi-axis load cells and wherein the at least two axes includes two axes thereby constituting the plurality of signal communication channels of the one or more communication conduits communicatively-connecting the three or more multi-axis load cells to the computing resource to include a total of eight signal communication channels.

16. The apparatus according to claim 12, wherein the three or more multi-axis load cells includes four multi-axis load cells and wherein the at least two axes includes three axes thereby constituting the plurality of signal communication channels of the one or more communication conduits communicatively-connecting the three or more multi-axis load cells to the computing resource to include a total of twelve signal communication channels.

17. The apparatus according to claim 12, wherein each signal of the at least one group of signals is a time domain force or moment ripple output that is communicated to the computing resource over the one or more communication conduits, wherein software associated with the computing resource sums the time domain force or moment ripple output of each channel and are then subsequently provided to a fast Fourier transform (FFT) analyzer.

18. An apparatus, comprising:

a uniformity device that determines uniformity of a workpiece, wherein the uniformity device includes: a lower workpiece-engaging portion that interfaces with an upper workpiece-engaging portion; and a computing resource communicatively-coupled to one or more components of one or both of the lower workpiece-engaging portion and the upper workpiece-engaging portion by one or more communication conduits, wherein the lower workpiece-engaging portion includes a central shaft having a proximal end and a distal end and an elongated body that extends between the proximal end and the distal end, wherein the lower workpiece-engaging portion includes a motor, wherein the proximal end of the central shaft is connected to the motor, wherein the lower workpiece-engaging portion includes a radially manipulatable workpiece-engaging chuck that is connected to the distal end of the central shaft, wherein the upper workpiece-engaging portion includes an axially-movable cylinder having a proximal end and a distal end forming a recess that is sized for receiving the radially manipulatable workpiece-engaging chuck; and a first tire tread-engaging portion opposingly-arranged with respect to a second tire tread-engaging portion, wherein each of the first tire tread-engaging portion and the second tire tread-engaging portion includes a tire tread-engaging member, wherein the first tire tread-engaging portion includes a uniformity-detecting portion connected to the tire tread-engaging member having a tire tread-engaging member including a plurality of roller members rotatably connected to an upper bracket and a lower bracket, wherein the plurality of roller members consists of: only two roller members, wherein the uniformity-detecting portion further includes:

three or more air spring members disposed between and connecting a first support plate to a second support plate; and at least one laser indicator that is positioned proximate the plurality of air spring members as well as the first support plate and the second support plate, wherein the at least one laser indicator detects a difference in an amount distance between the first support plate and the second support plate as a result of a compression or expansion of the three or more air spring members that connects a first support plate to the second support plate.

19. The apparatus according to claim 18, wherein the at least one laser indicator produces at least one signal that is communicated to the computing resource over the one or more communication conduits, wherein the at least one signal is a time domain displacement ripple output.

20. The apparatus according to claim 19, wherein if more than one laser indicator is used, software associated with the computing resource sums the time domain displacement ripple output of each signal output by each laser indicator which is then subsequently provided to a fast Fourier transform analyzer.

21. The apparatus according to claim 5, wherein the only two roller members that are separated by a gap, wherein the gap spans a leading edge and a trailing edge of a tire contact patch area.

22. The apparatus according to claim 1, wherein the first tire tread-engaging portion includes a pedestal member connected to a radially-movable cylinder or servo mechanism that selectively radially moves the uniformity-detecting portion connected to the tire tread-engaging member, wherein the first tire tread-engaging portion includes an applied load-detecting portion.

23. The apparatus according to claim 22, wherein selective radial movement of the uniformity-detecting portion imparted by the radially-movable cylinder or servo mechanism ceases once the applied load-detecting portion detects that the tire tread-engaging member applies a specified load to the workpiece.

24. The apparatus according to claim 1, wherein the lower workpiece-engaging portion includes a workpiece inboard surface-engaging member connected to the elongated body of the central shaft proximate the distal end of the central shaft.

25. The apparatus according to claim 1, wherein the lower workpiece-engaging portion includes an angular encoder connected to the elongated body of the central shaft between the distal end of the central shaft and the proximal end of the central shaft.

26. The apparatus according to claim 1, wherein the uniformity device includes a base member, a lower support member and an upper support member, wherein the lower support member and the upper support member are arranged upon the base member, wherein the lower support member is connected to the lower workpiece-engaging portion, wherein the upper support member is connected to the upper workpiece-engaging portion.

27. The apparatus according to claim 12, wherein the upper workpiece-engaging portion includes an axially-movable cylinder having a proximal end connected to a canopy member of an upper support member.

28. The apparatus according to claim 1, wherein the three or more multi-axis load cells are strain gauge transducers.

29. The apparatus according to claim 1, wherein the three or more multi-axis load cells are piezoelectric transducers.

30. A method, comprising the steps of:

providing the uniformity device of claim 1;

arranging the workpiece upon the lower workpiece-engaging portion, wherein the workpiece is a tire-wheel assembly;

removably-securing the tire-wheel assembly to the lower workpiece-engaging portion;

interfacing the upper workpiece-engaging portion with the lower workpiece-engaging portion for rotatably-sandwiching the tire-wheel assembly between the lower workpiece-engaging portion and the upper workpiece-engaging portion;

interfacing the tire tread-engaging member of each of the first tire tread-engaging portion and the second tire tread-engaging portion adjacent a tread surface of a tire of the tire-wheel assembly until the tire tread-engaging member applies a specified load to the workpiece;

rotating the lower workpiece-engaging portion in order to impart the rotation to the tire-wheel assembly; and communicating a signal from the uniformity-detecting portion to the computing resource by way of the one or more communication conduits, wherein the signal is indicative of uniformity or a lack of uniformity of the tire of the tire-wheel assembly.

31. A method, comprising the steps of:

providing the balancing device of claim 3;

arranging the workpiece upon the lower workpiece-engaging portion, wherein the workpiece is a calibration disk;

attaching one or more imbalance weights to one or more of the inboard surface and the outboard surface of the calibration disk;

removably-securing the calibration disk to the lower workpiece-engaging portion;

rotating the lower workpiece-engaging portion in order to impart the rotation to the calibration disk at sufficient rotational speed for any components of mass imbalance associated therewith to produce measurable inertial forces; and communicating a signal from the multi-axis transducer to the computing resource by way of the one or more communication conduits, wherein the signal is indicative of a predetermined imbalance configuration of the calibration disk that is defined by the one or more imbalance weights attached to one or more of the inboard surface and the outboard surface of the calibration disk.

32. A method, comprising the steps of:

providing the balancing device of claim 3;

arranging the workpiece upon the lower workpiece-engaging portion, wherein the workpiece is a tire-wheel assembly;

removably-securing the tire-wheel assembly to the lower workpiece-engaging portion;

rotating the lower workpiece-engaging portion in order to impart the rotation to the tire-wheel assembly at sufficient rotational speed for any components of mass imbalance associated therewith to produce measurable inertial forces; and communicating a signal from the multi-axis transducer to the computing resource by way of the one or more communication conduits, wherein the signal is indicative of an unknown imbalance of the tire-wheel assembly.

33. A method, comprising the steps of:

providing the apparatus of claim 3;

arranging at least one lock-up mechanism in a first state of engagement for arranging the apparatus in the balancing mode, wherein the first state of engagement is different than a second state of engagement of the at least one lock-up mechanism;

arranging the workpiece upon the lower workpiece-engaging portion, wherein the workpiece is a calibration disk;

attaching one or more imbalance weights to one or more of the inboard surface and the outboard surface of the calibration disk;

removably-securing the calibration disk to the lower workpiece-engaging portion;

rotating the lower workpiece-engaging portion in order to impart the rotation to the calibration disk at sufficient rotational speed for any components of mass imbalance associated therewith to produce measurable inertial forces; and communicating a signal from the multi-axis transducer to the computing resource by way of the one or more communication conduits, wherein the signal is indicative of a predetermined imbalance configuration of the calibration disk that is defined by the one or more imbalance weights attached to one or more of the inboard surface and the outboard surface of the calibration disk.

34. A method, comprising the steps of:

providing the apparatus of claim 3;

arranging at least one lock-up mechanism in a first state of engagement for arranging the apparatus in the balancing mode, wherein the first state of engagement is different than a second state of engagement of the at least one lock-up mechanism;

arranging the workpiece upon the lower workpiece-engaging portion, wherein the workpiece is a tire-wheel assembly;

removably-securing the tire-wheel assembly to the lower workpiece-engaging portion;

rotating the lower workpiece-engaging portion in order to impart the rotation to the tire-wheel assembly at sufficient rotational speed for any components of mass imbalance associated therewith to produce measurable inertial forces; and communicating a signal from the multi-axis transducer to the computing resource by way of the one or more communication conduits, wherein the signal is indicative of an unknown imbalance of the tire-wheel assembly.

35. A method, comprising the steps of:

providing the apparatus of claim 3;

arranging at least one lock-up mechanism in a second state of engagement for arranging the apparatus in the uniformity mode, wherein the second state of engagement is different than a first state of engagement of the at least one lock-up mechanism;

arranging the workpiece upon the lower workpiece-engaging portion, wherein the workpiece is a tire-wheel assembly;

removably-securing the tire-wheel assembly to the lower workpiece-engaging portion;

interfacing the upper workpiece-engaging portion with the lower workpiece-engaging portion for rotatably-sandwiching the tire-wheel assembly between the lower workpiece-engaging portion and the upper workpiece-engaging portion;

interfacing the tire tread-engaging member of each of the first tire tread-engaging portion and the second tire tread-engaging portion adjacent a tread surface of a tire of the tire-wheel assembly until the tire tread-engaging member applies a specified load to the workpiece;

rotating the lower workpiece-engaging portion in order to impart the rotation to the tire-wheel assembly; and communicating a signal from the uniformity-detecting portion to the computing resource by way of the one or more communication conduits, wherein the signal is indicative of uniformity or a lack of uniformity of the tire of the tire-wheel assembly.

* * * * *